(12) United States Patent
Onozaki et al.

(10) Patent No.: US 9,201,219 B2
(45) Date of Patent: Dec. 1, 2015

(54) CLOSE-DISTANCE CORRECTING LENS SYSTEM

(71) Applicant: PENTAX RICOH IMAGING COMPANY, LTD., Tokyo (JP)

(72) Inventors: Tatsuyuki Onozaki, Tokyo (JP); Masakazu Saori, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 93 days.

(21) Appl. No.: 13/777,324

(22) Filed: Feb. 26, 2013

(65) Prior Publication Data

US 2013/0222925 A1    Aug. 29, 2013

(30) Foreign Application Priority Data

Feb. 28, 2012  (JP) .................................. 2012-041804
Feb. 28, 2012  (JP) .................................. 2012-041805
Dec. 19, 2012  (JP) .................................. 2012-277048

(51) Int. Cl.
| | |
|---|---|
| G02B 15/14 | (2006.01) |
| G02B 15/22 | (2006.01) |
| G02B 13/00 | (2006.01) |
| G02B 7/105 | (2006.01) |
| G02B 13/24 | (2006.01) |
| G02B 27/64 | (2006.01) |

(52) U.S. Cl.
CPC ............ *G02B 13/0055* (2013.01); *G02B 7/105* (2013.01); *G02B 13/24* (2013.01); *G02B 27/646* (2013.01); *G03B 2205/0015* (2013.01)

(58) Field of Classification Search
CPC .......... G03B 2205/0007; G02B 27/64; G02B 27/646; G02B 9/34; G02B 7/105; G02B 15/22; G02B 9/04; G02B 15/161

USPC ........ 359/557, 690, 692, 773, 795, 693, 705, 359/754, 554, 771; 396/52, 55; 348/208.11
See application file for complete search history.

(56) References Cited

U.S. PATENT DOCUMENTS

| | | | | | |
|---|---|---|---|---|---|
| 3,884,555 | A | * | 5/1975 | Suwa et al. ................... | 359/705 |
| 4,113,355 | A | * | 9/1978 | Tsuji et al. ................... | 359/693 |
| 4,178,076 | A | * | 12/1979 | Tsuji et al. ................... | 359/693 |
| 4,230,397 | A | * | 10/1980 | Fleischman ................... | 359/683 |
| 4,307,943 | A | * | 12/1981 | Betensky et al. ............. | 359/693 |

(Continued)

FOREIGN PATENT DOCUMENTS

| | | |
|---|---|---|
| JP | 06-130291 | 5/1994 |
| JP | 07-261126 | 10/1995 |

(Continued)

*Primary Examiner* — Scott J Sugarman
*Assistant Examiner* — Collin X Beatty
(74) *Attorney, Agent, or Firm* — Greenblum & Bernstein P.L.C.

(57) ABSTRACT

A close-distance correcting lens system includes a positive first lens group and a negative second lens group, wherein traveling distances of the first lens group and the second lens group toward the object side differ from each other when carrying out a focusing operation on an object at infinity to an object at a close distance. The first lens group includes a positive first sub lens group, a negative second sub lens group, a diaphragm, and a positive third sub lens group, in that order from the object side. The second sub lens group includes an image-stabilizing lens group which is arranged to move in a direction orthogonal to the optical axis to change an imaging position of the object image to thereby correct any image shake of the object image.

27 Claims, 126 Drawing Sheets

(56) References Cited

U.S. PATENT DOCUMENTS

| | | | |
|---|---|---|---|
| 4,348,082 A * | 9/1982 | Ogawa | 359/677 |
| 4,437,734 A * | 3/1984 | Iizuka | 359/745 |
| 4,634,236 A * | 1/1987 | Masumoto | 359/684 |
| 4,865,434 A * | 9/1989 | Matsushita et al. | 359/690 |
| 4,917,482 A * | 4/1990 | Ito | 359/690 |
| 5,033,832 A * | 7/1991 | Ito | 359/689 |
| 5,159,494 A * | 10/1992 | Yamanashi | 359/689 |
| 5,194,991 A * | 3/1993 | Yamanashi | 359/693 |
| 5,331,463 A * | 7/1994 | Yamanashi | 359/689 |
| 5,412,507 A * | 5/1995 | Sato | 359/687 |
| 5,530,589 A * | 6/1996 | Sato | 359/557 |
| 5,530,594 A * | 6/1996 | Shibayama | 359/690 |
| 5,572,277 A * | 11/1996 | Uzawa et al. | 359/686 |
| 5,654,826 A * | 8/1997 | Suzuki | 359/557 |
| 5,715,088 A * | 2/1998 | Suzuki | 359/557 |
| 5,731,897 A * | 3/1998 | Suzuki | 359/557 |
| 5,751,485 A | 5/1998 | Suzuki | |
| 5,760,967 A * | 6/1998 | Terasawa et al. | 359/684 |
| 5,841,590 A * | 11/1998 | Sato | 359/763 |
| 5,946,136 A | 8/1999 | Suzuki | |
| 6,091,903 A | 7/2000 | Murata et al. | |
| 6,094,313 A * | 7/2000 | Yamanashi | 359/686 |
| 6,141,156 A * | 10/2000 | Aoki | 359/686 |
| 6,154,324 A * | 11/2000 | Murata et al. | 359/693 |
| 6,342,972 B1 * | 1/2002 | Yamanashi | 359/686 |
| 6,359,739 B1 * | 3/2002 | Sensui | 359/754 |
| 6,829,106 B2 * | 12/2004 | Eguchi | 359/773 |
| 6,927,926 B2 * | 8/2005 | Kasahara et al. | 359/747 |
| 7,123,422 B2 * | 10/2006 | Suzuki | 359/690 |
| 7,242,532 B2 * | 7/2007 | Shibayama et al. | 359/690 |
| 7,330,316 B2 * | 2/2008 | Shibayama et al. | 359/686 |
| 7,423,813 B2 * | 9/2008 | Kamo | 359/686 |
| 7,471,462 B2 * | 12/2008 | Hatada | 359/690 |
| 7,777,974 B2 * | 8/2010 | Yamamoto | 359/791 |
| 8,792,182 B2 * | 7/2014 | Ito | 359/683 |
| 2002/0005851 A1 | 1/2002 | Kinno et al. | |
| 2003/0128438 A1 * | 7/2003 | Wada | 359/649 |
| 2004/0017617 A1 | 1/2004 | Taki | |
| 2008/0247058 A1 | 10/2008 | Kato | |
| 2009/0153980 A1 * | 6/2009 | Yamamoto | 359/693 |
| 2012/0050885 A1 * | 3/2012 | Onozaki | 359/686 |
| 2012/0293877 A1 * | 11/2012 | Watanabe | 359/715 |

FOREIGN PATENT DOCUMENTS

| | | |
|---|---|---|
| JP | 09-218349 | 8/1997 |
| JP | 11-231210 | 8/1999 |
| JP | 2003-185916 | 7/2003 |
| JP | 2003-279849 | 10/2003 |
| JP | 2004-61680 | 2/2004 |
| JP | 2008-20656 | 1/2008 |
| JP | 2008-257088 | 10/2008 |

* cited by examiner

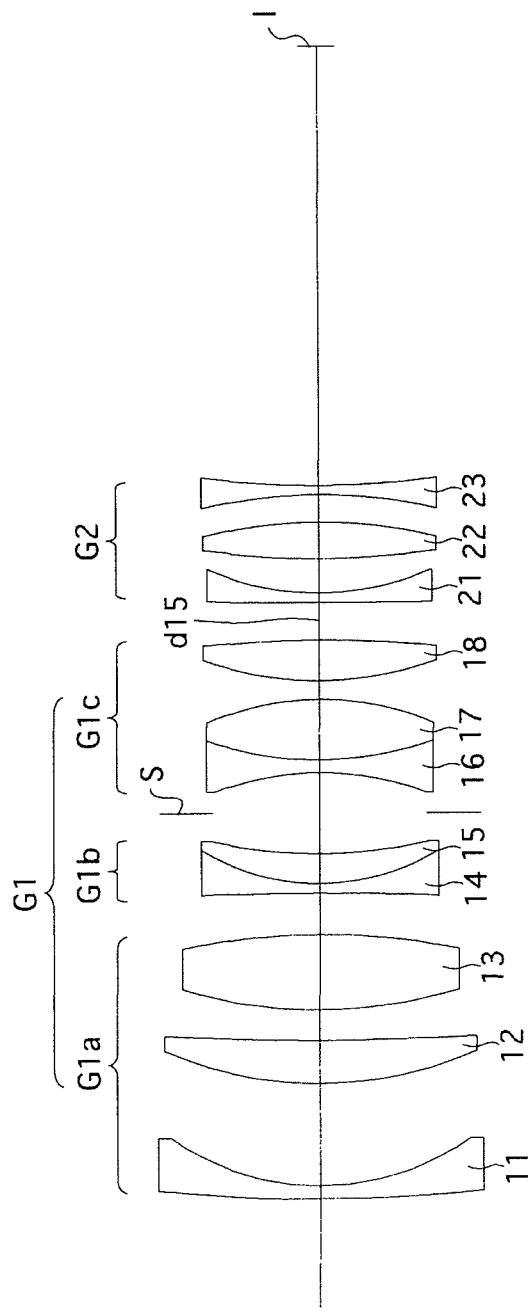

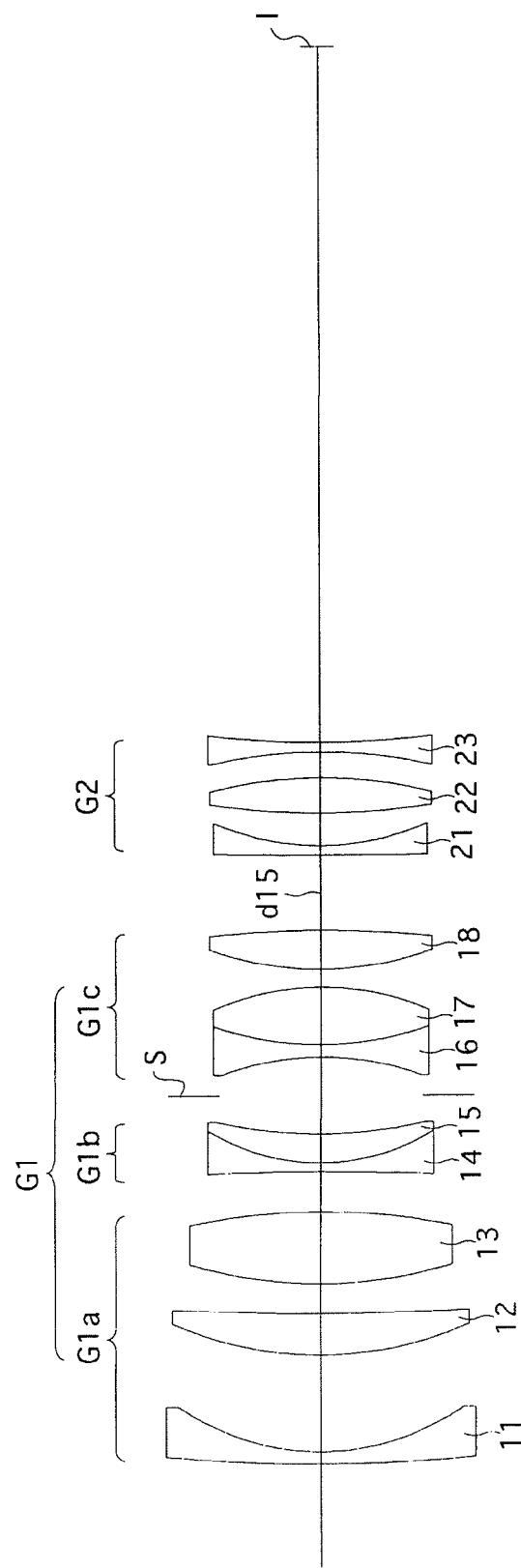

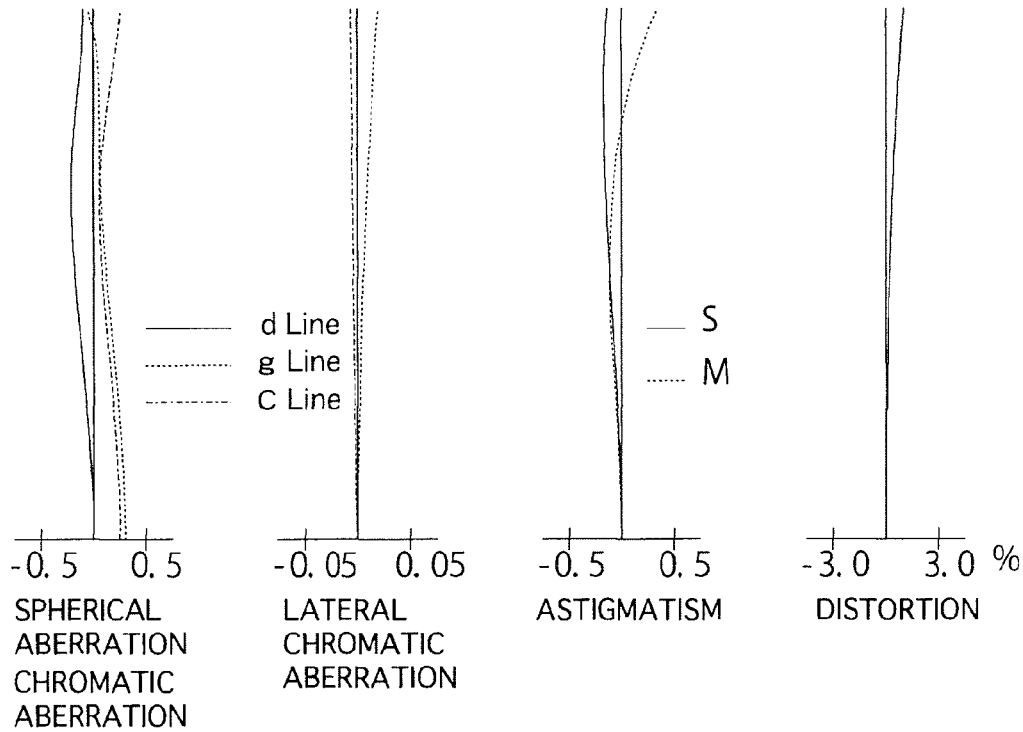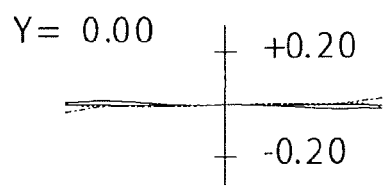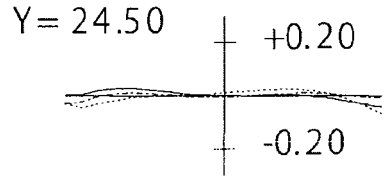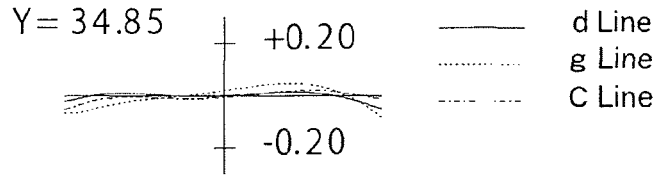

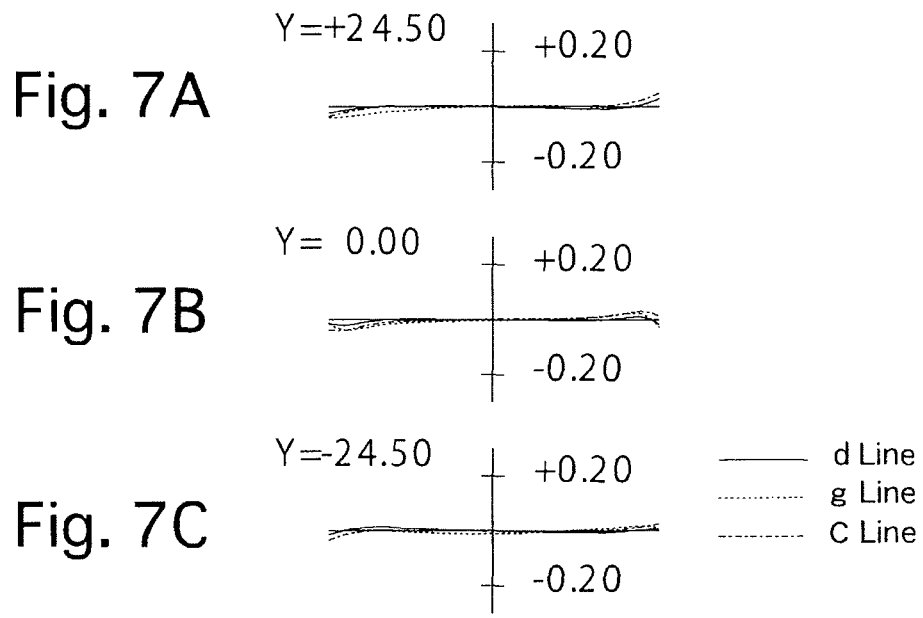
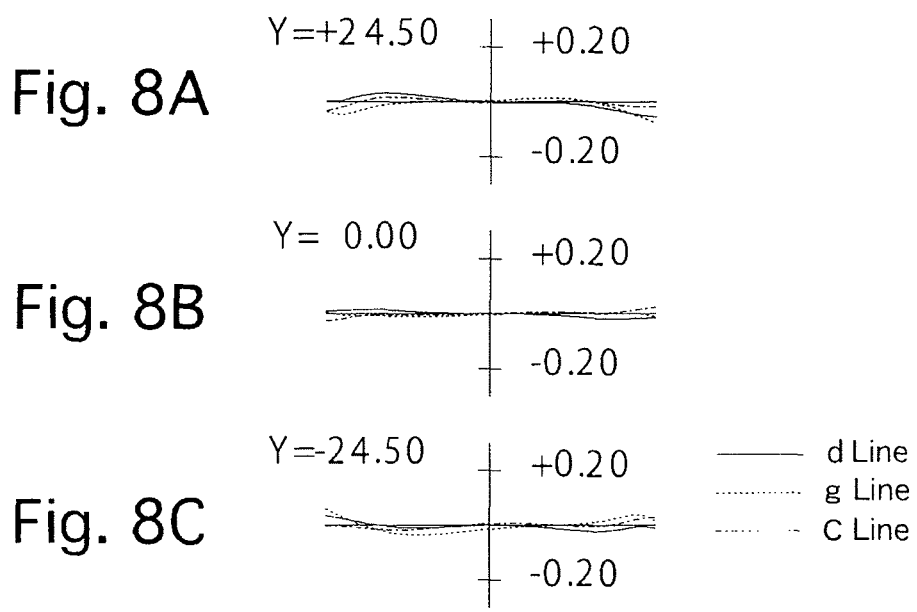

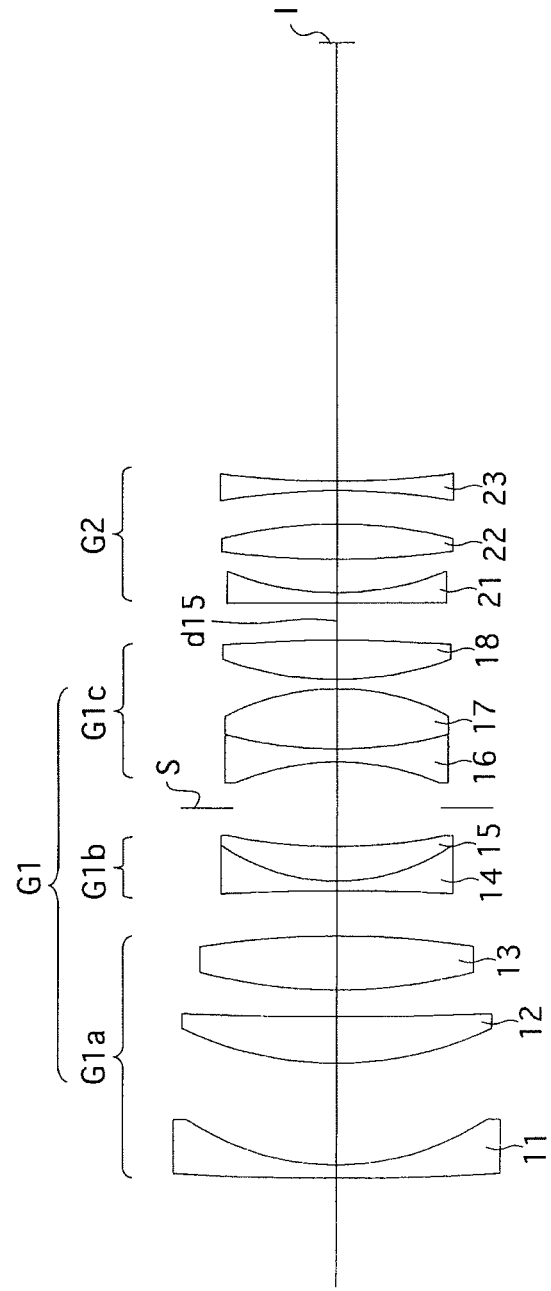

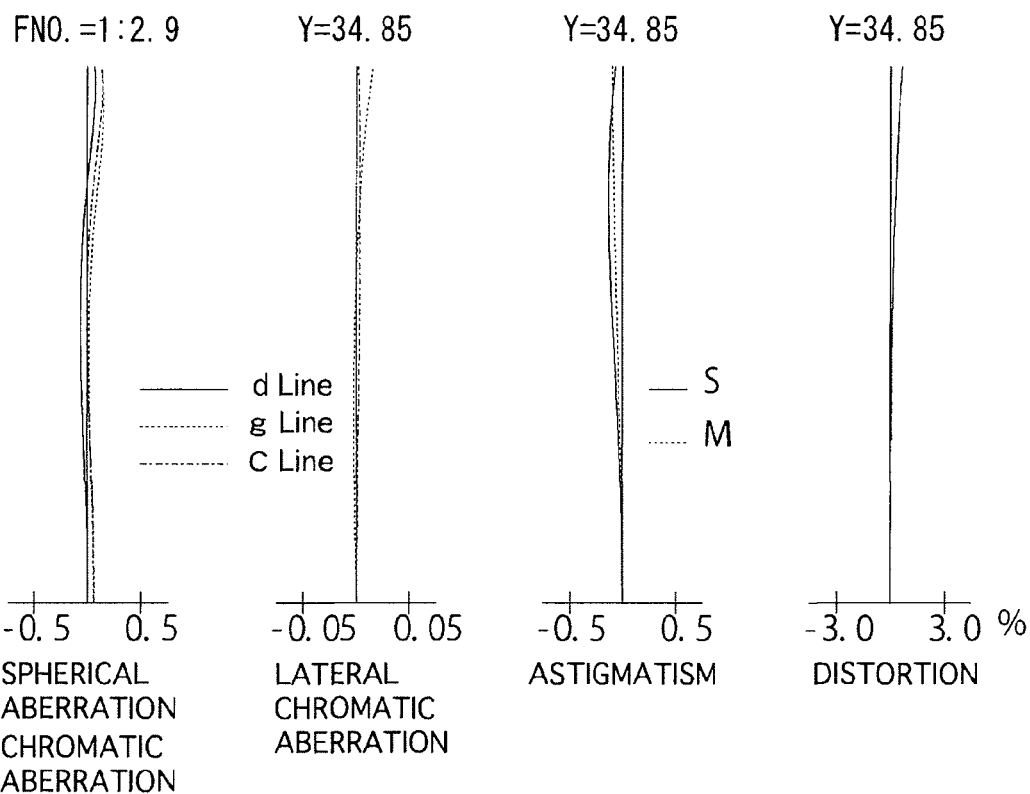
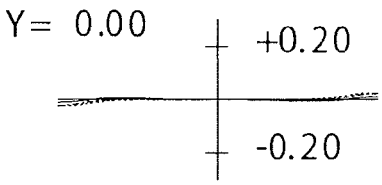
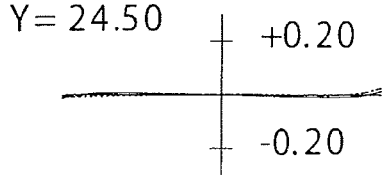
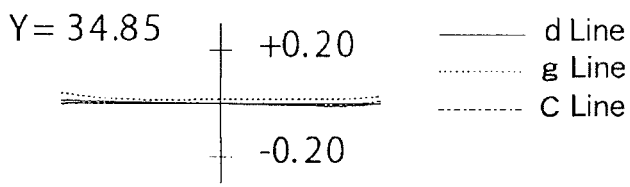

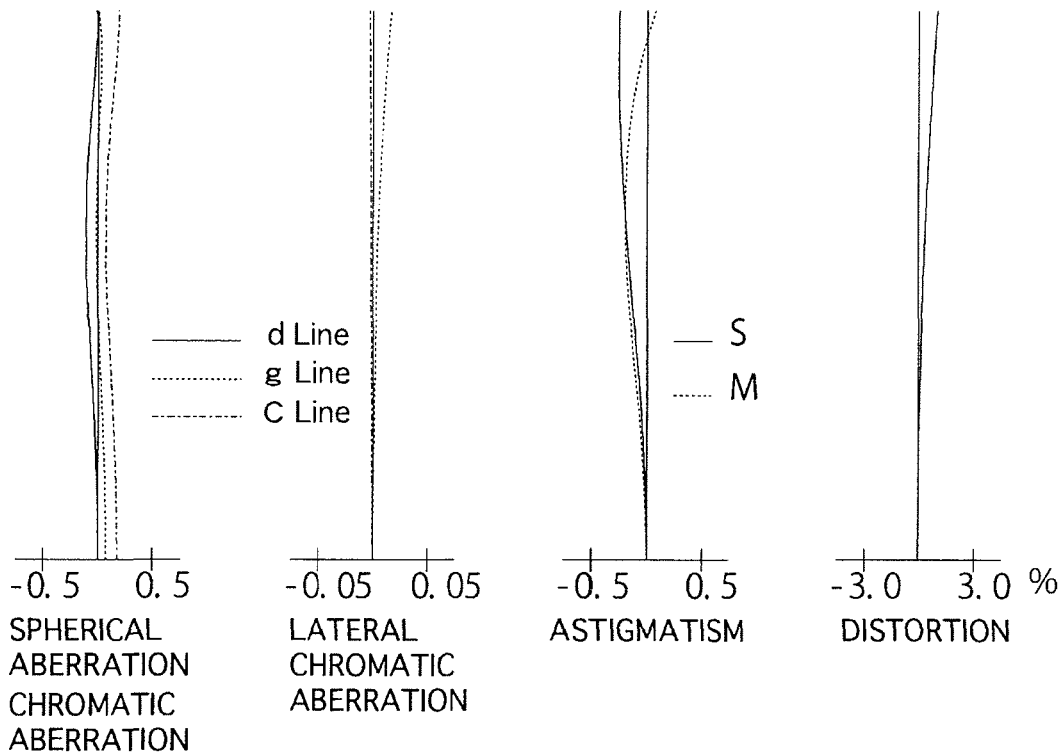
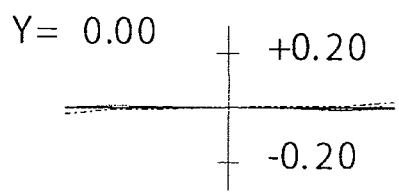
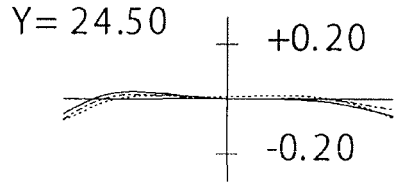
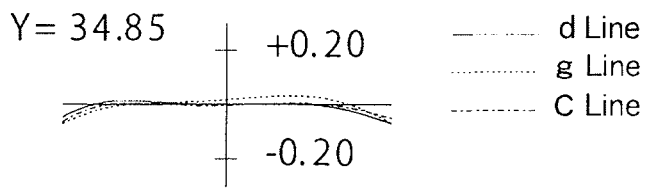

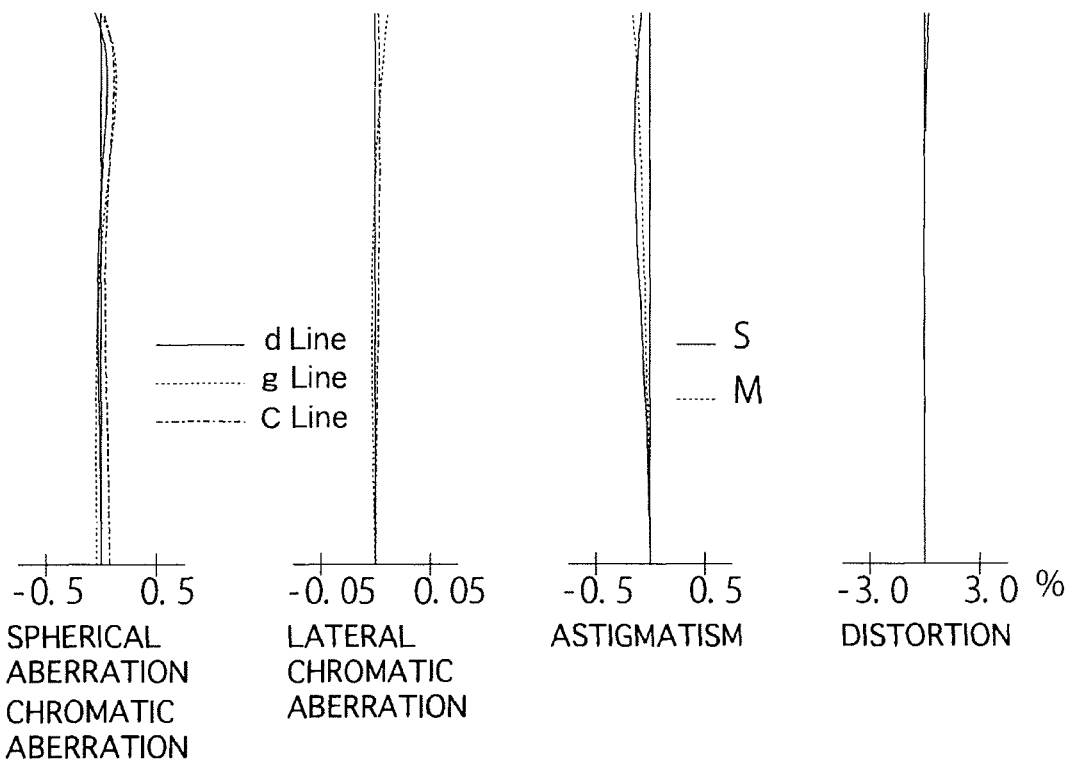
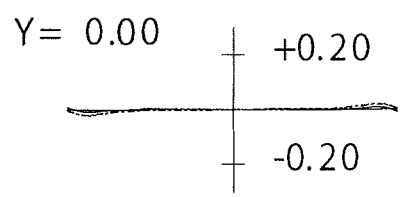
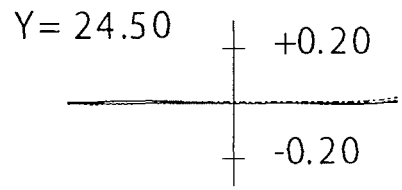
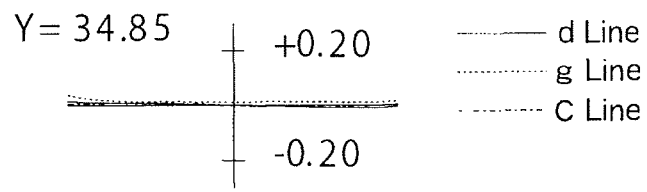

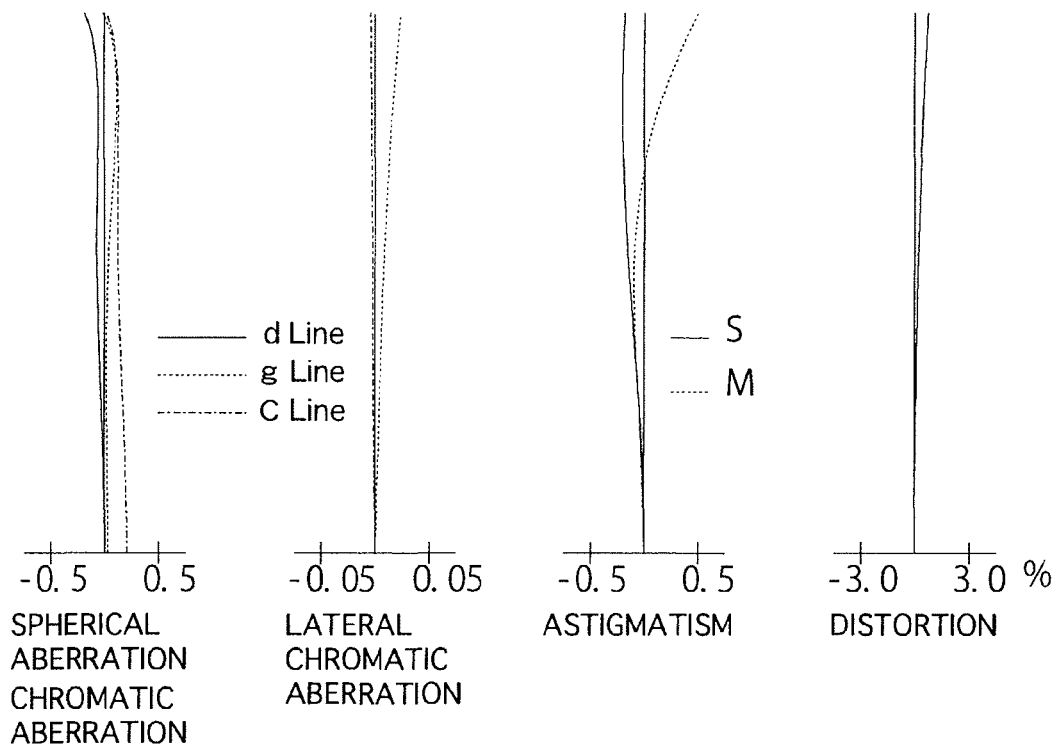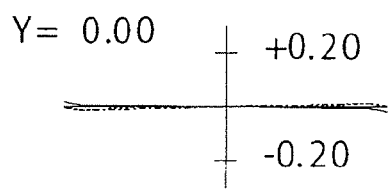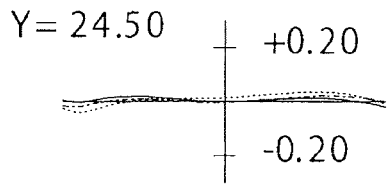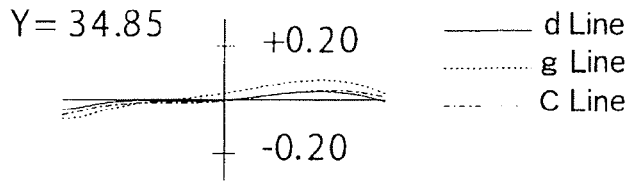

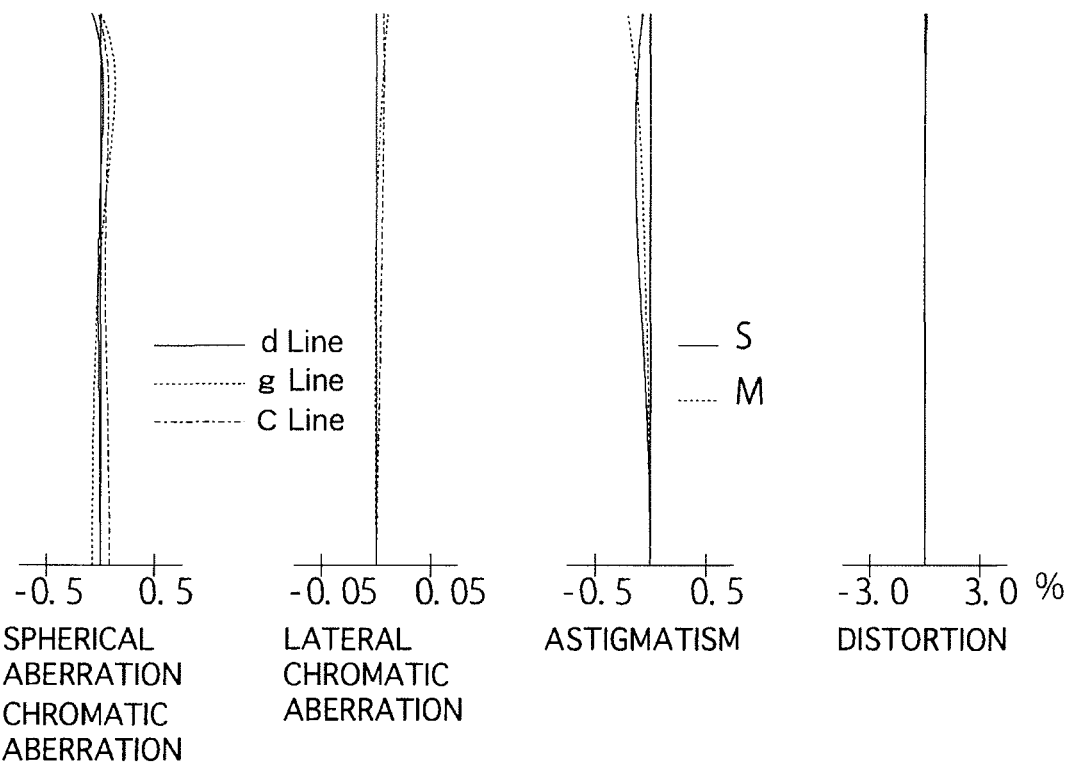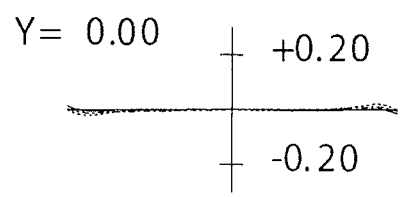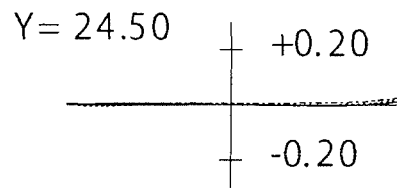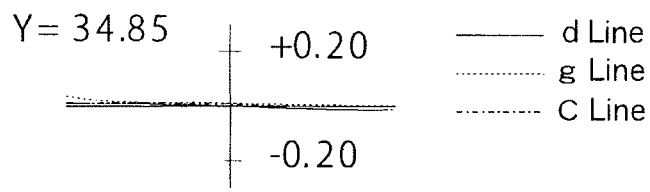

Fig. 29A  Fig. 29B  Fig. 29C  Fig. 29D
FNO.=1:4.1    Y=34.85    Y=34.85    Y=34.85
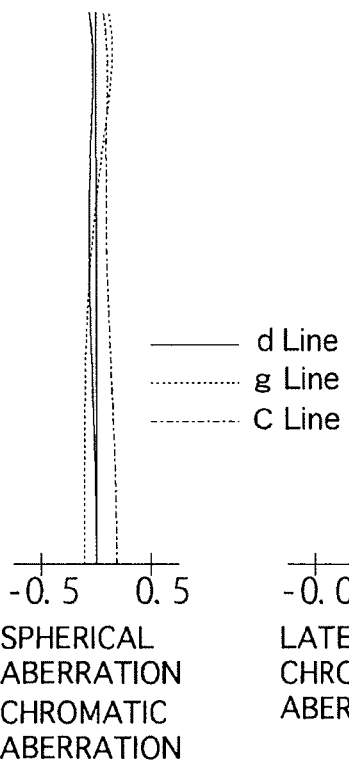
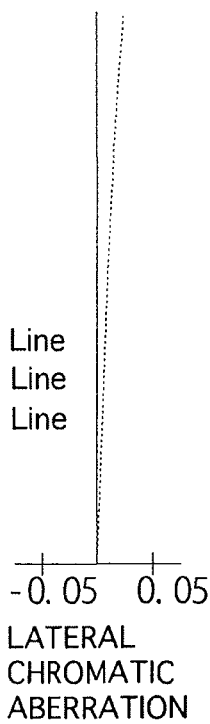
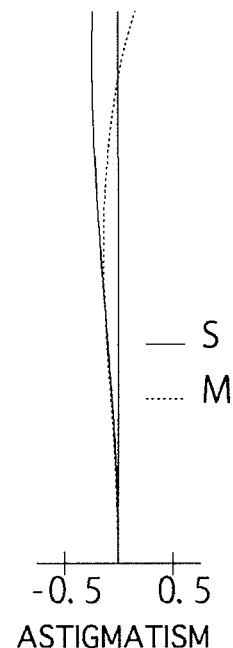
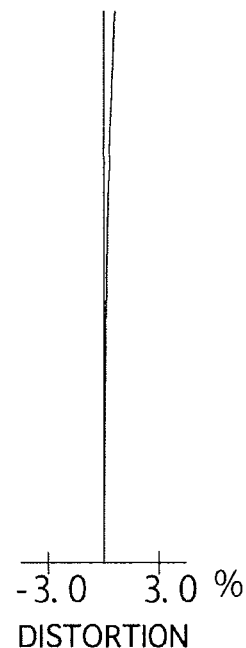
—— d Line
········· g Line
------ C Line
—— S
······· M
-0.5   0.5      -0.05  0.05     -0.5   0.5      -3.0   3.0 %
SPHERICAL       LATERAL         ASTIGMATISM     DISTORTION
ABERRATION      CHROMATIC
CHROMATIC       ABERRATION
ABERRATION
Fig. 30A
Y= 0.00    +0.20
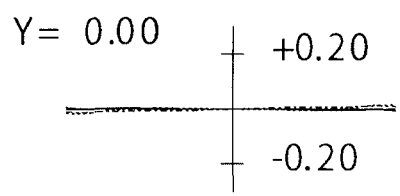
-0.20
Fig. 30B
Y= 24.50   +0.20
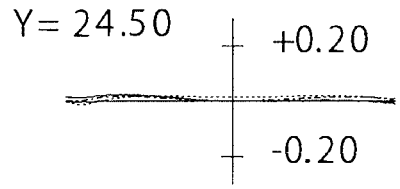
-0.20
Fig. 30C
Y= 34.85   +0.20
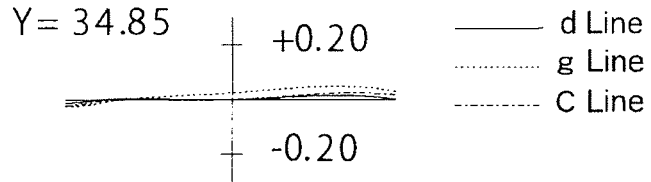
-0.20
—— d Line
············ g Line
------ C Line

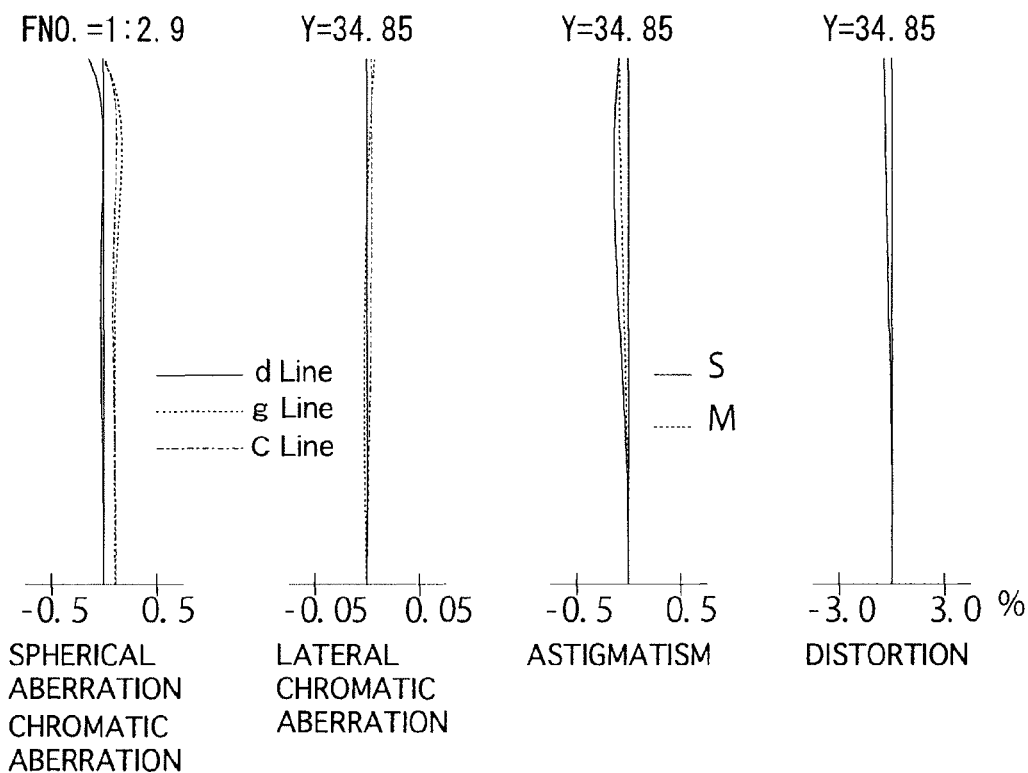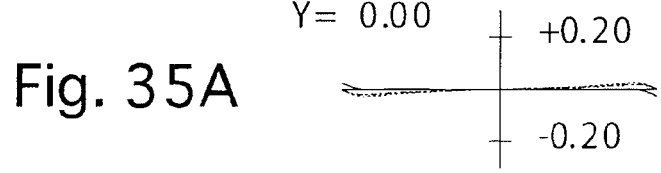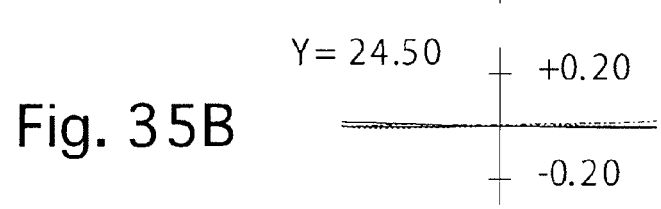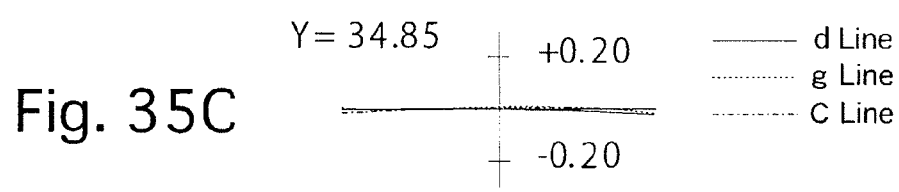

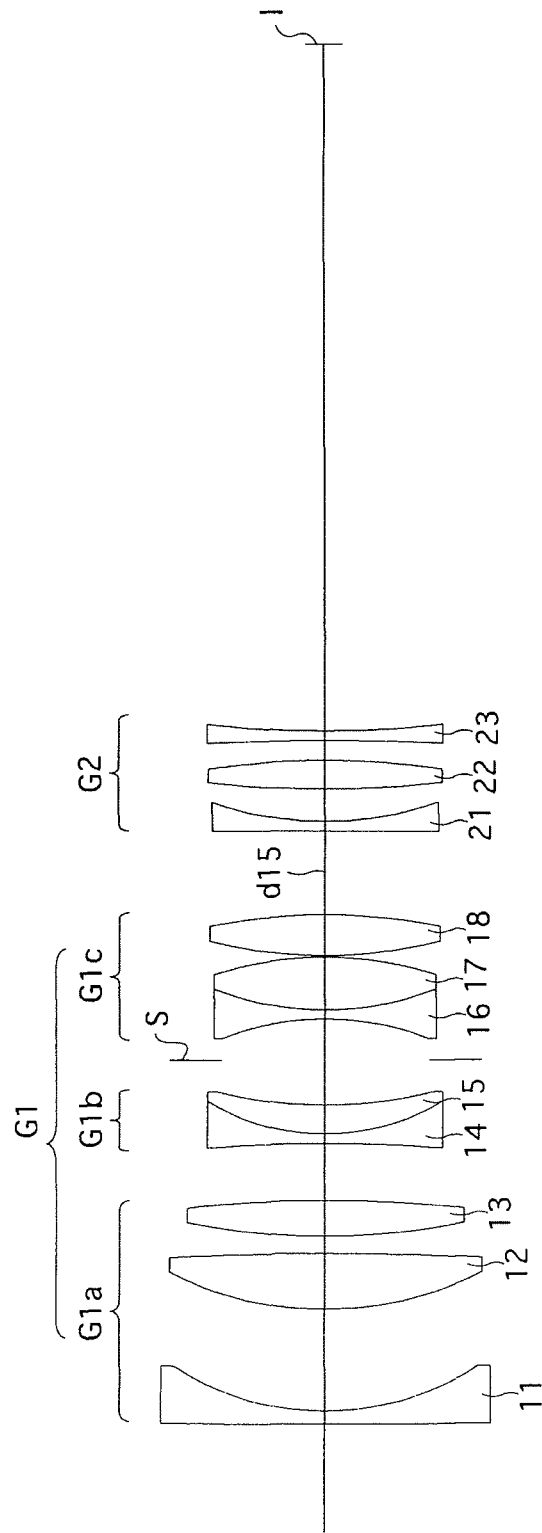

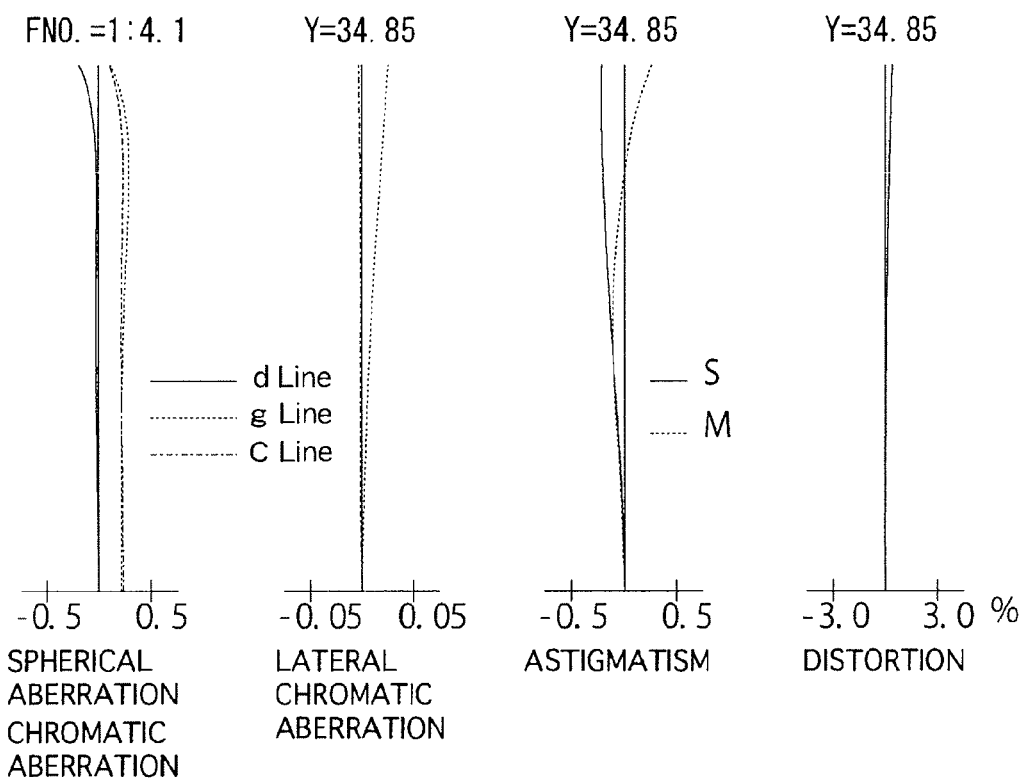
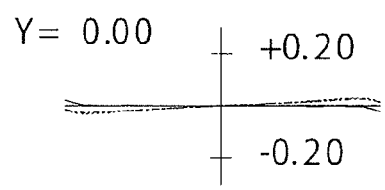
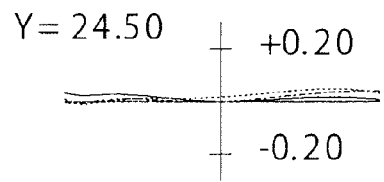
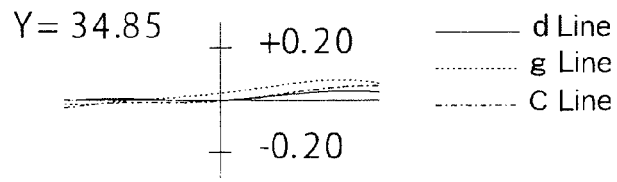

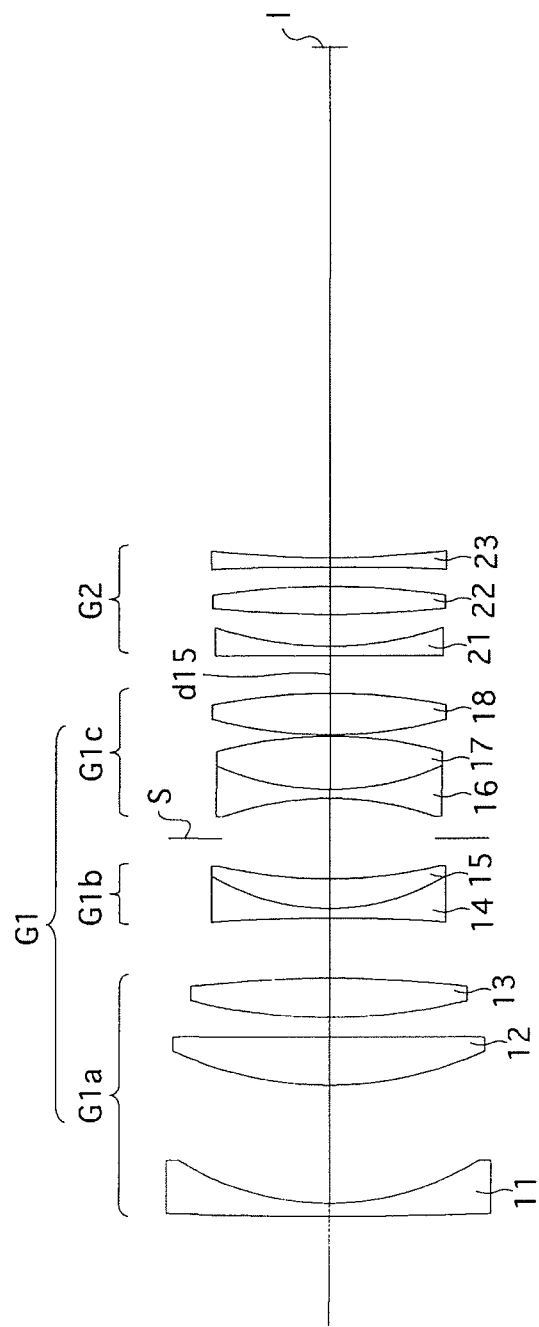

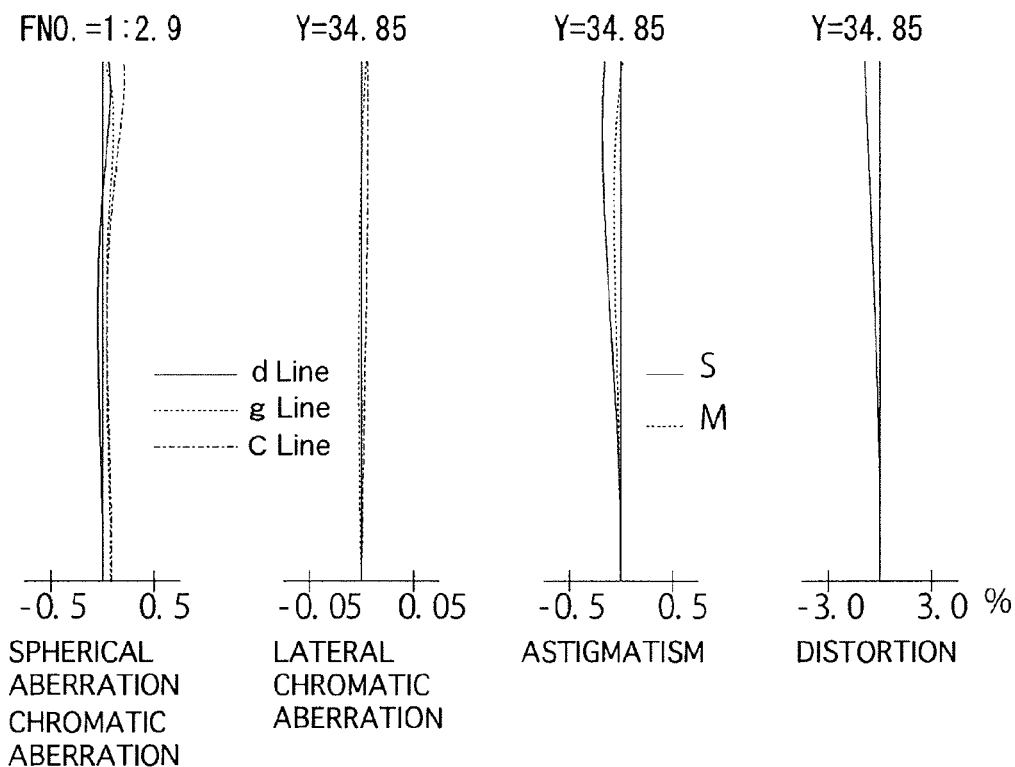
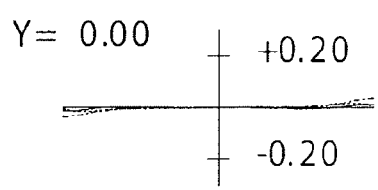
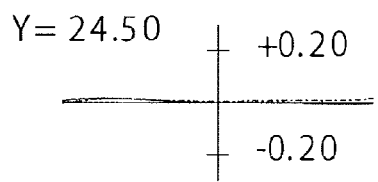
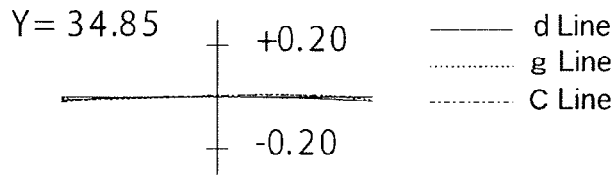

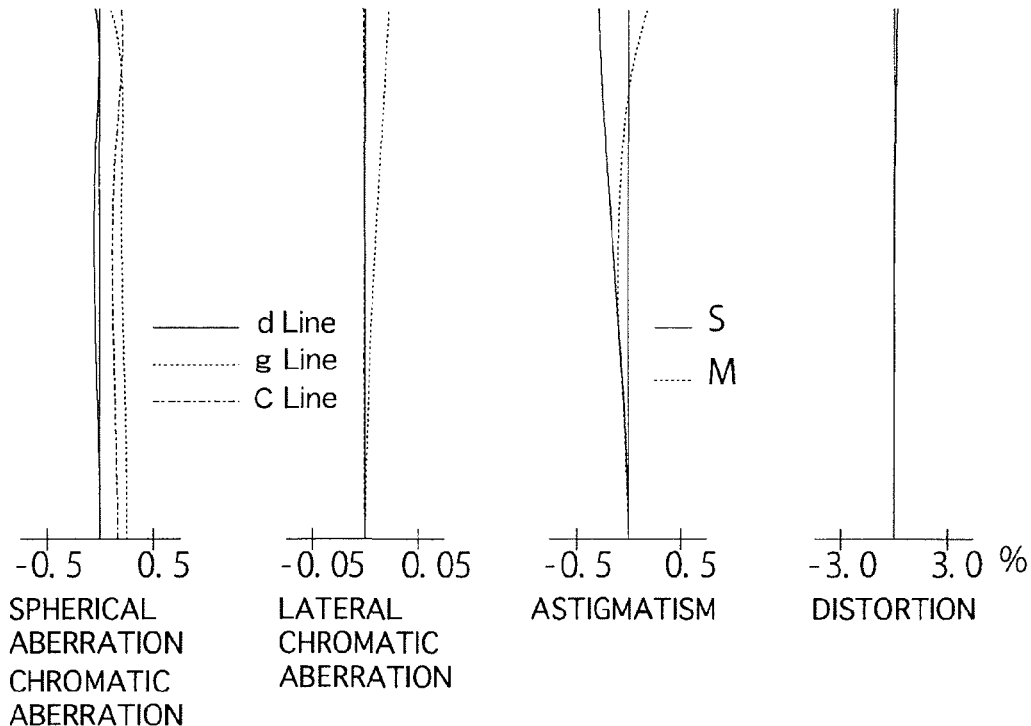
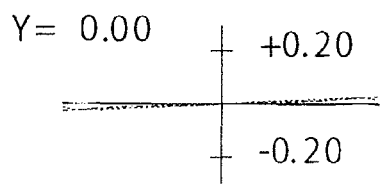
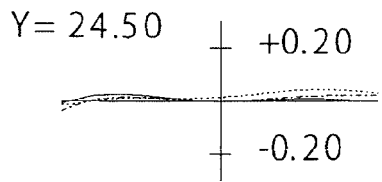
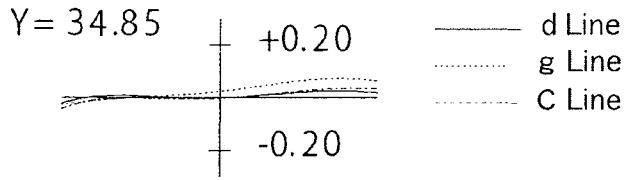

——— d Line
·········· g Line
—·—·— C Line

——— d Line
·········· g Line
—·—·— C Line

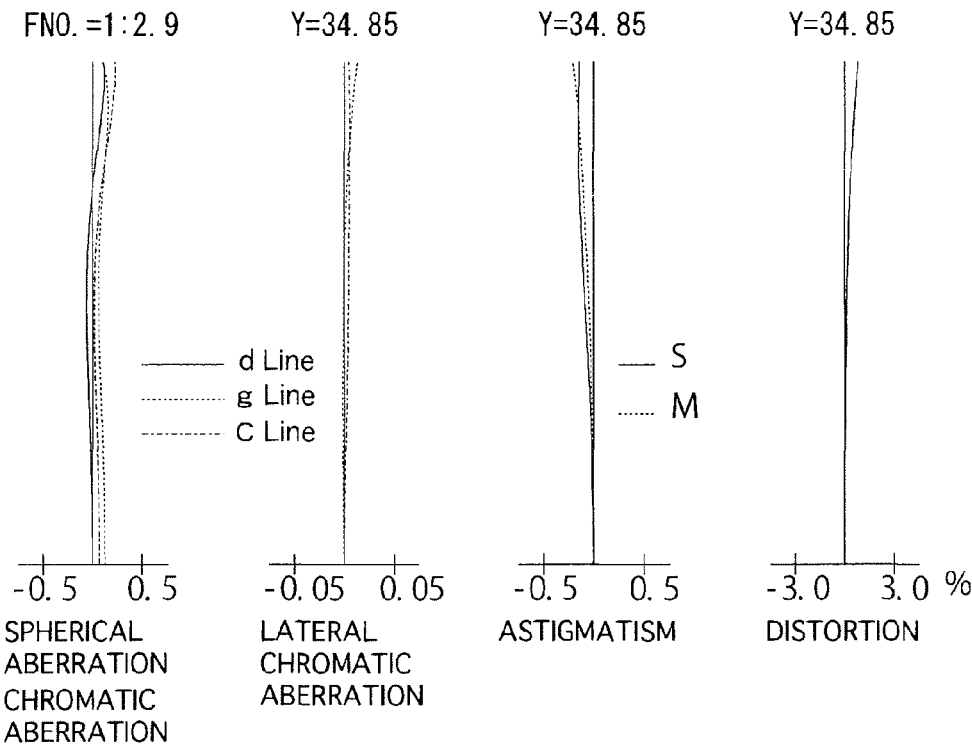
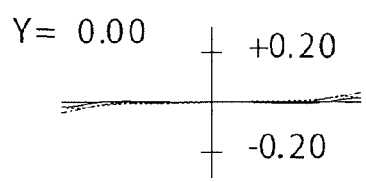
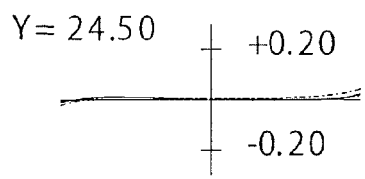
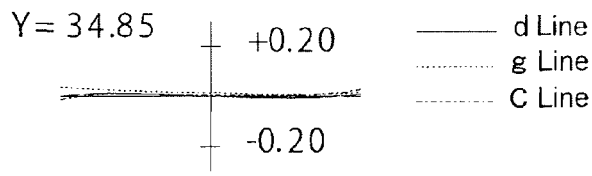

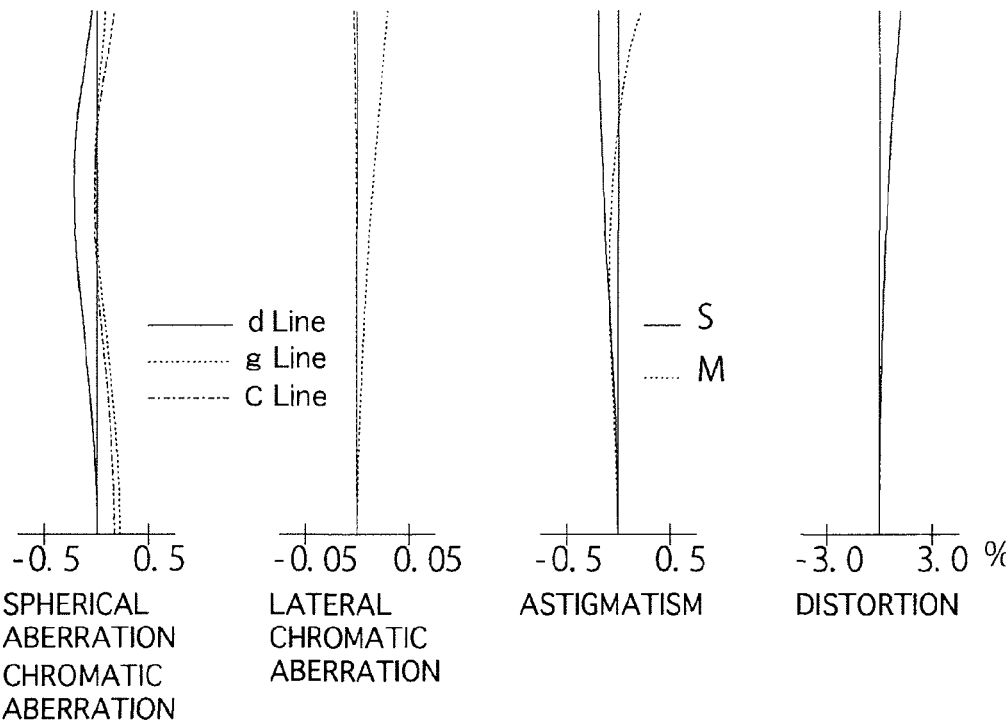
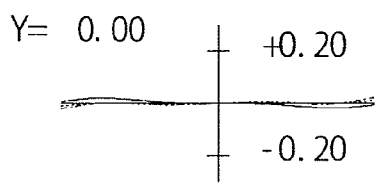
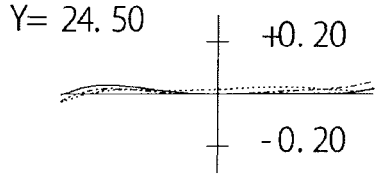
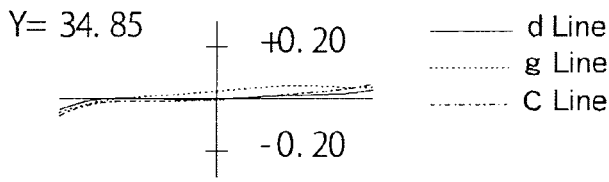

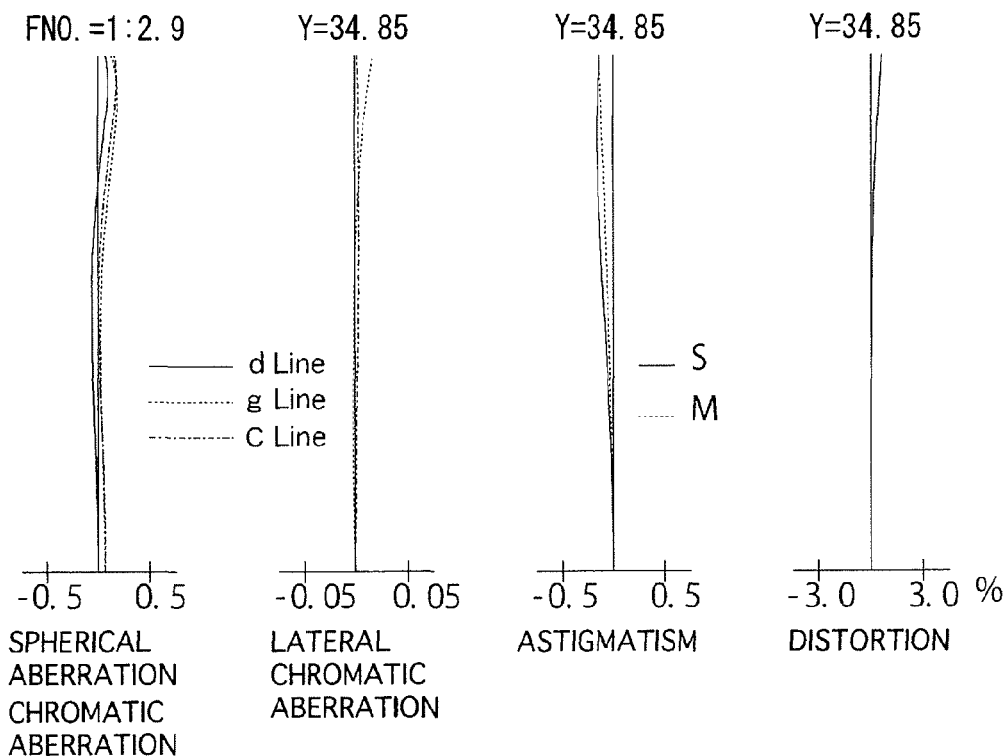
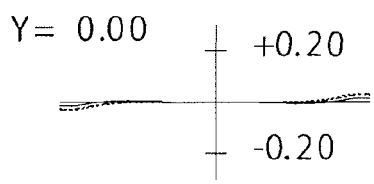
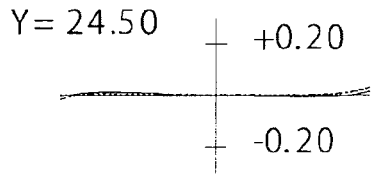
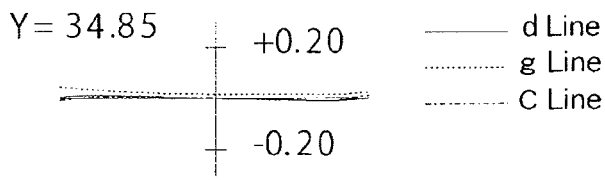

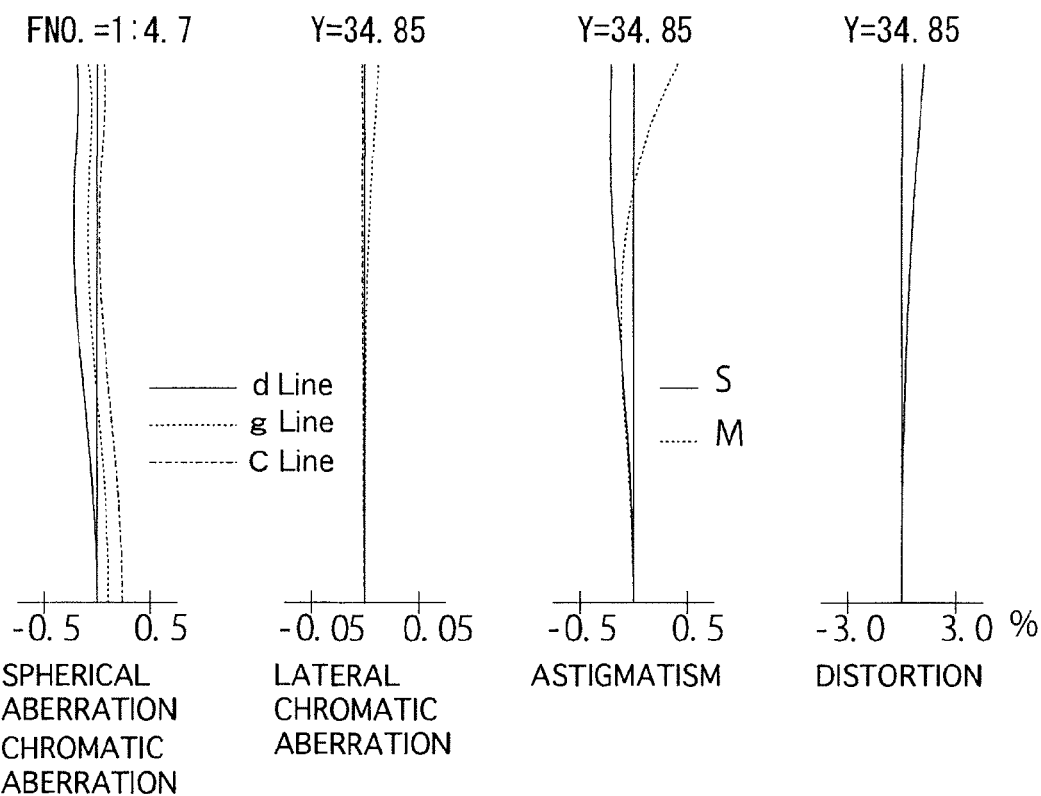
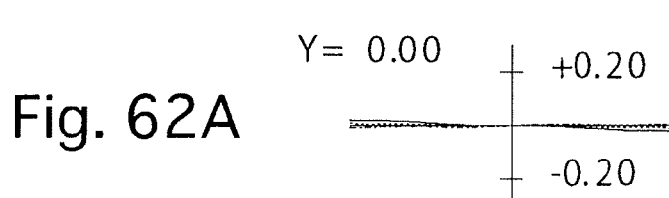
Fig. 62A
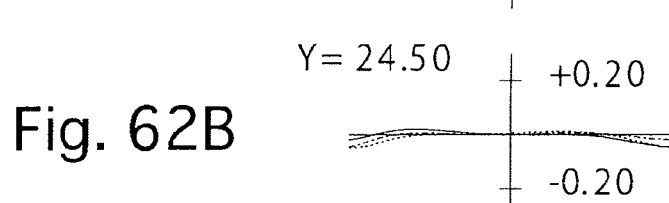
Fig. 62B
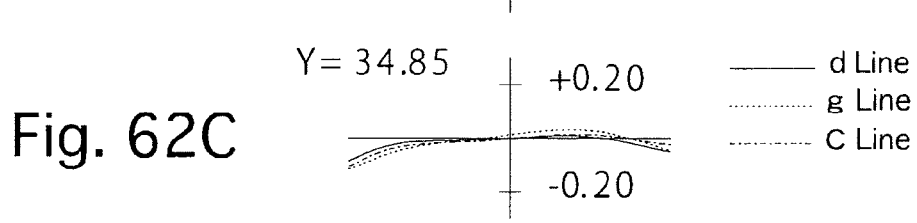
Fig. 62C

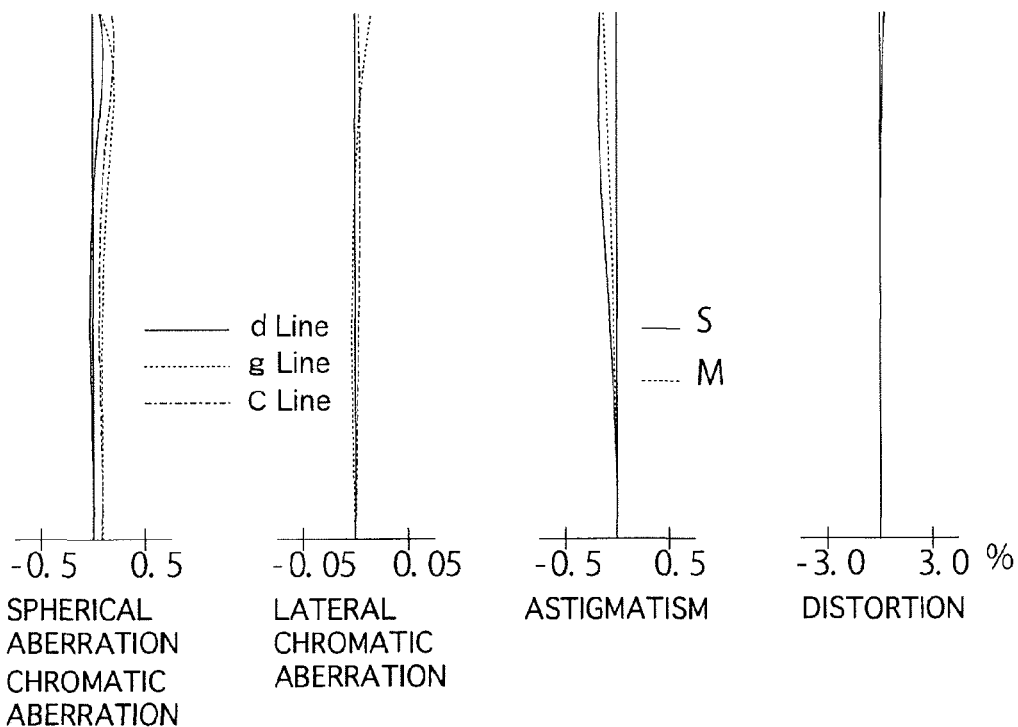
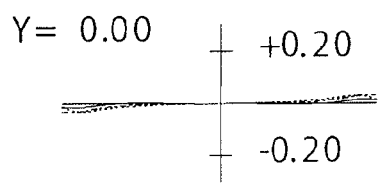
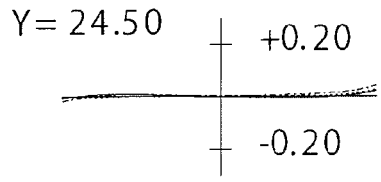
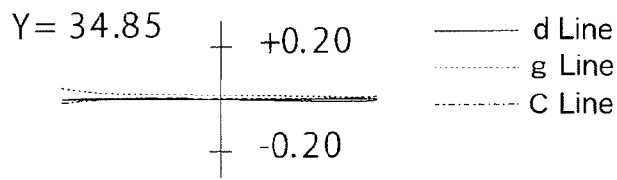

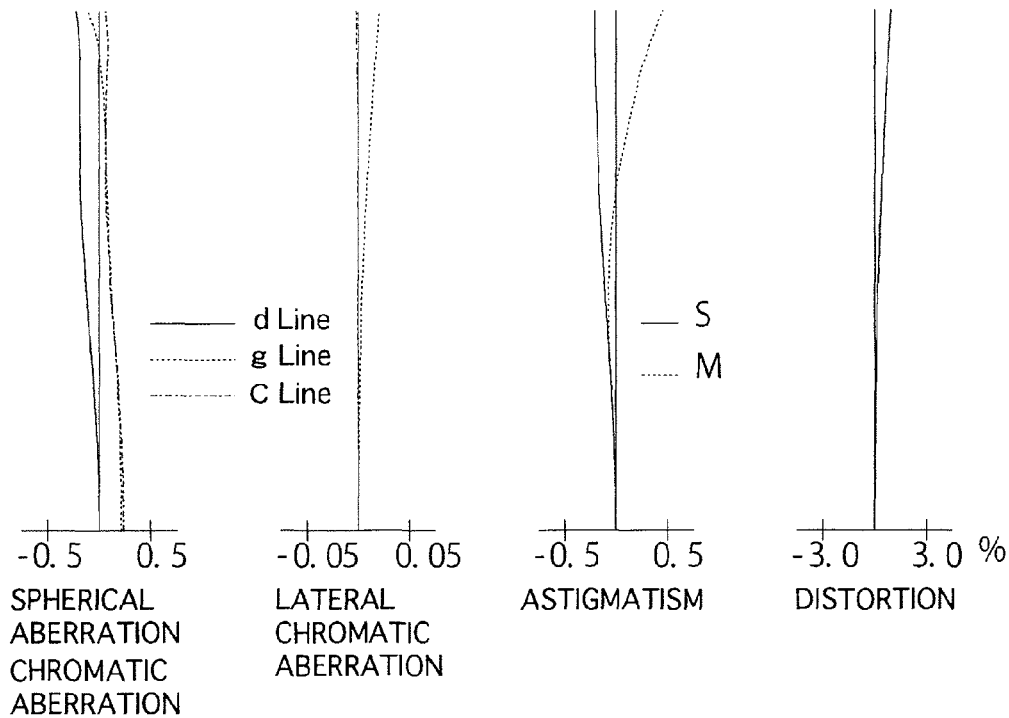
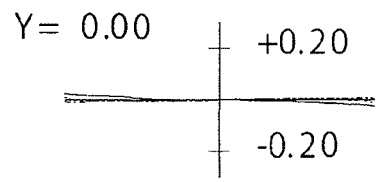
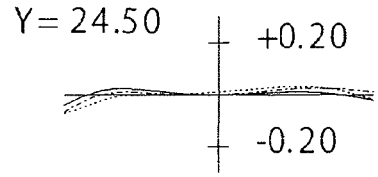
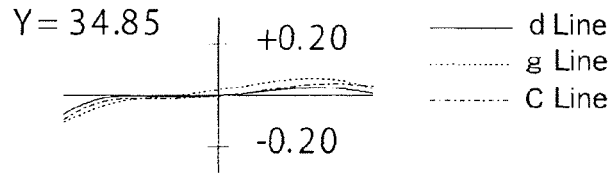

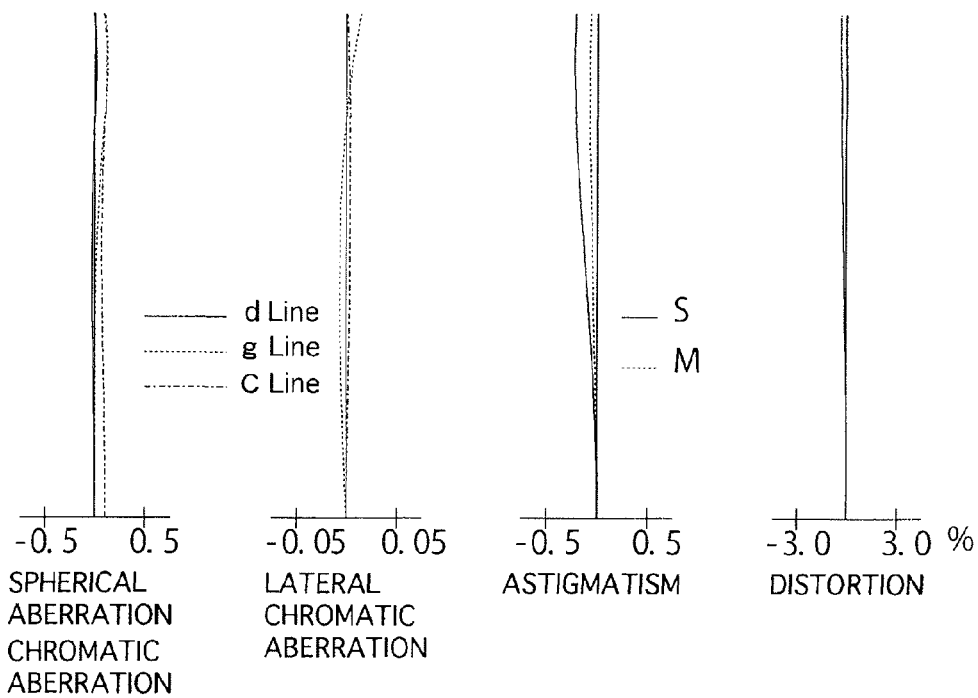
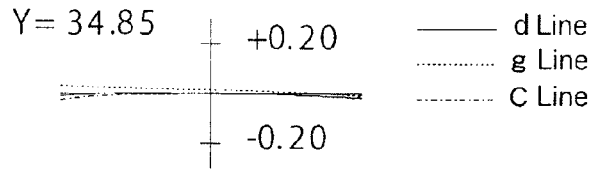

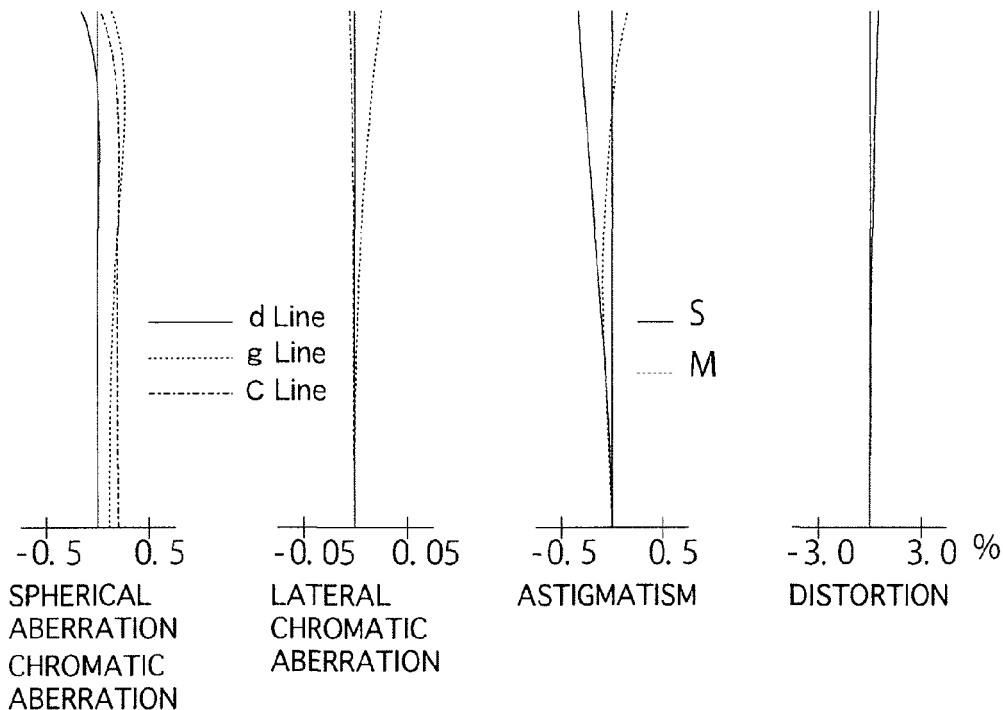
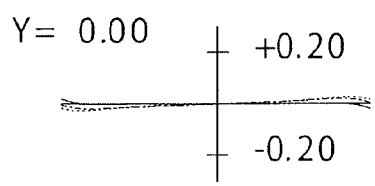
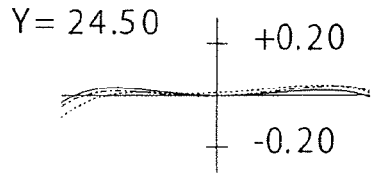
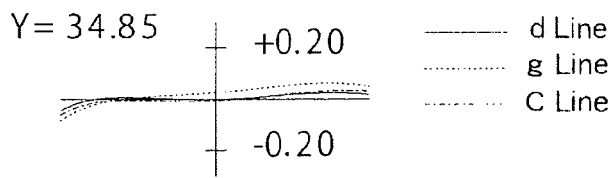

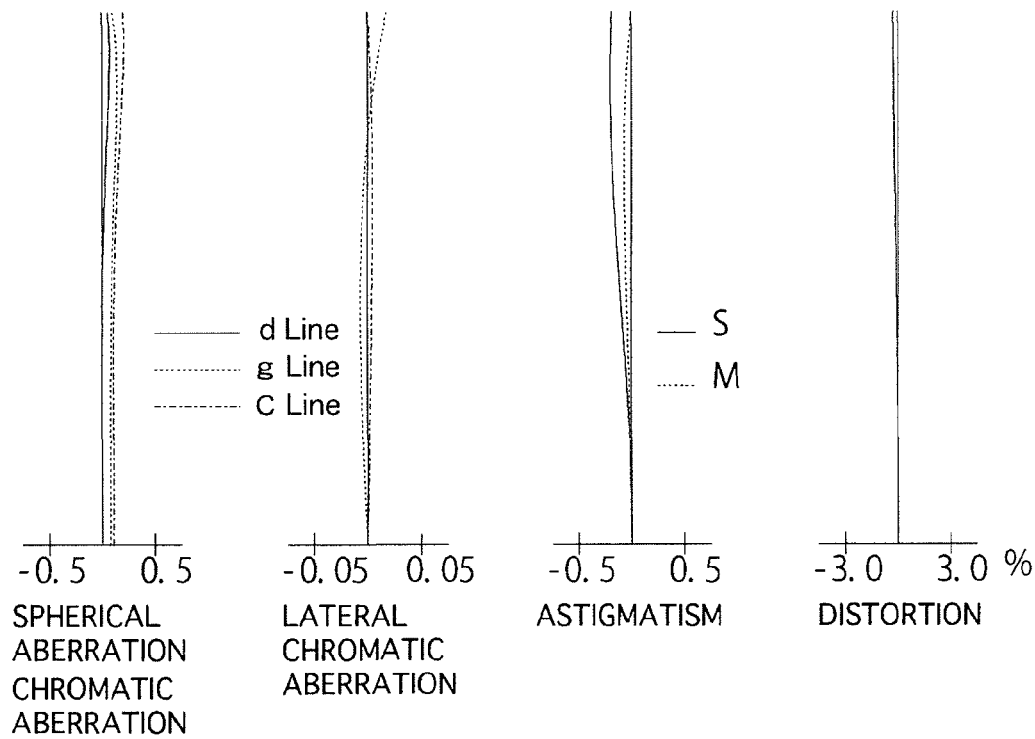
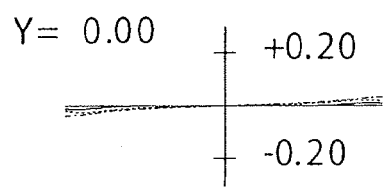
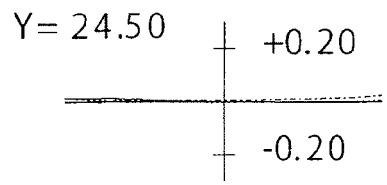
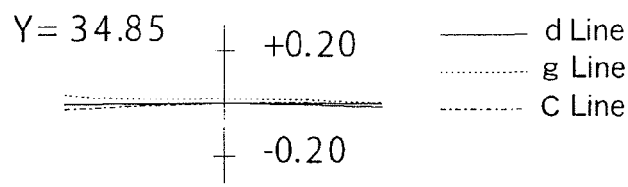

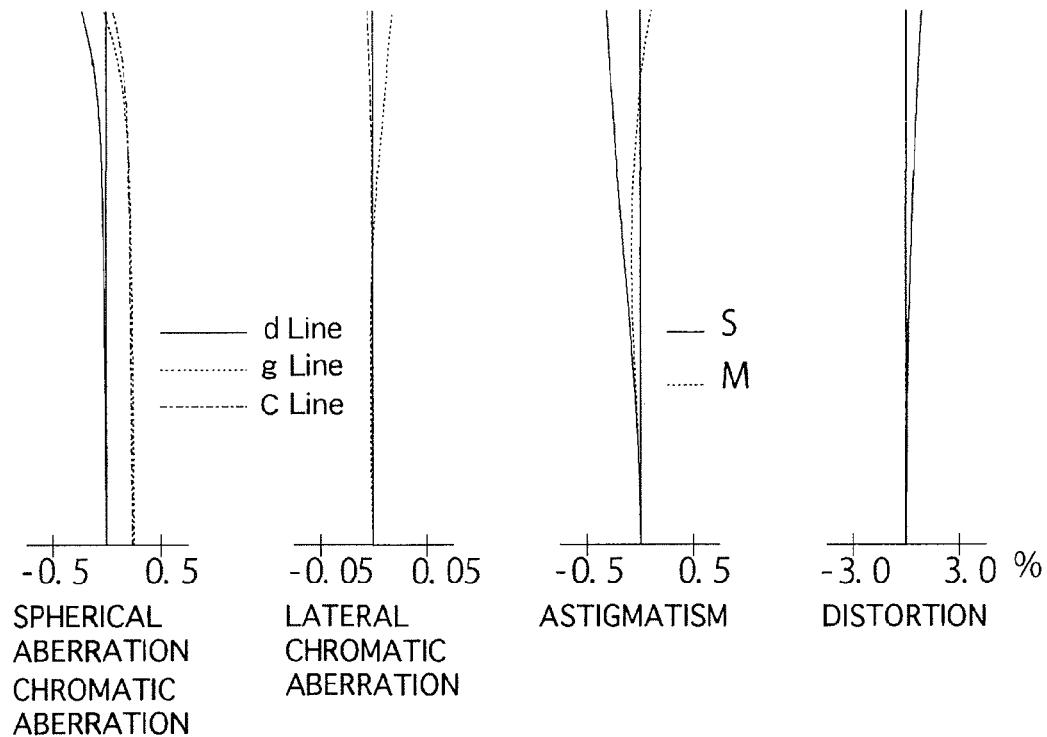
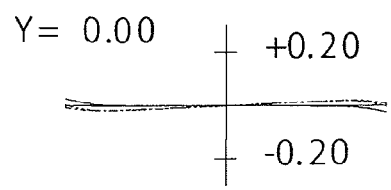
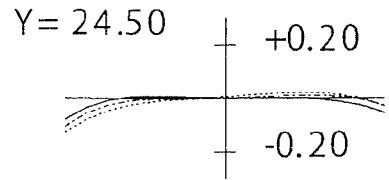
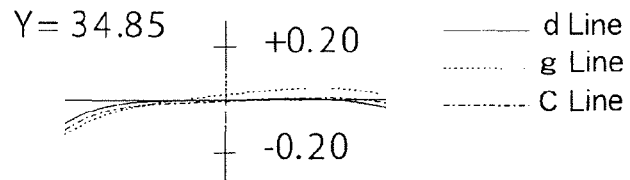

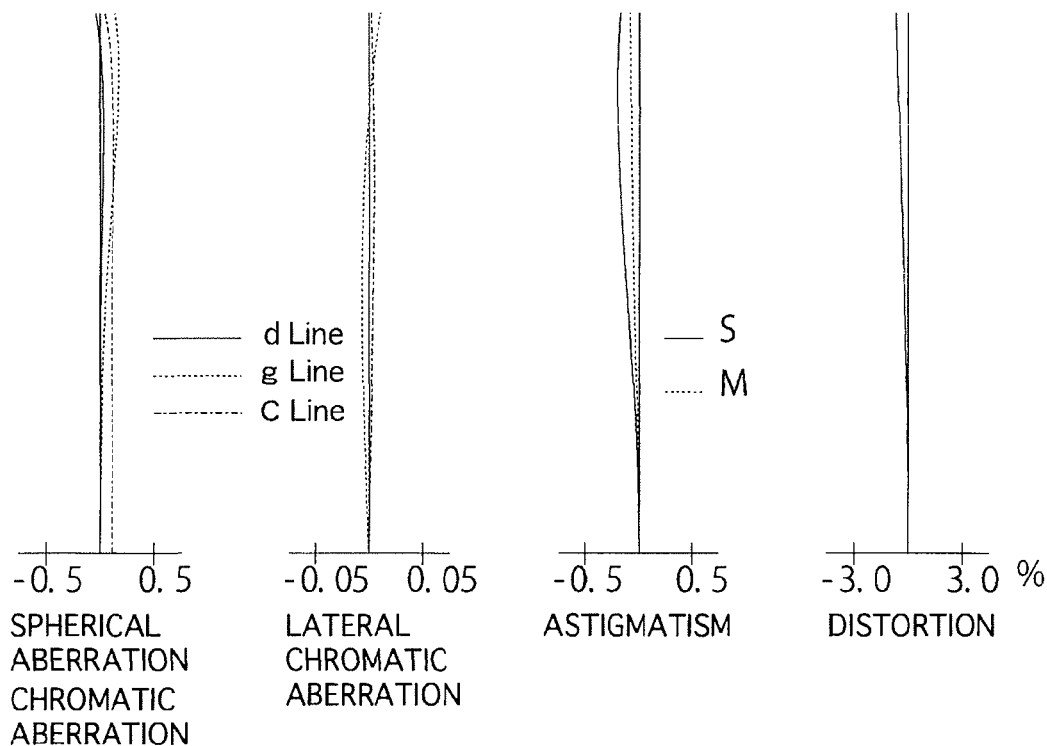
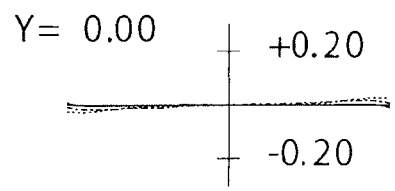
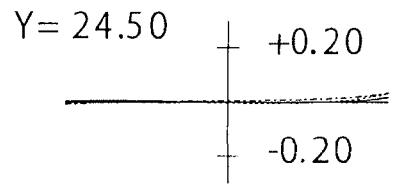
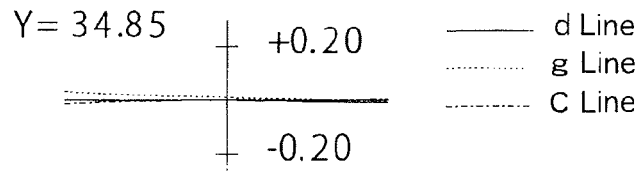

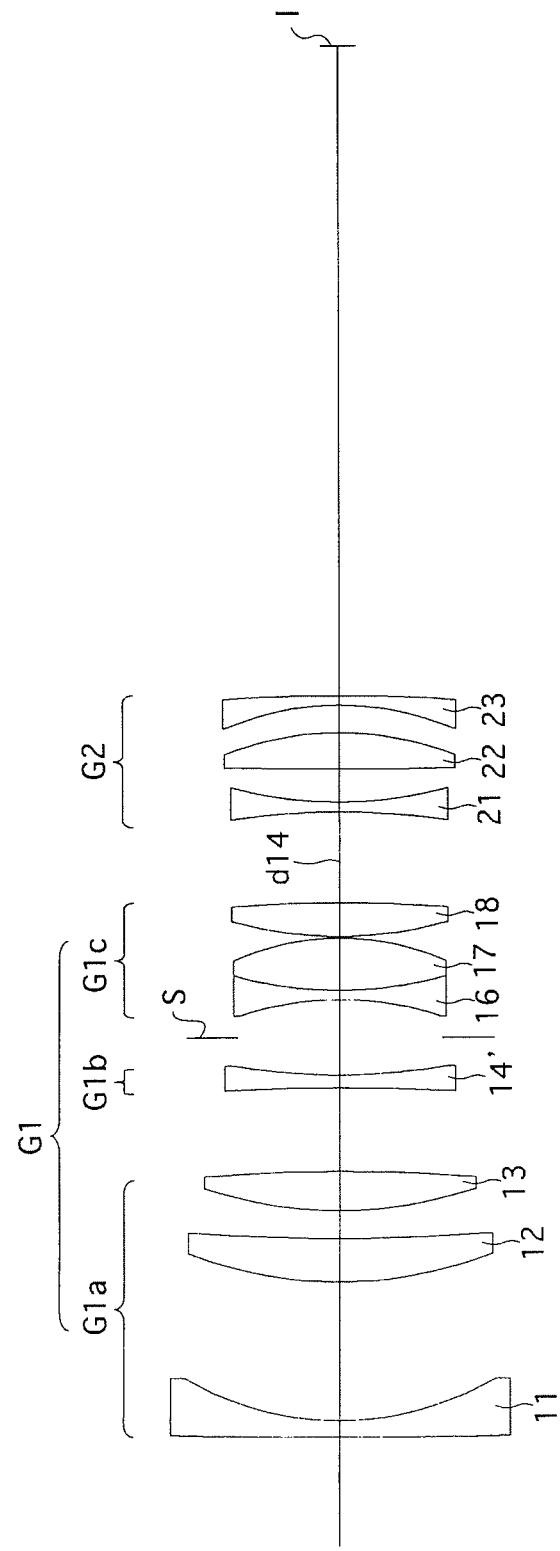

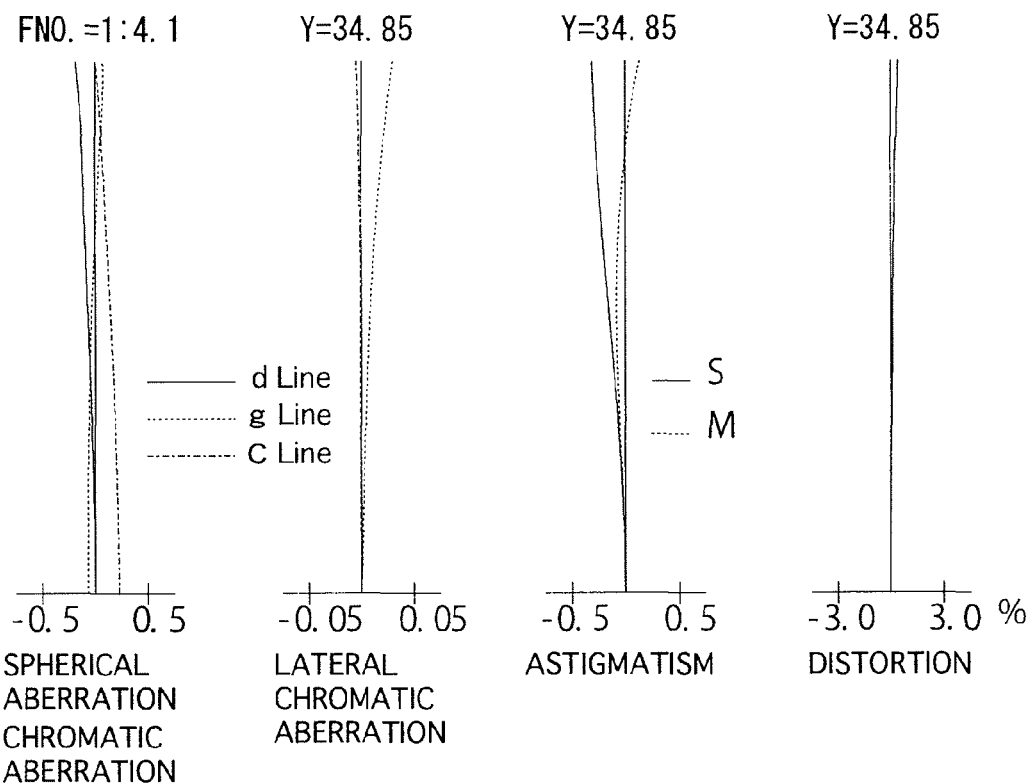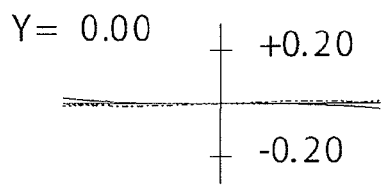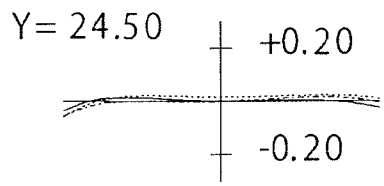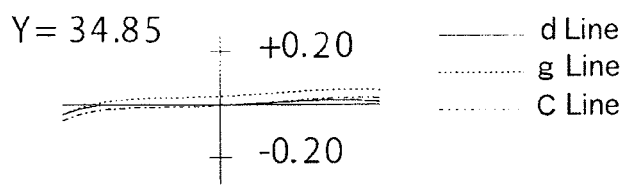

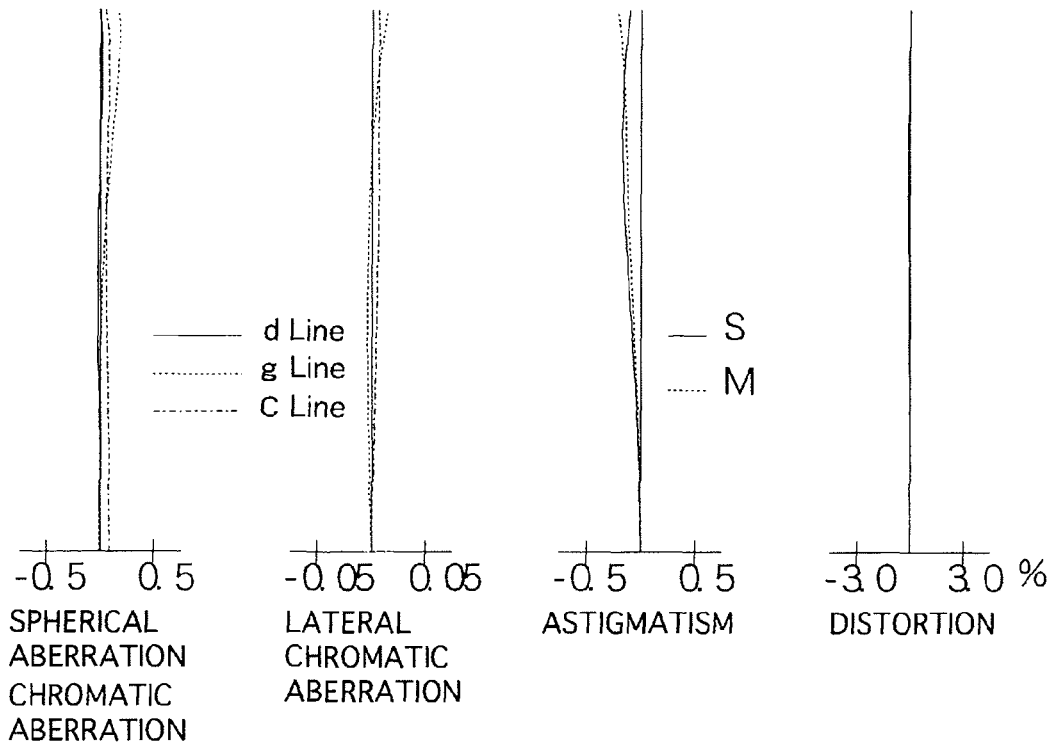
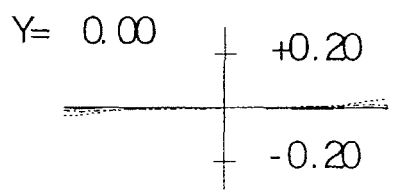
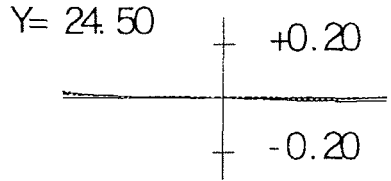
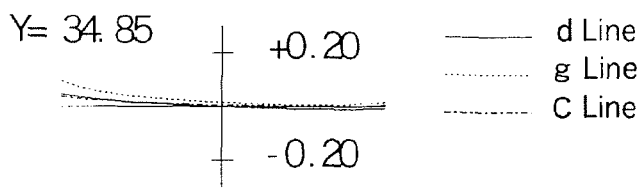

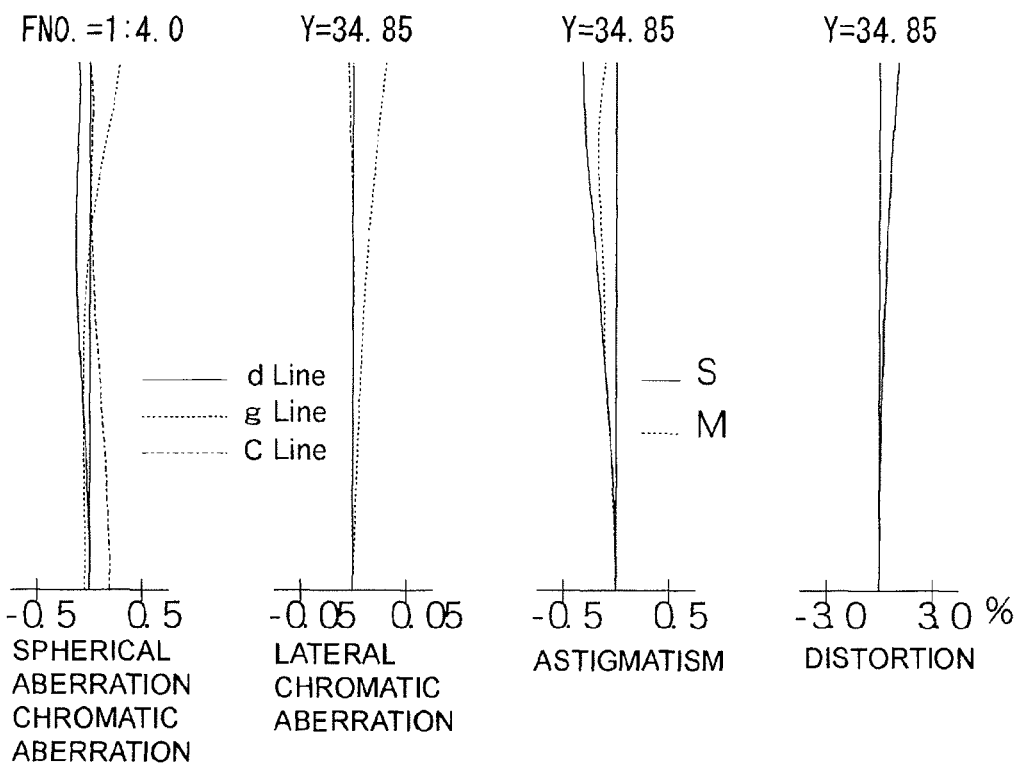
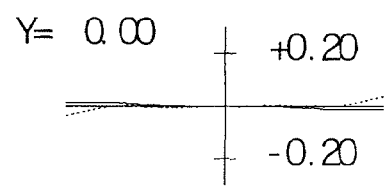
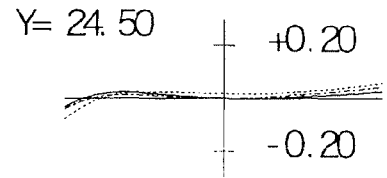
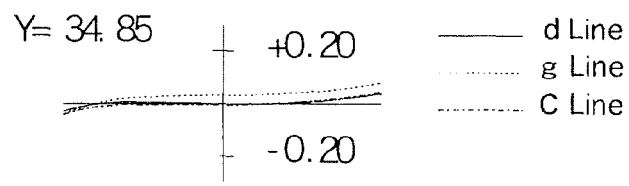

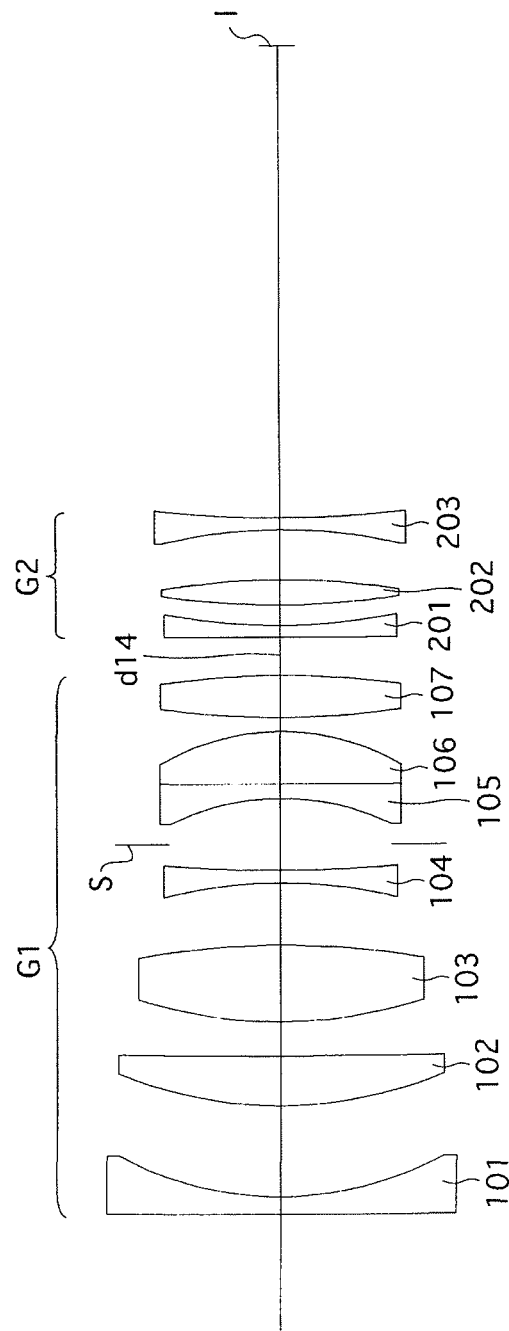

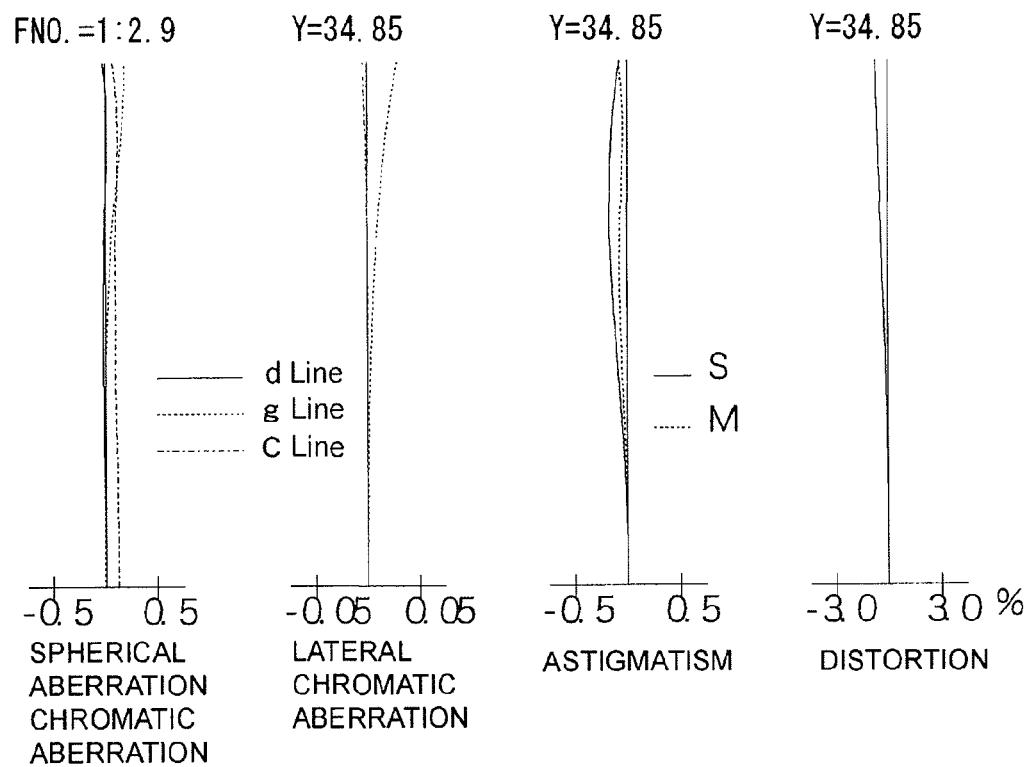
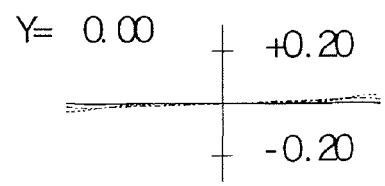
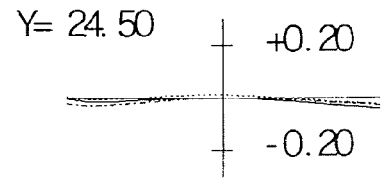
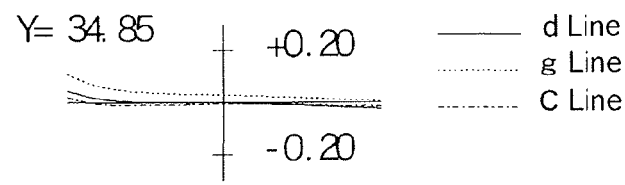

Fig.108A  Fig.108B  Fig.108C  Fig.108D
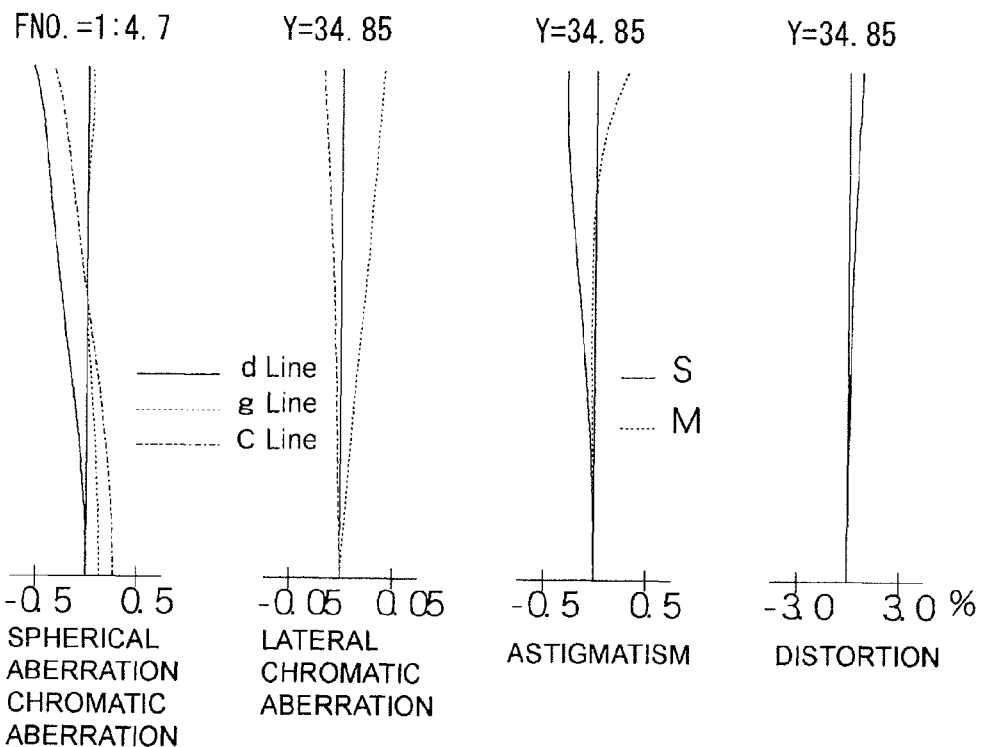
Fig.109A
Fig.109B
Fig.109C
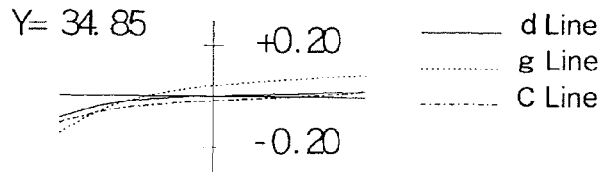

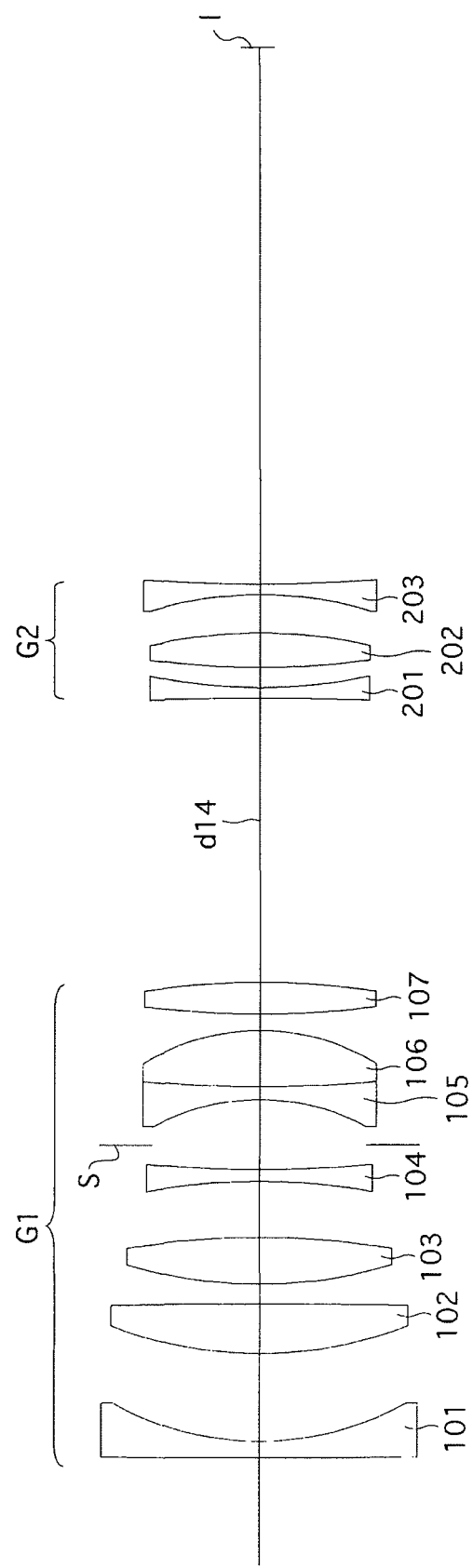

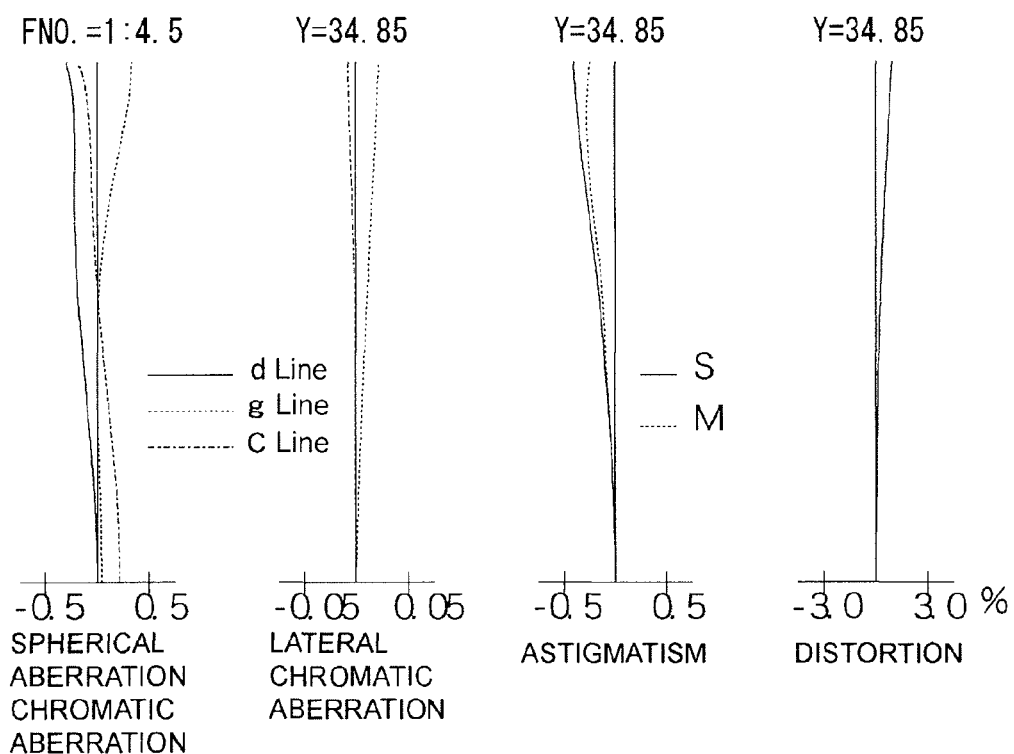
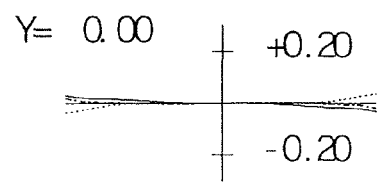
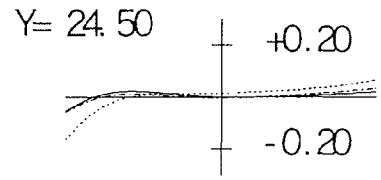
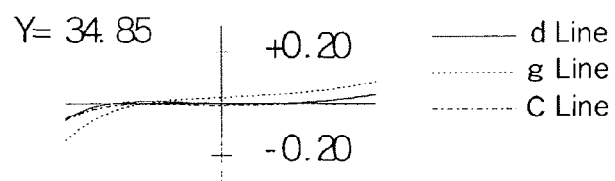

Fig.117A Fig.117B Fig.117C Fig.117D
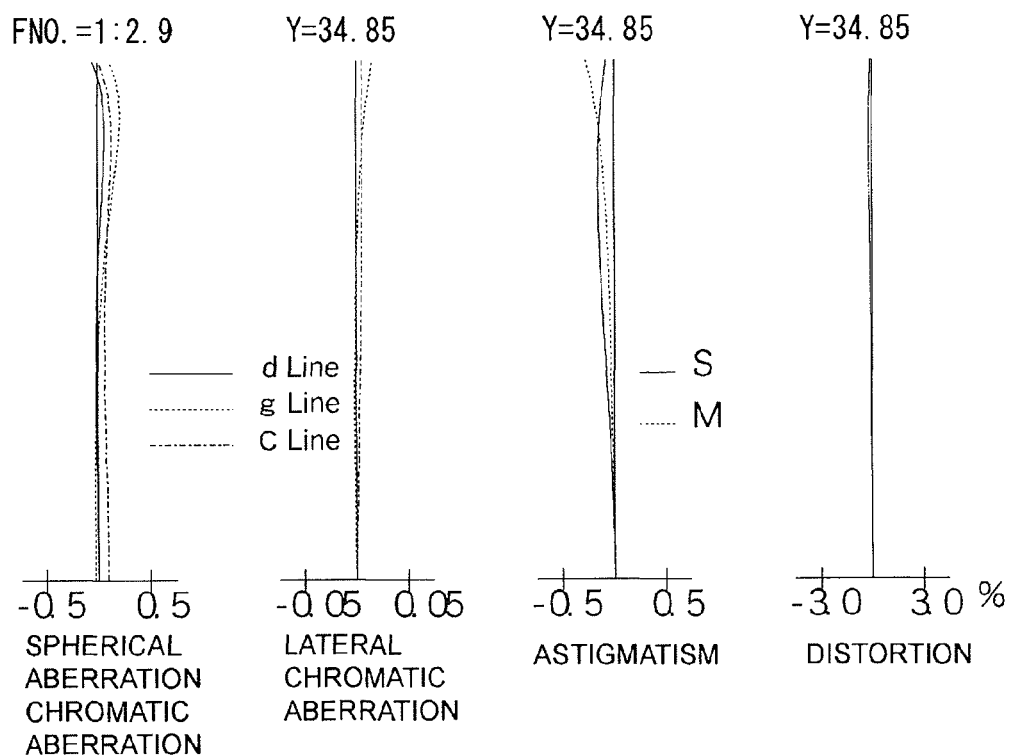
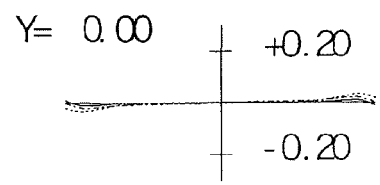
Fig.118A
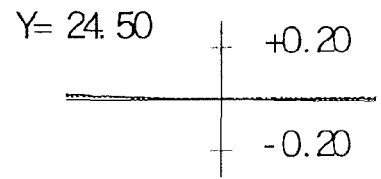
Fig.118B
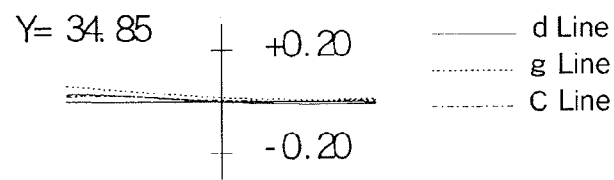
Fig.118C

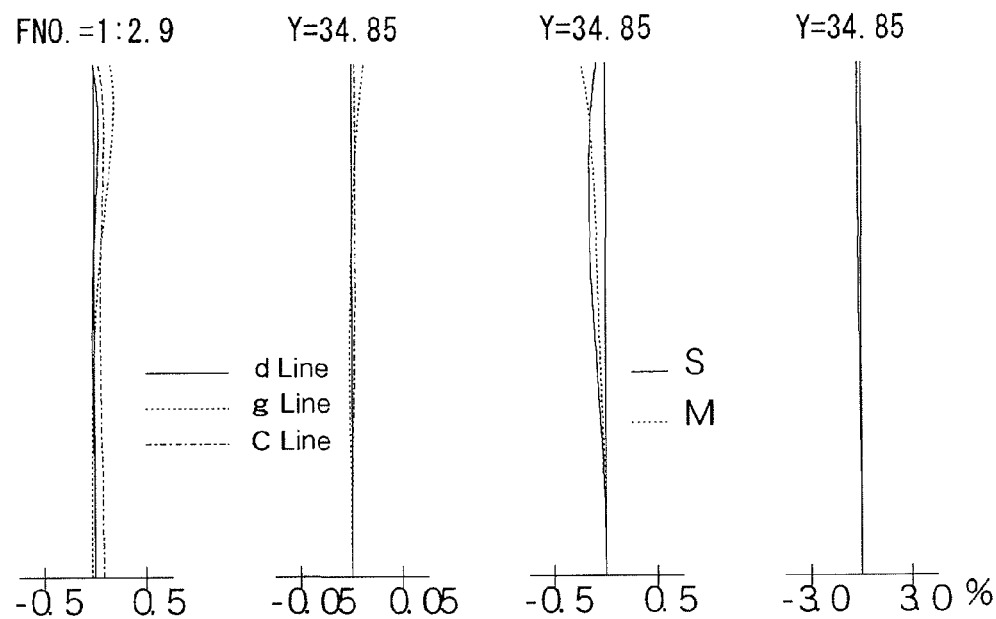
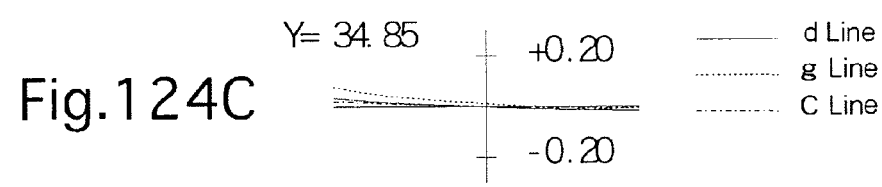

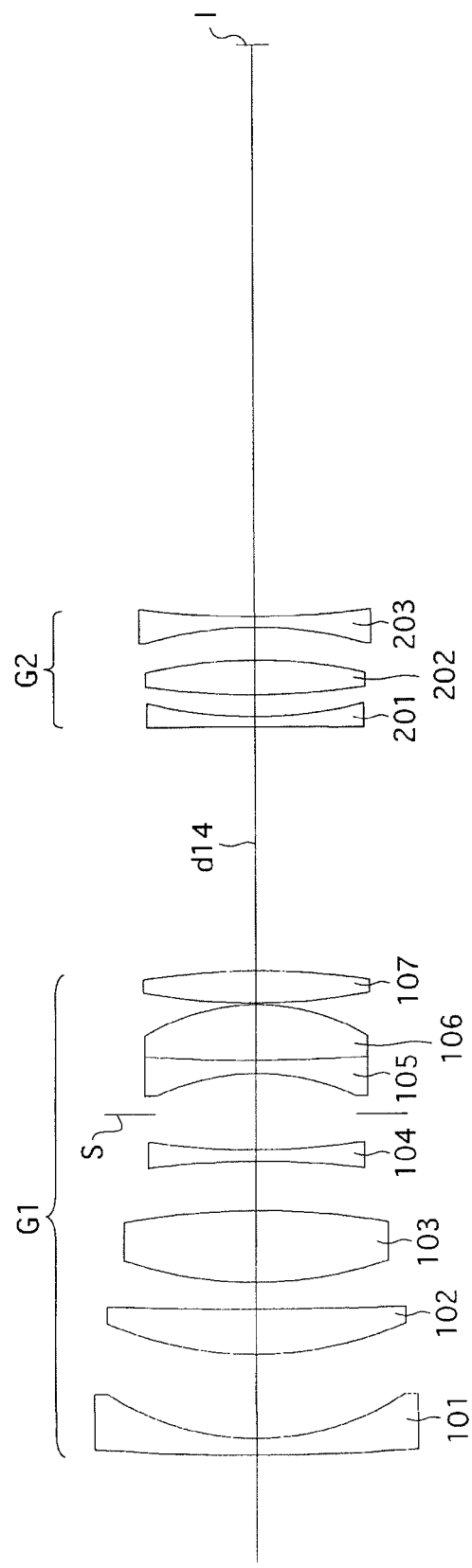

Fig.126A  Fig.126B  Fig.126C  Fig.126D
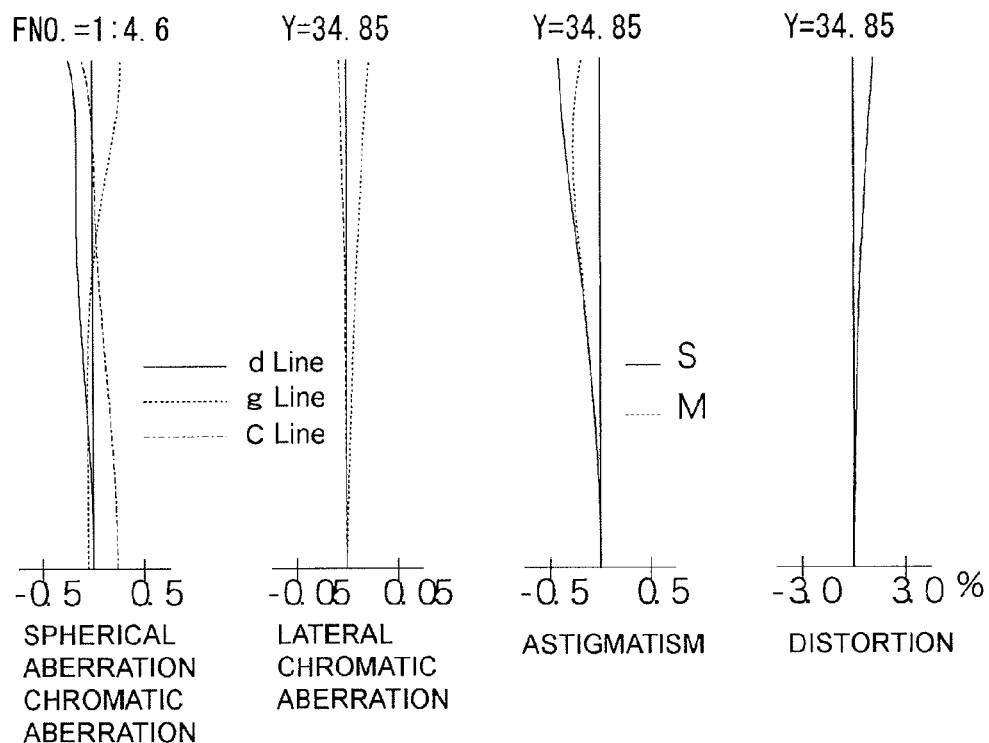
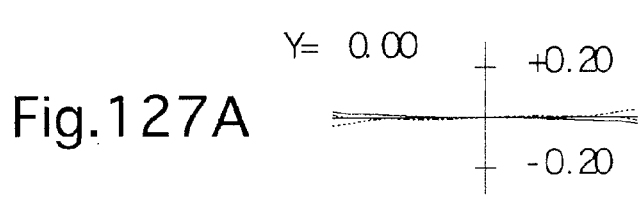
Fig.127A
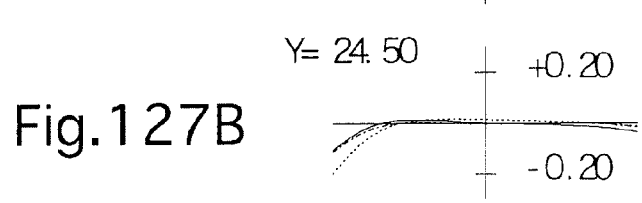
Fig.127B
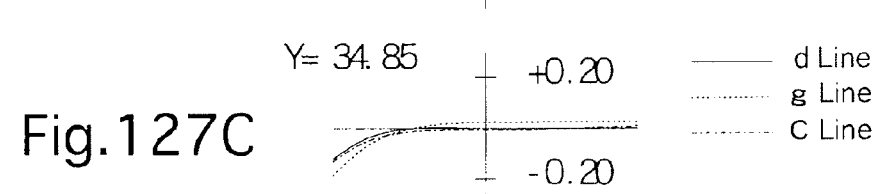
Fig.127C

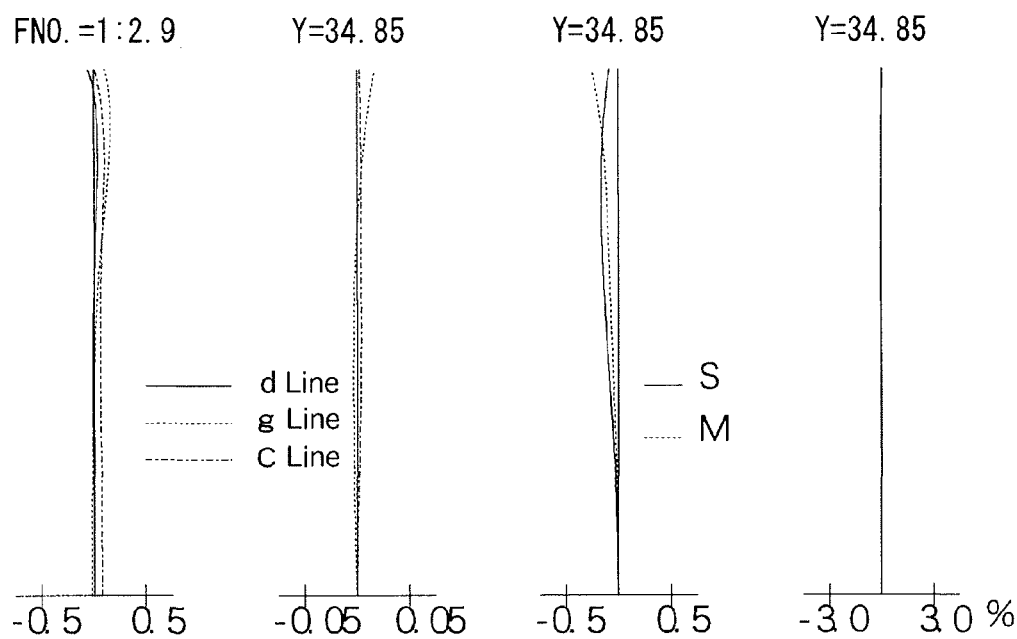
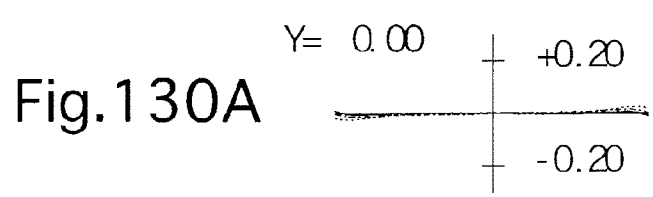
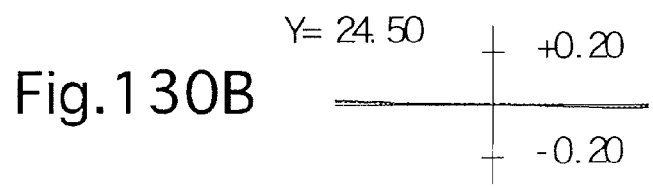
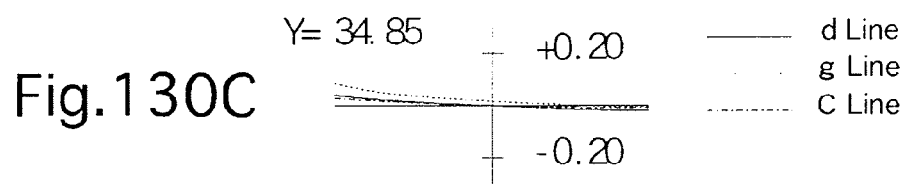

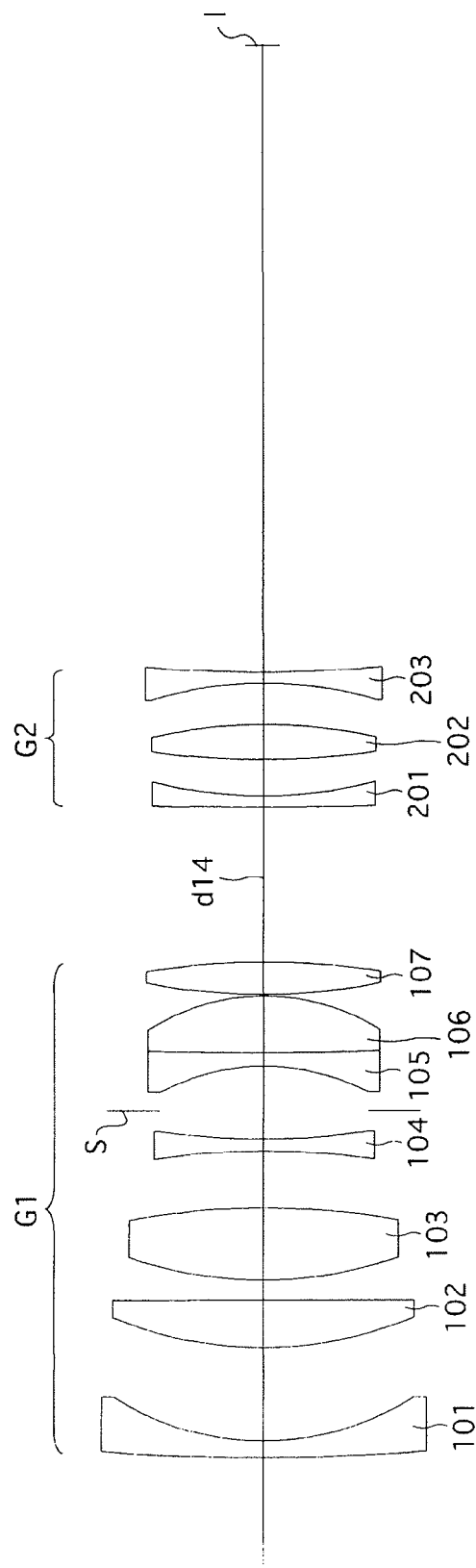

Fig.132A Fig.132B Fig.132C Fig.132D
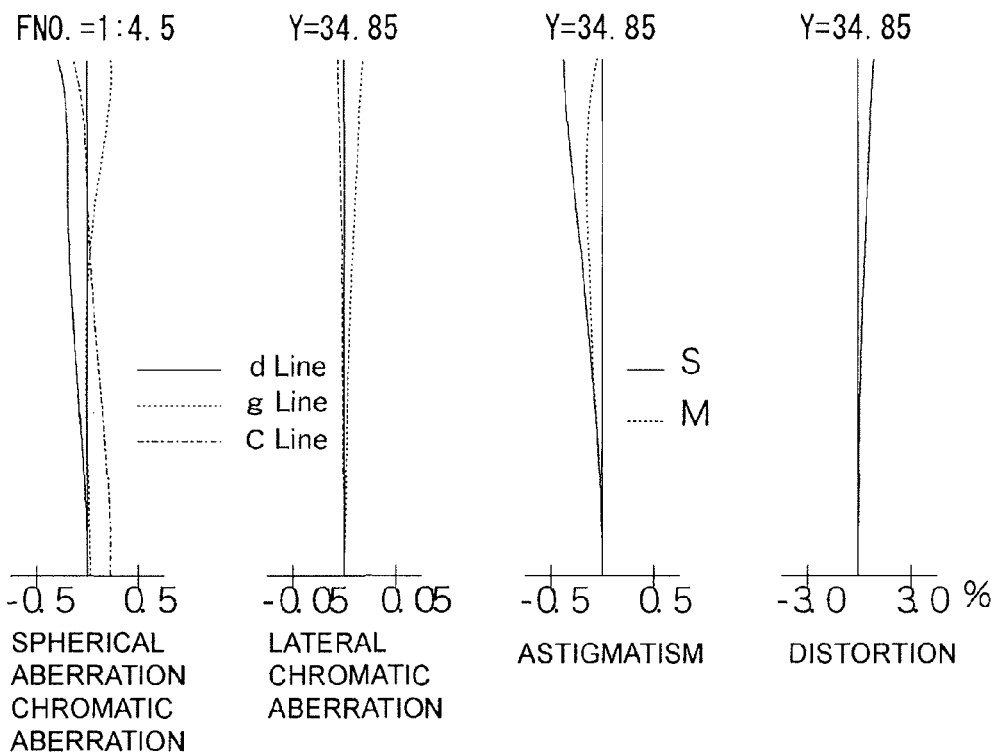
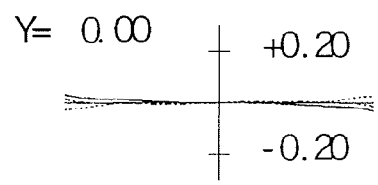
Fig.133A
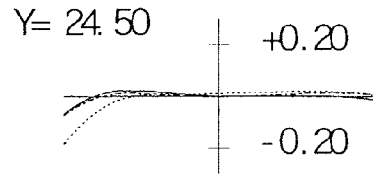
Fig.133B
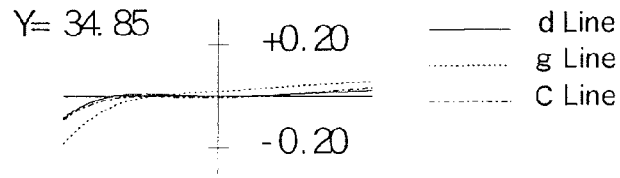
Fig.133C

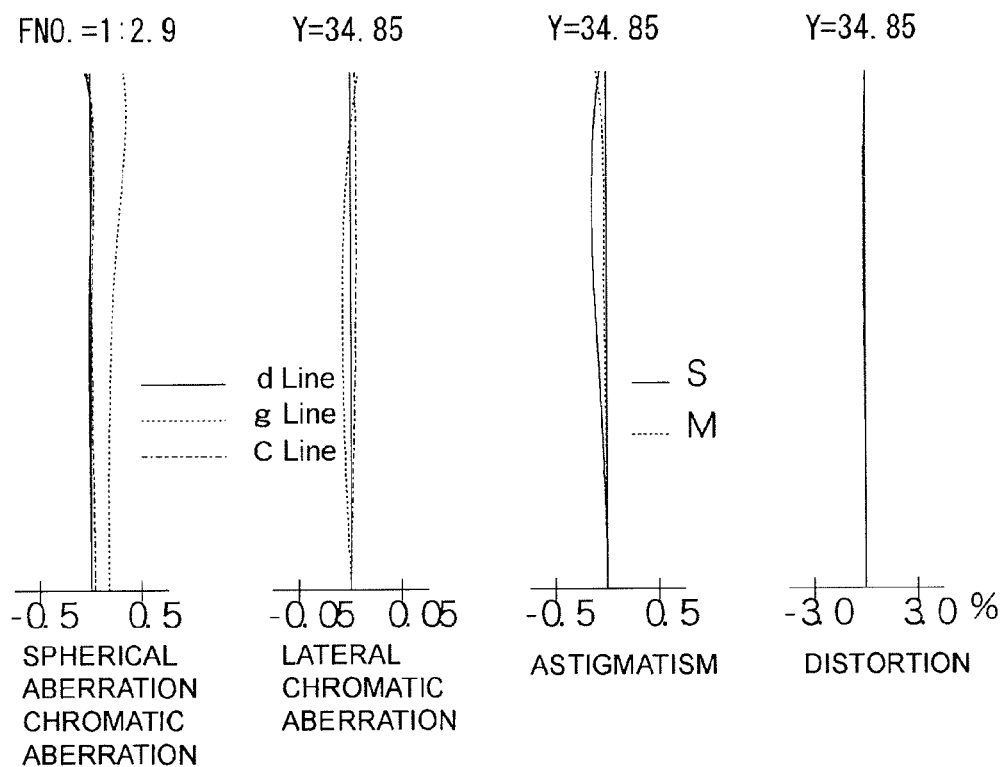
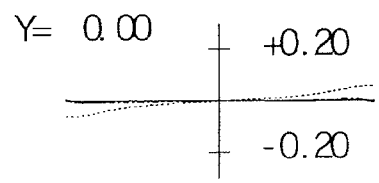
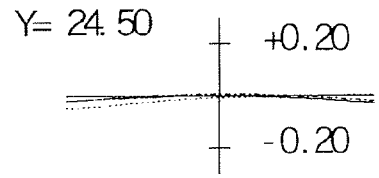
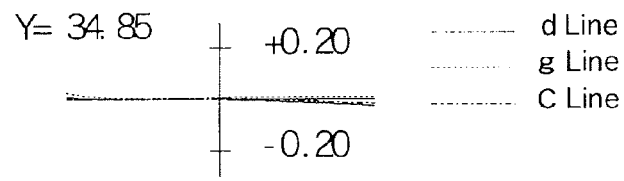

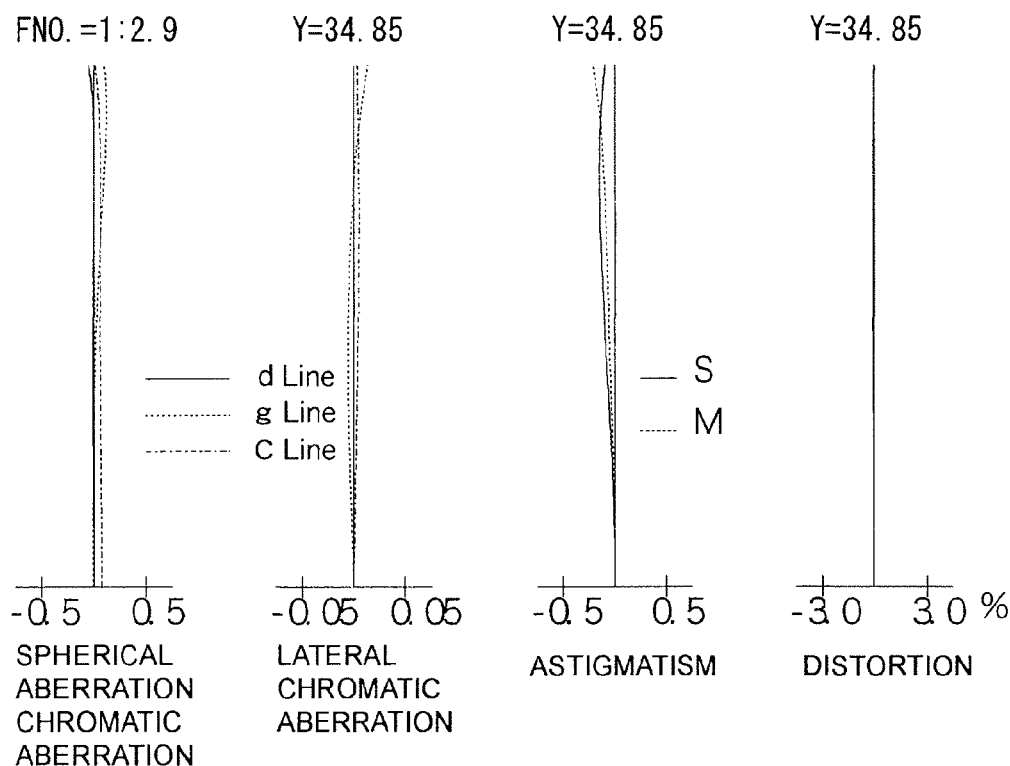
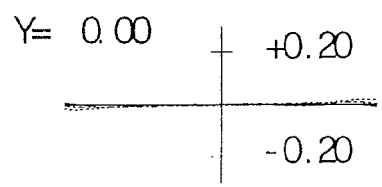
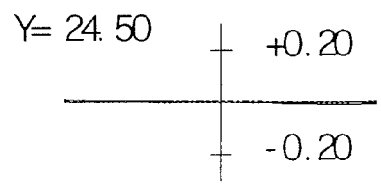
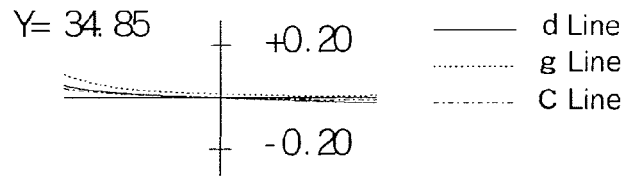

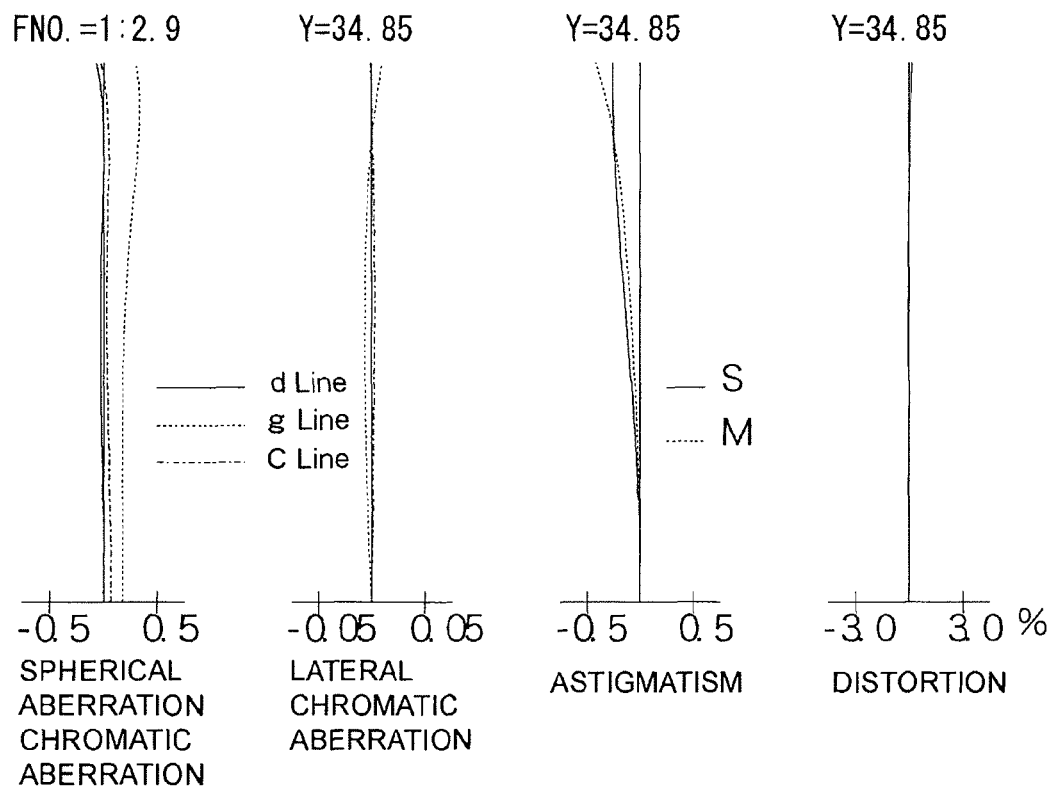
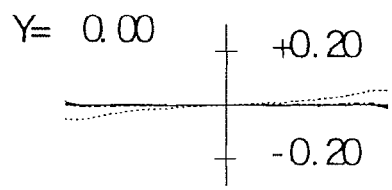
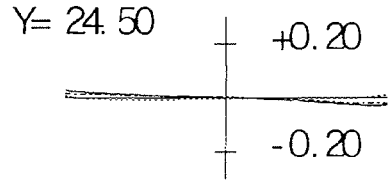
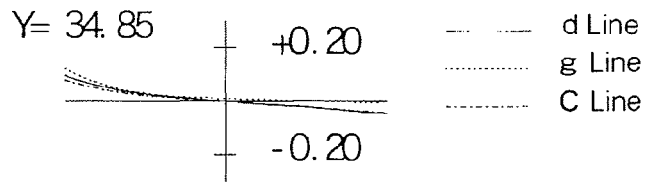

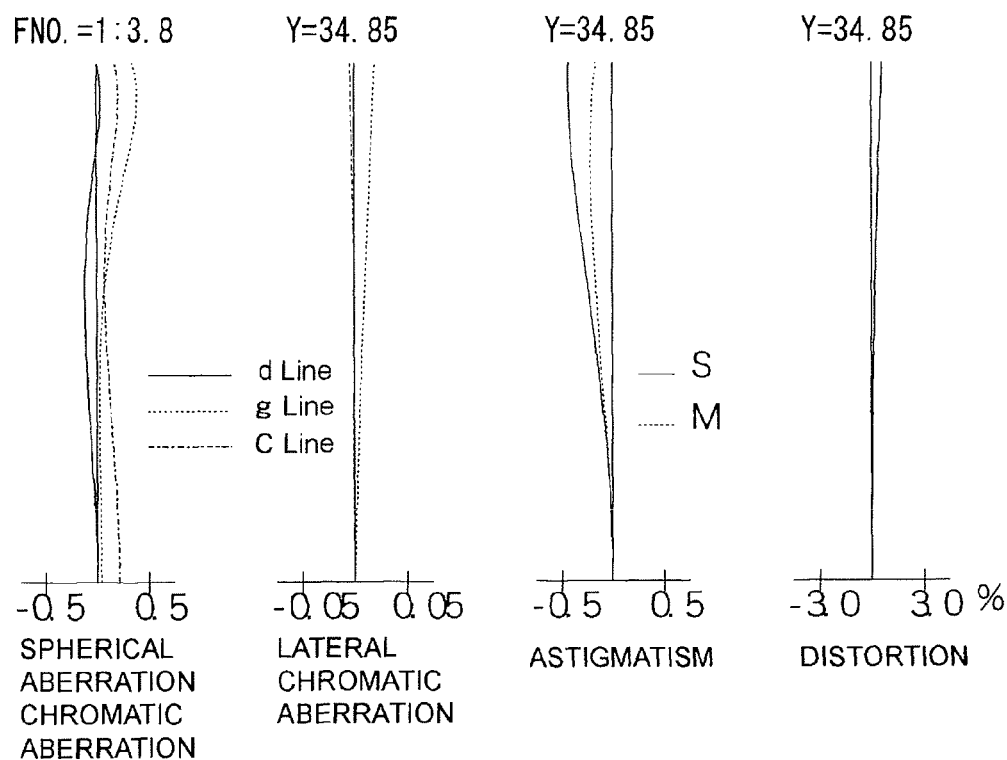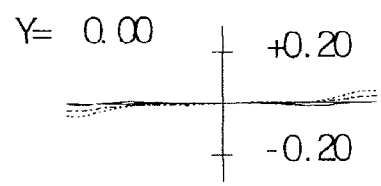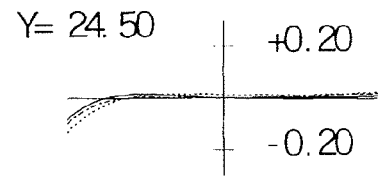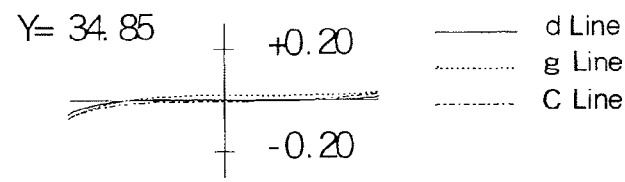

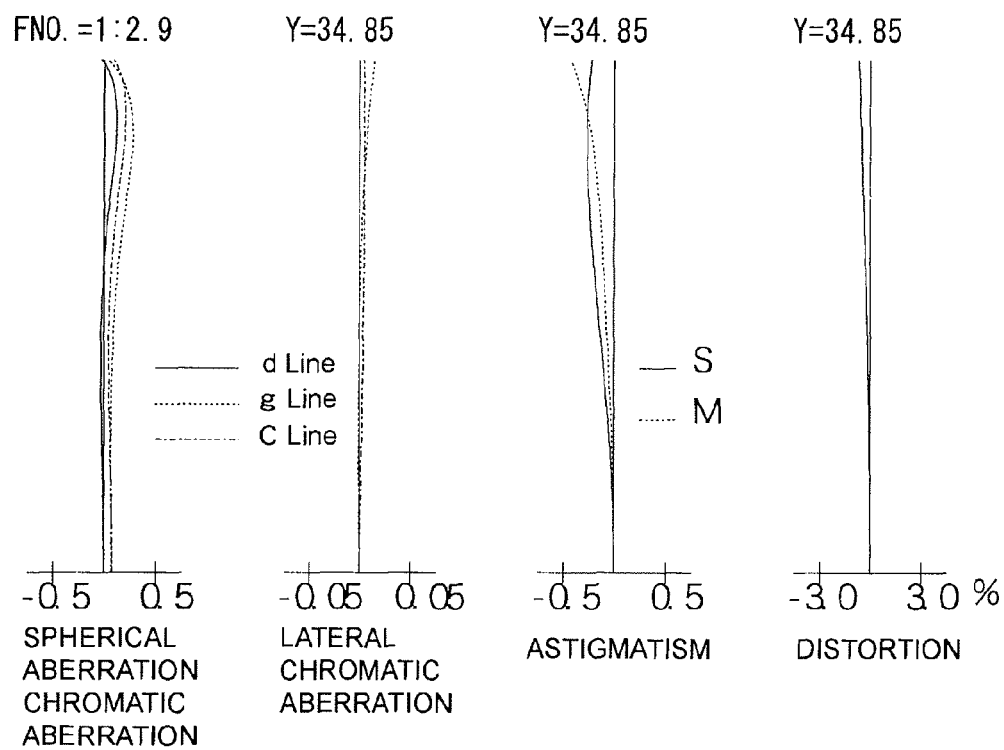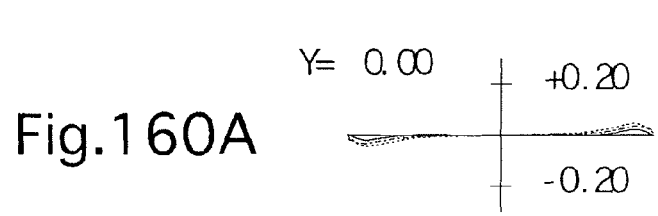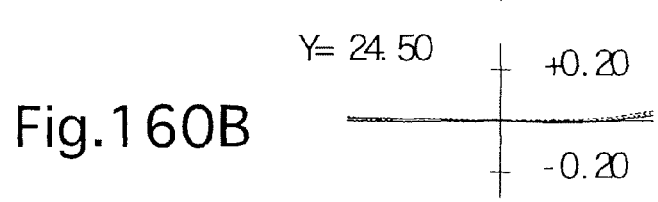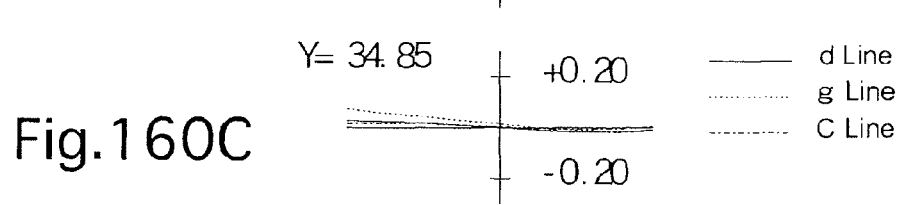

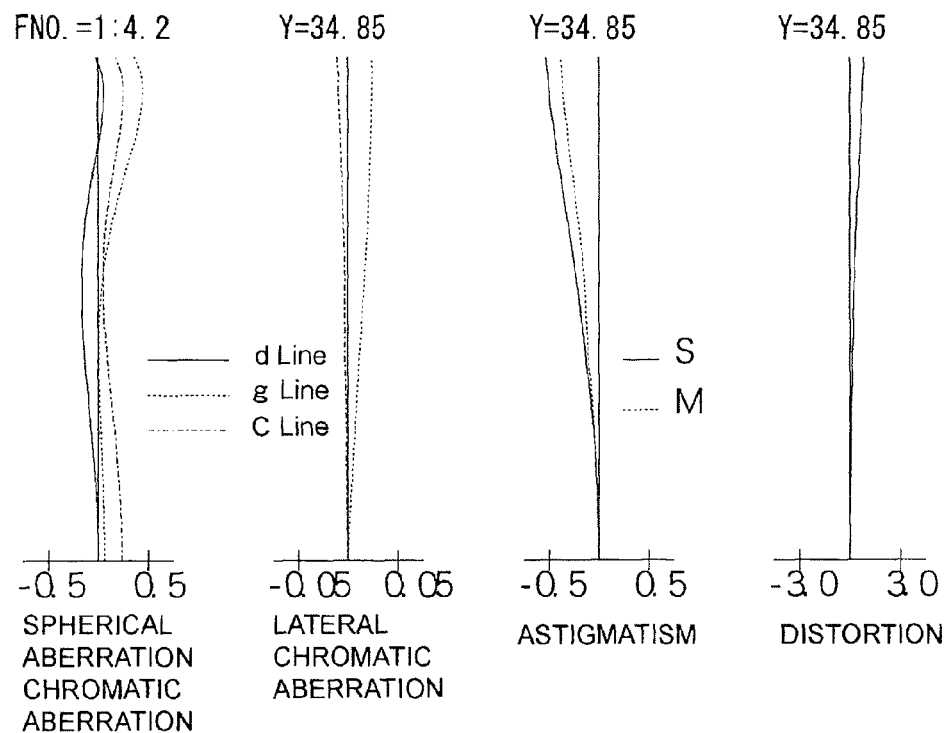
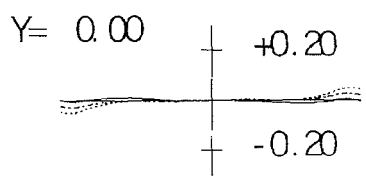
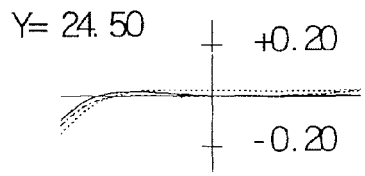
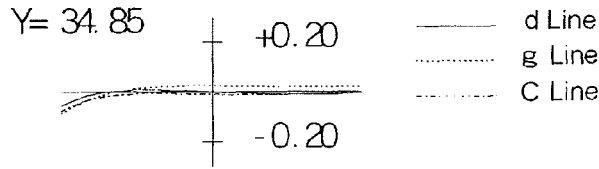

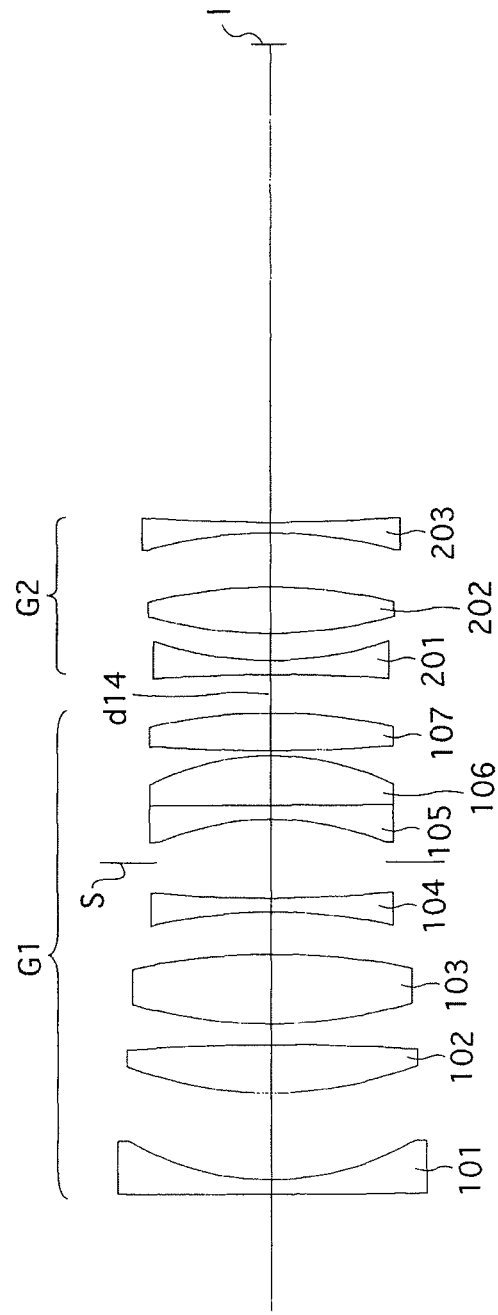

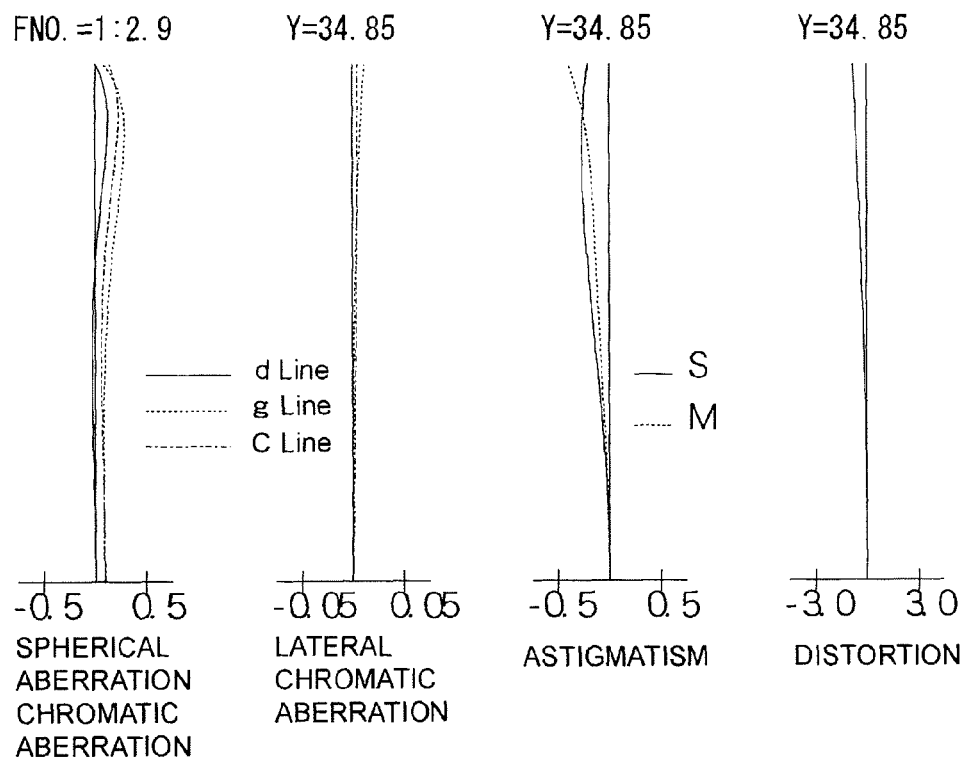
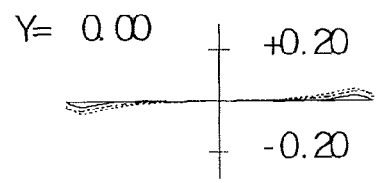
Fig.166A
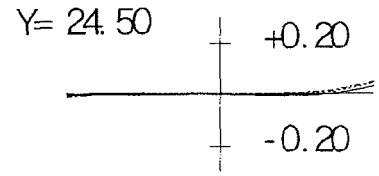
Fig.166B
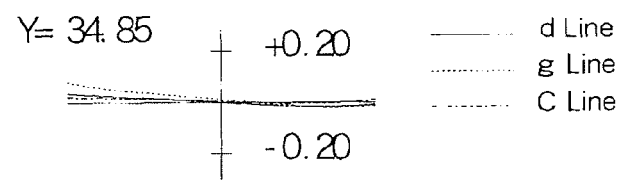
Fig.166C

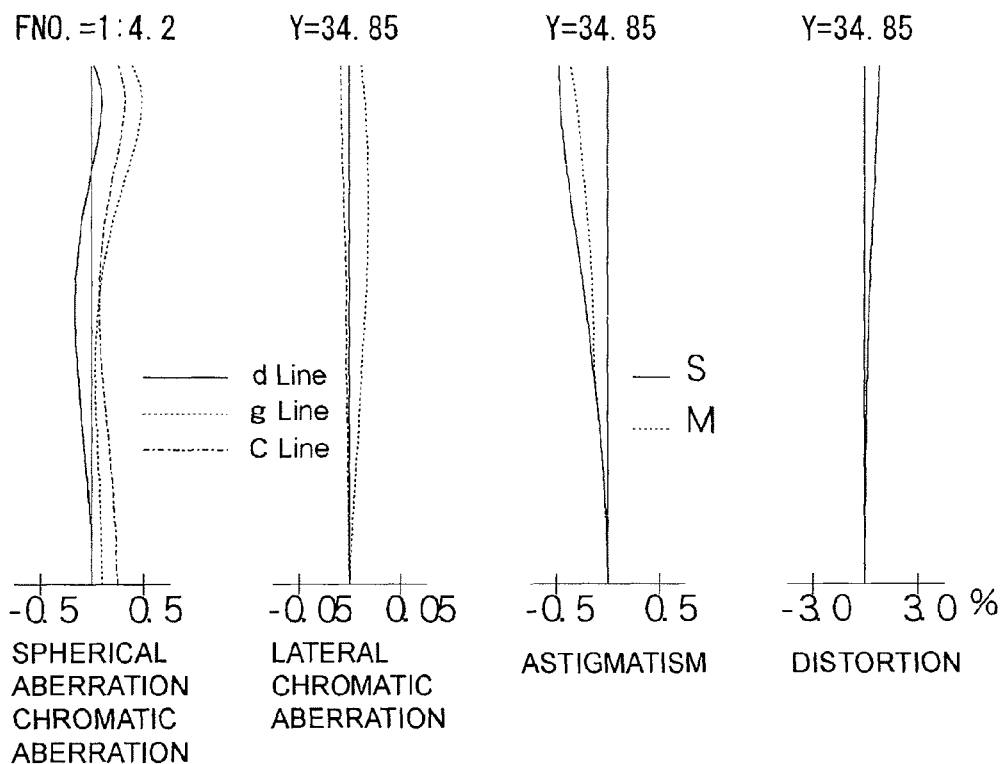
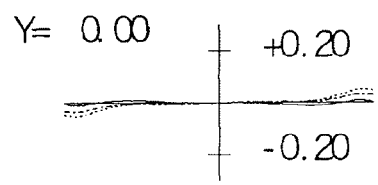
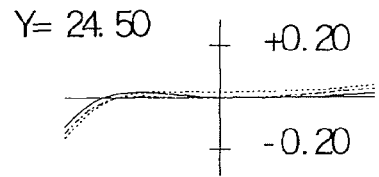
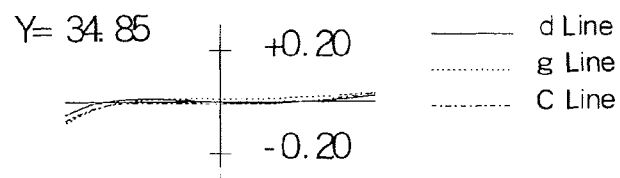

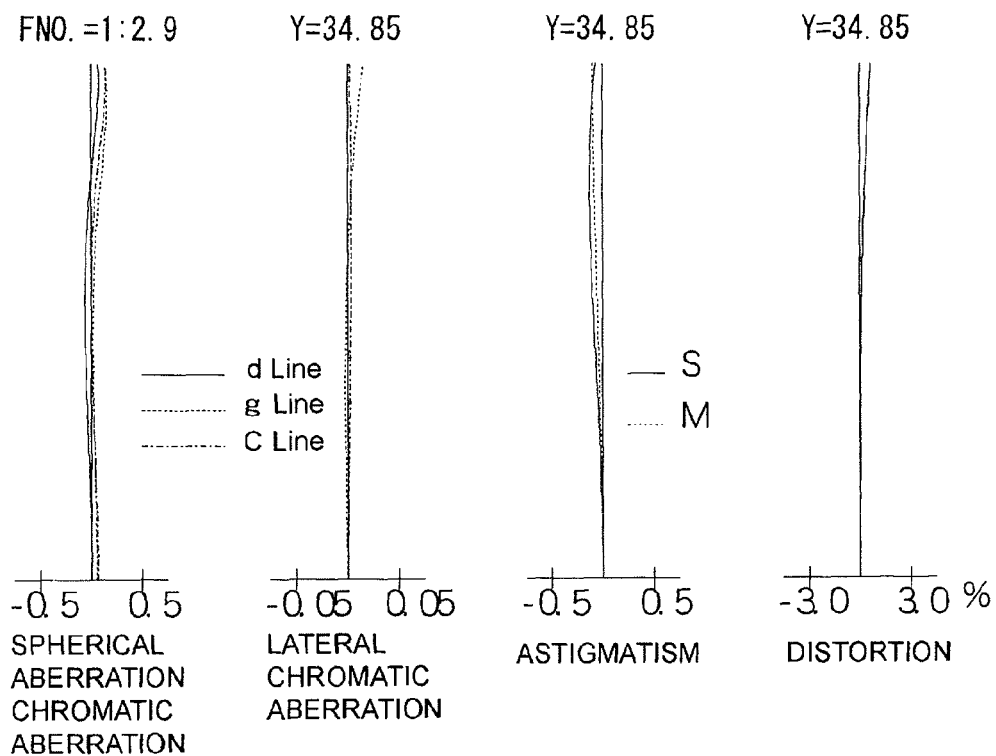
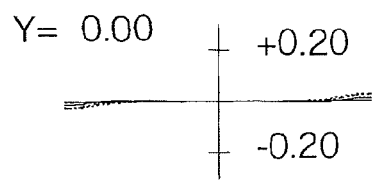
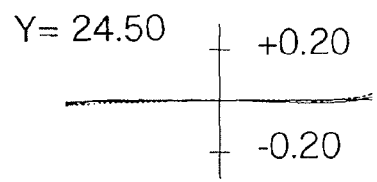
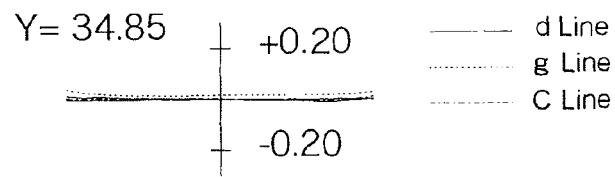

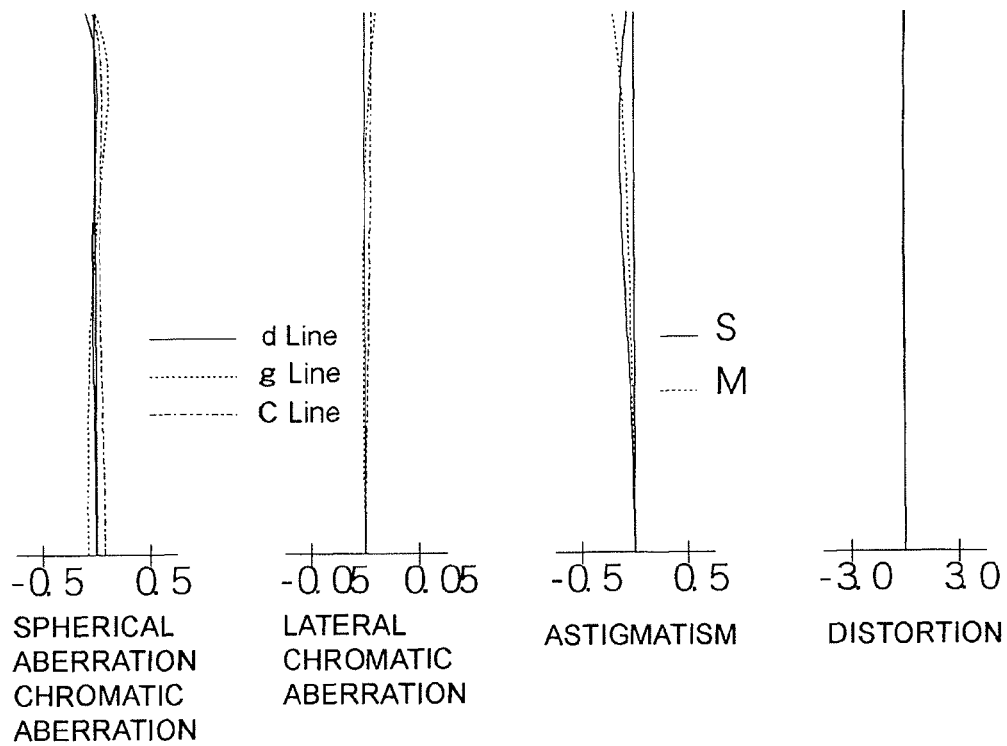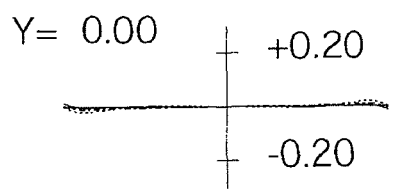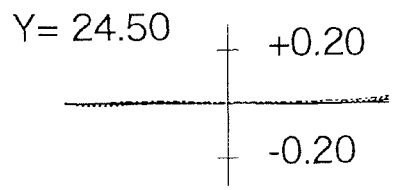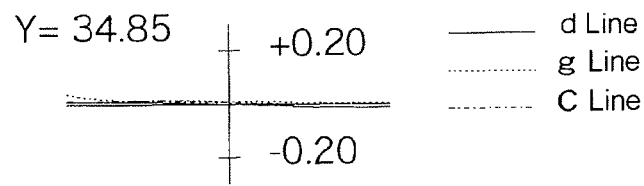

Fig.189A  Fig.189B  Fig.189C  Fig.189D
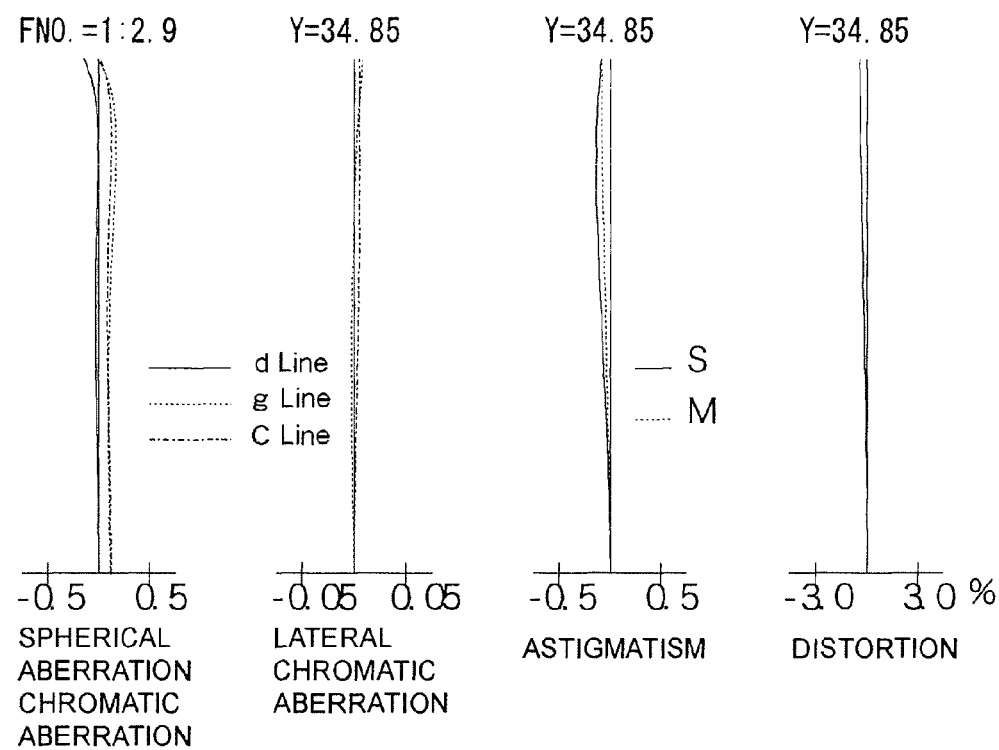
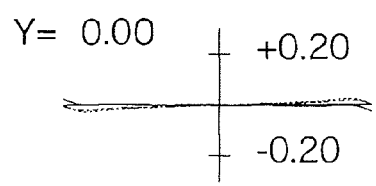
Fig.190A
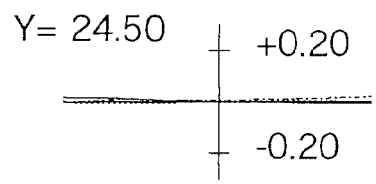
Fig.190B
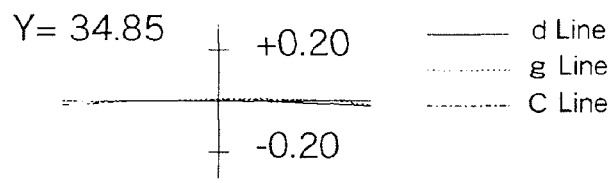
Fig.190C

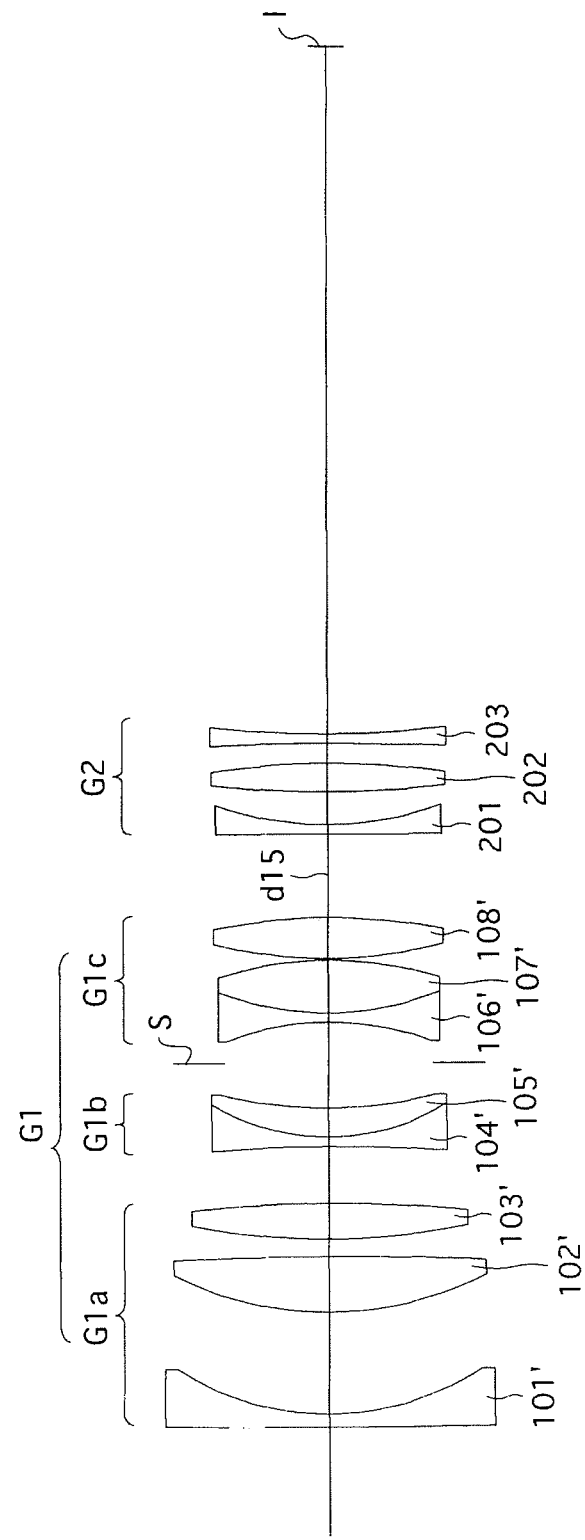

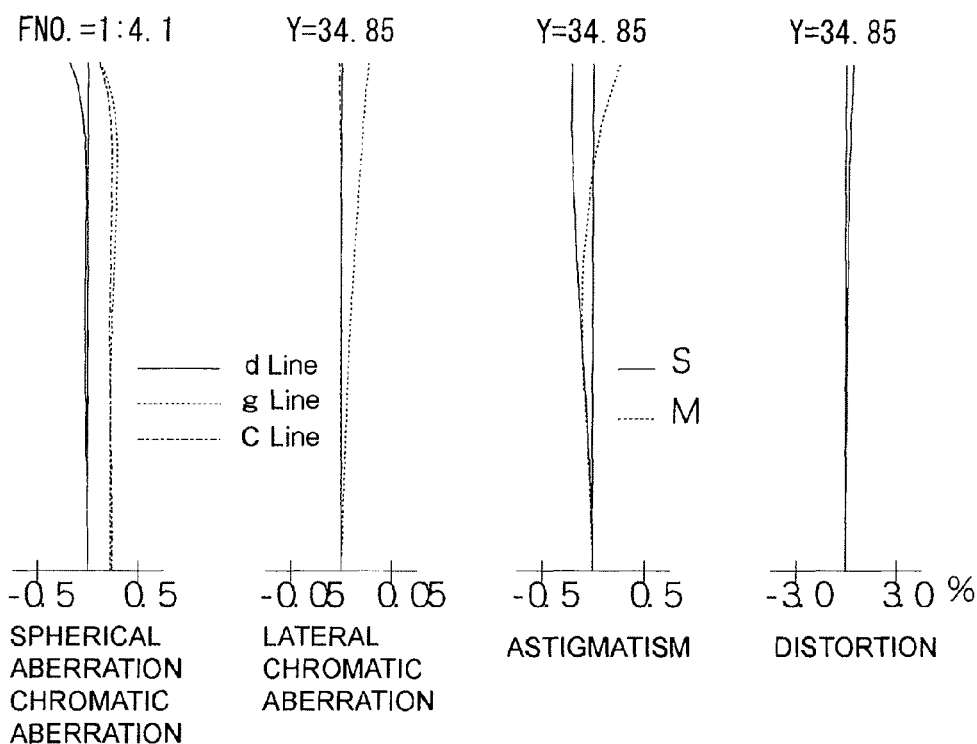

CLOSE-DISTANCE CORRECTING LENS SYSTEM

BACKGROUND OF THE INVENTION

1. Field of the Invention

The present invention relates to a close-distance correction lens system which is capable of photographing an object ranging from infinity to a close distance, and which is equipped with an image-stabilizing (anti-shake/image-blur correcting) function.

2. Description of Related Art

Background Art

In a typical photographing lens system, a photographing distance is usually set to infinity or a low photographing magnification of less than 0.1:1 (zero magnification to −0.1:0) as a designed reference (standard) distance. Furthermore, the entire lens system is designed to integrally advance when a focusing operation is performed. Accordingly, aberration fluctuations become larger at closer distances, e.g., a photographing magnification exceeding 0.5:1 (−0.5:1 through −0.1:1), so that it has been difficult to maintain an appropriate optical performance of such a photographing lens system. Hence, as disclosed in Japanese Unexamined Patent Publication No. H06-130291 (Patent Document 1) and Japanese Unexamined Patent Publication No. 2008-20656 (Patent Document 2), in order to enable photographing at very close distances, e.g., the photographing magnification from 0.5:1 to 1:1 (life sized), a photographing lens system employing a floating mechanism has been proposed. With the floating mechanism, a plurality of (two or three) lens groups are arranged to independently move at different traveling rates so that aberration fluctuations upon focusing can be reduced.

On the other hand, a close-distance correction lens system with an image-stabilizing (anti-shake/image-blur correcting) function, in which the correcting of a changed image-position due to camera shake (image shake) is performed by decentering a part of the photographing lens system (image-stabilizing (anti-shake/image-blur correcting) lens group) in a direction orthogonal to the optical axis, has been proposed. In the close-distance correction lens system with an image-stabilizing function, it is required to maintain a suitable optical performance by reducing aberrations caused by the decentering of the anti-blur lens group. Also, in order to reduce the load on a mechanism for decentering the image-stabilizing lens group, miniaturization and weight-saving of the image-stabilizing lens group is required, so that the amount of change of an image point with respect to the amount of decentering of the image-stabilizing lens group (decentering sensitivity) is preferably made larger.

Japanese Unexamined Patent Publication No. H07-261126 (Patent Document 3) discloses a close-distance correction lens system with an image-stabilizing function, including a positive first lens group, an aperture diaphragm, a positive second lens group and a negative third lens group, in that order from the object side. In this lens system, a focusing operation is performed on an object at infinity to an object at a close distance by independently moving the positive first lens group and the positive second lens group, while a part of the negative third lens group, which is immovable upon focusing, is arranged to function as an image-stabilizing lens group.

However, in the above-mentioned lens-group arrangement, a part of the negative third lens group which is positioned distant from the aperture diaphragm is arranged to function as the image-stabilizing lens group rather than the positive first lens group and the positive second lens group which are positioned symmetrically with respect to the aperture diaphragm. However, in such a lens-group arrangement, abaxial decentration aberration inevitably and largely occurs when the image-stabilizing lens group is being decentered.

Japanese Unexamined Patent Publication No. H09-218349 (Patent Document 4) discloses a close-distance correction lens system with an image-stabilizing function, including a positive first lens group, an aperture diaphragm, a negative second lens group and a positive third lens group, in that order from the object side. In this lens system, a part of the negative second lens group, which is positioned close to the aperture diaphragm, is arranged to function as an image-stabilizing lens group.

However, in the above-mentioned lens-group arrangement, a focusing operation is performed on an object at infinity to an object at a close distance by independently moving all the three lens groups (i.e., the positive first lens group, the negative second lens group and the positive third lens group), which makes the focusing mechanism thereof large and complicated. Moreover, the traveling distance (the telescoping amount/advancing amount) of the entire lens system is too long, which undesirably causes decentration aberration due to tilting of the lens groups.

With the above-mentioned photographing lens system in which an object distance as a designed reference distance is set to infinity or a low photographing magnification of less than 0.1:1 (zero magnification through −0.1:1), if focusing is performed by advancing the entire lens system toward the object in order to photograph an object at a even closer distance (e.g., more than −0.5:1), aberration fluctuations become larger, and optical performance deteriorates. Hence, in order to enable photographing from infinity to a closer distance, a photographing lens system employing a floating mechanism has been proposed. With the floating mechanism, a plurality of lens groups are arranged to independently move at different traveling rates, so that aberration fluctuations upon focusing can be reduced. Such a photographing lens system is disclosed in Patent Document 1, Japanese Unexamined Patent Publication No. H11-231210 (Patent Document 5), Japanese Unexamined Patent Publication No. 2003-185916 (Patent Document 6), Japanese Unexamined Patent Publication No. 2003-279849 (Patent Document 7), Japanese Unexamined Patent Publication No. 2008-257088 (Patent Document 8), and Japanese Unexamined Patent Publication No. 2004-61680 (Patent Document 9).

The photographing lens systems disclosed in Patent Documents 5 through 7 are provided for a medium format single-lens reflex (SLR) camera having the imaging plane larger than that of a 35 mm format single-lens reflex (SLR) camera. On the other hand, the photographing lens systems disclosed in the above-mentioned Documents 5 through 7 have a comparatively narrower angle-of-view equivalent to that of a medium format telephoto lens system. Therefore, from the viewpoint of securing sufficient light quantity and correcting aberrations, the photographing lens systems disclosed in the above-mentioned Documents 5 through 7 cannot be applied to photographing lens systems having a wider angle-of-view equivalent to that of a so-called standard photographing lens system (standard angle-of-view).

The photographing lens systems, disclosed in Patent Documents 1, 8 and 9 have an angle-of-view that is wider than the standard angle-of-view disclosed in Patent Documents 5, 6 and 7. However, the photographing lens systems disclosed in Patent Documents 1, 8 and 9 are optimized for the imaging plane of a 35 mm format SLR camera, and therefore cannot be applied to a medium format SLR camera having a larger imaging plane.

In a SLR camera (system), a backfocus has been required to be sufficiently long in order to prevent the quick-return mirror from coming into contact with the rearmost lens element which is closest to the image side of the SLR camera (system). Particularly, in a medium format SLR camera, in which the size of the imaging plane is larger than that of a 35 mm format SLR camera, the backfocus has been required to be longer with respect to the focal length. However, if an attempt is made to apply the photographing lens systems of Patent Documents 1, 8 and 9 to a medium format SLR camera having substantially the same angle-of-view as those of the lens systems as disclosed in Patent Documents 1, 8 and 9, it is difficult to attain the standard angle-of-view only by the enlarging (scaling) the photographing lens system, and such an enlargement also causes an increase in the entire length of the photographing lens system. Namely, if an attempt is made to apply the photographing lens systems of Patent Documents 1, 8 and 9, while maintaining the angle-of-view thereof, to a medium format SLR camera, a sufficient backfocus cannot be obtained. On the other hand, if the enlargement (scaling) of a photographing lens system is carried out to the extent that the sufficient backfocus is obtained, the focal length becomes longer, i.e., the angle-of-view becomes narrower.

SUMMARY OF THE INVENTION

The present invention has been devised based on the above-mentioned problems, and provides a miniaturized close-distance correction lens system, having outstanding optical performance, in which the focusing mechanism is simplified, the correcting of aberrations from infinity to a closer distance (a photographing magnification exceeding 0.5:1) can be favorably carried out, and aberration fluctuations (in particular, abaxial aberration fluctuations of field curvature and lateral chromatic aberration, etc.) occurred when the image-stabilizing lens group is being decentered can be favorably corrected.

Furthermore, the present invention also provides a close-distance correction lens system which can be used a medium format SLR camera in which the angle-of-view is relatively wider (42 to 43 degrees), the backfocus necessary for a medium format SLR camera is sufficiently secured, and the correcting of aberrations over a photographing range from infinity to a closer distanced is favorably carried out.

According to an aspect of the present invention, a close-distance correcting lens system is provided, including a positive first lens group and a negative second lens group, wherein traveling distances of the first lens group and the second lens group toward the object side differ from each other when carrying out a focusing operation on an object at infinity to an object at a close distance. The first lens group includes a positive first sub lens group, a negative second sub lens group, a diaphragm, and a positive third sub lens group, in that order from the object side. The second sub lens group includes an image-stabilizing lens group which is arranged to move in a direction orthogonal to the optical axis to change an imaging position of the object image to thereby correct any image shake of the object image.

It is desirable for the second sub lens group to include a cemented lens including a negative lens element having a concave surface on the image side and a positive lens element having a concave surface on the image side, in that order from the object side.

It is desirable for the following condition (1) to be satisfied:

$$vd_{1bn} > 30 \quad (1),$$

wherein $vd_{1bn}$ designates the Abbe number, with respect to the d-line, of the negative lens element provided in the second sub lens group.

It is desirable for the following condition (2) to be satisfied:

$$0 < vd_{1bn} - vd_{1bp} < 20 \quad (2),$$

wherein $vd_{1bn}$ designates the Abbe number, with respect to the d-line, of the negative lens element provided in the second sub lens group, and $vd_{1bp}$ designates the Abbe number, with respect to the d-line, of the positive lens element provided in the second sub lens group.

It is further desirable for the following condition (2') to be satisfied:

$$0 < vd_{1bn} - vd_{1bp} < 15 \quad (2').$$

It is desirable for the following conditions (3) and (4) to be satisfied:

$$nd_{1bn} < 1.7 \quad (3),$$

and $$nd_{1bp} > 1.8 \quad (4),$$

wherein $nd_{1bn}$ designates the refractive index of the d-line of the negative lens element provided in the second sub lens group, and $nd_{1bp}$ designates the refractive index of the d-line of the positive lens element provided in the second sub lens group.

It is desirable for the second sub lens group to include a single negative lens element having a concave surface on the image side.

It is desirable for the following condition (5) to be satisfied:

$$vd_{1b} > 45 \quad (5),$$

wherein $vd_{1b}$ designates the Abbe number, with respect to the d-line, of the single negative lens element provided in the second sub lens group.

It is desirable for the following conditions (6) and (7) to be satisfied:

$$2.5 < \beta_{1b} < 3.2 \quad (6),$$

and $$0.35 < \beta_R < 0.50 \quad (7),$$

wherein $\beta_{1b}$ designates the lateral magnification of the second sub lens group when focused on an object at infinity, and $\beta_R$ designates the lateral magnification of the lens groups which are located closer to the image than the second sub lens group when focused on an object at infinity.

It is desirable for the following condition (8) to be satisfied:

$$1.9 < |f2/f1| < 3.9 \ (f2<0) \quad (8),$$

wherein f1 designates the focal length of the first lens group, and f2 designates the focal length of the second lens group.

It is desirable for the following condition (9) to be satisfied:

$$0.74 < \Delta d2/\Delta d1 < 0.88 \quad (9),$$

wherein $\Delta d1$ designates the traveling distance of the first lens group when a focusing operation is performed on an object at infinity to an object at a close distance, and $\Delta d2$ designates the traveling distance of the second lens group when carrying out a focusing operation on an object at infinity to an object at a close distance.

In an embodiment, a close-distance correcting lens system is provided, including a positive first lens group and a negative second lens group, wherein traveling distances of the first lens group and the second lens group toward the object side differ from each other when carrying out a focusing operation on an object at infinity to an object at a close distance. The first lens group includes a positive first sub lens group, a negative second sub lens group, a diaphragm, and a positive third sub lens group, in that order from the object side. The second sub lens group includes a cemented lens including a negative lens element having a concave surface on the image side and a positive lens element having a concave surface on the image side, in that order from the object side. The following condition (2) is satisfied:

$$0 < \nu d_{1bn} - \nu d_{1bp} < 20 \quad (2),$$

wherein $\nu d_{1bn}$ designates the Abbe number, with respect to the d-line, of the negative lens element provided in the second sub lens group, and $\nu d_{1bp}$ designates the Abbe number, with respect to the d-line, of the positive lens element provided in the second sub lens group.

It is desirable for the following condition (1) to be satisfied:

$$\nu d_{1bn} > 30 \quad (1),$$

wherein $\nu d_{1bn}$ designates the Abbe number, with respect to the d-line, of the negative lens element provided in the second sub lens group.

It is desirable for the following conditions (3) and (4) to be satisfied:

$$nd_{1bn} < 1.7 \quad (3),$$

and $$nd_{1bp} > 1.8 \quad (4),$$

wherein $nd_{1bn}$ designates the refractive index of the d-line of the negative lens element provided in the second sub lens group, and $nd_{1bp}$ designates the refractive index of the d-line of the positive lens element provided in the second sub lens group.

In an embodiment, a close-distance correcting lens system is provided, including a positive first lens group and a negative second lens group, wherein traveling distances of the first lens group and the second lens group toward the object side differ from each other when carrying out a focusing operation on an object at infinity to an object at a close distance. The first lens group includes a positive first sub lens group, a negative second sub lens group, a diaphragm and a positive third sub lens group, in that order from the object side. The second sub lens group includes a single negative lens element having a concave surface facing toward the image.

The following condition (5) is satisfied:

$$\nu d_{1b} > 45 \quad (5),$$

wherein $\nu d_{1b}$ designates the Abbe number, with respect to the d-line, of the single negative lens element provided in the second sub lens group.

In an embodiment, a close-distance correcting lens system is provided, including a positive first lens group and a negative second lens group, wherein at least the first lens group moves toward the object side when carrying out a focusing operation on an object at infinity to an object at a close distance; and wherein the second lens group includes a negative lens element having a concave surface on the image side, a positive lens element, and a negative lens element having a concave surface on the object side, in that order from the object side.

It is desirable for the following condition (10) to be satisfied:

$$-1.6 < (R_{21i} + R_{21o})/(R_{21i} - R_{21o}) < -0.6 \quad (10),$$

wherein $R_{21i}$ designates the radius of curvature of the surface on the image side of said negative lens element having the concave surface on the image side within said second lens group, and $R_{21o}$ designates the radius of curvature of the surface on the object side of said negative lens element having the concave surface on the image side within said second lens group.

It is desirable for the following condition (11) to be satisfied:

$$0.1 < R_{23o}/f_2 < 2.0 \quad (11),$$

wherein $R_{23o}$ designates the radius of curvature of the surface on the object side of said negative lens element having the concave surface on the object side with in said second lens group, and $f_2$ designates the focal length of the second lens group.

It is desirable for the following condition (12) to be satisfied:

$$0.2 < f_{21}/f_2 < 0.7 \quad (12),$$

wherein $f_{21}$ designates the focal length of the negative lens element having a concave surface on the image side within the second lens group, and $f_2$ designates the focal length of the second lens group.

It is desirable for the following condition (13) to be satisfied:

$$0.2 < f_{23}/f_2 < 0.9 \quad (13),$$

wherein $f_{23}$ designates the focal length of the negative lens element having a concave surface on the object side within the second lens group, and $f_2$ designates the focal length of the second lens group.

It is desirable for the following condition (14) to be satisfied:

$$\nu d_{23} < 60 \quad (14),$$

wherein $\nu d_{23}$ designates the Abbe number, with respect to the d-line, of the negative lens element having a concave surface on the object side within the second lens group.

It is desirable for the first lens group to include a negative lens element which has a concave surface on the image side and is provided closest to the object side.

It is desirable for the following conditions (15) and (16) to be satisfied:

$$nd_{11} > 1.65 \quad (15),$$

and $$\nu d_{11} > 40 \quad (16),$$

wherein $nd_{11}$ designates the refractive index of the d-line of the negative lens element having a concave surface on the image side and provided closest to the object side within the first lens group, and $\nu d_{11}$ designates the Abbe number, with respect to the d-line, of the negative lens element having a concave surface on the image side and provided closest to the object side within the first lens group.

It is desirable for the first lens group to include at least one positive lens element, and wherein the following conditions (17) and (18) are satisfied:

$$nd_{P1} > 1.7 \quad (17),$$

and $$\nu d_{P1} < 60 \quad (18),$$

wherein $nd_{P1}$ designates the refractive index of the d-line of the at least one positive lens element provided within the first lens group, and $\nu d_{P1}$ designates the Abbe number, with respect to the d-line, of the at least one positive lens element provided within the first lens group.

When carrying out a focusing operation on an object at infinity to an object at a close distance, it is desirable for the second lens group to move toward the object side at a moving rate different from that of the first lens group. The following condition (19) is satisfied:

$$0.1 < \Delta d2/\Delta d1 < 0.9 \quad (19),$$

wherein $\Delta d1$ designates the traveling distance of the first lens group when carrying out a focusing operation on an object at infinity to an object at a close distance, and $\Delta d2$ designates the traveling distance of the second lens group when carrying out a focusing operation on an object at infinity to an object at a close distance.

The close-distance correcting lens system of the present invention satisfying condition (19) further desirably satisfies the following condition (19'):

$$0.5 < \Delta d2/\Delta d1 < 0.9 \quad (19').$$

When carrying out a focusing operation on an object at infinity to an object at a close distance, it is desirable for the second lens group not to move in the optical axis direction thereof relative to the imaging plane.

It is desirable for the first lens group to include a positive first sub lens group, a negative second sub lens group, a diaphragm, and a positive third sub lens group, in that order from the object side, wherein the second sub lens group includes a cemented lens including a negative lens element having a concave surface on the image side, and a positive lens element having a concave surface on the image side, in that order from the object side.

It is desirable for the following condition (20) to be satisfied:

$$\nu d_{1bn} > 30 \quad (20),$$

wherein $\nu d_{1bn}$ designates the Abbe number, with respect to the d-line, of the negative lens element provided in the second sub lens group.

It is desirable for the following condition (21) to be satisfied:

$$0 < \nu d_{1bn} - \nu d_{1bp} < 20 \quad (21),$$

wherein $\nu d_{1bn}$ designates the Abbe number, with respect to the d-line, of the negative lens element provided in the second sub lens group, and $\nu d_{1bp}$ designates the Abbe number, with respect to the d-line, of the positive lens element provided in the second sub lens group.

The close-distance correcting lens system of the present invention satisfying condition (21) further desirably satisfies the following condition (21'):

$$0 < \nu d_{1bn} - \nu d_{1bp} < 15 \quad (21').$$

It is desirable for the following conditions (22) and (23) to be satisfied:

$$nd_{1bn} < 1.7 \quad (22),$$

$$nd_{1bp} > 1.8 \quad (23),$$

wherein $nd_{1bn}$ designates the refractive index of the d-line of the negative lens element provided in the second sub lens group, and $nd_{1bp}$ designates the refractive index of the d-line of the positive lens element provided in the second sub lens group.

Effects of the Invention

According to the present invention, a miniaturized close-distance correction lens system, with outstanding optical performance, can be achieved in which the focusing mechanism is simplified, the correcting of aberrations from infinity to a closer distance (the photographing magnification exceeding ×0.5) can be favorably carried out, and aberration fluctuations (in particular, fluctuations of abaxial aberrations such as field curvature and lateral chromatic aberration, etc.) that occurred when the image-stabilizing lens group is being decentered can be favorably corrected.

In addition to the above, the present invention provides a close-distance correction lens system particularly for a medium format SLR camera in which the angle-of-view is relatively wider (42 to 43 degrees), the backfocus necessary for a medium format SLR camera is sufficiently secured, and the correcting of aberrations over a photographing range from infinity to a close distanced can be favorably carried out.

The present disclosure relates to subject matter contained in Japanese Patent Application Nos. 2012-41804 and 2012-41805 (both filed on Feb. 28, 2012,) and 2012-277048 (filed on Dec. 19, 2012), which are expressly incorporated herein in their entirety.

BRIEF DESCRIPTION OF THE DRAWINGS

The present invention will be discussed below in detail with reference to the accompanying drawings, in which:

FIG. 1 shows a lens arrangement of a $1^{st}$ numerical embodiment of a close-distance correcting lens system, according to the present invention, in a state where an image-stabilizing lens group is not decentered when focused on an object at infinity;

FIG. 4 shows a lens arrangement of the $1^{st}$ numerical embodiment of a close-distance correcting lens system, according to the present invention, in a state where an image-stabilizing lens group is not decentered when focused on an object at a close distance;

FIGS. 5A, 5B, 5C and 5D show various aberrations that occurred in the lens arrangement shown in FIG. 4;

FIGS. 6A, 6B and 6C show lateral aberrations that occurred in the lens arrangement shown in FIG. 4;

FIGS. 7A, 7B and 7C show lateral aberrations of the $1^{st}$ numerical embodiment of a close-distance correcting lens system, according to the present invention, in a state where an image-stabilizing lens group is decentered when focused on an object at infinity;

FIGS. 8A, 8B and 8C shows lateral aberrations of the $1^{st}$ numerical embodiment of a close-distance correcting lens system, according to the present invention, in a state where an image-stabilizing lens group is decentered when focused on an object at a close distance;

FIG. 9 shows a lens arrangement of a $2^{nd}$ numerical embodiment of a close-distance correcting lens system, according to the present invention, in a state where an image-stabilizing lens group is not decentered when focused on an object at infinity;

FIGS. 10A, 10B, 10C and 10D show various aberrations that occurred in the lens arrangement shown in FIG. 9;

FIGS. 11A, 11B and 11C show lateral aberrations that occurred in the lens arrangement shown in FIG. 9;

FIGS. 13A, 13B, 13C and 13D show various aberrations that occurred in the lens arrangement shown in FIG. 12;

FIGS. 14A, 14B and 14C show lateral aberrations that occurred in the lens arrangement shown in FIG. 12;

FIGS. 18A, 18B, 18C and 18D show various aberrations that occurred in the lens arrangement shown in FIG. 17;

FIGS. 19A, 19B and 19C show lateral aberrations that occurred in the lens arrangement shown in FIG. 17;

FIGS. 21A, 21B, 21C and 21D show various aberrations that occurred in the lens arrangement shown in FIG. 20;

FIGS. 22A, 22B and 22C show lateral aberrations that occurred in the lens arrangement shown in FIG. 20;

FIGS. 26A, 26B, 26C and 26D show various aberrations that occurred in the lens arrangement shown in FIG. 25;

FIGS. 27A, 27B and 27C show lateral aberrations that occurred in the lens arrangement shown in FIG. 25;

FIGS. 29A, 29B, 29C and 29D show various aberrations that occurred in the lens arrangement shown in FIG. 28;

FIGS. 30A, 30B and 30C show lateral aberrations that occurred in the lens arrangement shown in FIG. 28;

FIGS. 34A, 34B, 34C and 34D show various aberrations that occurred in the lens arrangement shown in FIG. 33;

FIGS. 35A, 35B and 35C show lateral aberrations that occurred in the lens arrangement shown in FIG. 33;

FIG. 36 shows a lens arrangement of the $5^{th}$ numerical embodiment of a close-distance correcting lens system, according to the present invention, in a state where an image-stabilizing lens group is not decentered when focused on an object at a close distance;

FIGS. 37A, 37B, 37C and 37D show various aberrations that occurred in the lens arrangement shown in FIG. 36;

FIGS. 38A, 38B and 38C show lateral aberrations that occurred in the lens arrangement shown in FIG. 36;

FIG. 41 shows a lens arrangement of a $6^{th}$ numerical embodiment of a close-distance correcting lens system, according to the present invention, in a state where an image-stabilizing lens group is not decentered when focused on an object at infinity;

FIGS. 42A, 42B, 42C and 42D show various aberrations that occurred in the lens arrangement shown in FIG. 41;

FIGS. 43A, 43B and 43C show lateral aberrations that occurred in the lens arrangement shown in FIG. 42;

FIGS. 45A, 45B, 45C and 45D show various aberrations that occurred in the lens arrangement shown in FIG. 44;

FIGS. 46A, 46B and 46C show lateral aberrations that occurred in the lens arrangement shown in FIG. 44;

FIGS. 50A, 50B, 50C and 50D show various aberrations that occurred in the lens arrangement shown in FIG. 49;

FIGS. 51A, 51B and 51C show lateral aberrations that occurred in the lens arrangement shown in FIG. 49;

FIGS. 53A, 53B, 53C and 53D show various aberrations that occurred in the lens arrangement shown in FIG. 52;

FIGS. 54A, 54B and 54C show lateral aberrations that occurred in the lens arrangement shown in FIG. 52;

FIGS. 58A, 58B, 58C and 58D show various aberrations that occurred in the lens arrangement shown in FIG. 57;

FIGS. 59A, 59B and 59C show lateral aberrations that occurred in the lens arrangement shown in FIG. 57;

FIGS. 61A, 61B, 61C and 61D show various aberrations that occurred in the lens arrangement shown in FIG. 60;

FIGS. 62A, 62B and 62C show lateral aberrations that occurred in the lens arrangement shown in FIG. 60;

FIGS. 66A, 66B, 66C and 66D show various aberrations that occurred in the lens arrangement shown in FIG. 65;

FIGS. 67A, 67B and 67C show lateral aberrations that occurred in the lens arrangement shown in FIG. 65;

FIGS. 69A, 69B, 69C and 69D show various aberrations that occurred in the lens arrangement shown in FIG. 68;

FIGS. 70A, 70B and 70C show lateral aberrations that occurred in the lens arrangement shown in FIG. 68;

FIGS. 74A, 74B, 74C, and 74D show various aberrations that occurred in the lens arrangement shown in FIG. 73;

FIGS. 75A, 75B and 75C show lateral aberrations that occurred in the lens arrangement shown in FIG. 73;

FIGS. 77A, 77B, 77C and 77D show various aberrations that occurred in the lens arrangement shown in FIG. 76;

FIGS. 78A, 78B and 78C show lateral aberrations that occurred in the lens arrangement shown in FIG. 76;

FIGS. 82A, 82B, 82C and 82D show various aberrations that occurred in the lens arrangement shown in FIG. 81;

FIGS. 83A, 83B and 83C show lateral aberrations that occurred in the lens arrangement shown in FIG. 81;

FIGS. 85A, 85B, 85C and 85D show various aberrations that occurred in the lens arrangement shown in FIG. 84;

FIGS. 86A, 86B and 86C show lateral aberrations that occurred in the lens arrangement shown in FIG. 84;

FIGS. 90A, 90B, 90C and 90D show various aberrations that occurred in the lens arrangement shown in FIG. 89;

FIGS. 91A, 91B and 91C show lateral aberrations that occurred in the lens arrangement shown in FIG. 89;

FIG. 92 shows a lens arrangement of the 12$^{th}$ numerical embodiment of a close-distance correcting lens system, according to the present invention, in a state where an image-stabilizing lens group is not decentered when focused on an object at a close distance;

FIGS. 93A, 93B, 93C and 93D show various aberrations that occurred in the lens arrangement shown in FIG. 92;

FIGS. 94A, 94B and 94C show lateral aberrations that occurred in the lens arrangement shown in FIG. 92;

FIGS. 99A, 99B, 99C and 99D show various aberrations that occurred in the lens arrangement shown in FIG. 98;

FIGS. 100A, 100B and 100C show lateral aberrations that occurred in the lens arrangement shown in FIG. 98;

FIGS. 102A, 102B, 102C and 102D show various aberrations that occurred in the lens arrangement shown in FIG. 101;

FIGS. 103A, 103B and 103C show lateral aberrations that occurred in the lens arrangement shown in FIG. 101;

FIG. 104 shows a 14$^{th}$ numerical embodiment of a close-distance correcting lens system, according to the present invention, when focused on an object at infinity;

FIGS. 105A, 105B, 105C and 105D show various aberrations that occurred in the lens arrangement shown in FIG. 104;

FIGS. 106A, 106B and 106C show lateral aberrations that occurred in the lens arrangement shown in FIG. 104;

FIGS. 108A, 108B 108C and 108D show various aberrations that occurred in the lens arrangement shown in FIG. 107;

FIGS. 109A, 109B and 109C show lateral aberrations that occurred in the lens arrangement shown in FIG. 107;

FIG. 113 shows a lens arrangement of the 15$^{th}$ numerical embodiment of a close-distance correcting lens system, according to the present invention, when focused on an object at a close distance;

FIGS. 114A, 114B, 114C and 114D show various aberrations that occurred in the lens arrangement shown in FIG. 113;

FIGS. 115A, 115B and 115C show lateral aberrations that occurred in the lens arrangement shown in FIG. 113;

FIGS. 117A, 117B, 117C and 117D show various aberrations that occurred in the lens arrangement shown in FIG. 116;

FIGS. 118A, 118B and 118C show lateral aberrations that occurred in the lens arrangement shown in FIG. 116;

FIG. 119 shows a lens arrangement of the 16$^{th}$ numerical embodiment of a close-distance correcting lens system, according to the present invention, when focused on an object at a close distance;

FIGS. 120A, 120B, 120C and 120D show various aberrations that occurred in the lens arrangement shown in FIG. 119;

FIGS. 121A, 121B and 121C show lateral aberrations that occurred in the lens arrangement shown in FIG. 119;

FIG. 122 shows a 17$^{th}$ numerical embodiment of a close-distance correcting lens system, according to the present invention, when focused on an object at infinity;

FIGS. 123A, 123B, 123C and 123D show various aberrations that occurred in the lens arrangement shown in FIG. 122;

FIGS. 124A, 124B and 124C show lateral aberrations that occurred in the lens arrangement shown in FIG. 122;

FIG. 125 shows a lens arrangement of the 17$^{th}$ numerical embodiment of a close-distance correcting lens system, according to the present invention, when focused on an object at a close distance;

FIGS. 126A, 126B, 126C and 126D show various aberrations that occurred in the lens arrangement shown in FIG. 125;

FIGS. 127A, 127B and 127C show lateral aberrations that occurred in the lens arrangement shown in FIG. 125;

FIG. 128 shows a 18$^{th}$ numerical embodiment of a close-distance correcting lens system, according to the present invention, when focused on an object at infinity;

FIGS. 129A, 129B, 129C and 129D show various aberrations that occurred in the lens arrangement shown in FIG. 128;

FIGS. 130A, 130B and 130c show lateral aberrations that occurred in the lens arrangement shown in FIG. 128;

Figure 134:
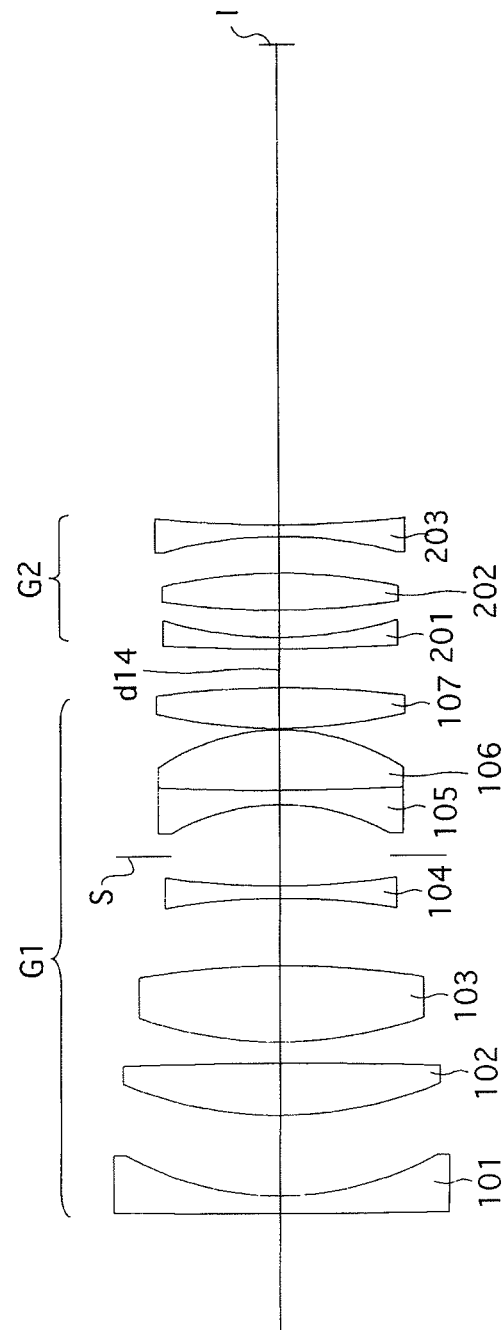
Figure 137:
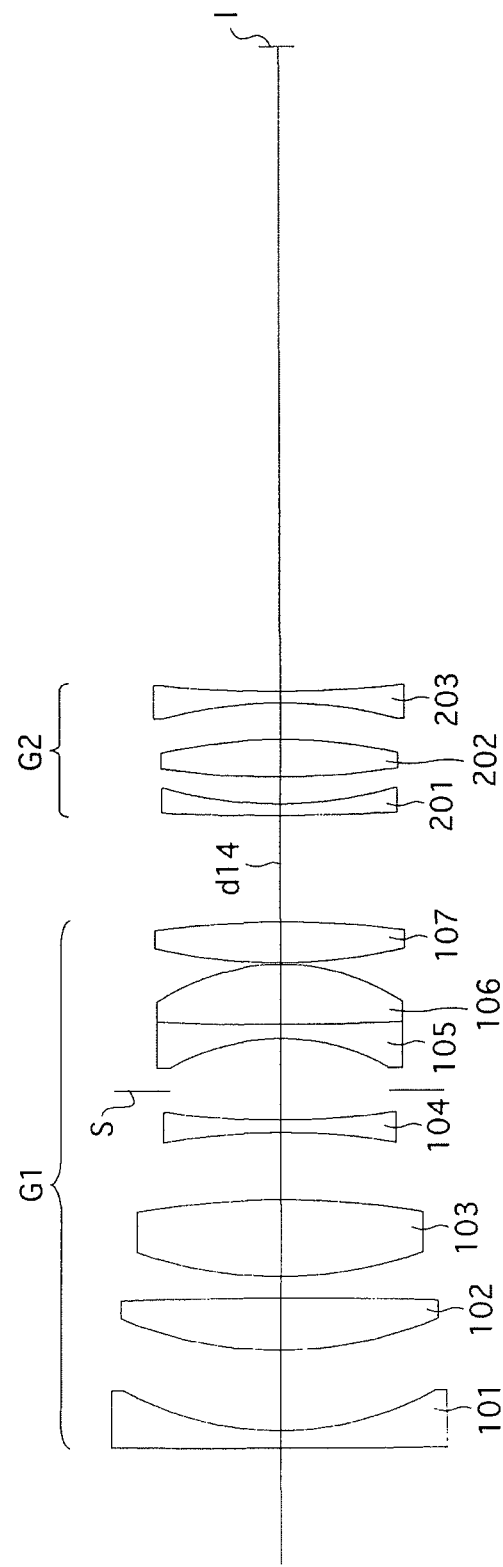
Figures 138A, 138B, 138C, 138D:
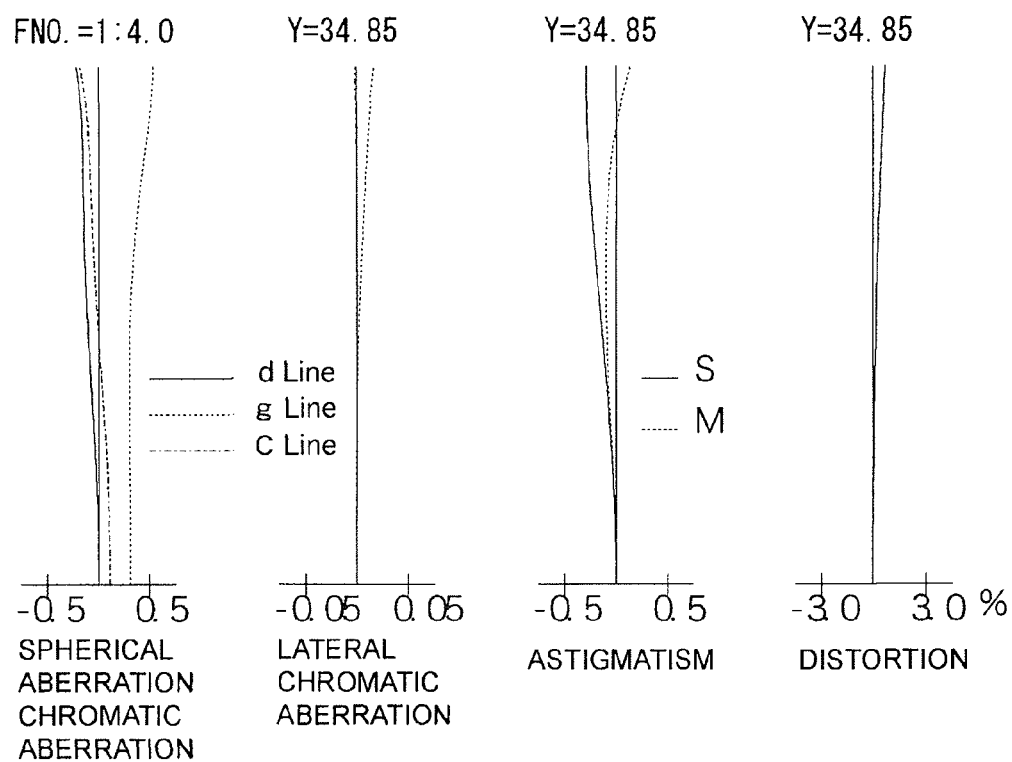
Figure 139A:
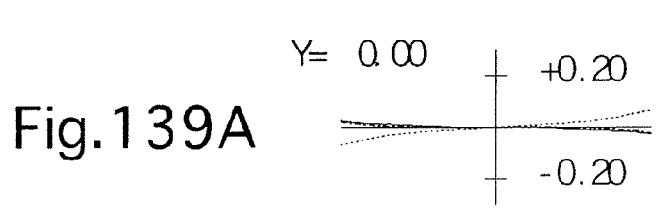
Figure 139B:
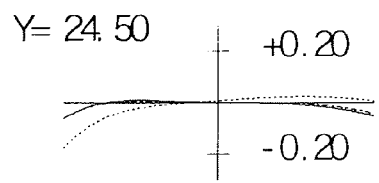
Figure 139C:
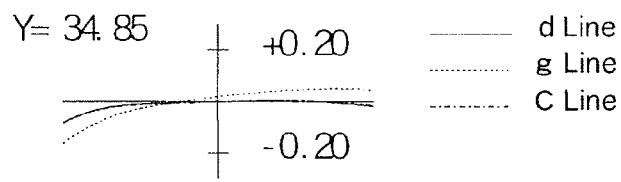
Figure 140:
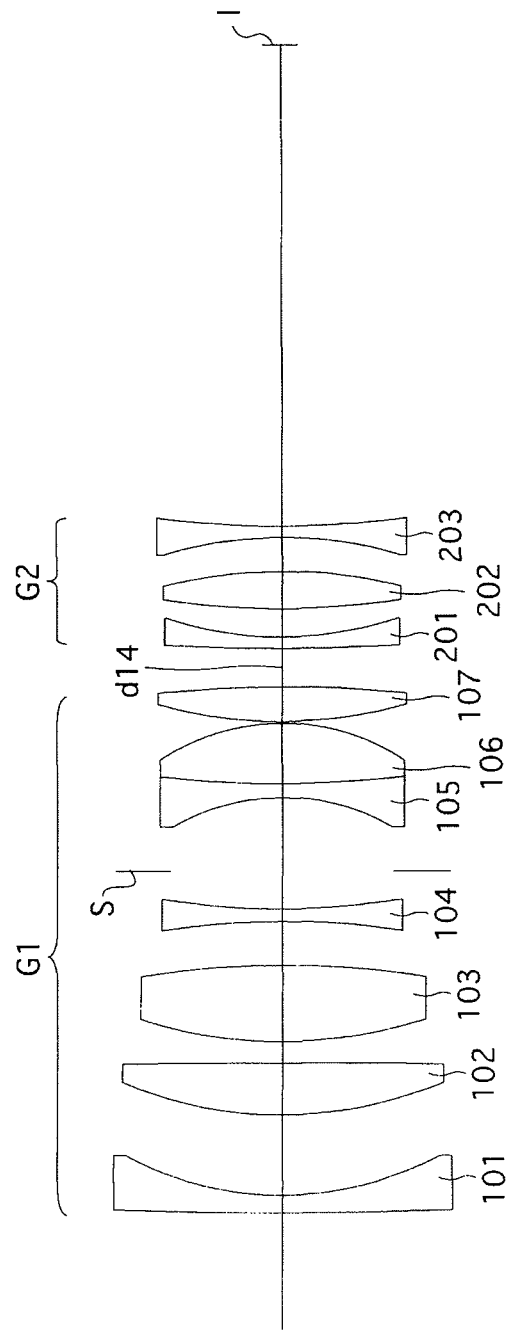
Figure 143:
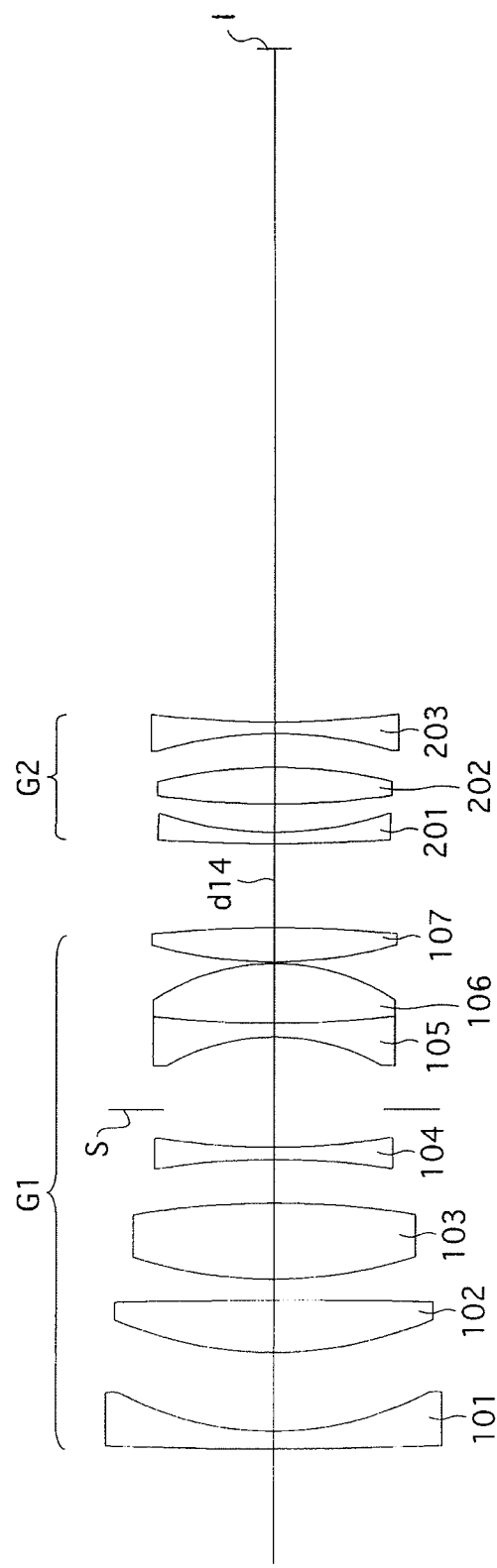
Figures 144A, 144B, 144C, 144D:
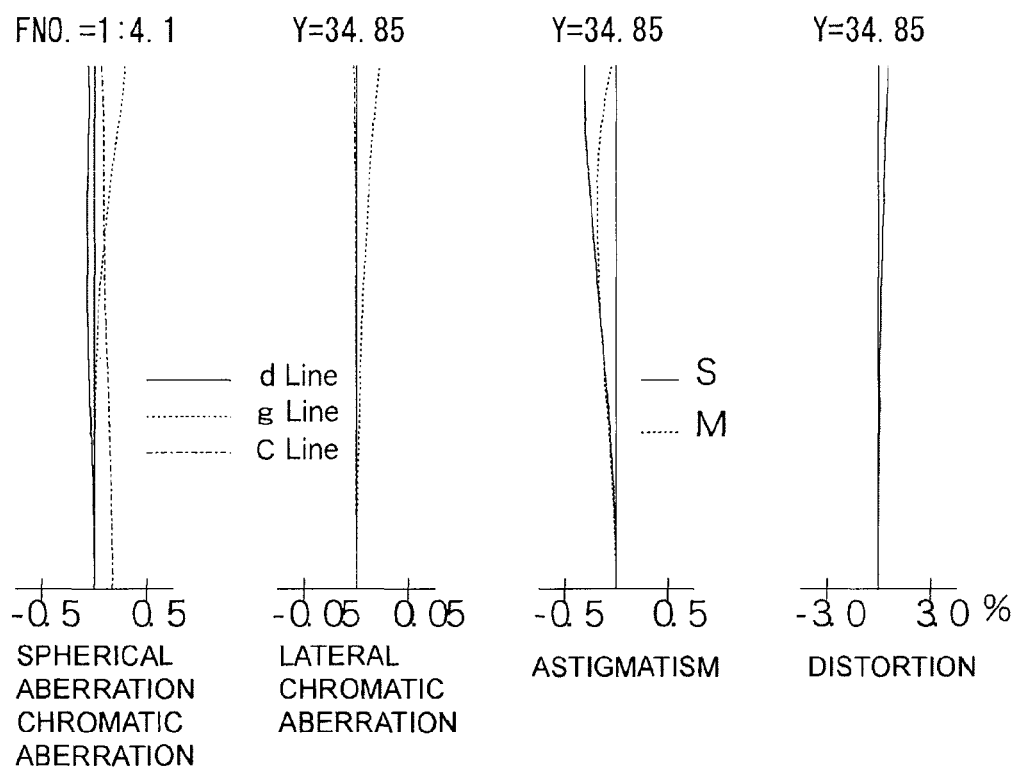
Figure 145A:
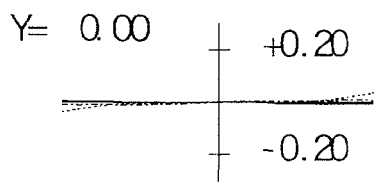
Figure 145B:
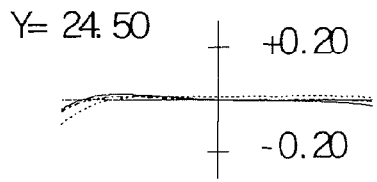
Figure 145C:
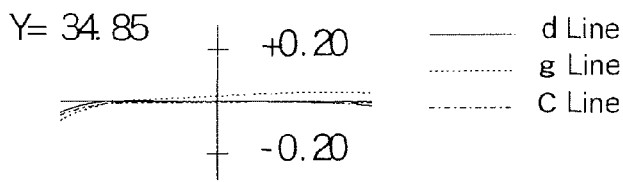
Figure 146:
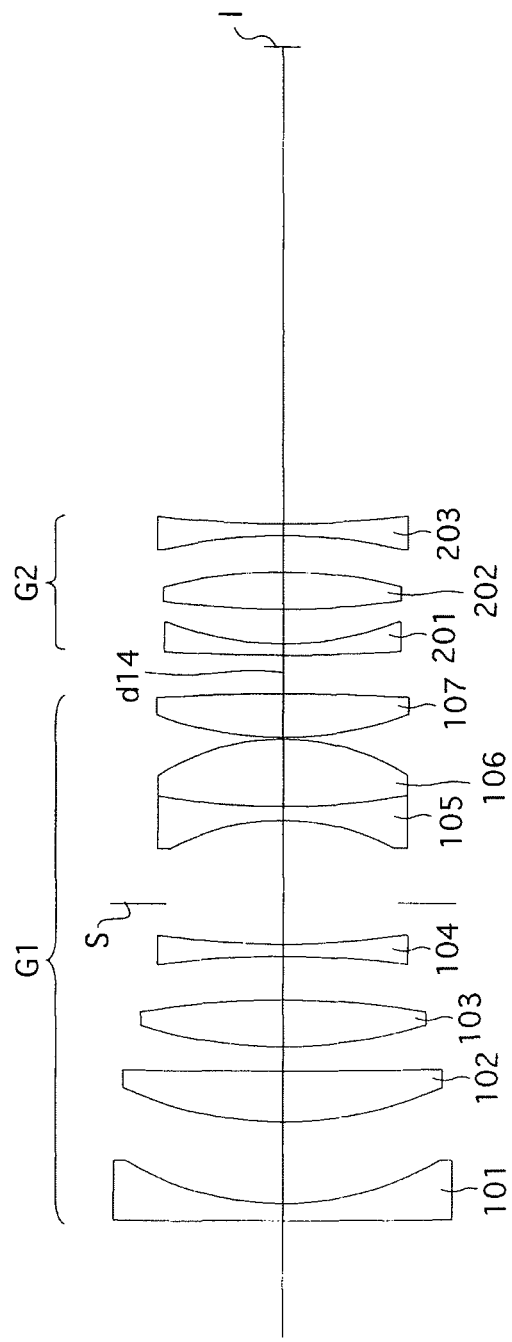
Figure 149:
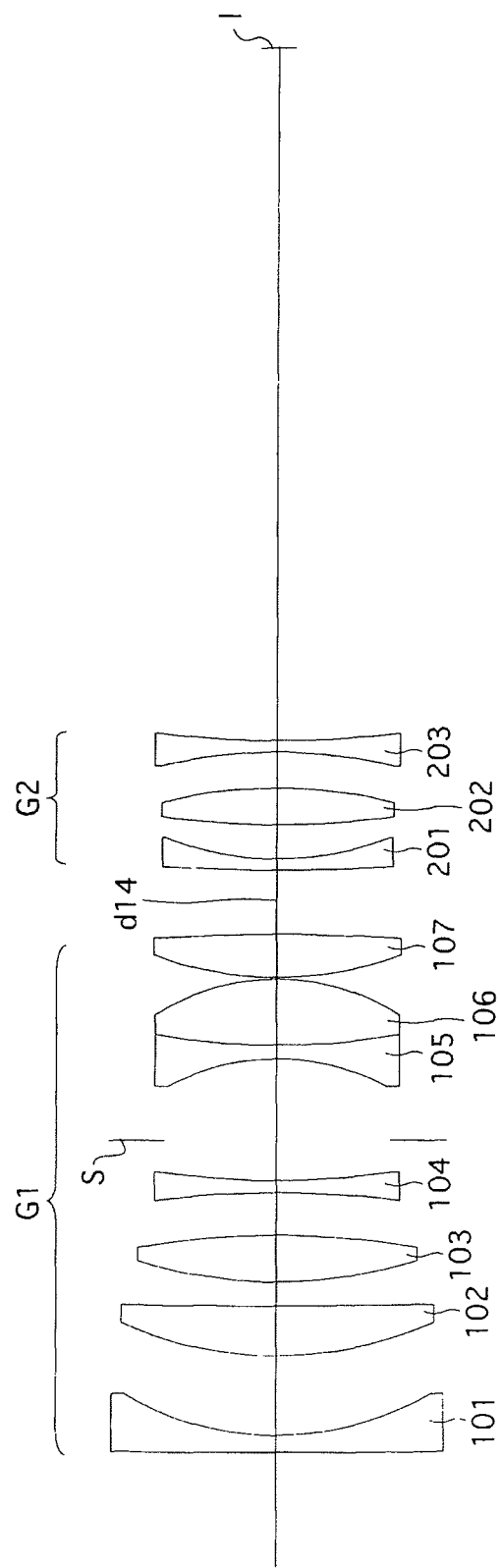
Figures 150A, 150B, 150C, 150D:
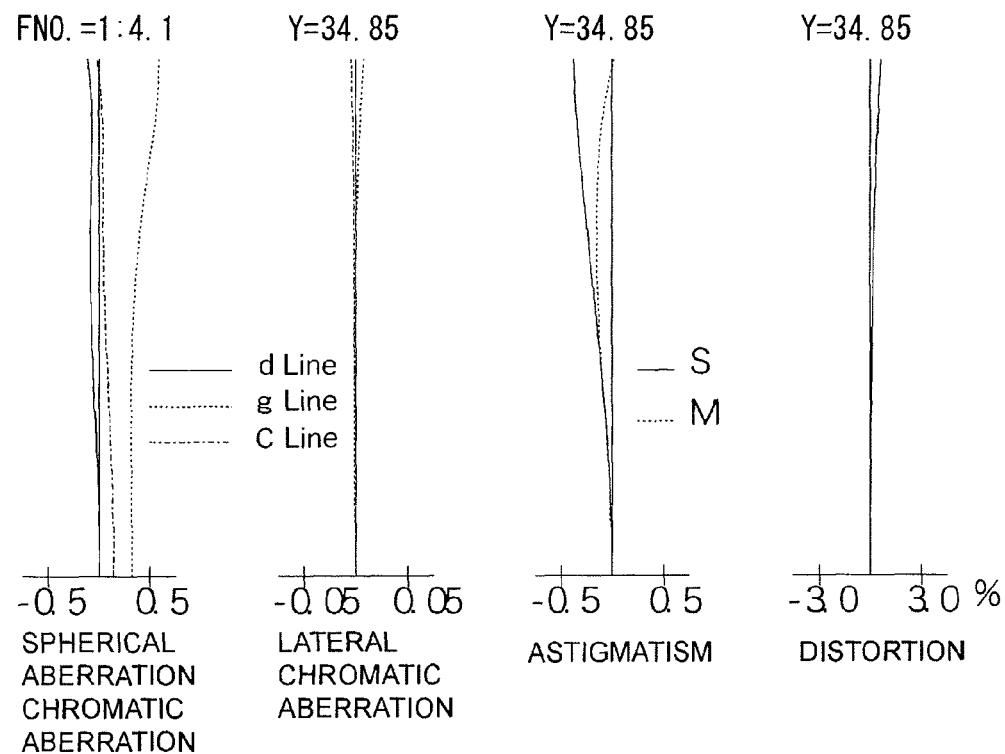
Figure 151A:
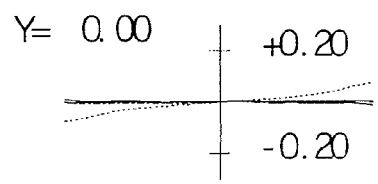
Figure 151B:
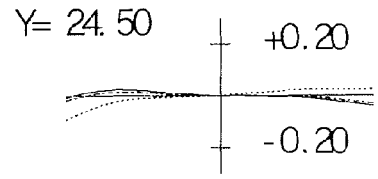
Figure 151C:
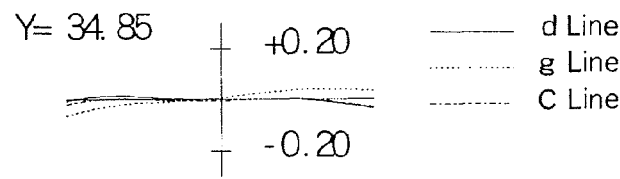
Figure 152:
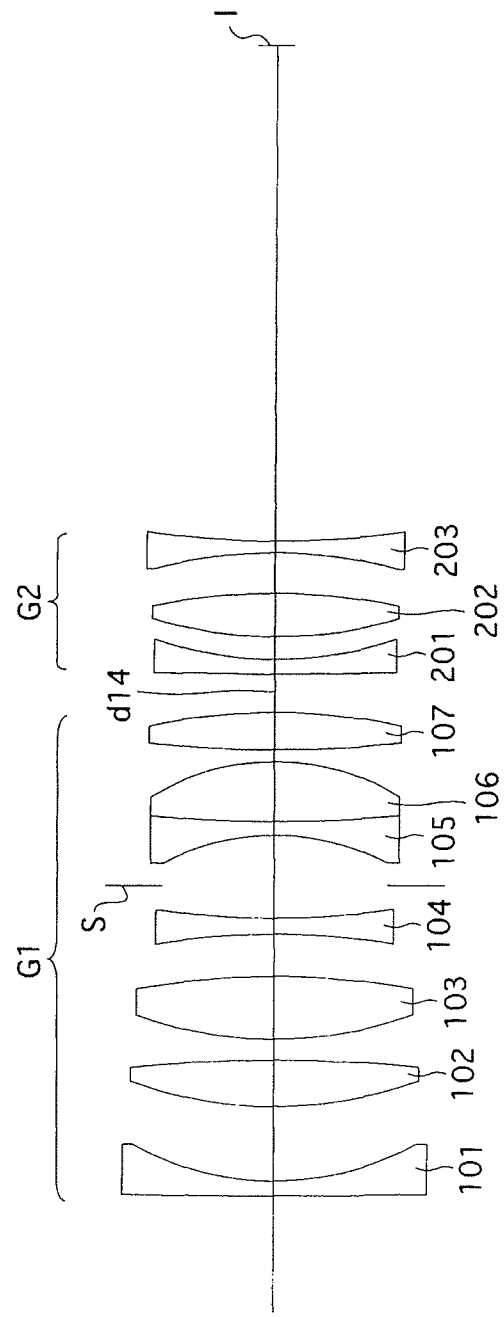
Figures 153A, 153B, 153C, 153D:
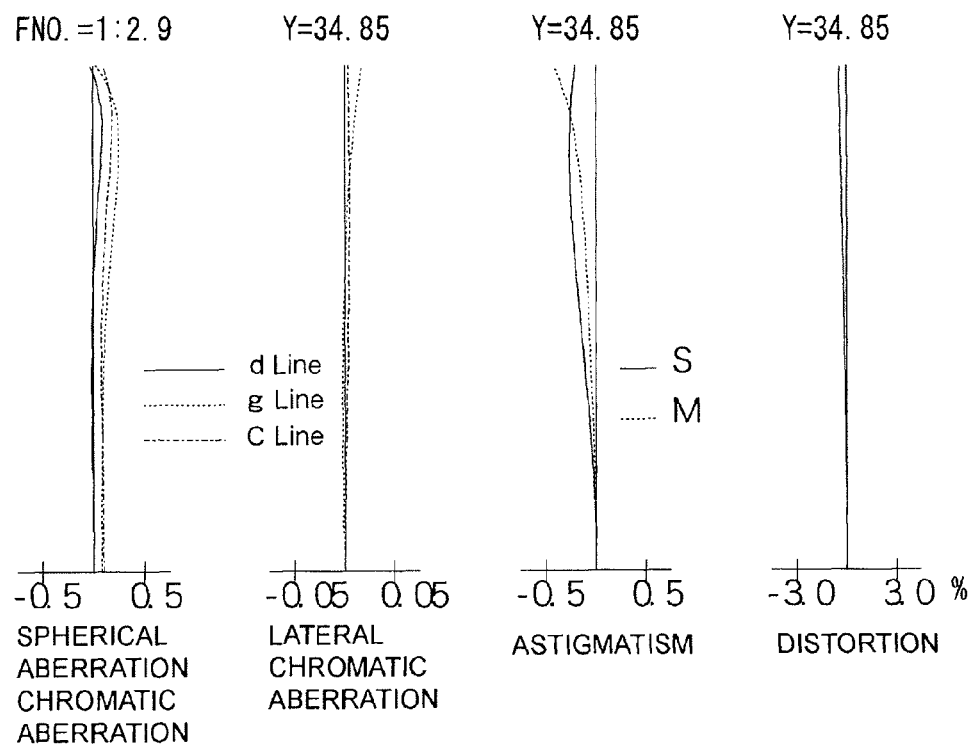
Figure 154A:
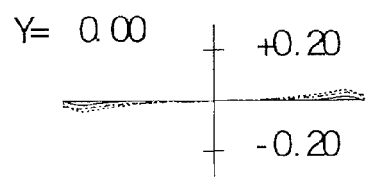
Figure 154B:
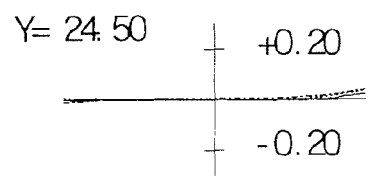
Figure 154C:
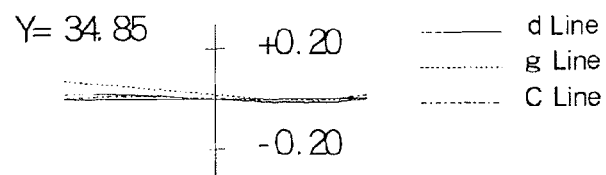
Figure 155:
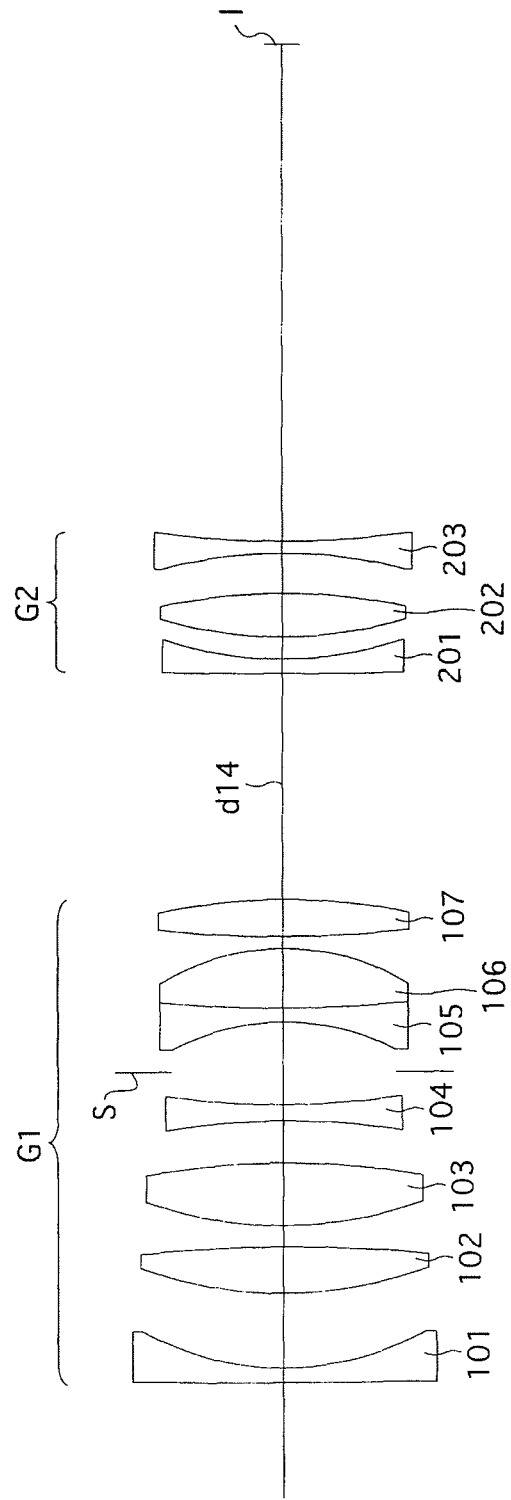
Figure 158:
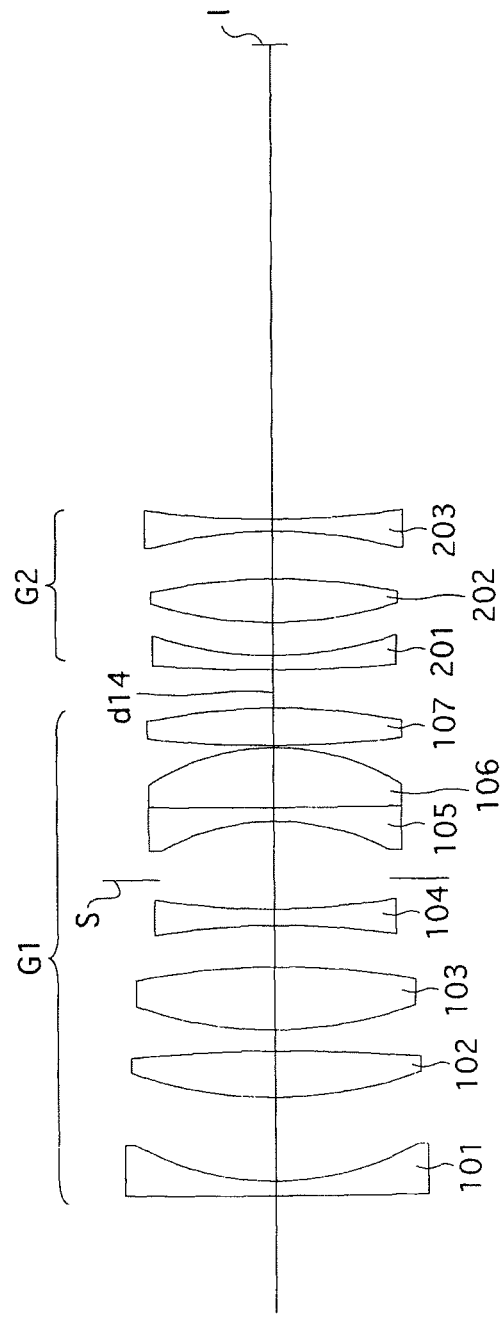
Figure 161:
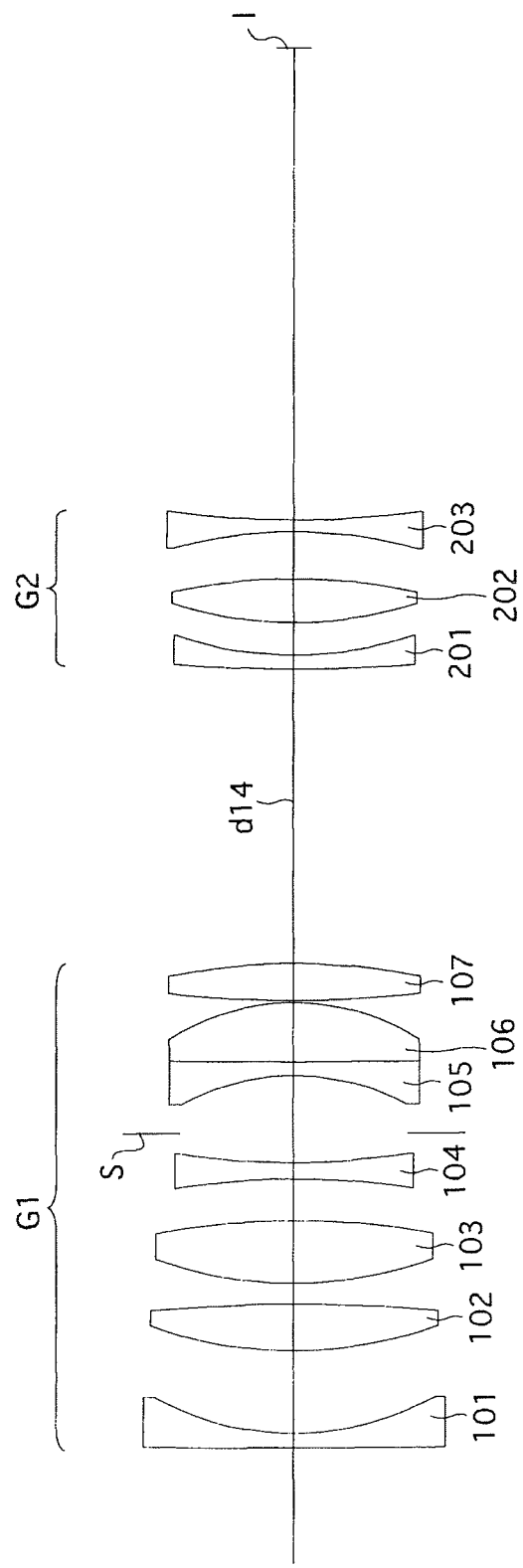
Figure 167:
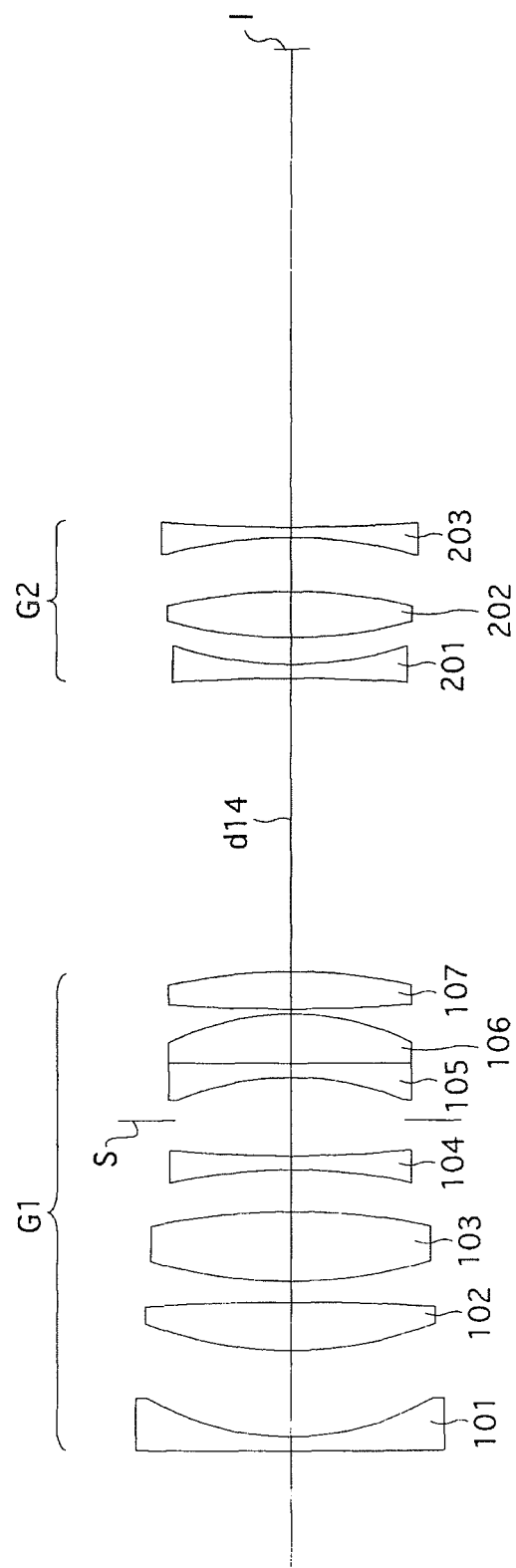
Figure 170:
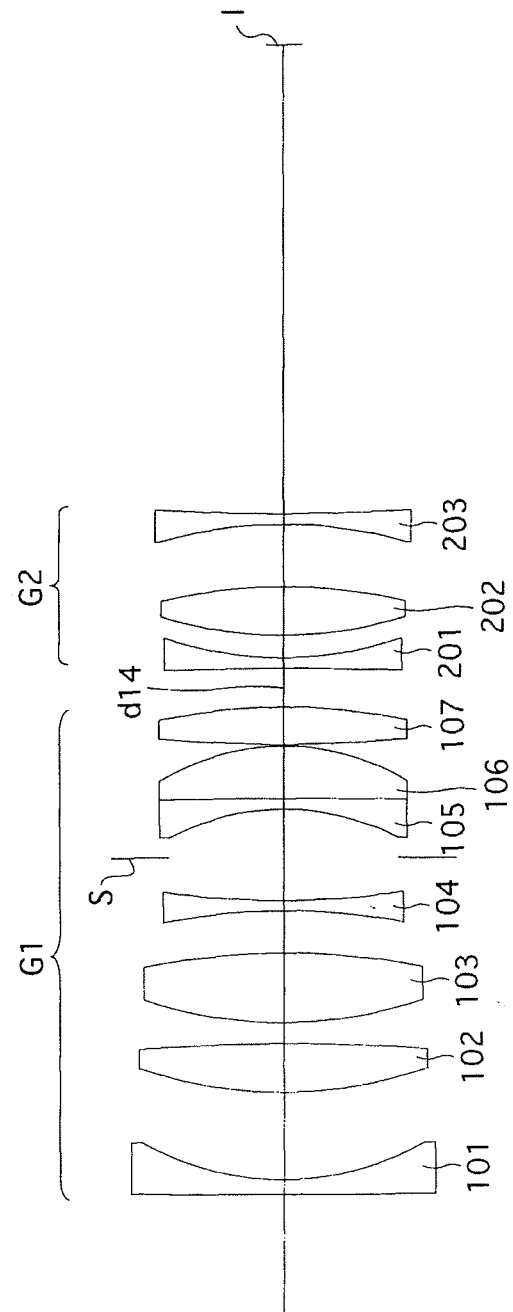
Figures 171A, 171B, 171C, 171D:
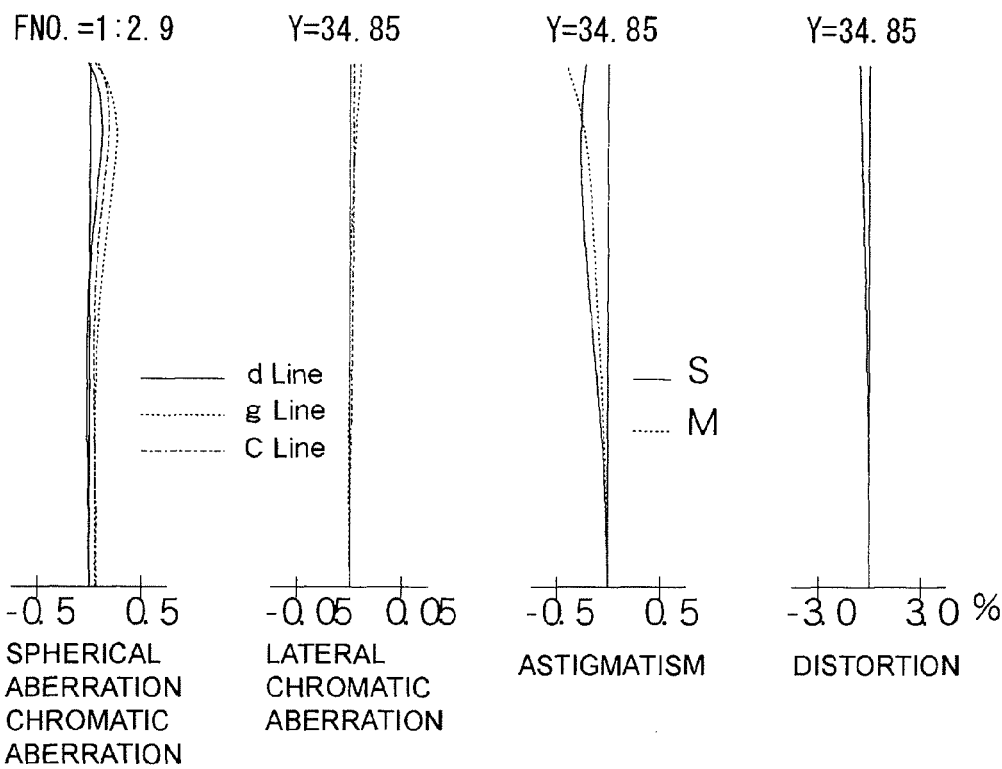
Figure 172A:
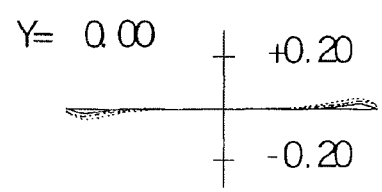
Figure 172B:
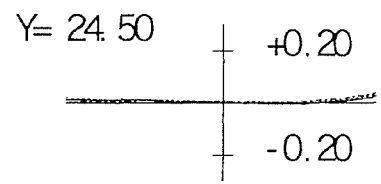
Figure 172C:
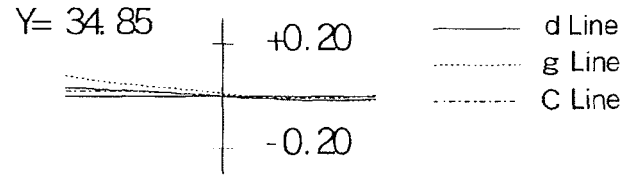
Figure 173:
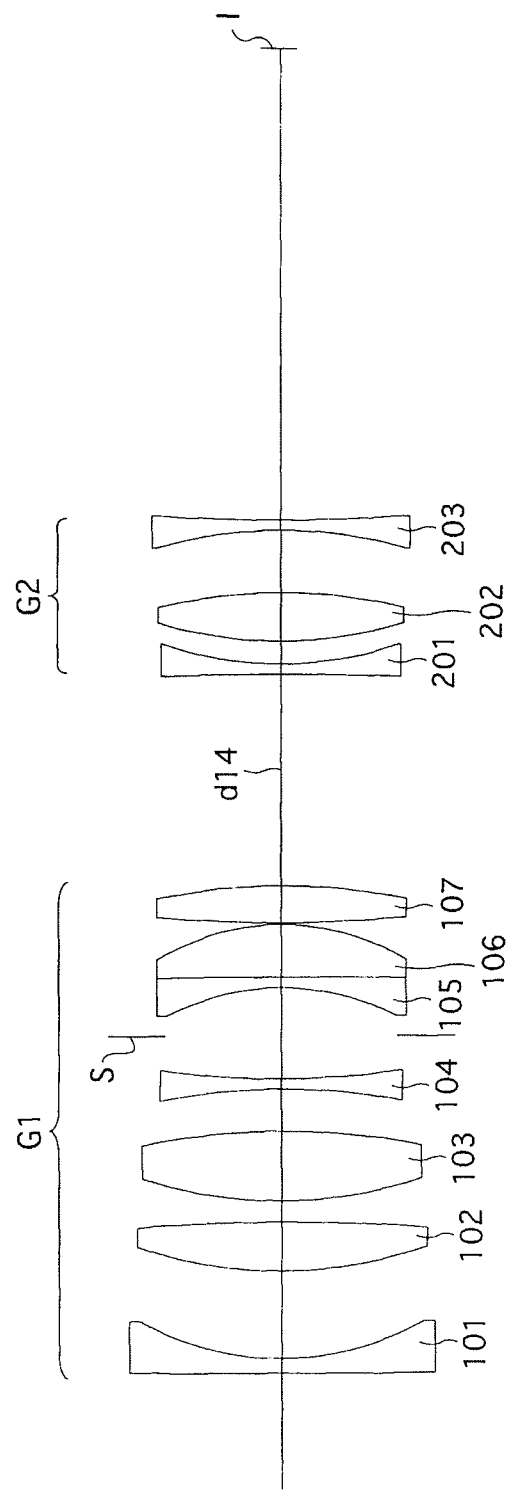
Figures 174A, 174B, 174C, 174D:
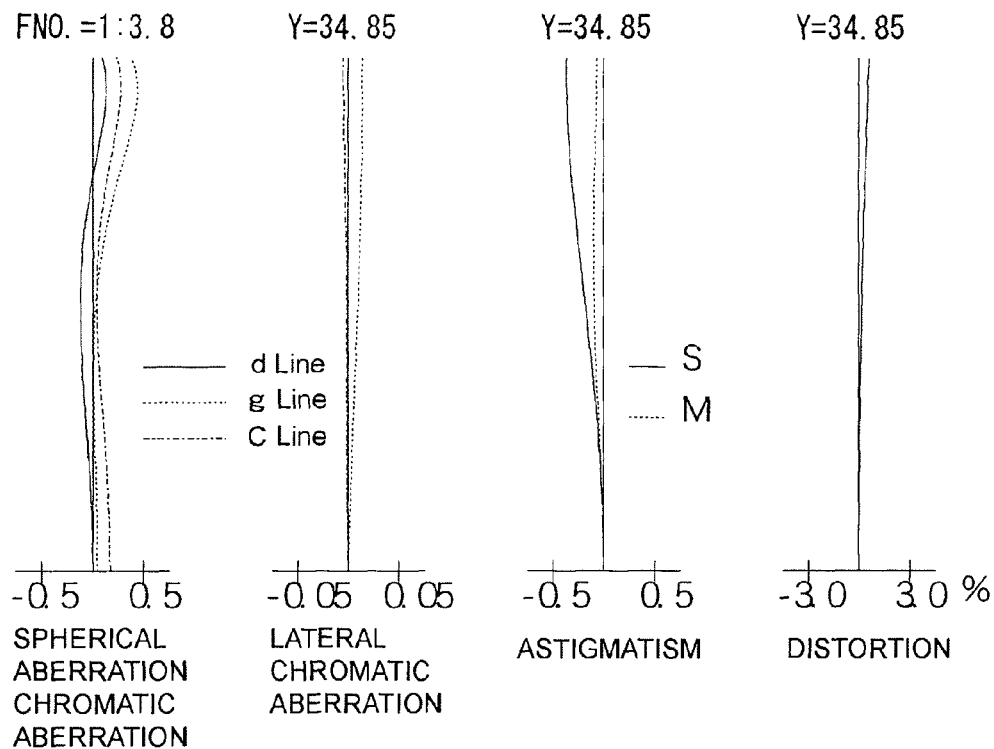
Figure 175A:
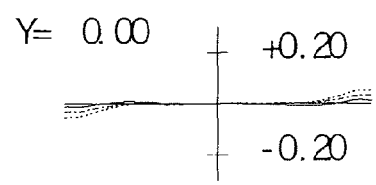
Figure 175B:
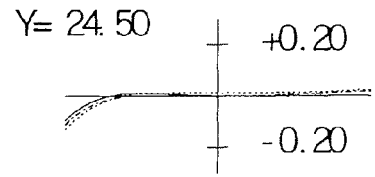
Figure 175C:
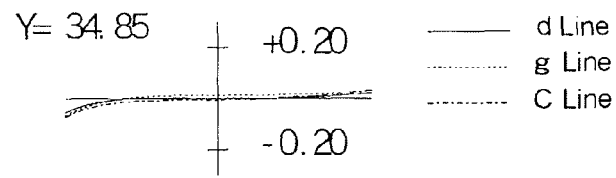
Figure 176:
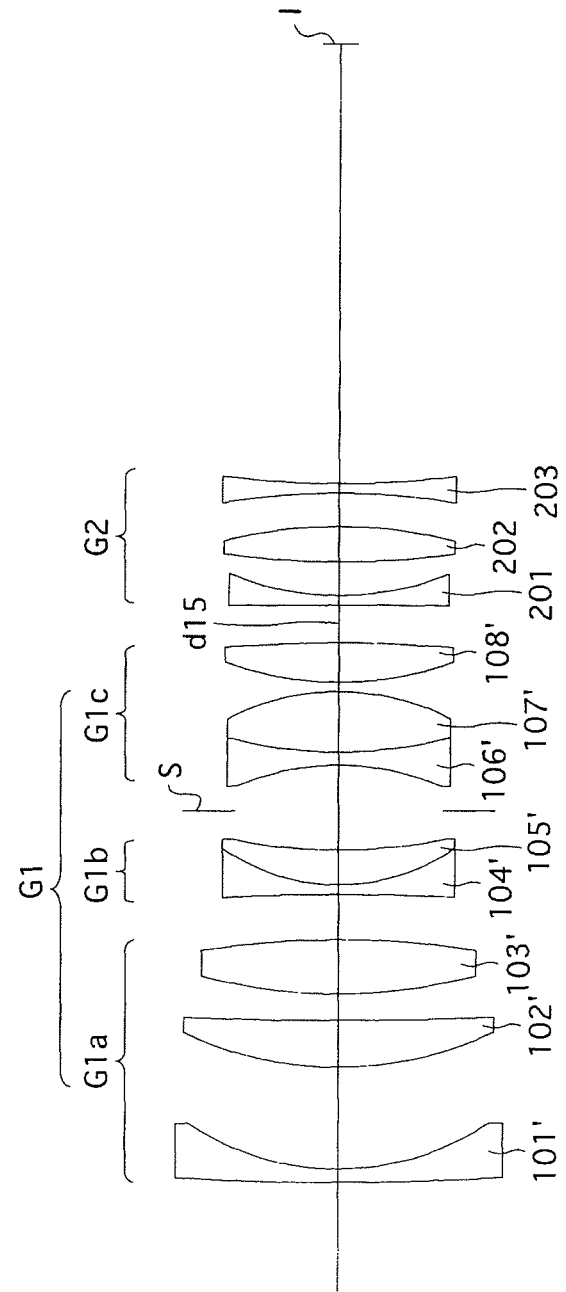
Figure 179:
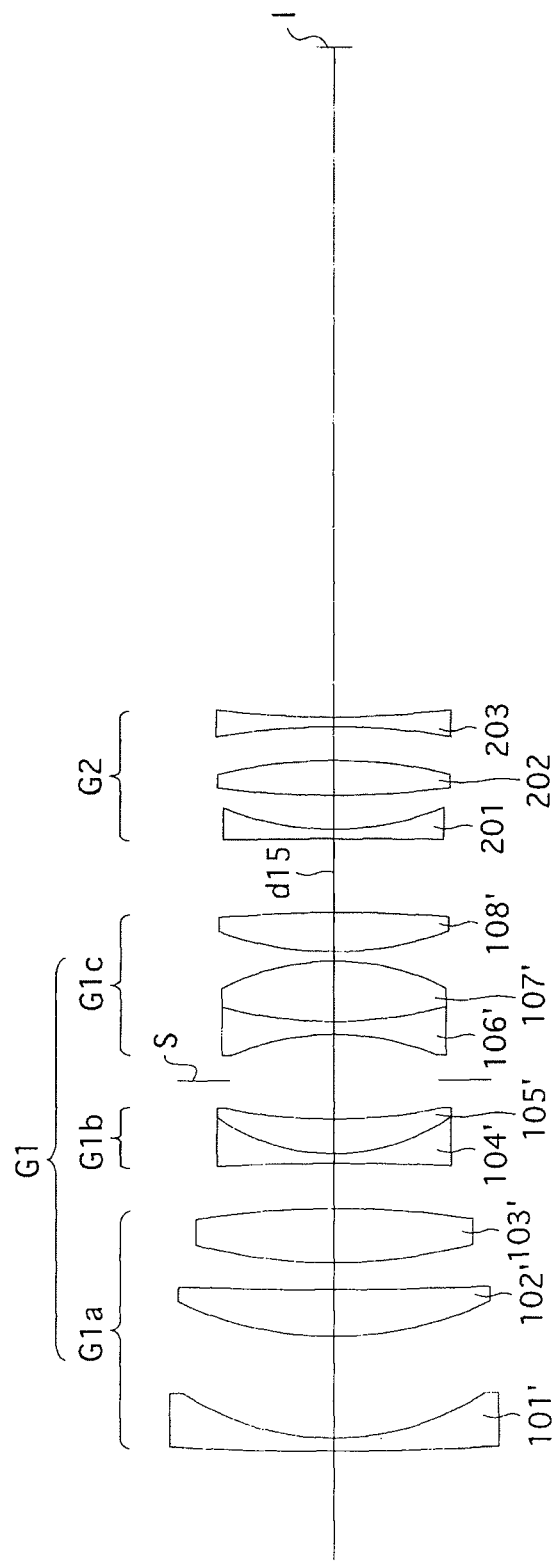
Figures 180A, 180B, 180C, 180D:
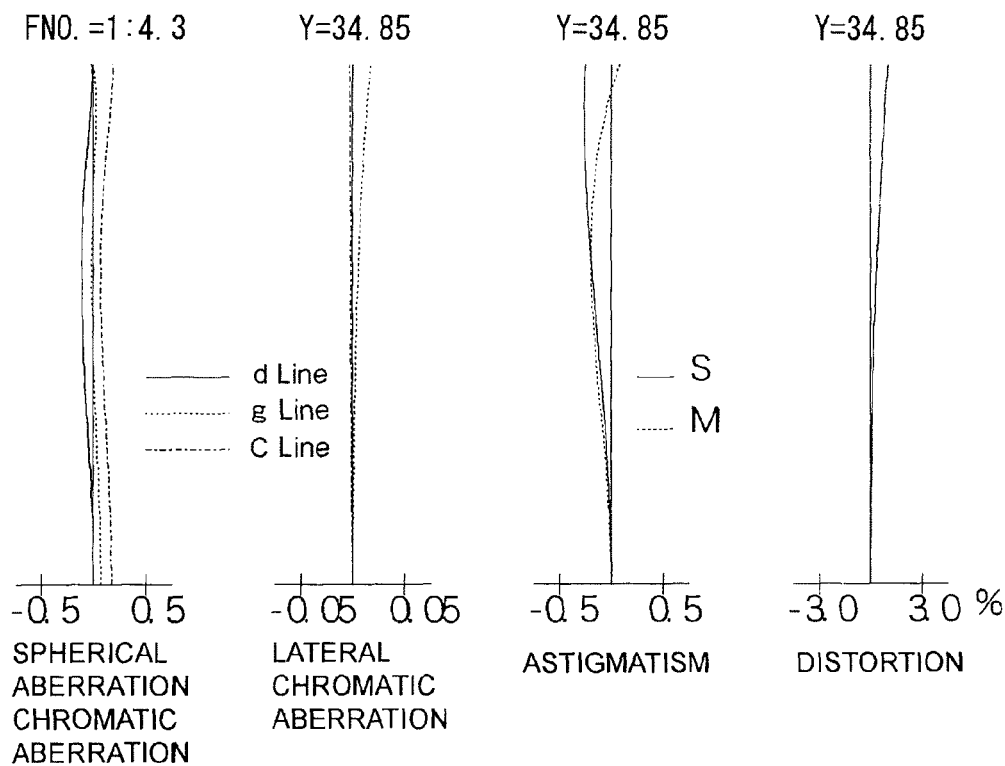
Figure 181A:
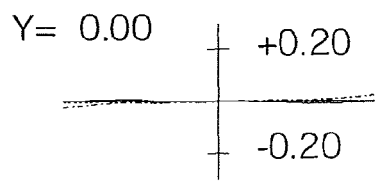
Figure 181B:
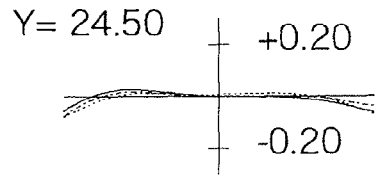
Figure 181C:
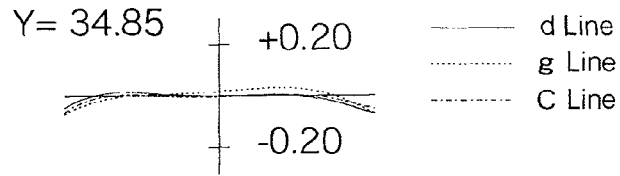
Figure 182:
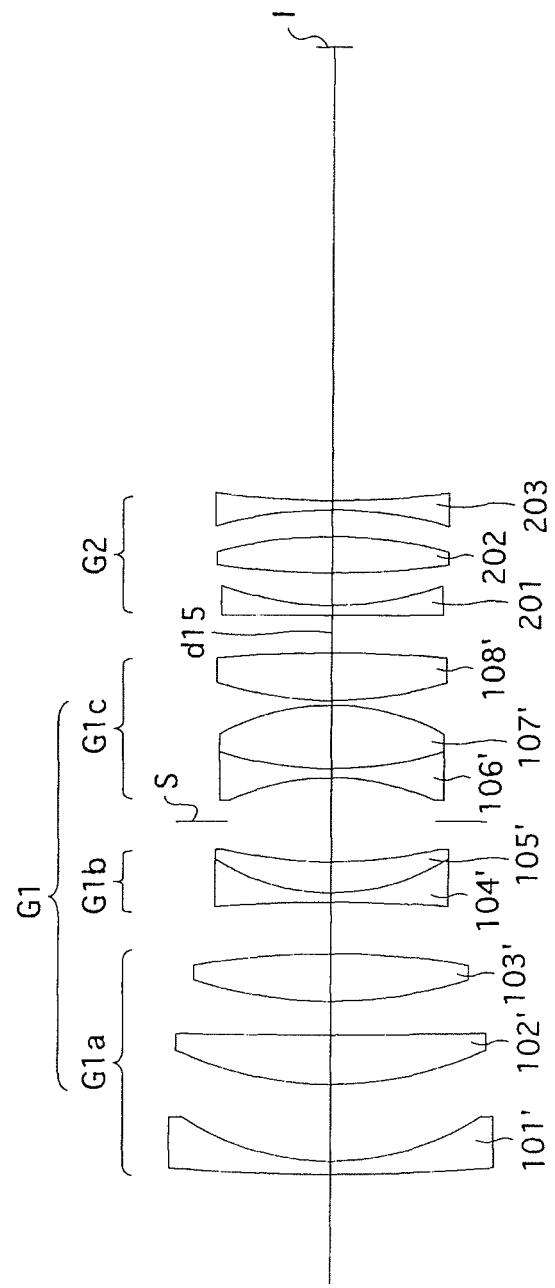
Figure 185:
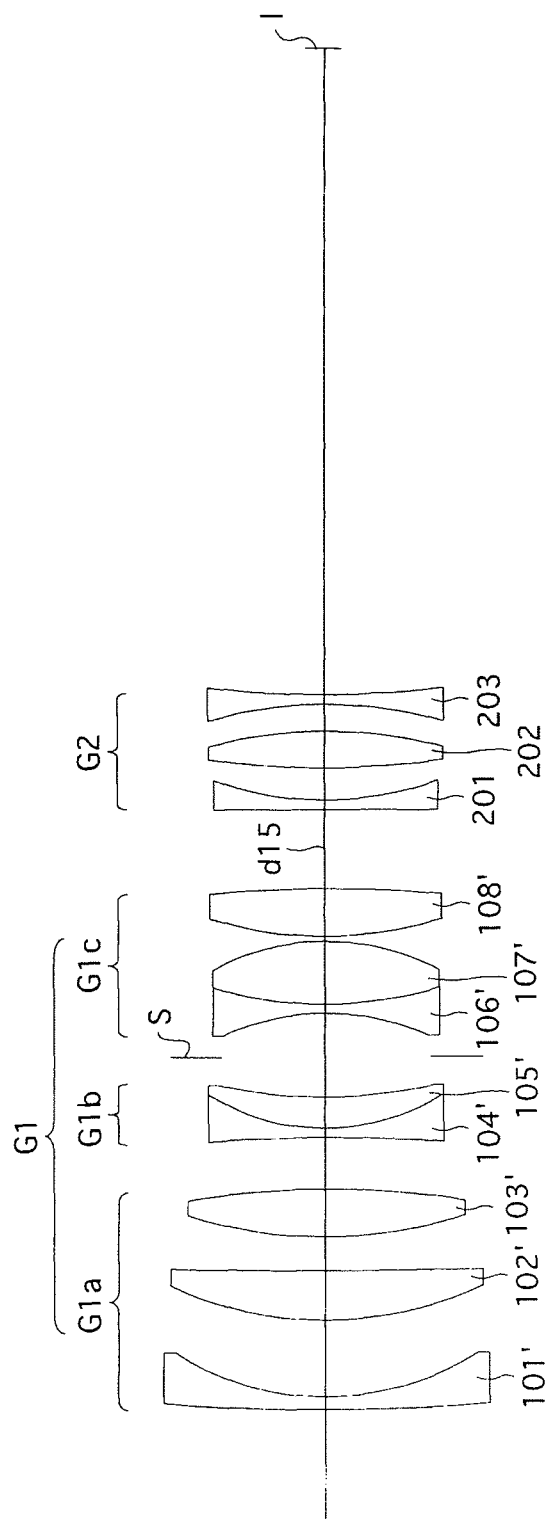
Figures 186A, 186B, 186C, 186D:
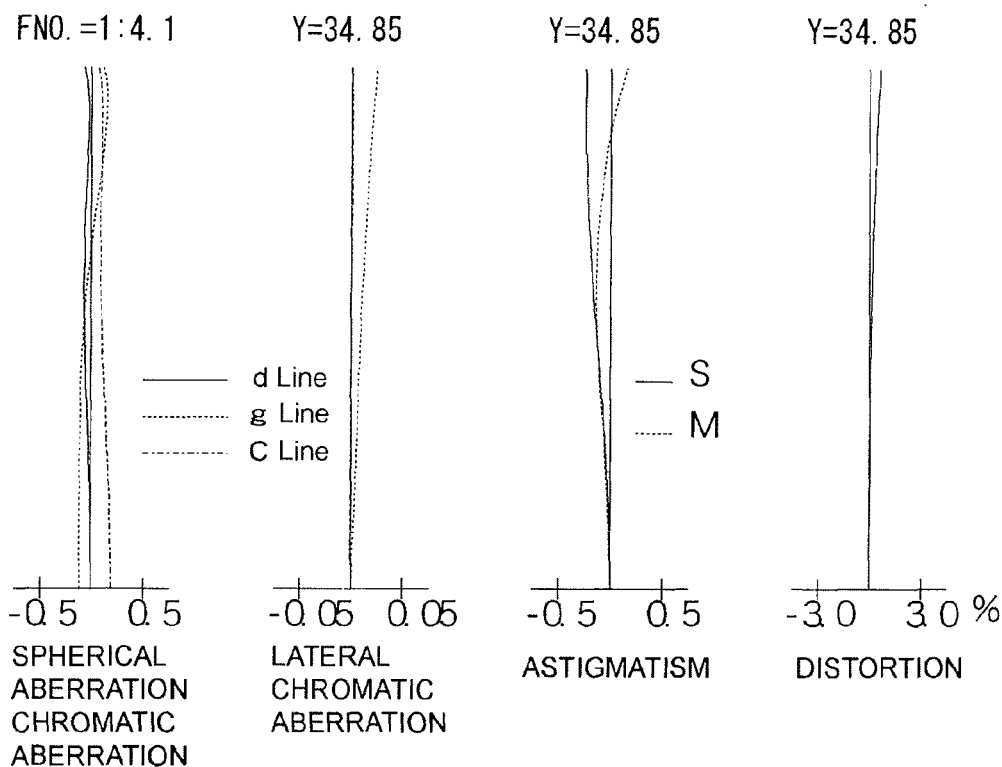
Figure 187A:
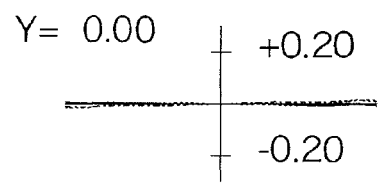
Figure 187B:
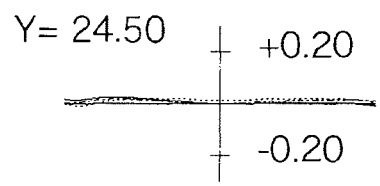
Figure 187C:
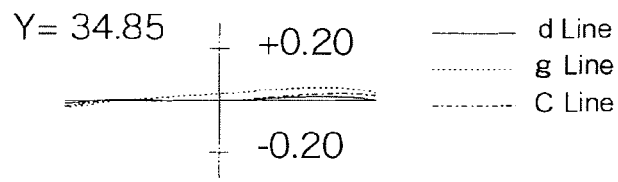
Figure 188:
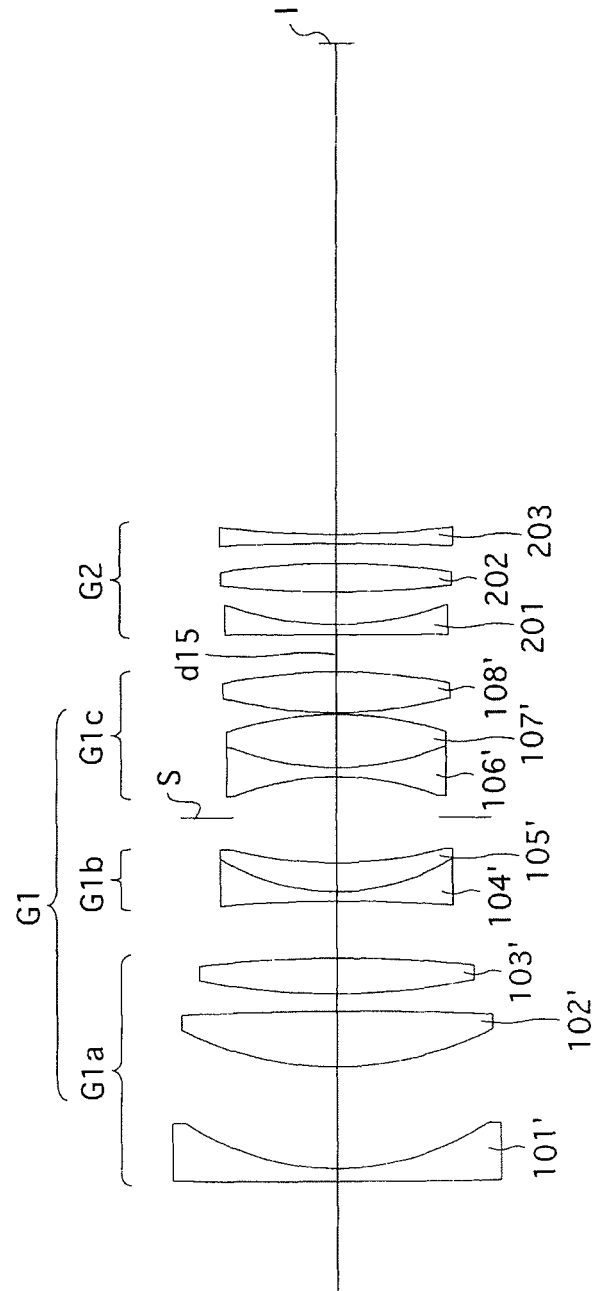
Figure 194:
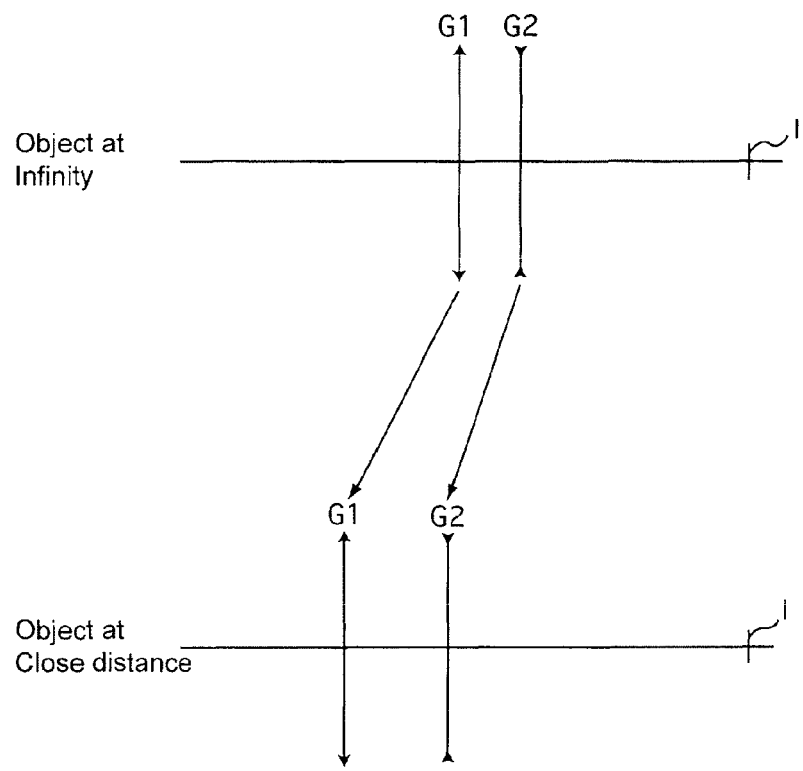
Figure 195:
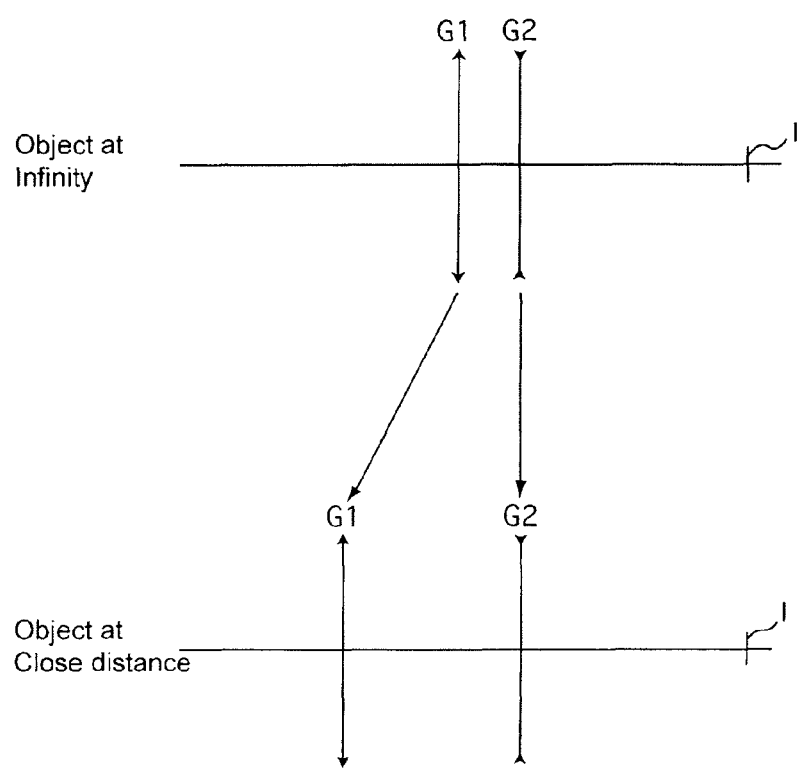

FIG. 131 shows a lens arrangement of the 18$^{th}$ numerical embodiment of a close-distance correcting lens system, according to the present invention, when focused on an object at a close distance;

FIGS. 132A, 132B, 132C and 132D show various aberrations that occurred in the lens arrangement shown in FIG. 131;

FIGS. 133A, 133B and 133C show lateral aberrations that occurred in the lens arrangement shown in FIG. 131;

FIG. 134 shows a 19$^{th}$ numerical embodiment of a close-distance correcting lens system, according to the present invention, when focused on an object at infinity;

FIGS. 135A, 135B, 135C and 135D show various aberrations that occurred in the lens arrangement shown in FIG. 134;

FIGS. 136A, 136B and 136C show lateral aberrations that occurred in the lens arrangement shown in FIG. 134;

FIG. 137 shows a lens arrangement of the 19$^{th}$ numerical embodiment of a close-distance correcting lens system, according to the present invention, when focused on an object at a close distance;

FIGS. 138A, 138B, 138C and 138D show various aberrations that occurred in the lens arrangement shown in FIG. 137;

FIGS. 139A, 139B and 139C show lateral aberrations that occurred in the lens arrangement shown in FIG. 137;

FIG. 140 shows a 20$^{th}$ numerical embodiment of a close-distance correcting lens system, according to the present invention, when focused on an object at infinity;

FIGS. 141A, 141B, 141C and 141D show various aberrations that occurred in the lens arrangement shown in FIG. 140;

FIGS. 142A, 142B and 142C show lateral aberrations that occurred in the lens arrangement shown in FIG. 140;

FIG. 143 shows a lens arrangement of the 20$^{th}$ numerical embodiment of a close-distance correcting lens system, according to the present invention, when focused on an object at a close distance;

FIGS. 144A, 144B, 144C and 144D show various aberrations that occurred in the lens arrangement shown in FIG. 143;

FIGS. 145A, 145B and 145C show lateral aberrations that occurred in the lens arrangement shown in FIG. 143;

FIG. 146 shows a 21$^{st}$ numerical embodiment of a close-distance correcting lens system, according to the present invention, when focused on an object at infinity;

FIGS. 147A, 147B, 147C and 147D show various aberrations that occurred in the lens arrangement shown in FIG. 146;

FIGS. 148A, 148B and 148C show lateral aberrations that occurred in the lens arrangement shown in FIG. 146;

FIG. 149 shows a lens arrangement of the 21$^{st}$ numerical embodiment of a close-distance correcting lens system, according to the present invention, when focused on an object at a close distance;

FIGS. 150A, 150B, 150C and 150D show various aberrations that occurred in the lens arrangement shown in FIG. 149;

FIGS. 151A, 151B and 151C show lateral aberrations that occurred in the lens arrangement shown in FIG. 149;

FIG. 152 shows a 22$^{nd}$ numerical embodiment of a close-distance correcting lens system, according to the present invention, when focused on an object at infinity;

FIGS. 153A, 153B, 153C and 153D show various aberrations that occurred in the lens arrangement shown in FIG. 152;

FIGS. 154A, 154B and 154C show lateral aberrations that occurred in the lens arrangement shown in FIG. 152;

FIG. 155 shows a lens arrangement of the 22$^{nd}$ numerical embodiment of a close-distance correcting lens system, according to the present invention, when focused on an object at a close distance;

FIGS. 156A, 156B, 156C and 156D show various aberrations that occurred in the lens arrangement shown in FIG. 155;

FIGS. 157A, 157B and 157C show lateral aberrations that occurred in the lens arrangement shown in FIG. 155;

FIG. 158 shows a 23$^{rd}$ numerical embodiment of a close-distance correcting lens system, according to the present invention, when focused on an object at infinity;

FIGS. 159A, 159B, 159C and 159D show various aberrations that occurred in the lens arrangement shown in FIG. 158;

FIGS. 160A, 160B and 160C show lateral aberrations that occurred in the lens arrangement shown in FIG. 158;

FIG. 161 shows a lens arrangement of the 23$^{rd}$ numerical embodiment of a close-distance correcting lens system, according to the present invention, when focused on an object at a close distance;

FIGS. 162A, 162B, 162C and 162D show various aberrations that occurred in the lens arrangement shown in FIG. 161;

FIGS. 163A, 163B and 163C show lateral aberrations that occurred in the lens arrangement shown in FIG. 161;

FIG. 164 shows a 24$^{th}$ numerical embodiment of a close-distance correcting lens system, according to the present invention, when focused on an object at infinity;

FIGS. 165A, 165B, 165C and 165D show various aberrations that occurred in the lens arrangement shown in FIG. 164;

FIGS. 166A, 166B and 166C show lateral aberrations that occurred in the lens arrangement shown in FIG. 164;

FIG. 167 shows a lens arrangement of the 24$^{th}$ numerical embodiment of a close-distance correcting lens system, according to the present invention, when focused on an object at a close distance;

FIGS. 168A, 168B, 168C and 168D show various aberrations that occurred in the lens arrangement shown in FIG. 167;

FIGS. 169A, 169B and 169C show lateral aberrations that occurred in the lens arrangement shown in FIG. 167;

FIG. 170 shows a 25$^{th}$ numerical embodiment of a close-distance correcting lens system, according to the present invention, when focused on an object at infinity;

FIGS. 171A, 171B, 171C and 171D show various aberrations that occurred in the lens arrangement shown in FIG. 170;

FIGS. 172A, 172B and 172C show lateral aberrations that occurred in the lens arrangement shown in FIG. 170;

FIG. 173 shows a lens arrangement of the 25$^{th}$ numerical embodiment of a close-distance correcting lens system, according to the present invention, when focused on an object at a close distance;

FIGS. 174A, 174B, 174C and 174D show various aberrations that occurred in the lens arrangement shown in FIG. 173;

FIGS. 175A, 175B and 175C show lateral aberrations that occurred in the lens arrangement shown in FIG. 173;

FIG. 176 shows a 26$^{th}$ numerical embodiment of a close-distance correcting lens system, according to the present invention, when focused on an object at infinity;

FIGS. 177A, 177B, 177C and 177D show various aberrations that occurred in the lens arrangement shown in FIG. 176;

FIGS. 178A, 178B and 178C show lateral aberrations that occurred in the lens arrangement shown in FIG. 176;

FIG. 179 shows a lens arrangement of the 26$^{th}$ numerical embodiment of a close-distance correcting lens system, according to the present invention, when focused on an object at a close distance;

FIGS. 180A, 180B, 180C and 180D show various aberrations that occurred in the lens arrangement shown in FIG. 179;

FIGS. 181A, 181B and 181C show lateral aberrations that occurred in the lens arrangement shown in FIG. 179;

FIG. 182 shows a 27$^{th}$ numerical embodiment of a close-distance correcting lens system, according to the present invention, when focused on an object at infinity;

FIGS. 183A, 183B, 183C and 183D show various aberrations that occurred in the lens arrangement shown in FIG. 182;

FIGS. 184A, 184B and 184C show lateral aberrations that occurred in the lens arrangement shown in FIG. 182;

FIG. 185 shows a lens arrangement of the 27$^{th}$ numerical embodiment of a close-distance correcting lens system, according to the present invention, when focused on an object at a close distance;

FIGS. 186A, 186B, 186C and 186D show various aberrations that occurred in the lens arrangement shown in FIG. 185;

FIGS. 187A, 187B and 187C show lateral aberrations that occurred in the lens arrangement shown in FIG. 185;

FIG. 188 shows a 28$^{th}$ numerical embodiment of a close-distance correcting lens system, according to the present invention, when focused on an object at infinity;

FIGS. 189A, 189B, 189C and 189D show various aberrations that occurred in the lens arrangement shown in FIG. 188;

FIGS. 190A, 190B and 190C show lateral aberrations that occurred in the lens arrangement shown in FIG. 188;

FIG. 191 shows a lens arrangement of the 28$^{th}$ numerical embodiment of a close-distance correcting lens system, according to the present invention, when focused on an object at a close distance;

FIGS. 192A, 192B, 192C and 192D show various aberrations that occurred in the lens arrangement shown in FIG. 191;

FIGS. 193A, 193B and 193C show lateral aberrations that occurred in the lens arrangement shown in FIG. 191;

FIG. 194 shows a first focusing path of the 13$^{th}$ through 28$^{th}$ numerical embodiment of the present invention when focusing on an object at infinity to an object at a close distance;

FIG. 195 shows a second focusing path of the 13$^{th}$ through 28$^{th}$ numerical embodiment of the present invention when focusing on an object at infinity to an object at a close distance.

DESCRIPTION OF THE EMBODIMENTS

A lens arrangement of a close-distance correcting lens system of the present invention is explained according to the 1$^{st}$ through 12$^{th}$ numerical embodiments.

Figure 97:
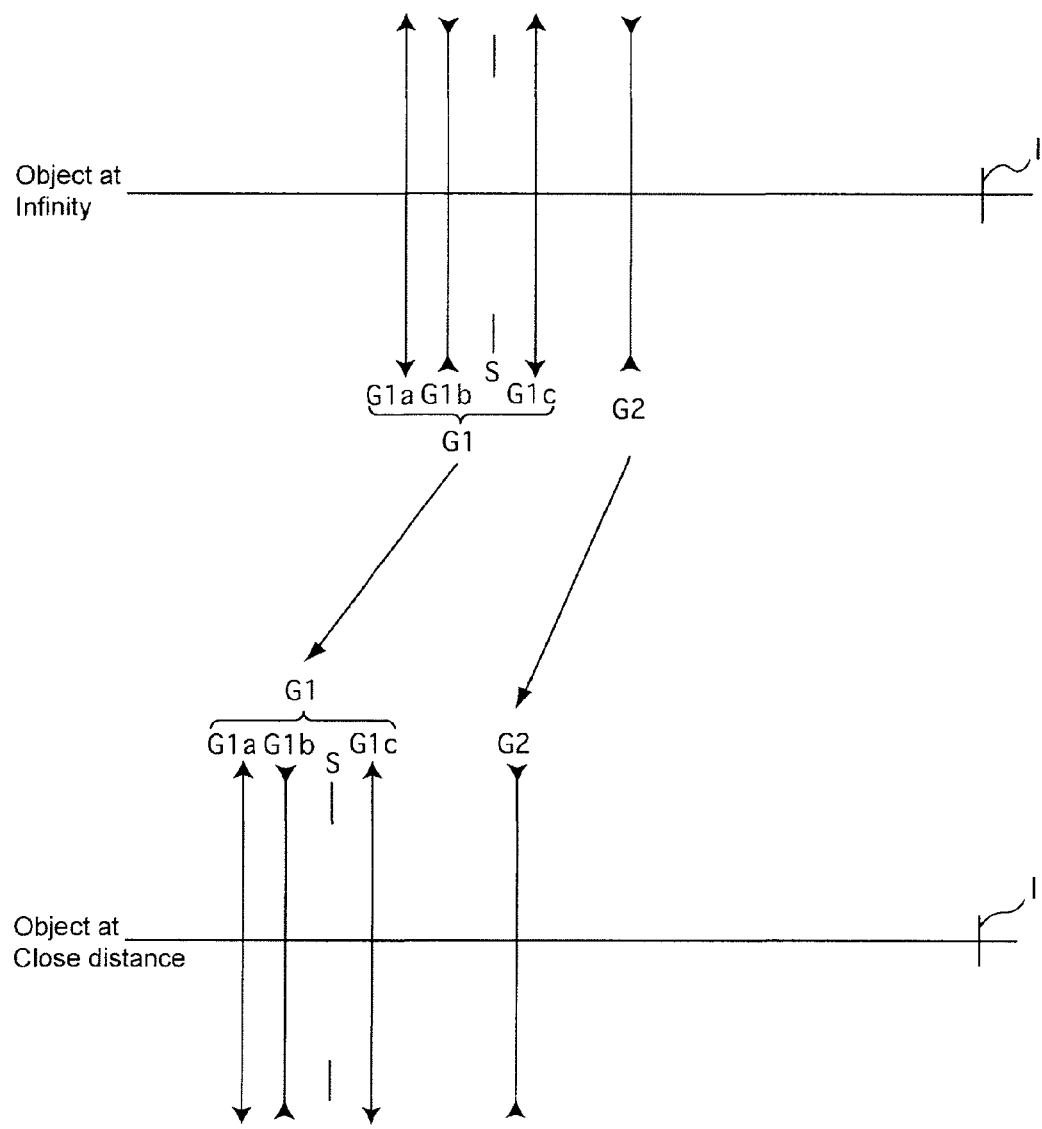
FIG. 97 shows a focusing paths of the 1$^{st}$ to 12$^{th}$ numerical embodiment of the present invention above when focusing an object at infinity to an object at a close distance.

The close-distance correcting lens system of the illustrated embodiments, as shown in the moving paths of FIG. 97, is configured of a positive first lens group G1 and a negative second lens group G2, in that order from the object side. The first lens group G1 is configured of a positive first sub lens group G1a, a negative second sub lens group G1b, a diaphragm 1 and a positive third sub lens group G1c, in that order from the object side. 'I' designates the imaging plane.

In the close-distance correcting lens system of the illustrated embodiments, as shown in the moving path of FIG. 97, the first lens group G1 and the second lens group G2 move toward the object by different traveling distances (the advancing amount) when carrying out a focusing operation on an object at infinity to an object at a close distance. The traveling distance of the first lens group G1(the advancing amount) is longer than that of the second lens group G2 (the advancing amount).

In the 1$^{st}$ through 12$^{th}$ numerical embodiments, the first sub lens group G1a is configured of three lens elements, namely, a negative lens element 11, a positive lens element 12 and a positive lens element 13. The negative lens element 11 and the positive lens element 13 are formed as a spherical lens element, respectively. The positive lens element 12 is formed as a spherical lens element in the 1$^{st}$ through 4$^{th}$ and 6$^{th}$ through 12$^{th}$ numerical embodiments, and the position lens element 12 has an aspherical surface on the object-side thereof in the 5$^{th}$ numerical embodiment.

In the 1$^{st}$ through 6$^{th}$ numerical embodiments, the second sub lens group G1b is configured of a cemented lens including a negative lens element 14 (a negative lens element having a concave surface facing toward the image) and a positive lens element 15 (a positive lens having a concave surface facing toward the image), in that order from the object side.

In the 7$^{th}$ through 12$^{th}$ numerical embodiments, the second sub lens group G1b is configured of a single negative lens element 14' (a single negative lens having a concave surface facing toward the image). In the 7$^{th}$ through 9$^{th}$, 11$^{th}$ and 12$^{th}$ numerical embodiments, the single negative lens element 14' is formed as a spherical lens element having spherical surface on each side, and the single negative lens element 14' has an aspherical surface on the object-side thereof in the 10$^{th}$ numerical embodiment.

In the 1$^{st}$ through 12$^{th}$ numerical embodiments, the second sub lens group G1b is an image stabilizing (an anti-shaking/image-blur correcting) lens group which is arranged to move in a direction orthogonal to the optical axis of the close-distance correcting lens system to change an imaging position of the object thereby correcting an blurred image (thereby stabilizing the object image).

In the 1$^{st}$ through 12$^{th}$ numerical embodiments, the third sub lens group G1c is configured of a cemented lens including a negative lens element 16 and a positive lens element 17, in that order from the object side, and a positive lens element 18, in that order from the object side. The positive lens element 18 has an aspherical surface formed on the image-side thereof.

In the 1$^{st}$ through 12$^{th}$ numerical embodiments, the second lens group G2 is configured of three lens elements, i.e., a negative lens element 21, a positive lens element 22 and a negative lens element 23, in that order from the object side.

The close-distance correcting lens system including an image stabilizing (anti-shaking) function has been required to suitably set the displacement of an image point with respect the amount of decentering of the image stabilizing (an anti-shaking) lens group (decentering sensitivity), and to suitably maintain optical performance by reducing aberration fluctuations both when the image stabilizing (an anti-shaking) lens group is being decentered and when the lens group is not being decentered. Furthermore, it is important to select an appropriate glass material for the image stabilizing (an anti-shaking) lens group, and to suitably distribute refractive power thereover. In order to correct aberrations from an object at infinity to an object at a close distance, a focusing lens group has been required to be provided with an appropriate refractive power and with an appropriate distance to travel for focusing.

In the illustrated embodiments, the close-distance correcting lens system is configured of a positive first lens group G1 and a negative second lens group G2, in that order from the object side, and a floating focusing system is employed, in which the traveling distances of the first lens group G1 and that of the second lens group G2 are different from each other when carrying out a focusing operation on an object at infinity to an object at a close distance. Due to such an arrangement, the close-distance correcting lens system can be simplified and miniaturized, and can attain suitable optical performance by reducing aberration fluctuations of field curvature, etc., when an object at a closer distance is photographed.

Furthermore, in the illustrated embodiments, the first lens group G1 is configured of the positive first sub lens group G1a, the negative second sub lens group G1b, the diaphragm S and the positive third sub lens group G1c, in that order from the object side. The second sub lens group G1b located in front of the diaphragm S is arranged to function as an image stabilizing (anti-shake) lens group which moves in a direction orthogonal to the optical axis of the lens system to change an imaging position of an object thereby correcting a blurred image. Accordingly, since an abaxial bundle of rays passes near the optical axis at the second sub lens group G1b, aberration fluctuations (in particular, fluctuations of abaxial aberrations such as field curvature and lateral chromatic aberration, etc.) that occurred when the image-stabilizing lens group is being decentered can be favorably corrected, so that superior optical performance can be achieved.

As described above, in the $1^{st}$ through $6^{th}$ numerical embodiments, since the second sub lens group G1b is configured of a cemented lens including a negative lens element 14 (a negative lens having a concave surface facing toward the image) and a positive lens element 15 (a positive lens element having a concave surface facing toward the image), in that order from the object side, aberration fluctuations (in particular, fluctuations of abaxial aberrations such as field curvature and lateral chromatic aberration, etc.) that occurred when the image-stabilizing lens group is being decentered can be reduced to the minimum.

In the case where the second sub lens group G1b is configured of two lens elements (a positive lens element and a negative lens element), the order of the two lens elements in the optical axis direction can be changed. However, in order to make a gradually-converging bundle of light rays from the first sub lens group G1a incident on the second sub lens group G1b, the effective diameter of the second sub lens group G1b tends to be larger on the object side than the image side thereof.

Accordingly, when the second sub lens group G1b is configured of a positive lens element and a negative lens element, in that order from the object side, the diameter of the positive lens element becomes larger, and the volume of the second sub lens group G1b also becomes larger. Therefore, the load on a mechanism for performing an anti-shake movement of the second sub lens group G1b increases.

Hence, in the illustrated embodiments, the second sub lens group G1b is configured of a cemented lens including a negative lens element 14 and a positive lens element 15, in that order from the object side. Due to this arrangement, even if the diameter of the negative lens element 14 becomes larger, an increase in the volume thereof is not as large as an increase in the volume of the positive lens element 15. As a result, the weight of the second sub lens group G1b can be reduced, the load on a mechanism for performing an anti-shake movement of the second sub lens group G1b can also be reduced. Furthermore, when the object-side surface of the second sub lens group G1b (i.e., the object-side surface of the negative lens element 14) is formed as a concave surface facing toward the object, spherical aberration and coma can be favorably corrected. In addition, when the cemented surface is arranged to be a convex surface facing toward the object (i.e., the concave surface of the negative lens element 14 facing toward the image and the convex surface of the positive lens element 15 facing toward the object), the occurrence of spherical aberration can be reduced.

Condition (1) specifies the Abbe number with respect to the d-line of the negative lens element 14, when the second sub lens group G1b is configured of the cemented lens including the negative lens element 14 (a negative lens element having a concave surface facing toward the image) and the positive lens element 15 (a positive lens element having a concave surface facing toward the image), in that order from the object side. By satisfying condition (1), fluctuation of lateral chromatic aberration due to the decentering of the second sub lens group G1b for an image-stabilizing (image-blur correcting) operation can be reduced.

If the lower limit of condition (1) is exceeded, the lateral chromatic aberration due to the decentering of the second sub lens group G1b is undercorrected.

Condition (2) specifies the difference of the Abbe number with respect to the d-line of the negative lens element 14 and that of the positive lens element 15, when the second sub lens group G1b is configured of the cemented lens including the negative lens element 14 (a negative lens element having a concave surface facing toward the image) and the positive lens element 15 (a positive lens element having a concave surface facing toward the image), in that order from the object side. By satisfying condition (2), fluctuation of lateral chromatic aberration due to the decentering of the second sub lens group G1b can be reduced.

The second sub lens group G1b is arranged to have an overall negative refractive power. Therefore, if an attempt is made to correct chromatic aberration in the second sub lens group G1b, it is necessary to make the negative lens element 14 of a glass material whose dispersion ratio is lower than a glass material of the positive lens element 15 so that an appropriate difference of the Abbe numbers to the extent of satisfying condition (2) is attained.

If the upper limit of condition (2) is exceeded, lateral chromatic aberration due to the decentering of the second sub lens group G1b is overcorrected.

If the lower limit of condition (2) is exceeded, the lateral chromatic aberration due to the decentering of the second sub lens group G1b is undercorrected.

Conditions (3) and (4) specify a refractive index of the d-line which the negative lens element 14 and the positive lens element 15 respectively satisfy. By satisfy conditions (3) and (4), the Petzval sum becomes suitable, so that field curvature can be satisfactorily corrected not only when the second sub lens group G1b is being decentered, but also when the lens group is not in the decentering state.

If the upper limit of condition (3) is exceeded, or if the lower limit of condition (4) is exceeded, it becomes difficult to correct field curvature respectively occurring in the negative lens element 14 and the positive lens element 15.

As discussed above, in the $7^{th}$ through $12^{th}$ numerical embodiments, the second sub lens group G1b is configured of a single negative lens element 14' (a single negative lens having a concave surface facing toward the image). Due to this arrangement, the volume and weight of the second sub lens group G1b as an image stabilizing (the anti-shaking) lens group can be reduced, so that the load on a mechanism for performing an anti-shake movement of the second sub lens group G1b can also be reduced. Furthermore, since the image-side surface of the second sub lens group G1b (i.e., the image-side surface of single negative lens element 14') is formed as a concave surface facing toward the image, the occurrence of spherical aberration can be reduced. In addition, if the object-side surface of the second sub lens group G1b (i.e., the object-side surface of single negative lens element 14') is formed as a concave surface facing toward the object, coma can be favorably corrected.

Condition (5) specifies the Abbe number with respect to the d-line of the single negative lens element 14'. By forming the single negative lens element 14' as an image stabilizing (the anti-shaking) lens element of a low dispersion glass material satisfying condition (5), fluctuation of lateral chromatic aberration due to the decentering of the second sub lens group G1b (the single negative lens element 14') can be reduced.

In a Gaussian type lens system such as described in the illustrated embodiments, no consideration is given for correcting lateral chromatic aberration by a negative lens element only, which is positioned just before the diaphragm; conventionally, it is known that a negative lens element immediately before the diaphragm is made of a glass material of a smaller Abbe number (high-dispersion). In the illustrated embodiments, the above-mentioned conventional technical practice has been reconsidered. As a result, the single negative lens element 14' is made of a glass material of a larger Abbe number (low dispersion) satisfying condition (5), and is provided immediately before the diaphragm S so that lateral chromatic aberration that occurs due to the decentering of the single negative lens element 14' for image-stabilizing (image-blur correcting) operation is corrected by the single negative lens element 14' only.

If the lower limit of condition (5) is exceeded, the correction of lateral chromatic aberration due to the decentering of the second sub lens group G1b (the single negative lens element 14') is undercorrected.

Condition (6) specifies the lateral magnification of the second sub lens group G1b when focused on an object at infinity.

Condition (7) specifies the lateral magnification of lens groups which are located closer to the image than the second sub lens group G1b (the third sub lens group G1c and the second lens group G2) when focused on an object at infinity.

Namely, conditions (6) and (7) specify the decentering sensitivity which is the displacement of an image point with respect the amount of decentering of the second sub lens group G1b, which is the image stabilizing lens group.

If the upper limit of condition (6) is exceeded, or if the lower limit of condition (7) is exceeded, the decentering sensitivity decreases, so that the amount of decentering (displacement) of the second sub lens group G1b, which is the image stabilizing lens group, becomes too large. Accordingly, the load on a mechanism for performing an anti-shake movement of the second sub lens group G1b increases. Moreover, a responding velocity toward an image blur becomes slower, so that the correcting of image blur cannot be favorably carried out.

If the lower limit of condition (6) is exceeded, or if the upper limit of condition (7) is exceeded, the refractive power of the second sub lens group G1b, which is the image stabilizing lens group, increases too much. As a result, the correcting of decentering coma, etc., when the second sub lens group G1b is being decentered for image-stabilizing (image-blur correcting) operation, becomes difficult.

Condition (8) specifies the ratio of the focal length of the second lens group G2 to that of the first lens group G1 as a focusing lens group. Note that the focal length of the first lens group G1 is a positive numerical value, and the focal length of the second lens group G2 is a negative numerical value. By satisfying condition (8), the traveling distance (the advancing amount) of the entire close-distance correcting lens system upon focusing is adequately determined, and the correcting of aberration, when an object at a closer distance is photographed, can be favorably carried out.

If the upper limit of condition (8) is exceeded, the coma and field curvature that occurs, when an object at a closer distance is photographed, is undercorrected.

If the lower limit of condition (8) is exceeded, the traveling distance (the advancing amount) of the first lens group G1 upon focusing increases, which is not practical. Moreover, due to decentration of the first lens group G1 and the second lens group G2 caused by inclination of these lens groups, image plane tilt easily occurs.

Condition (9) specifies the ratio of the traveling distance (the advancing amount) of the second lens group G2 to that of the first lens group G1 upon focusing on an object at infinity to an object at a close distance. By satisfying condition (9), the traveling distance (the advancing amount) of the entire close-distance correcting lens system upon focusing is adequately determined, and the correcting of aberration, when an object at a closer distance is photographed, can be favorably carried out.

If the upper limit of condition (9) is exceeded, the traveling distance (the advancing amount) of the second lens group G2 upon focusing increases with respect to that of the first lens group G1, which is not practically preferable. Moreover, due to decentration of the first lens group G1 and the second lens group G2 caused by inclination of these lens groups, image plane tilt easily occurs.

If the lower limit of condition (9) is exceeded, aberrations such as field curvature, etc., when an object at a closer distance is photographed, are undercorrected.

A lens arrangement of a close-distance correcting lens system of the present invention is explained according to the $13^{th}$ through $28^{th}$ numerical embodiments.

In the $13^{th}$ through $28^{th}$ numerical embodiments, the close-distance correcting lens system, as shown in the moving paths of FIG. 194 and FIG. 195, is configured of a positive first lens group G1 and a negative second lens group G2, in that order from the object side. 'I' designates the imaging plane.

In the close-distance correcting lens system of the present invention, according to the $13^{th}$ through $28^{th}$ numerical embodiments, when carrying out a focusing operation on an object at infinity to an object at a close distance, at least the first lens group G1 is arranged to move toward the object while the distance between the first lens group G1 and the second lens group G2 varies.

More specifically, in the $13^{th}$ through $21^{st}$ numerical embodiments and the $26^{th}$ through $28^{th}$ numerical embodiments, in the close-distance correcting lens system of the illustrated embodiments, as shown in the moving paths of FIG. 194, the first lens group G1 and the second lens group G2 move toward the object by different traveling distances (advancing amounts) when carrying out a focusing operation on an object at infinity to an object at a close distance. The traveling distance of the first lens group G1 is longer than that of the second lens group G2.

In the close-distance correcting lens system of the present invention, according to the $22^{nd}$ through $25^{th}$ numerical embodiments, as shown in the moving paths of FIG. 195, when carrying out a focusing operation on an object at infinity to an object at a close distance, the first lens group G1 moves (advances) toward the object, while the second lens group G2 does not move in the optical axis direction relative to the imaging plane I, i.e., the second lens group G2 does not move along the optical axis.

In the $13^{th}$ through $25^{th}$ numerical embodiments, the first lens group G1 is configured of a negative lens element 101 (a negative lens element having a concave surface facing toward the image), a positive lens element 102, a positive lens element 103, a negative lens element 104, a diaphragm S, a cemented lens including a negative lens element 105 and a positive lens element 106, and a positive lens element 107, in that order from the object side. The image-side surface of the positive lens element 107 is an aspherical surface.

In the $26^{th}$ through $28^{th}$ numerical embodiments, the first lens group G1 is configured of a positive first sub lens group G1$a$, a negative second sub lens group G1$b$, a diaphragm S and a positive third sub lens group G1$c$, in that order from the object side.

The first sub lens group G1$a$ is configured of a negative lens element 101', a positive lens element 102' and a positive lens element 103', in that order from the object side. The positive lens element 102' is formed as a spherical lens element in the $26^{th}$ and $27^{th}$ numerical embodiments, and is formed aspherical on the object-side surface thereof in the $28^{th}$ numerical embodiment.

The second sub lens group G1$b$ is configured of a cemented lens including a negative lens element 104' (a negative lens element having a concave surface facing toward the image) and a positive lens element 105' (a positive lens having a concave surface facing toward the image), in that order from the object side.

The third sub lens group G1$c$ is configured of a cemented lens including a negative lens element 106' and a positive lens element 107', and a positive lens element 108', in that order from the object side. In the $26^{th}$ through $28^{th}$ numerical embodiments, the positive lens element 108' has an aspherical surface formed on the image-side thereof.

The second lens group G2 is configured of a negative lens element 201 (a negative lens element having a concave surface facing toward the image), a positive lens element 202 and a negative lens element 203 (a negative lens element having a concave surface facing toward the object), in that order from the object side.

In the $13^{th}$ through $21^{st}$ numerical embodiments and the $26^{th}$ through $28^{th}$ numerical embodiments, the close-distance correcting lens system employs a floating focusing system in which the traveling distance of the first lens group G1 and that of the second lens group G2 are different from each other when carrying out a focusing operation on an object at infinity to an object at a close distance. Due to such an arrangement, abaxial aberrations such as field curvature and distortion, etc., in particular, occurred when an object at a closer distance is photographed. Furthermore, the first lens group G1 is arranged to move toward the object, which can make the retracted length of the lens system shorter and the portability of the close-distance correcting lens system can be enhanced.

As described in the $22^{nd}$ through $25^{th}$ numerical embodiments, when carrying out a focusing operation on an object at infinity to an object at a close distance, the first lens group G1 moves (advances) toward the object, while the second lens group G2 is immovable with respect to the imaging plane I, i.e., the second lens group G2 does not move along the optical axis. Due to this arrangement, the focusing mechanism can be simplified, and decentering sensitivity of the second lens group G2 is reduced to a minimum, which can satisfactorily maintain practical optical performance of the lens system.

In the $13^{th}$ through $28^{th}$ numerical embodiments, the second lens group G2 is configured of three lens elements, i.e., a negative lens element 201 (a negative lens element having a concave surface facing toward the image), a positive lens element 202 and a negative lens element 203 (a negative lens element having a concave surface facing toward the object), in that order from the object side.

On the other hand, when the second lens group G2 is configured of two lens elements, i.e., the negative lens element 201 (a negative lens element having a concave surface facing toward the image) and the positive lens element 202, in that order from the object side, spherical aberration and coma can be favorably corrected.

By providing the negative lens element 201 at a position closest to the object side of the second lens group G2 (i.e., the closest position to the diaphragm S), adverse effects of abaxial aberrations such as filed curvature and distortion, etc., can be reduced to the minimum, and a longer backfocus can be secured.

If the rearmost lens element (the lens element closest to the image side) of the second lens group G2 were configured of a positive lens element, the diameter thereof would increase, which is not desirable for a SLR camera system in which the effective diameter of a lens element is limited by the size of the mount. Hence, in the illustrated embodiments, the rearmost lens element (the lens element closest to the image side) of the second lens group G2 is configured of a negative lens element 203 (a negative lens having a concave surface facing toward the object), thereby the diameter of the second lens group G2 is made smaller.

In the second lens group G2, by forming the concave surface on the image-side surface of the negative lens element 201 provided closest to the object side, and by the concave surface on the object-side surface of the negative lens element 203 provided closest to the image side, the shape of the negative lens element 201 and that of the negative lens element 203 are symmetrical with each other. Due to this arrangement, field curvature and distortion can be favorably corrected. Furthermore, by configuring the positive lens element 202, provided between the negative lens elements 201 and 230, as a biconvex lens element, corresponding to the image-side concave surface of the negative lens element 201 and the object-side concave surface of the negative lens element 203, the occurrence of spherical aberration and coma can be reduced.

In the close-distance correcting lens system of the present invention, according to the $26^{th}$ through $28^{th}$ numerical embodiments, the first lens group G1 is configured of the positive first sub lens group G1$a$, the negative second sub lens group G1$b$, the diaphragm S and the positive third sub lens group G1$c$, in that order from the object side. Due to this arrangement, since an abaxial bundle of rays passes near the optical axis at the second sub lens group G1$b$, aberration fluctuations (in particular, fluctuations of abaxial aberrations such as field curvature and lateral chromatic aberration, etc.) that occurred by decentration caused by an error at the production stage can be favorably corrected, so that superior optical performance can be achieved. Furthermore, the second sub lens group G1$b$ located in front of the diaphragm S can be configured as an image stabilizing lens group which is arranged to move in a direction orthogonal to the optical axis of the lens system to change an imaging position of an object thereby correcting a blurred image.

The second sub lens group G1$b$ is configured of a cemented lens including a negative lens element 104' (a negative lens having a concave surface facing toward the image) and a positive lens element 105' (a positive lens element having a concave surface facing toward the image), in that order from the object side. Due to this arrangement, aberration fluctuations (in particular, fluctuations of abaxial aberrations such as field curvature and lateral chromatic aberration, etc.) that occurred by decentration can be reduced to the minimum.

When the object-side surface of the second sub lens group G1$b$ (i.e., the object-side surface of the negative lens element 104') is formed as a concave surface facing toward the object, spherical aberration and coma can be favorably corrected. In addition, when the cemented surface is arranged to be a convex surface facing toward the object (i.e., the negative lens element 104' having a concave surface facing toward the image and the positive lens element 105' having a convex surface facing toward the object), the occurrence of spherical aberration can be reduced.

Condition (10) specifies the shaping factor of the negative lens element 201 (a negative lens element having a concave surface facing toward the image) provided closest to the object side within the second lens group G2. By satisfying condition (10), spherical aberration and field curvature can be favorably corrected.

If the upper limit of condition (10) is exceeded, spherical aberration and field curvature can be favorably corrected.

If the lower limit of condition (10) is exceeded, the spherical aberration and field curvature that occurs are overcorrected.

Condition (11) specifies the ratio of the radius of curvature of the object-side surface of the negative lens element 203 (a negative lens element having a concave surface facing toward the object) provided closest to the image side within the second lens group G2 to the focal length of the second lens group G2. By satisfying condition (11), the occurrence of coma, lateral chromatic aberration and astigmatism can be reduced, and appropriate optical performance can be attained.

If the upper limit of condition (11) is exceeded, the coma and lateral chromatic aberration that occurs are undercorrected.

If the lower limit of condition (11) is exceeded, large amounts of astigmatism and chromatic coma occur.

Condition (12) specifies the ratio of the focal length of the negative lens element 201 (a negative lens element having a concave surface facing toward the image) provided closest to the object side within the second lens group to the focal length of the second lens group G2. By satisfying condition (12), a longer backfocus can be secured, and astigmatism, spherical aberration and axial chromatic aberration can be favorably corrected.

If the upper limit of condition (12) is exceeded, the astigmatism that occurs is undercorrected, and securing a backfocus becomes difficult.

If the lower limit of condition (12) is exceeded, spherical aberration and axial chromatic aberration are undercorrected.

Condition (13) specifies the ratio of the focal length of the most image-side negative lens element 203 (a negative lens element having a concave surface facing toward the object) in the second lens group G2 to the focal length of the second lens group G2. By satisfying condition (13), lateral chromatic aberration, spherical aberration and axial chromatic aberration and field curvature can be favorably corrected.

If the upper limit of condition (13) is exceeded, lateral chromatic aberration is undercorrected; and axial chromatic aberration is overcorrected, when an object at a closer distance is photographed.

If the lower limit of condition (13) is exceeded, spherical aberration, field curvature and axial chromatic aberration and are undercorrected.

Condition (14) specifies the Abbe number, with respect to the d-line, of the negative lens element 203 (a negative lens element having a concave surface facing toward the object) that is provided closest to the image side within the second lens group G2. By employing a high-dispersion glass material satisfying condition (14) for the negative lens element 203, lateral chromatic aberration can be more effectively corrected.

If the upper limit of condition (14) is exceeded, the lateral chromatic aberration that occurs is undercorrected.

As described above, the first lens group G1 is configured of the negative lens element 101 which is provided closest to the object side and has a concave surface facing toward the image, which is a precondition for conditions (15) and (16). By providing the negative lens element 101 having the concave surface facing toward the image at a positioned closest to object side of the first lens group G1, secured large quantity of light can be collected and a wider angle-of-view can be attained without increasing the diameter of the first lens group G1. If the lens element that is provided closest to the object side within the first lens group G1 were configured of a negative lens element having a convex surface facing toward the image, a large amount of field curvature and distortion occurs, which is undesirable.

Condition (15) specifies the refractive index of the d-line of the negative lens element 101 having a concave surface facing toward the image and provided closest to object side of the first lens group G1. By satisfying condition (15), spherical aberration and coma can be favorably corrected.

If the lower limit of condition (15) is exceeded, it is difficult to reduce the occurrence of spherical aberration and coma.

Condition (16) specifies the Abbe number, with respect to the d-line, of the negative lens element 101 having the concave surface facing toward the image provided closest to the object side within the first lens group G1. By satisfying condition (16), lateral chromatic aberration can be favorably corrected.

If the lower limit of condition (16) is exceeded, the lateral chromatic aberration that occurs is undercorrected.

As explained, the first lens group G1 is configured of the four positive lens elements, i.e., the positive lens element 102, the positive lens element 103, the positive lens element 106 and the positive lens element 107, which is a precondition for conditions (17) and (18) to be explained.

Condition (17) specifies the refractive index of the d-line of at least any one of the positive lens elements 102, 103, 106 and 107 in the first lens group G1. By satisfying condition (17), spherical aberration and coma can be favorably corrected.

If the lower limit of condition (17) is exceeded, it is difficult to reduce the occurrence of spherical aberration and coma.

Condition (18) specifies the Abbe number, with respect to the d-line, of at least one of the positive lens elements 102, 103, 106 and 107 in the first lens group G1. By satisfying condition (18), lateral chromatic aberration can be favorably corrected.

If the upper limit of condition (18) is exceeded, lateral chromatic aberration is undercorrected.

In the illustrated embodiments, a positive lens element satisfying conditions (17) and (18) is the positive lens element 102, which is provided closest to the object side of the first lens group G1, so that lateral chromatic aberration can more be favorably corrected.

As described above, in the $13^{th}$ through $21^{st}$ numerical embodiments, the first lens group G1 and the second lens group G2 move toward the object by different traveling distances (advancing amounts) when carrying out a focusing operation on an object at infinity to an object at a close distance.

With the above arrangement, condition (19) specifies the ratio of the traveling distance of the second lens group G2 to that of the first lens group G1 when carrying out a focusing operation on an object at infinity to an object at a close distance. By satisfying condition (19), the traveling distance (the advancing amount) of the entire close-distance correcting lens system upon focusing is adequately determined, and the correcting of abaxial aberrations, such as field curvature and distortion, etc., can be favorably carried out when an object at a closer distance is photographed.

If the upper limit of condition (19) is exceeded, the traveling distance (the advancing amount) of the entire close-distance correcting lens system upon focusing becomes longer, which is practically undesirable. Moreover, due to decentration of the first lens group G1 and the second lens group G2 caused by inclination of these lens groups, imaging plane tilt easily occurs.

If the lower limit of condition (19) is exceeded, field curvature and distortion that occurs when an object at a closer distance is photographed are undercorrected.

Condition (20) specifies the Abbe number, with respect to the d-line, of the negative lens element 104' having the concave surface facing toward the image, when the second sub lens group G1$b$ is configured of the cemented lens including the negative lens element 104' (a negative lens having a concave surface facing toward the image) and the positive lens element 105' (a positive lens element having a concave surface facing toward the image), in that order from the object side, as described in the 26$^{th}$ through 28$^{th}$ numerical embodiments. By satisfying condition (20), fluctuation of lateral chromatic aberration that occurred by decentration of the second sub lens group G1$b$ can be reduced to a minimum.

If the lower limit of condition (20) is exceeded, lateral chromatic aberration that occurred by decentering the second sub lens group G1$b$ is undercorrected.

Condition (21) specifies the difference of the Abbe number, with respect to the d-line, of the negative lens element 104' (a negative lens element having a concave surface facing toward the image) and that of the positive lens element 105'(a positive lens element having a concave surface facing toward the image), when the second sub lens group G1$b$ is configured of the cemented lens including the negative lens element 104' and the positive lens element 105', in that order from the object side. By satisfying condition (21), fluctuation of lateral chromatic aberration that occurred by decentering the second sub lens group G1$b$ can be reduced to the minimum.

Conditions (22) and (23) specify a refractive index of the d-line which the negative lens element 104' (a negative lens element having a concave surface facing toward the image) and the positive lens element 105'(a positive lens element having a concave surface facing toward the image) respectively satisfy, when the second sub lens group G1$b$ is configured of the cemented lens including the negative lens element 104' and the positive lens element 105', in that order from the object side. By satisfy conditions (22) and (23), a desirable Petzval sum can be achieved, so that field curvature can be satisfactorily corrected not only when the second sub lens group G1$b$ is being decentered, but also when the lens group is not in the decentering state.

If the upper limit of condition (22) is exceeded, or if the lower limit of condition (23) is exceeded, the correction of field curvature respectively occurring in the negative lens element 104' and the positive lens element 105' becomes difficult.

Specific numerical embodiments will be herein discussed. In the aberration diagrams and the tables, the d-line, g-line and C-line show aberrations at their respective wave-lengths; S designates the sagittal image, M designates the meridional image, FNO. designates the F-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. LI designates a moving amount (decentering sensitivity) of the object image in a direction orthogonal to the optical axis with respect to a moving amount (LV) of 1 mm of the image-stabilizing lens group in a direction orthogonal to the optical axis. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance. from a tangent plane of the aspherical vertex, 'c' designates the curvature (1/r) of the aspherical vertex, 'y' designates the distance. from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

[Numerical Embodiment 1]

FIGS. 1 through 8C and Tables 1 through 4 show a first numerical embodiment of a close-distance correcting lens system according to the present invention. FIG. 1 shows a lens arrangement of the first numerical embodiment of the close-distance correcting lens system when focused on an image at infinity. FIGS. 2A, 2B, 2C and 2D show various aberrations that occurred in the lens arrangement shown in FIG. 1. FIGS. 3A, 3B and 3C show lateral aberrations that occurred in the lens arrangement shown in FIG. 1. FIG. 4 shows a lens arrangement of the first numerical embodiment of the close-distance correcting lens system when focused on an image at close-distance. FIGS. 5A, 5B, 5C and 5D show various aberrations that occurred in the lens arrangement shown in FIG. 4. FIGS. 6A, 6B and 6C show lateral aberrations that occurred in the lens arrangement shown in FIG. 4. FIGS. 7A, 7B and 7C show lateral aberrations that occurred when image-stabilizing operation is carried out when focused on an object at infinity. FIGS. 8A, 8B and 8C show lateral aberrations that occurred when image-stabilizing operation is carried out when focused on an object at a close distance. Table 1 shows the lens surface data, Table 2 shows various data, Table 3 shows aspherical data, and Table 4 shows image-stabilizing operation data.

The close-distance correcting lens system of the first embodiment is configured of a positive first lens group G1, and a negative second lens group G2, in that order from the object side.

The first lens group G1 is configured of a positive first sub lens group G1$a$, a negative second sub lens group G1$b$, a diaphragm S and a positive third sub lens group G1$c$, in that order from the object side.

The first sub lens group G1$a$ is configured of a negative meniscus lens element 11 having a convex surface on the object side, a positive meniscus lens element 12 having a convex surface on the object side and a positive biconvex lens element 13, in that order from the object side.

The second sub lens group G1$b$ is configured of a cemented lens configured of a biconcave lens element (a negative lens element having a concave surface on the image side) 14 and a positive meniscus lens element having a convex surface on the object side (a positive lens element having a concave surface on the image side) 15, in that order from the object side. The second sub lens group G1*b* includes image-stabilizing lens group which displaces in orthogonal direction to the optical axis thereby correcting the image-shake.

The third sub lens group G1*c* is configured of a cemented lens having a biconcave lens element 16 and a positive biconvex lens element 17, and biconvex lens element 18, in that order from the object side. The biconvex lens element 18 is provided with an aspherical surface on the image side thereof.

The second lens group G2 is configured of a negative meniscus lens element 21 having a convex surface on the object side, a biconvex lens element 22 and a biconcave lens element 23, in that order from the object side.

TABLE 1

SURFACE DATA

| SURFACE NO. | r | d | N(d) | νd |
|---|---|---|---|---|
| 1 | 257.359 | 2.000 | 1.72916 | 54.7 |
| 2 | 39.866 | 15.590 | | |
| 3 | 59.386 | 6.620 | 1.83400 | 37.3 |
| 4 | 469.064 | 4.670 | | |
| 5 | 73.257 | 11.520 | 1.48749 | 70.4 |
| 6 | −101.758 | 6.380 | | |
| 7 | −386.499 | 1.450 | 1.67270 | 32.2 |
| 8 | 34.721 | 4.580 | 1.84666 | 23.8 |
| 9 | 74.798 | 6.130 | | |
| 10 diaphragm | ∞ | 6.230 | | |
| 11 | −45.091 | 2.000 | 1.75211 | 25.0 |
| 12 | 53.483 | 9.200 | 1.49700 | 81.6 |
| 13 | −43.476 | 2.900 | | |
| 14 | 53.289 | 6.200 | 1.80450 | 39.6 |
| 15* | −139.359 | d15 | | |
| 16 | 917.770 | 1.500 | 1.63980 | 34.6 |
| 17 | 42.729 | 5.220 | | |
| 18 | 120.465 | 5.600 | 1.80518 | 25.5 |
| 19 | −70.785 | 4.170 | | |
| 20 | −78.286 | 1.450 | 1.72342 | 38.0 |
| 21 | 144.240 | — | | |

The asterisk (*) designates an aspherical surface which is rotationally symmetrical with respect to the optical axis.

TABLE 2

[VARIOUS DATA]

| | Infinite Photographic Position | Close-Distance(−0.75:1) Photographic Position |
|---|---|---|
| FNO. | 2.85 | 4.66 |
| f | 90.84 | |
| W | 20.8 | |
| Y | 34.85 | 34.85 |
| fB | 66.65 | 110.84 |
| L | 175.74 | 226.24 |
| d15 | 5.680 | 11.993 |

TABLE 3

[ASPHERICAL DATA]

| SURFACE NO. | K | A4 |
|---|---|---|
| 15 | 0.000 | 0.1690E−05 |

TABLE 4

[IMAGE-STABILIZING OPERATION DATA]

| | Infinite Photographic Position | Close-Distance(−0.75:1) Photographic Position |
|---|---|---|
| f | 90.84 | |
| LV | 1.00 | 1.00 |
| LI | −0.74 | −1.09 |

[Numerical Embodiment 2]

Figures 2A, 2B, 2C, 2D:
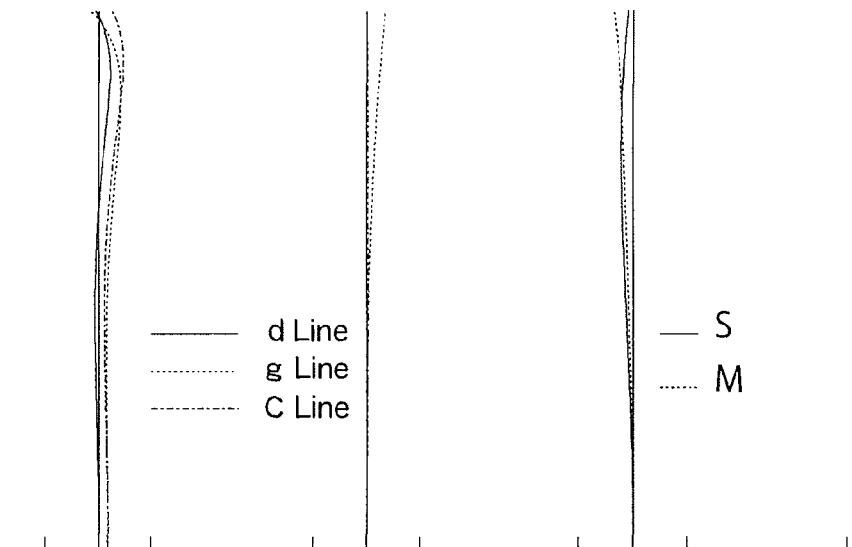
FIGS. 2A, 2B, 2C and 2D show various aberrations that occurred in the lens arrangement shown in FIG. 1.
Figure 3A:
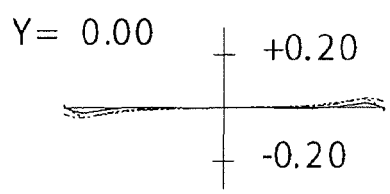
FIGS. 3A, 3B and 3C show lateral aberrations that occurred in the lens arrangement shown in FIG. 1.
Figure 3B:
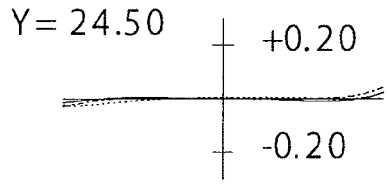
Figure 3C:
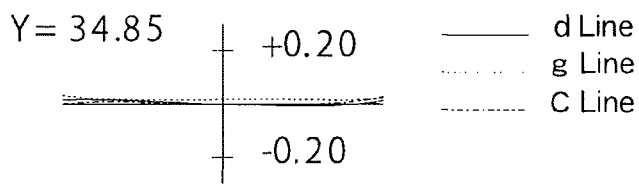
Figure 12:
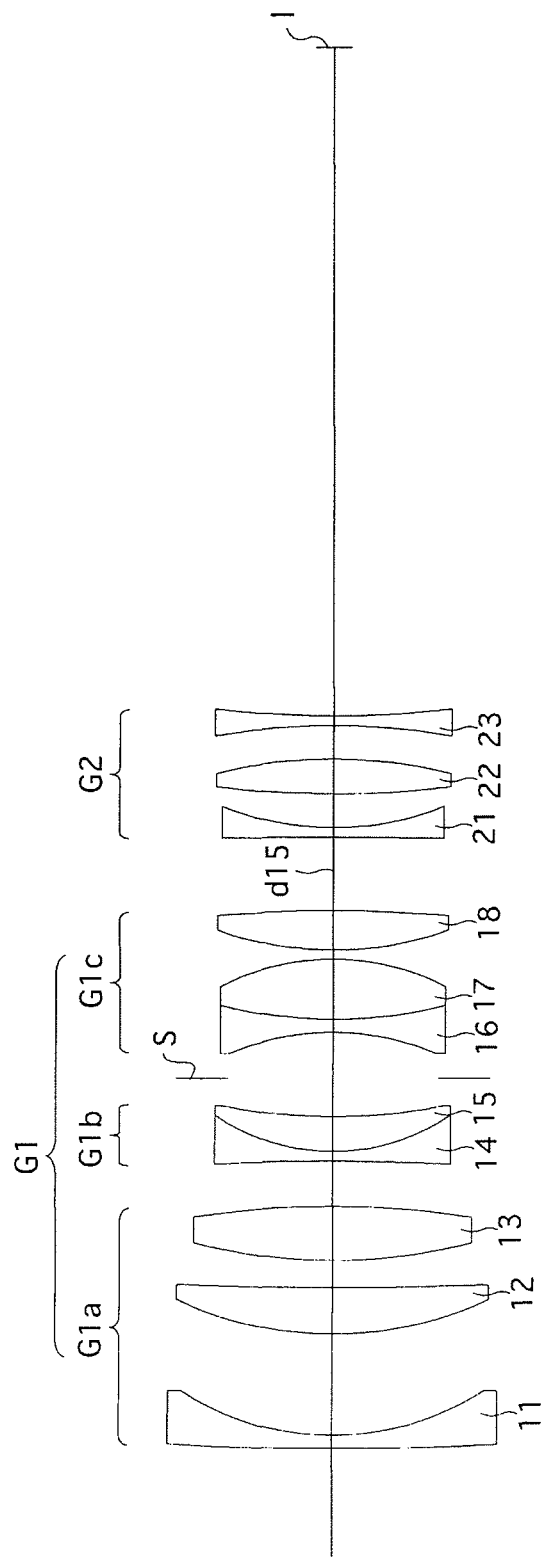
FIG. 12 shows a lens arrangement of the $2^{nd}$ numerical embodiment of a close-distance correcting lens system, according to the present invention, in a state where an image-stabilizing lens group is not decentered when focused on an object at a close distance.
Figure 15A:
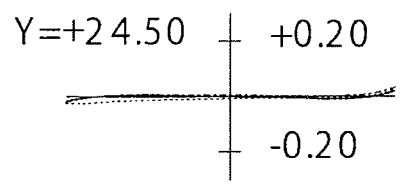
FIGS. 15A, 15B and 15C show lateral aberrations of the $2^{nd}$ numerical embodiment of a close-distance correcting lens system, according to the present invention, in a state where an image-stabilizing lens group is decentered when focused on an object at infinity.
Figure 15B:
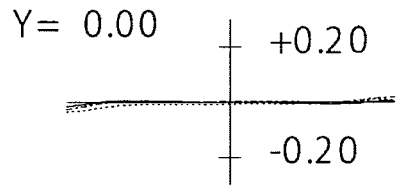
Figure 15C:
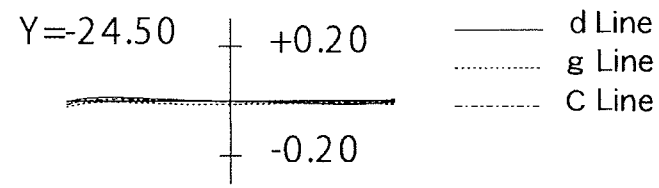
Figure 16A:
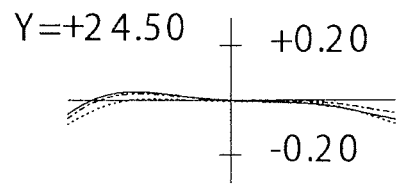
FIGS. 16A, 16B and 16C show lateral aberrations of the $2^{nd}$ numerical embodiment of a close-distance correcting lens system, according to the present invention, in a state where an image-stabilizing lens group is decentered when focused on an object at a close distance.
Figure 16B:
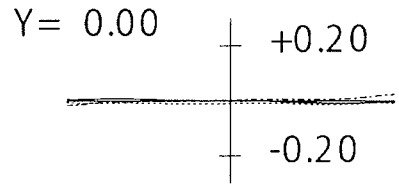
Figure 16C:
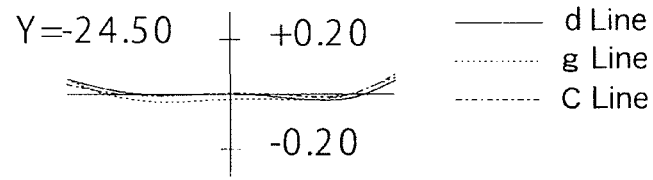

FIGS. 9 through 16C and Tables 5 through 8 show a second numerical embodiment of a close-distance correcting lens system according to the present invention. FIG. 9 shows a lens arrangement of the second numerical embodiment of the close-distance correcting lens system when focused on an image at infinity. FIGS. 10A, 10B, 10C and 10D show various aberrations that occurred in the lens arrangement shown in FIG. 9. FIGS. 11A, 11B and 11C show lateral aberrations that occurred in the lens arrangement shown in FIG. 9. FIG. 12 shows a lens arrangement of the second numerical embodiment of the close-distance correcting lens system when focused on an image at close-distance. FIGS. 13A, 13B, 13C and 13D show various aberrations that occurred in the lens arrangement shown in FIG. 12. FIGS. 14A, 14B and 14C show lateral aberrations that occurred in the lens arrangement shown in FIG. 12. FIGS. 15A, 15B and 15C show lateral aberrations that occurred when image-stabilizing operation is carried out when focused on an object at infinity. FIGS. 16A, 16B and 16C show lateral aberrations that occurred when image-stabilizing operation is carried out when focused on an object at a close distance. Table 5 shows the lens surface data, Table 6 shows various data, Table 7 shows aspherical data, and Table 8 shows image-stabilizing operation data.

The lens arrangement of the second numerical embodiment is the same as that of the first numerical embodiment except the following point (1).

(1) The negative lens element 21 of the second lens group G2 is configured of a negative biconcave lens element.

TABLE 5

SURFACE DATA

| SURFACE NO. | r | d | N(d) | νd |
|---|---|---|---|---|
| 1 | 473.951 | 2.000 | 1.69680 | 55.5 |
| 2 | 42.407 | 15.520 | | |
| 3 | 56.655 | 7.090 | 1.83400 | 37.3 |
| 4 | 617.022 | 4.080 | | |
| 5 | 81.434 | 8.290 | 1.49700 | 81.6 |
| 6 | −137.766 | 6.930 | | |
| 7 | −338.338 | 1.450 | 1.69895 | 30.0 |
| 8 | 31.510 | 5.320 | 1.80518 | 25.5 |
| 9 | 85.195 | 5.880 | | |
| 10 diaphragm | ∞ | 7.050 | | |
| 11 | −39.794 | 2.000 | 1.75520 | 27.5 |
| 12 | 67.154 | 9.200 | 1.49700 | 81.6 |
| 13 | −37.583 | 1.400 | | |
| 14 | 50.849 | 6.040 | 1.80101 | 40.9 |
| 15* | −174.666 | d15 | | |
| 16 | −4275.941 | 1.500 | 1.67270 | 32.2 |
| 17 | 44.710 | 5.160 | | |
| 18 | 137.335 | 5.350 | 1.80518 | 25.5 |
| 19 | −73.119 | 5.110 | | |
| 20 | −104.080 | 1.450 | 1.70154 | 41.2 |
| 21 | 145.257 | — | | |

The asterisk (*) designates an aspherical surface which is rotationally symmetrical with respect to the optical axis.

TABLE 6

[VARIOUS DATA]

|  | Infinite Photographic Position | Close-Distance(−0.60:1) Photographic Position |
|---|---|---|
| FNO. | 2.87 | 4.32 |
| f | 90.45 | |
| W | 21.0 | |
| Y | 34.85 | 34.85 |
| fB | 66.76 | 101.86 |
| L | 173.26 | 213.84 |
| d15 | 5.680 | 11.159 |

TABLE 7

[ASPHERICAL DATA]

| SURFACE NO. | K | A4 | A6 |
|---|---|---|---|
| 15 | 0.000 | 0.1916E−05 | −0.9666E−10 |

TABLE 8

[IMAGE-STABILIZING OPERATION DATA]

|  | Infinite Photographic Position | Close-Distance(−0.60:1) Photographic Position |
|---|---|---|
| f | 90.45 | |
| LV | 1.00 | 1.00 |
| LI | −0.75 | −1.03 |

[Numerical Embodiment 3]

Figure 17:
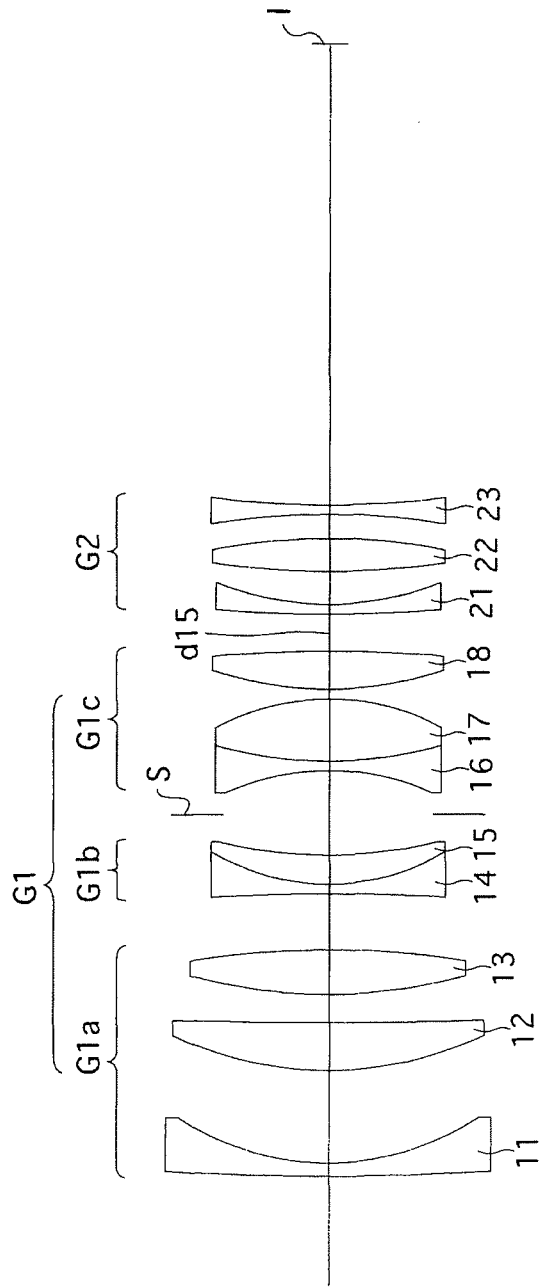
FIG. 17 shows a lens arrangement of a $3^{rd}$ numerical embodiment of a close-distance correcting lens system, according to the present invention, in a state where an image-stabilizing lens group is not decentered when focused on an object at infinity.
Figure 20:
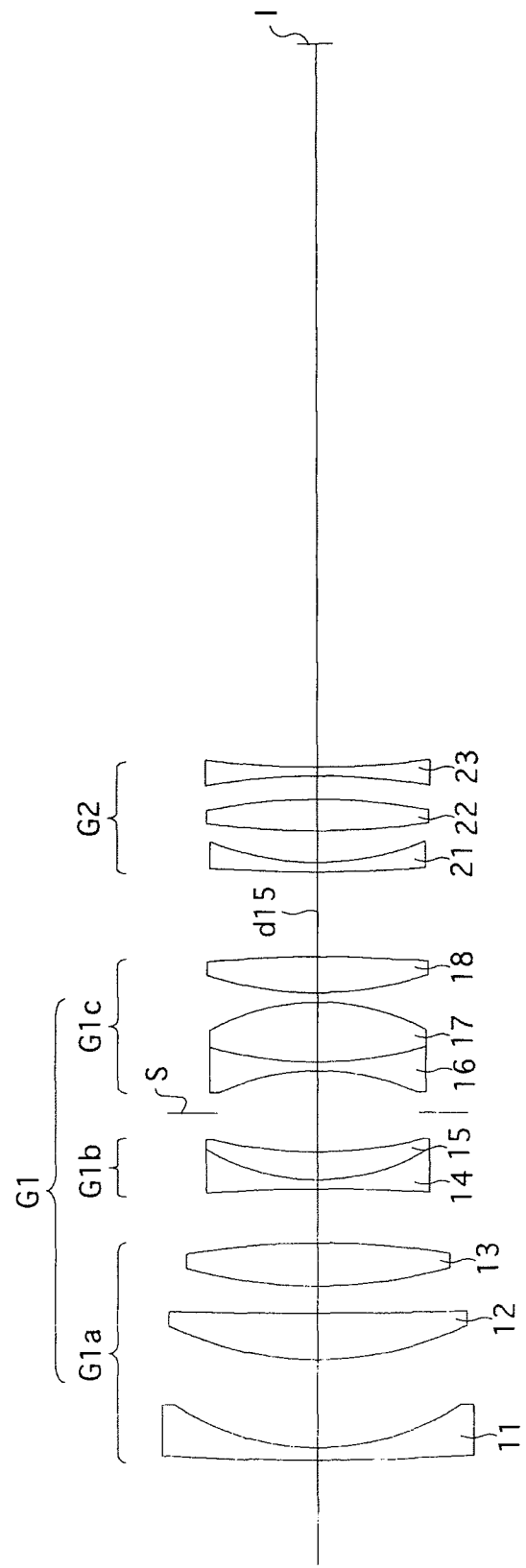
FIG. 20 shows a lens arrangement of the $3^{rd}$ numerical embodiment of a close-distance correcting lens system, according to the present invention, in a state where an image-stabilizing lens group is not decentered when focused on an object at a close distance.
Figure 23A:
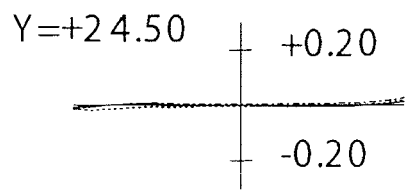
FIGS. 23A, 23B and 23C show lateral aberrations of the $3^{rd}$ numerical embodiment of a close-distance correcting lens system, according to the present invention, in a state where an image-stabilizing lens group is decentered when focused on an object at infinity.
Figure 23B:
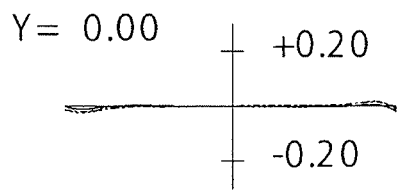
Figure 23C:
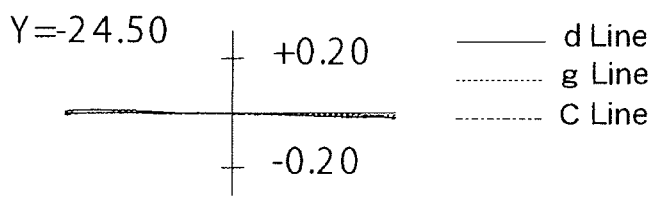
Figure 24A:
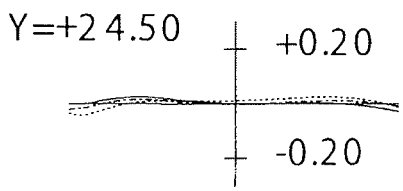
FIGS. 24A, 24B and 24C show lateral aberrations of the $3^{rd}$ numerical embodiment of a close-distance correcting lens system, according to the present invention, in a state where an image-stabilizing lens group is decentered when focused on an object at a close distance.
Figure 24B:
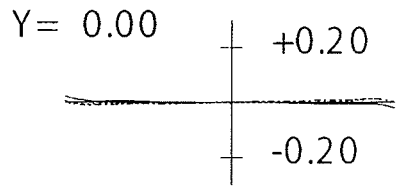
Figure 24C:
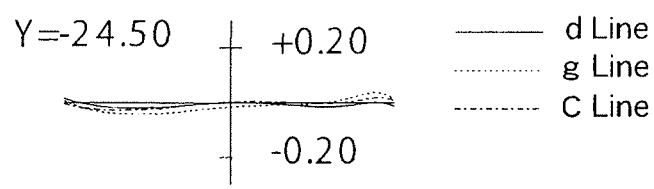

FIGS. 17 through 24C and Tables 9 through 12 show a third numerical embodiment of a close-distance correcting lens system according to the present invention. FIG. 17 shows a lens arrangement of the third numerical embodiment of the close-distance correcting lens system when focused on an image at infinity. FIGS. 18A, 18B, 18C and 18D show various aberrations that occurred in the lens arrangement shown in FIG. 17. FIGS. 19A, 19B and 19C show lateral aberrations that occurred in the lens arrangement shown in FIG. 17. FIG. 20 shows a lens arrangement of the third numerical embodiment of the close-distance correcting lens system when focused on an image at close-distance. FIGS. 21A, 21B, 21C and 21D show various aberrations that occurred in the lens arrangement shown in FIG. 20. FIGS. 22A, 22B and 22C show lateral aberrations that occurred in the lens arrangement shown in FIG. 20. FIGS. 23A, 23B and 23C show lateral aberrations that occurred when image-stabilizing operation is carried out when focused an object at infinity. FIGS. 24A, 24B and 24C show lateral aberrations that occurred when image-stabilizing operation is carried out when focused an object at a close distance. Table 9 shows the lens surface data, Table 10 shows various data, Table 11 shows aspherical data, and Table 12 shows image-stabilizing operation data.

The lens arrangement of the third numerical embodiment is the same as that of the first numerical embodiment.

TABLE 9

SURFACE DATA

| SURFACE NO. | r | d | N(d) | ν d |
|---|---|---|---|---|
| 1 | 396.791 | 2.000 | 1.74330 | 49.2 |
| 2 | 41.655 | 14.130 | | |
| 3 | 55.722 | 7.340 | 1.80450 | 39.6 |
| 4 | 925.902 | 4.330 | | |
| 5 | 79.513 | 6.800 | 1.49700 | 81.6 |
| 6 | −130.947 | 8.610 | | |
| 7 | −270.690 | 1.450 | 1.63980 | 34.6 |
| 8 | 34.890 | 4.440 | 1.84666 | 23.8 |
| 9 | 71.321 | 6.220 | | |
| 10 diaphragm | ∞ | 6.750 | | |
| 11 | −37.654 | 1.400 | 1.72825 | 28.3 |
| 12 | 64.373 | 9.500 | 1.49700 | 81.6 |
| 13 | −36.125 | 1.510 | | |
| 14 | 56.221 | 5.740 | 1.80139 | 45.5 |
| 15* | −183.527 | d15 | | |
| 16 | 224.032 | 1.500 | 1.67270 | 32.2 |
| 17 | 45.955 | 5.030 | | |
| 18 | 126.696 | 5.010 | 1.80518 | 25.5 |
| 19 | −90.517 | 3.700 | | |
| 20 | −107.635 | 1.450 | 1.70154 | 41.2 |
| 21 | 148.223 | — | | |

The asterisk (*) designates an aspherical surface which is rotationally symmetrical with respect to the optical axis.

TABLE 10

[VARIOUS DATA]

|  | Infinite Photographic Position | Close-Distance(−0.75:1) Photographic Position |
|---|---|---|
| FNO. | 2.85 | 4.66 |
| f | 90.07 | |
| W | 21.1 | |
| Y | 34.85 | 34.85 |
| fB | 70.11 | 114.61 |
| L | 172.70 | 225.05 |
| d15 | 5.680 | 13.533 |

TABLE 11

[ASPHERICAL DATA]

| SURFACE NO. | K | A4 |
|---|---|---|
| 15 | 0.000 | 0.1461E−05 |

TABLE 12

[IMAGE-STABILIZING OPERATION DATA]

|  | Infinite Photographic Position | Close-Distance(−0.75:1) Photographic Position |
|---|---|---|
| f | 90.07 | |
| LV | 1.00 | 1.00 |
| LI | −0.75 | −1.10 |

[Numerical Embodiment 4]

Figure 25:
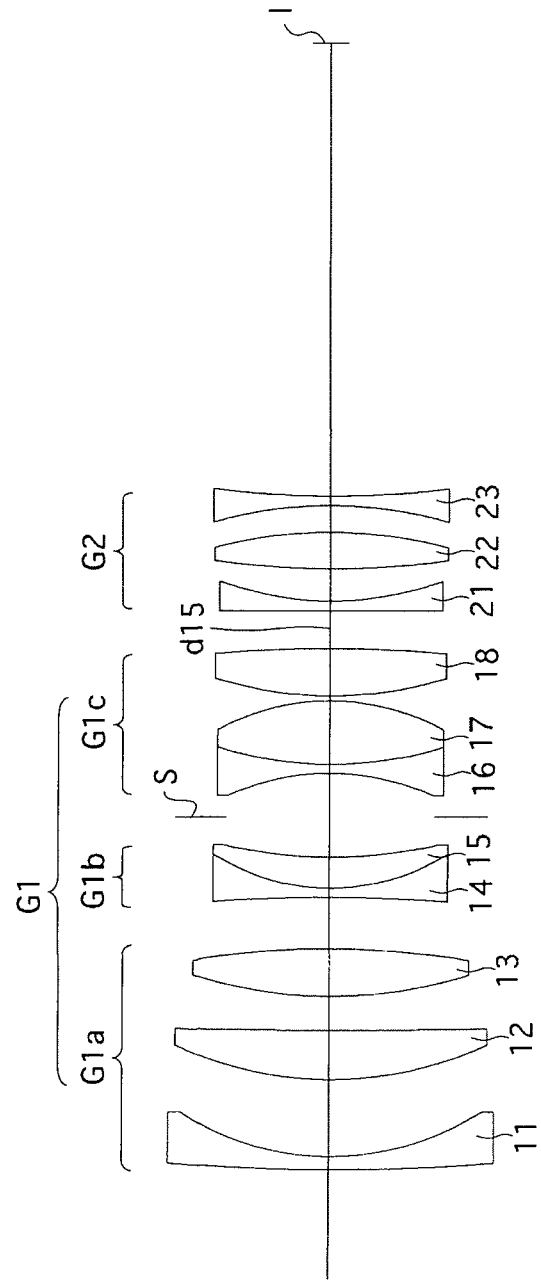
FIG. 25 shows a lens arrangement of a $4^{th}$ numerical embodiment of a close-distance correcting lens system, according to the present invention, in a state where an image-stabilizing lens group is not decentered when focused on an object at infinity.
Figure 28:
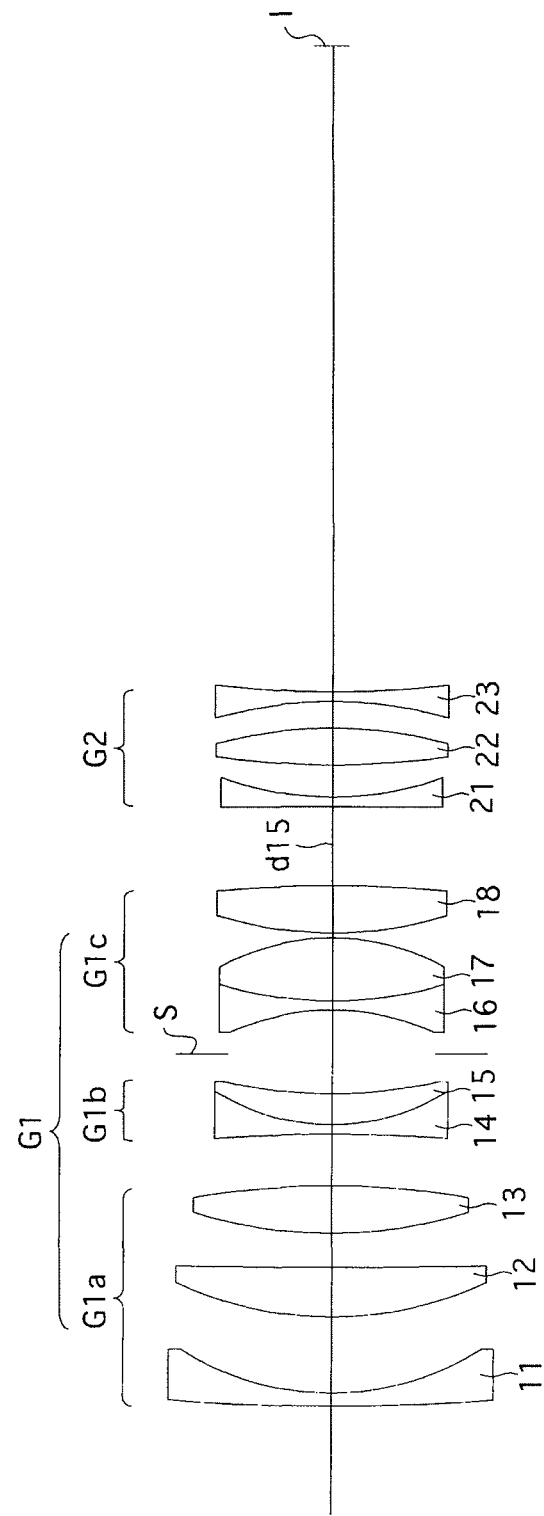
FIG. 28 shows a lens arrangement of the $4^{th}$ numerical embodiment of a close-distance correcting lens system, according to the present invention, in a state where an image-stabilizing lens group is not decentered when focused on an object at a close distance.
Figure 31A:
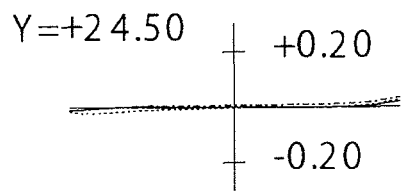
FIGS. 31A, 31B and 31C show lateral aberrations of the $4^{th}$ numerical embodiment of a close-distance correcting lens system, according to the present invention, in a state where an image-stabilizing lens group is decentered when focused on an object at infinity.
Figure 31B:
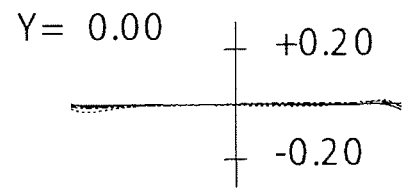
Figure 31C:
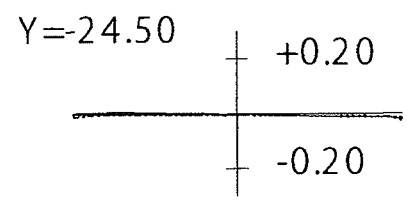
Figure 32A:
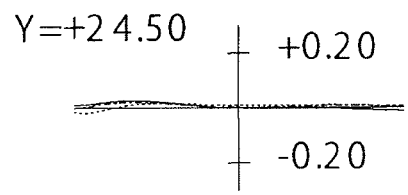
FIGS. 32A, 32B and 32C show lateral aberrations of the $4^{th}$ numerical embodiment of a close-distance correcting lens system, according to the present invention, in a state where an image-stabilizing lens group is decentered when focused on an object at a close distance.
Figure 32B:
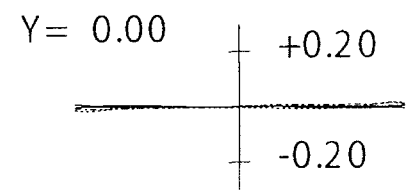
Figure 32C:
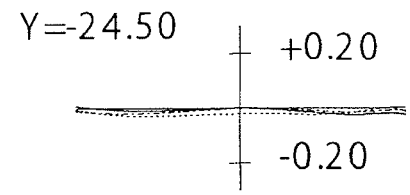

FIGS. 25 through 32C and Tables 13 through 16 show a fourth numerical embodiment of a close-distance correcting lens system according to the present invention. FIG. 25 shows a lens arrangement of the fourth numerical embodiment of the close-distance correcting lens system when focused on an image at infinity. FIGS. 26A, 26B, 26C and 26D show various aberrations that occurred in the lens arrangement shown in FIG. 25. FIGS. 27A, 27B and 27C show lateral aberrations that occurred in the lens arrangement shown in FIG. 25. FIG. 28 shows a lens arrangement of the fourth numerical embodiment of the close-distance correcting lens system when focused on an image at close-distance. FIGS. 29A, 29B, 29C and 29D show various aberrations that occurred in the lens arrangement shown in FIG. 28. FIGS. 30A, 30B and 30C show lateral aberrations that occurred in the lens arrangement shown in FIG. 28. FIGS. 31A, 31B and 31C show lateral aberrations that occurred when image-stabilizing operation is carried out when focused an object at infinity. FIGS. 32A, 32B and 32C show lateral aberrations that occurred when image-stabilizing operation is carried out when focused on an object at a close distance. Table 13 shows the lens surface data, Table 14 shows various data, Table 15 shows aspherical data, and Table 16 shows image-stabilizing operation data.

The lens arrangement of the fourth numerical embodiment is the same as that of the first numerical embodiment.

TABLE 13

SURFACE DATA

| SURFACE NO. | r | d | N(d) | ν d |
|---|---|---|---|---|
| 1 | 313.004 | 2.000 | 1.83481 | 42.7 |
| 2 | 42.890 | 11.700 | | |
| 3 | 56.534 | 7.540 | 1.80610 | 33.3 |
| 4 | 1344.027 | 5.180 | | |
| 5 | 70.142 | 7.260 | 1.49700 | 81.6 |
| 6 | −126.482 | 7.850 | | |
| 7 | −253.610 | 1.450 | 1.63980 | 34.6 |
| 8 | 33.519 | 4.750 | 1.80518 | 25.5 |
| 9 | 74.839 | 6.130 | | |
| 10 diaphragm | ∞ | 6.640 | | |
| 11 | −38.315 | 1.400 | 1.72825 | 28.3 |
| 12 | 58.634 | 9.660 | 1.49700 | 81.6 |
| 13 | −35.914 | 0.750 | | |
| 14 | 58.416 | 7.250 | 1.80610 | 40.7 |
| 15* | −183.734 | d15 | | |
| 16 | 2478.431 | 1.550 | 1.63980 | 34.6 |
| 17 | 49.802 | 4.900 | | |
| 18 | 126.215 | 5.570 | 1.80610 | 33.3 |
| 19 | −69.406 | 4.080 | | |
| 20 | −65.521 | 1.450 | 1.56883 | 56.0 |
| 21 | 146.337 | — | | |

The asterisk (*) designates an aspherical surface which is rotationally symmetrical with respect to the optical axis.

TABLE 14

[VARIOUS DATA]

| | Infinite Photographic Position | Close-Distance(−0.50:1) Photographic Position |
|---|---|---|
| FNO. | 2.85 | 4.06 |
| f | 90.12 | |
| W | 21.1 | |
| Y | 34.85 | 34.85 |
| fB | 69.09 | 98.18 |
| L | 171.88 | 207.25 |
| d15 | 5.680 | 11.958 |

TABLE 15

[ASPHERICAL DATA]

| SURFACE NO. | K | A4 |
|---|---|---|
| 15 | 0.000 | 0.1173E−05 |

TABLE 16

[IMAGE-STABILIZING OPERATION DATA]

| | Infinite Photographic Position | Close-Distance(−0.50:1) Photographic Position |
|---|---|---|
| f | 90.12 | |
| LV | 1.00 | 1.00 |
| LI | −0.75 | −1.01 |

[Numerical Embodiment 5]

Figure 33:
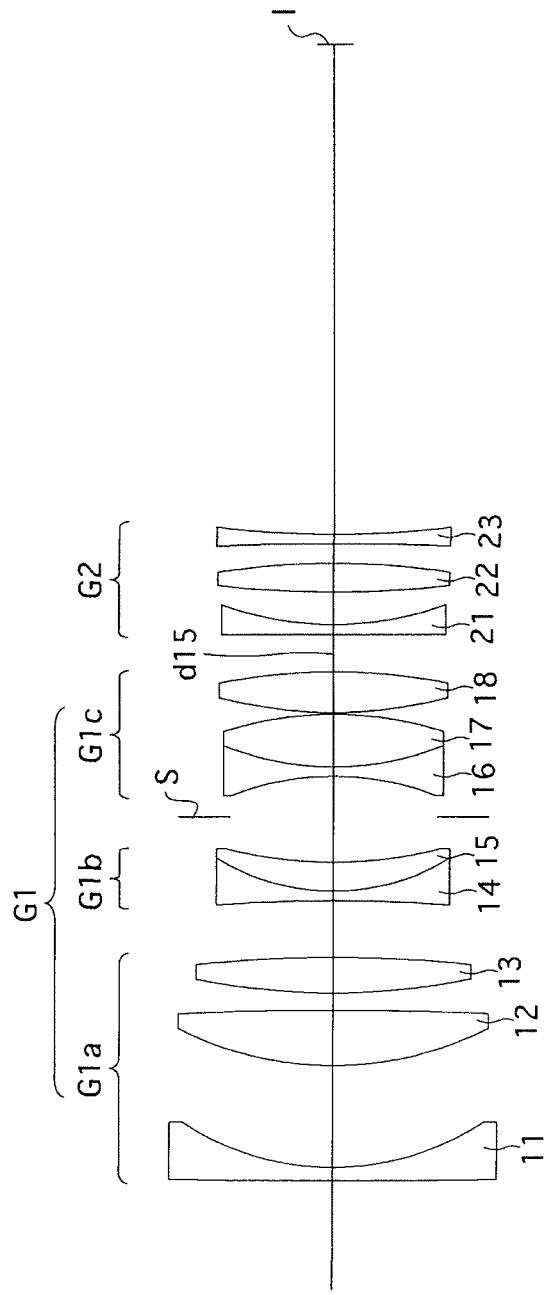
FIG. 33 shows a lens arrangement of a $5^{th}$ numerical embodiment of a close-distance correcting lens system, according to the present invention, in a state where an image-stabilizing lens group is not decentered when focused on an object at infinity.
Figure 39A:
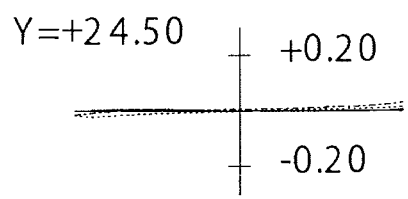
FIGS. 39A, 39B and 39C show lateral aberrations of the $5^{th}$ numerical embodiment of a close-distance correcting lens system, according to the present invention, in a state where an image-stabilizing lens group is decentered when focused on an object at infinity.
Figure 39B:
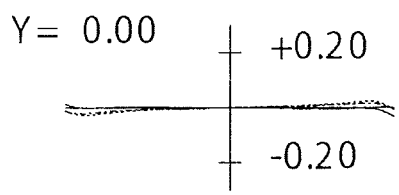
Figure 39C:
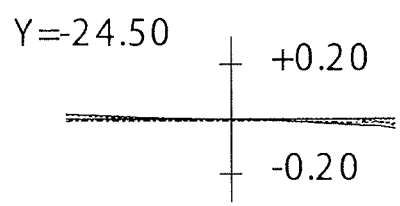
Figure 40A:
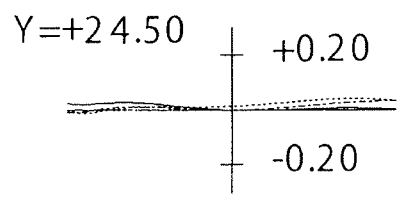
FIGS. 40A, 40B and 40C show lateral aberrations of the $5^{th}$ numerical embodiment of a close-distance correcting lens system, according to the present invention, in a state where an image-stabilizing lens group is decentered when focused on an object at a close distance.
Figure 40B:
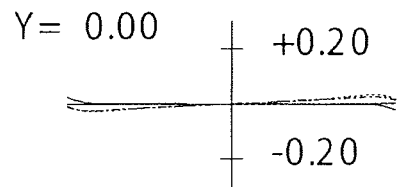
Figure 40C:
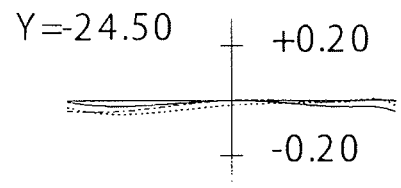

FIGS. 33 through 40C and Tables 17 through 20 show a fifth numerical embodiment of a close-distance correcting lens system according to the present invention. FIG. 33 shows a lens arrangement of the fifth numerical embodiment of the close-distance correcting lens system when focused on an image at infinity. FIGS. 34A, 34B, 34C and 34D show various aberrations that occurred in the lens arrangement shown in FIG. 33. FIGS. 35A, 35B and 35C show lateral aberrations that occurred in the lens arrangement shown in FIG. 33. FIG. 36 shows a lens arrangement of the fifth numerical embodiment of the close-distance correcting lens system when focused on an image at close-distance. FIGS. 37A, 37B, 37C and 37D show various aberrations that occurred in the lens arrangement shown in FIG. 36. FIGS. 38A, 38B and 38C show lateral aberrations that occurred in the lens arrangement shown in FIG. 36. FIGS. 39A, 39B and 39C show lateral aberrations that occurred when image-stabilizing operation is carried out when focused on an object at infinity. FIGS. 40A, 40B and 40C show lateral aberrations that occurred when image-stabilizing operation is carried out when focused on an object at a close distance. Table 17 shows the lens surface data, Table 18 shows various data, Table 19 shows aspherical data, and Table 20 shows image-stabilizing operation data.

The lens arrangement of the fifth numerical embodiment is the same as that of the first numerical embodiment except the following points (1) and (2).

(1) The positive lens element 12 of the first sub lens group G1a is configured of a positive biconvex lens element, which is provided with an aspherical surface on the object side thereof.

(2) The negative lens element 21 of the second lens group G2 is configured of a negative planoconcave lens element having a concave surface on the image side.

TABLE 17

SURFACE DATA

| SURFACE NO. | r | d | N(d) | ν d |
|---|---|---|---|---|
| 1 | 2254.961 | 2.000 | 1.65160 | 58.4 |
| 2 | 42.516 | 15.530 | | |
| 3* | 52.658 | 8.500 | 1.72916 | 54.7 |
| 4 | −473.334 | 2.630 | | |
| 5 | 106.175 | 5.470 | 1.49700 | 81.6 |
| 6 | −198.050 | 8.690 | | |
| 7 | −238.065 | 1.450 | 1.59551 | 39.2 |
| 8 | 34.324 | 4.410 | 1.80518 | 25.5 |
| 9 | 67.445 | 6.900 | | |
| 10 diaphragm | ∞ | 6.250 | | |
| 11 | −43.265 | 1.400 | 1.71736 | 29.5 |
| 12 | 45.438 | 8.080 | 1.48749 | 70.4 |
| 13 | −54.875 | 0.250 | | |
| 14 | 69.236 | 6.250 | 1.80139 | 45.5 |
| 15* | −80.649 | d15 | | |
| 16 | ∞ | 1.500 | 1.53172 | 48.8 |
| 17 | 50.628 | 4.960 | | |
| 18 | 156.419 | 4.380 | 1.80610 | 33.3 |

TABLE 17-continued

SURFACE DATA

| SURFACE NO. | r | d | N(d) | νd |
|---|---|---|---|---|
| 19 | −115.982 | 3.000 | | |
| 20 | −427.329 | 1.450 | 1.72342 | 38.0 |
| 21 | 152.155 | — | | |

The asterisk (*) designates an aspherical surface which is rotationally symmetrical with respect to the optical axis.

TABLE 18

[VARIOUS DATA]

| | Infinite Photographic Position | Close-Distance(−0.50:1) Photographic Position |
|---|---|---|
| FNO. | 2.87 | 4.06 |
| f | 89.86 | |
| W | 21.3 | |
| Y | 34.85 | 34.85 |
| fB | 74.69 | 104.66 |
| L | 173.47 | 210.47 |
| d15 | 5.680 | 12.710 |

TABLE 19

[ASPHERICAL DATA]

| SURFACE NO. | K | A4 |
|---|---|---|
| 3 | 0.000 | −0.9260E−07 |
| 15 | 0.000 | 0.1535E−05 |

TABLE 20

[IMAGE-STABILIZING OPERATION DATA]

| | Infinite Photographic Position | Close-Distance(−0.50:1) Photographic Position |
|---|---|---|
| f | 89.86 | |
| LV | 1.00 | 1.00 |
| LI | −0.75 | −0.99 |

[Numerical Embodiment 6]

Figure 44:
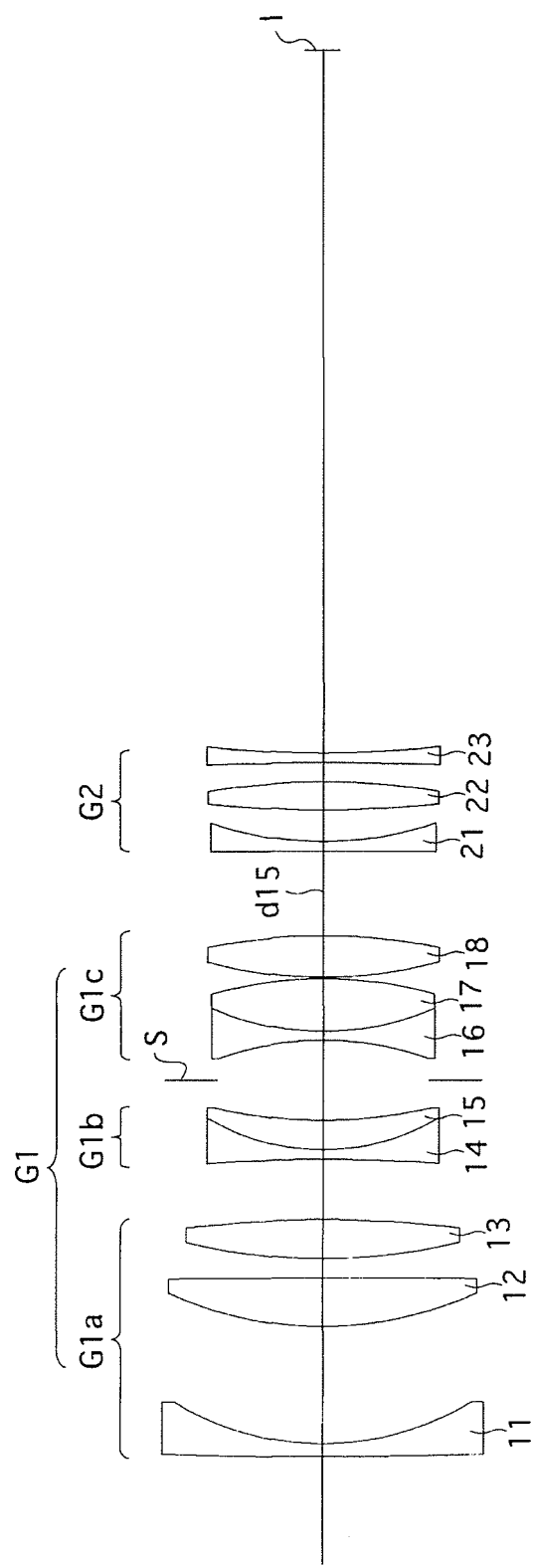
FIG. 44 shows a lens arrangement of the $6^{th}$ numerical embodiment of a close-distance correcting lens system, according to the present invention, in a state where an image-stabilizing lens group is not decentered when focused on an object at a close distance.
Figure 47A:
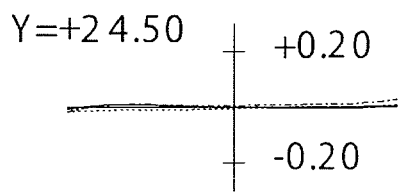
FIGS. 47A, 47B and 47C show lateral aberrations of the $6^{th}$ numerical embodiment of a close-distance correcting lens system, according to the present invention, in a state where an image-stabilizing lens group is decentered when focused on an object at infinity.
Figure 47B:
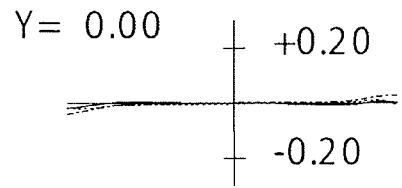
Figure 47C:
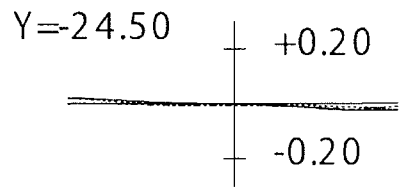
Figure 48A:
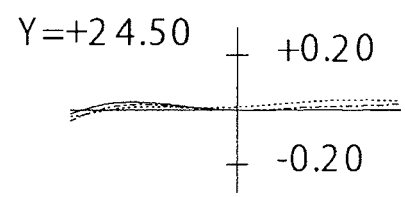
FIGS. 48A, 48B and 48C show lateral aberrations of the $6^{th}$ numerical embodiment of a close-distance correcting lens system, according to the present invention, in a state where an image-stabilizing lens group is decentered when focused on an object at a close distance.
Figure 48B:
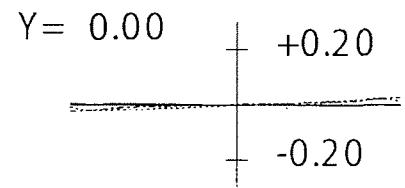
Figure 48C:
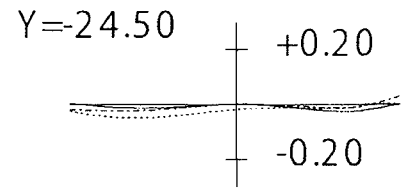

FIGS. 41 through 48C and Tables 21 through 24 show a sixth numerical embodiment of a close-distance correcting lens system according to the present invention. FIG. 41 shows a lens arrangement of the sixth numerical embodiment of the close-distance correcting lens system when focused on an image at infinity. FIGS. 42A, 42B, 42C and 42D show various aberrations that occurred in the lens arrangement shown in FIG. 41. FIGS. 43A, 43B and 43C show lateral aberrations that occurred in the lens arrangement shown in FIG. 41. FIG. 44 shows a lens arrangement of the sixth numerical embodiment of the close-distance correcting lens system when focused on an image at close-distance. FIGS. 45A, 45B, 45C and 45D show various aberrations that occurred in the lens arrangement shown in FIG. 44. FIGS. 46A, 46B and 46C show lateral aberrations that occurred in the lens arrangement shown in FIG. 44. FIGS. 47A, 47B and 47C show lateral aberrations that occurred when image-stabilizing operation is carried out when focused on an object at infinity. FIGS. 48A, 48B and 48C show lateral aberrations that occurred when image-stabilizing operation is carried out when focused on an object at a close distance.

Table 21 shows the lens surface data, Table 22 shows various data, Table 23 shows aspherical data, and Table 24 shows image-stabilizing operation data.

The lens arrangement of the sixth numerical embodiment is the same as that of the first numerical embodiment except the following points (1) and (2).

(1) The positive lens element 12 of the first sub lens group G1a is configured of a positive biconvex lens.

(2) The negative lens element 21 of the second lens group G2 is configured of a negative planoconcave lens having a concave surface on the image side.

TABLE 21

SURFACE DATA

| SURFACE NO. | r | d | N(d) | νd |
|---|---|---|---|---|
| 1 | 658.496 | 2.000 | 1.72916 | 54.7 |
| 2 | 43.844 | 18.040 | | |
| 3 | 57.724 | 7.370 | 1.80420 | 46.5 |
| 4 | −8802.094 | 2.990 | | |
| 5 | 91.086 | 5.950 | 1.49700 | 81.6 |
| 6 | −182.284 | 9.250 | | |
| 7 | −269.188 | 1.450 | 1.64769 | 33.8 |
| 8 | 34.650 | 4.560 | 1.84666 | 23.8 |
| 9 | 72.895 | 6.200 | | |
| 10 diaphragm | ∞ | 6.100 | | |
| 11 | −48.574 | 1.400 | 1.71736 | 29.5 |
| 12 | 43.801 | 8.040 | 1.49700 | 81.6 |
| 13 | −66.443 | 0.250 | | |
| 14 | 69.460 | 6.340 | 1.80139 | 45.5 |
| 15* | −83.906 | d15 | | |
| 16 | ∞ | 1.500 | 1.56883 | 56.0 |
| 17 | 54.405 | 4.870 | | |
| 18 | 169.367 | 4.260 | 1.80610 | 33.3 |
| 19 | −119.653 | 2.980 | | |
| 20 | −506.702 | 1.450 | 1.63980 | 34.6 |
| 21 | 156.398 | — | | |

The asterisk (*) designates an aspherical surface which is rotationally symmetrical with respect to the optical axis.

TABLE 22

[VARIOUS DATA]

| | Infinite Photographic Position | Close-Distance(−0.50:1) Photographic Position |
|---|---|---|
| FNO. | 2.88 | 4.02 |
| f | 88.80 | |
| W | 21.6 | |
| Y | 34.85 | 34.85 |
| fB | 78.02 | 107.63 |
| L | 178.70 | 215.60 |
| d15 | 5.680 | 12.969 |

TABLE 23

[ASPHERICAL DATA]

| SURFACE NO. | K | A4 |
|---|---|---|
| 15 | 0.000 | 0.1670E−05 |

TABLE 24

[IMAGE-STABILIZING OPERATION DATA]

|  | Infinite Photographic Position | Close-Distance(−0.50:1) Photographic Position |
|---|---|---|
| f | 88.80 |  |
| LV | 1.00 | 1.00 |
| LI | −0.77 | −1.00 |

[Numerical Embodiment 7]

Figure 49:
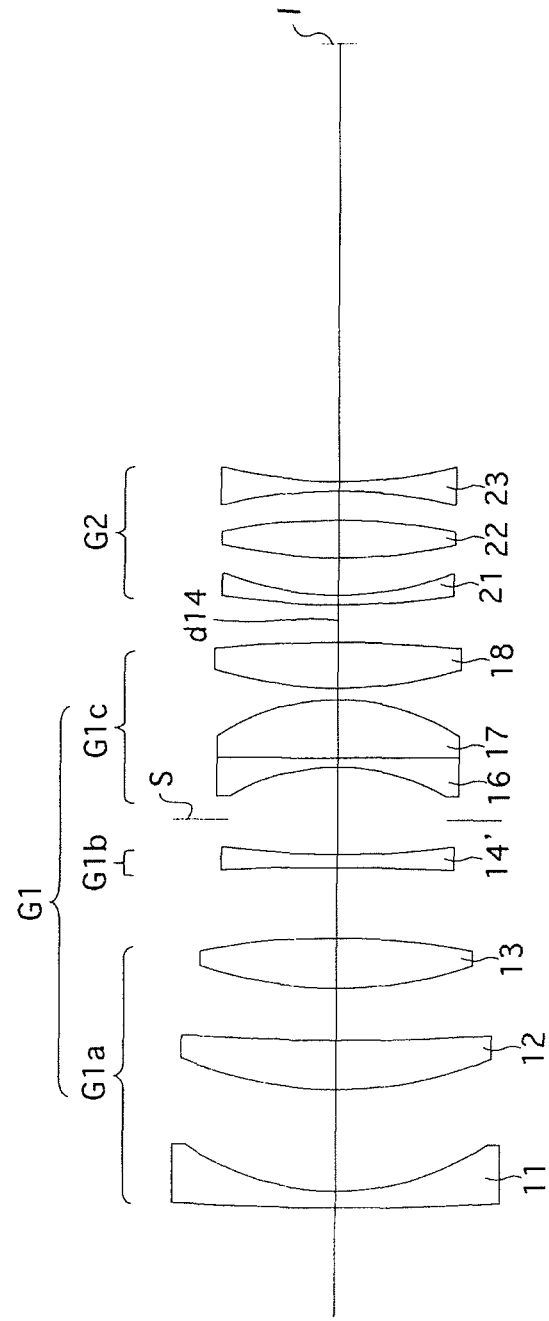
FIG. 49 shows a lens arrangement of a $7^{th}$ numerical embodiment of a close-distance correcting lens system, according to the present invention, in a state where an image-stabilizing lens group is not decentered when focused on an object at infinity.
Figure 52:
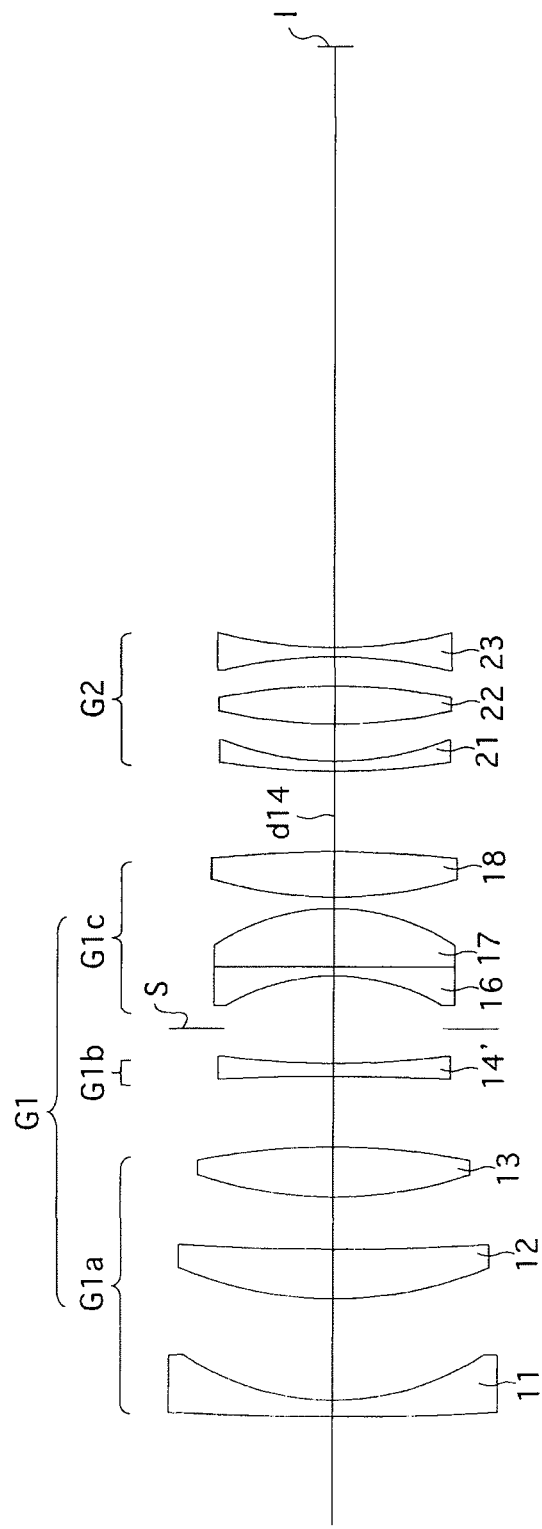
FIG. 52 shows a lens arrangement of the 7th numerical embodiment of a close-distance correcting lens system, according to the present invention, in a state where an image-stabilizing lens group is not decentered when focused on an object at a close distance.
Figure 55A:
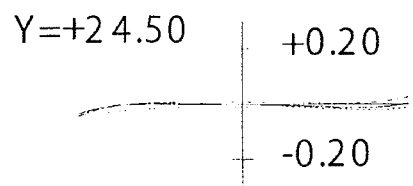
FIGS. 55A, 55B and 55C show lateral aberrations of the 7th numerical embodiment of a close-distance correcting lens system, according to the present invention, in a state where an image-stabilizing lens group is decentered when focused on an object at infinity.
Figure 55B:
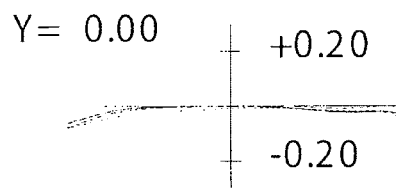
Figure 55C:
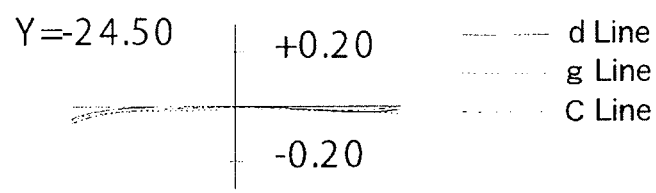
Figure 56A:
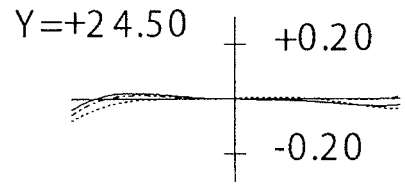
FIGS. 56A, 56B and 56C show lateral aberrations of the 7th numerical embodiment of a close-distance correcting lens system, according to the present invention, in a state where an image-stabilizing lens group is decentered when focused on an object at a close distance.
Figure 56B:
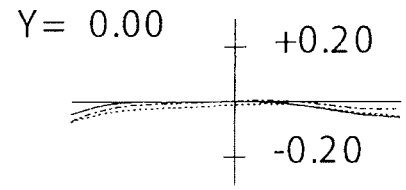
Figure 56C:
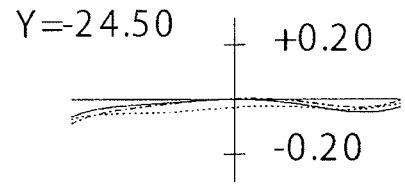

FIGS. 49 through 56C and Tables 25 through 28 show a seventh numerical embodiment of a close-distance correcting lens system according to the present invention. FIG. 49 shows a lens arrangement of the seventh numerical embodiment of the close-distance correcting lens system when focused on an image at infinity. FIGS. 50A, 50B, 50C and 50D show various aberrations that occurred in the lens arrangement shown in FIG. 49. FIGS. 51A, 51B and 51C show lateral aberrations that occurred in the lens arrangement shown in FIG. 49. FIG. 52 shows a lens arrangement of the seventh numerical embodiment of the close-distance correcting lens system when focused on an image at close-distance. FIGS. 53A, 53B, 53C and 53D show various aberrations that occurred in the lens arrangement shown in FIG. 52. FIGS. 54A, 54B and 54C show lateral aberrations that occurred in the lens arrangement shown in FIG. 52. FIGS. 55A, 55B and 55C show lateral aberrations that occurred when image-stabilizing operation is carried out when focused on an object at infinity. FIGS. 56A, 56B and 56C show lateral aberrations that occurred when image-stabilizing operation is carried out when focused on an object at a close distance. Table 25 shows the lens surface data, Table 26 shows various data, Table 27 shows aspherical data, and Table 28 shows image-stabilizing operation data.

The lens arrangement of the seventh numerical embodiment is the same as that of the first numerical embodiment except the following points (1) and (2).

(1) The second sub lens group G1b is configured of a single biconcave lens element (a single positive lens element having a concave surface on the image side) 14'.

(2) The negative lens element 16 and the positive lens element 17 of the third sub lens group G1c are configured of a negative planoconcave lens element having a concave surface on the object side, and of a planoconvex lens element having a convex surface on the image side, respectively.

TABLE 25

SURFACE DATA

| SURFACE NO. | r | d | N(d) | νd |
|---|---|---|---|---|
| 1 | 461.940 | 2.500 | 1.72000 | 50.3 |
| 2 | 41.142 | 15.540 |  |  |
| 3 | 62.000 | 7.490 | 1.80610 | 33.3 |
| 4 | 350.110 | 8.000 |  |  |
| 5 | 65.687 | 7.640 | 1.49700 | 81.6 |
| 6 | −107.896 | 10.820 |  |  |
| 7 | −358.740 | 2.000 | 1.80420 | 46.5 |
| 8 | 141.717 | 5.310 |  |  |
| 9 diaphragm | ∞ | 8.040 |  |  |
| 10 | −32.932 | 1.400 | 1.76182 | 26.6 |
| 11 | ∞ | 8.900 | 1.49700 | 81.6 |
| 12 | −33.210 | 1.750 |  |  |
| 13 | 65.433 | 7.000 | 1.80139 | 45.5 |
| 14* | −144.406 | d14 |  |  |
| 15 | 114.273 | 1.500 | 1.75520 | 27.5 |
| 16 | 47.735 | 5.700 |  |  |

TABLE 25-continued

SURFACE DATA

| SURFACE NO. | r | d | N(d) | νd |
|---|---|---|---|---|
| 17 | 80.998 | 5.750 | 1.80518 | 25.5 |
| 18 | −92.183 | 4.500 |  |  |
| 19 | −72.327 | 1.450 | 1.72342 | 38.0 |
| 20 | 74.154 | — |  |  |

The asterisk (*) designates an aspherical surface which is rotationally symmetrical with respect to the optical axis.

TABLE 26

[VARIOUS DATA]

|  | Infinite Photographic Position | Close-Distance(−0.50:1) Photographic Position |
|---|---|---|
| FNO. | 2.88 | 4.00 |
| f | 89.19 |  |
| W | 21.2 |  |
| Y | 34.85 | 34.85 |
| fB | 66.77 | 91.68 |
| L | 177.74 | 209.25 |
| d14 | 5.680 | 12.282 |

TABLE 27

[ASPHERICAL DATA]

| SURFACE NO. | K | A4 |
|---|---|---|
| 14 | 0.000 | 0.1550E−05 |

TABLE 28

[IMAGE-STABILIZING OPERATION DATA]

|  | Infinite Photographic Position | Close-Distance(−0.50:1) Photographic Position |
|---|---|---|
| f | 89.19 |  |
| LV | 1.00 | 1.00 |
| LI | −0.77 | −1.00 |

[Numerical Embodiment 8]

Figure 57:
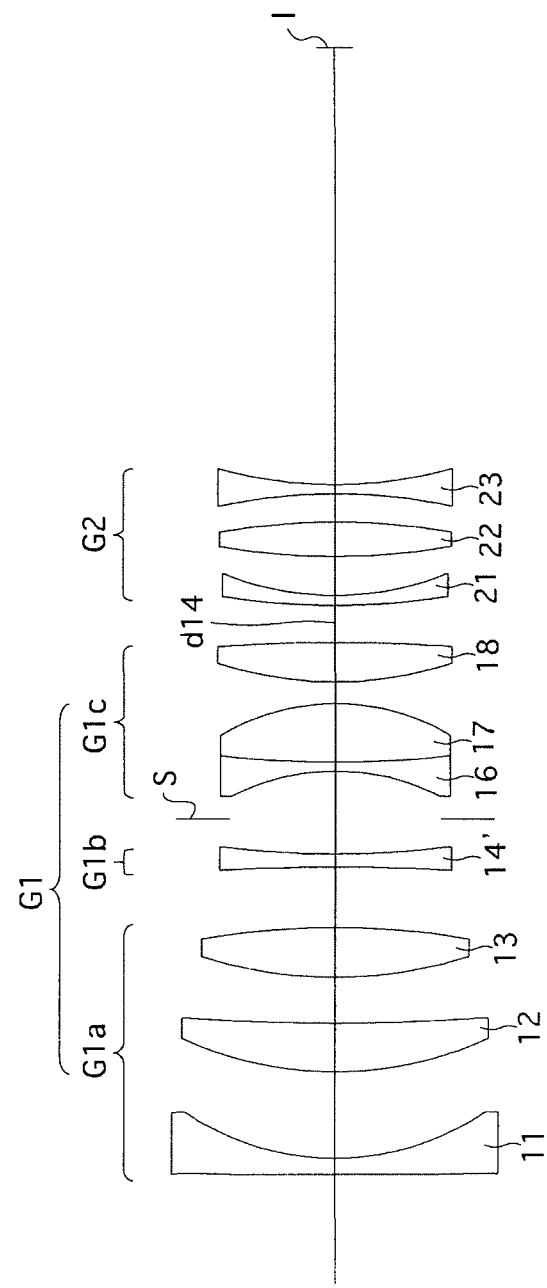
FIG. 57 shows a lens arrangement of a 8th numerical embodiment of a close-distance correcting lens system, according to the present invention, in a state where an image-stabilizing lens group is not decentered when focused on an object at infinity.
Figure 60:
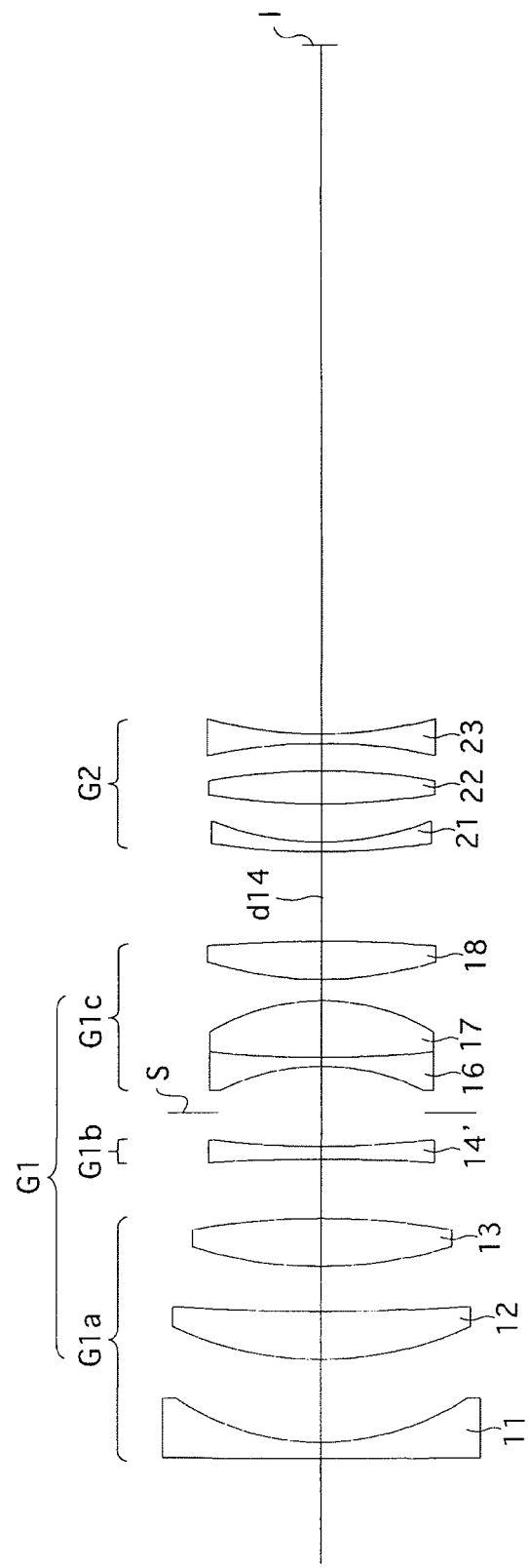
FIG. 60 shows a lens arrangement of the 8th numerical embodiment of a close-distance correcting lens system, according to the present invention, in a state where an image-stabilizing lens group is not decentered when focused on an object at a close distance.
Figure 63A:
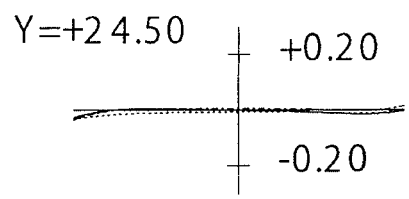
FIGS. 63A, 63B and 63C show lateral aberrations of the 8th numerical embodiment of a close-distance correcting lens system, according to the present invention, in a state where an image-stabilizing lens group is decentered when focused on an object at infinity.
Figure 63B:
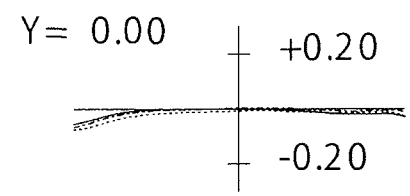
Figure 63C:
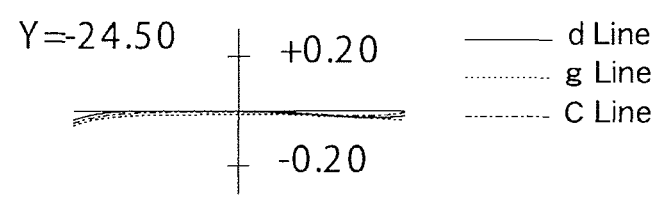
Figure 64A:
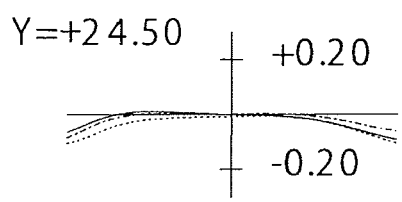
FIGS. 64A, 64B and 64C show lateral aberrations of the 8th numerical embodiment of a close-distance correcting lens system, according to the present invention, in a state where an image-stabilizing lens group is decentered when focused on an object at a close distance.
Figure 64B:
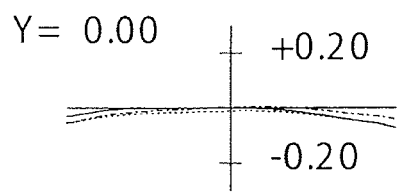
Figure 64C:
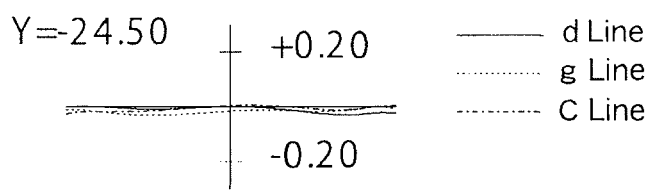

FIGS. 57 through 64C and Tables 29 through 32 show a eighth numerical embodiment of a close-distance correcting lens system according to the present invention. FIG. 57 shows a lens arrangement of the eighth numerical embodiment of the close-distance correcting lens system when focused on an image at infinity. FIGS. 58A, 58B, 58C and 58D show various aberrations that occurred in the lens arrangement shown in FIG. 57. FIGS. 59A, 59B and 59C show lateral aberrations that occurred in the lens arrangement shown in FIG. 57. FIG. 60 shows a lens arrangement of the eighth numerical embodiment of the close-distance correcting lens system when focused on an image at close-distance. FIGS. 61A, 61B, 61C and 61D show various aberrations that occurred in the lens arrangement shown in FIG. 60. FIGS. 62A, 62B and 62C show lateral aberrations that occurred in the lens arrangement shown in FIG. 60. FIGS. 63A, 63B and 63C show lateral aberrations that occurred when image-stabilizing operation is carried out when focused on an object at infinity. FIGS. 64A, 64B and 64C show lateral aberrations that occurred when image-stabilizing operation is carried out when focused on an object at a close distance. Table 29 shows the lens surface data, Table 30 shows various data, Table 31 shows aspherical data, and Table 32 shows image-stabilizing operation data.

The lens arrangement of the 8th numerical embodiment is the same as that of the 7th numerical embodiment except the following point (1).

(1) The negative lens element 16 and the positive lens element 17 in the third sub lens group G1c are configured of a negative biconcave lens element and a positive biconcave lens element, respectively.

TABLE 29

SURFACE DATA

| SURFACE NO. | r | d | N(d) | ν d |
|---|---|---|---|---|
| 1 | 1693.954 | 2.500 | 1.65844 | 50.8 |
| 2 | 41.055 | 13.160 | | |
| 3 | 56.198 | 7.490 | 1.80610 | 33.3 |
| 4 | 341.413 | 7.000 | | |
| 5 | 68.292 | 7.640 | 1.49700 | 81.6 |
| 6 | −117.375 | 9.230 | | |
| 7 | −333.385 | 2.000 | 1.77250 | 49.6 |
| 8 | 135.704 | 5.320 | | |
| 9 diaphragm | ∞ | 7.350 | | |
| 10 | −35.492 | 1.400 | 1.74077 | 27.8 |
| 11 | 168.532 | 8.900 | 1.49700 | 81.6 |
| 12 | −34.595 | 3.340 | | |
| 13 | 58.068 | 6.000 | 1.80139 | 45.5 |
| 14* | −199.754 | d14 | | |
| 15 | 113.267 | 1.500 | 1.75520 | 27.5 |
| 16 | 45.735 | 5.960 | | |
| 17 | 104.425 | 5.270 | 1.80518 | 25.5 |
| 18 | −105.748 | 4.310 | | |
| 19 | −86.718 | 1.450 | 1.54814 | 45.8 |
| 20 | 67.844 | — | | |

The asterisk (*) designates an aspherical surface which is rotationally symmetrical with respect to the optical axis.

TABLE 30

[VARIOUS DATA]

| | Infinite Photographic Position | Close-Distance(−0.75:1) Photographic Position |
|---|---|---|
| FNO. | 2.88 | 4.69 |
| f | 89.97 | |
| W | 21.1 | |
| Y | 34.85 | 34.85 |
| fB | 66.76 | 108.10 |
| L | 172.26 | 222.07 |
| d14 | 5.680 | 14.148 |

TABLE 31

[ASPHERICAL DATA]

| SURFACE NO. | K | A4 |
|---|---|---|
| 14 | 0.000 | 0.1564E−05 |

TABLE 32

[IMAGE-STABILIZING OPERATION DATA]

| | Infinite Photographic Position | Close-Distance(−0.75:1) Photographic Position |
|---|---|---|
| f | 89.97 | |
| LV | 1.00 | 1.00 |
| LI | −0.75 | −1.10 |

[Numerical Embodiment 9]

Figure 65:
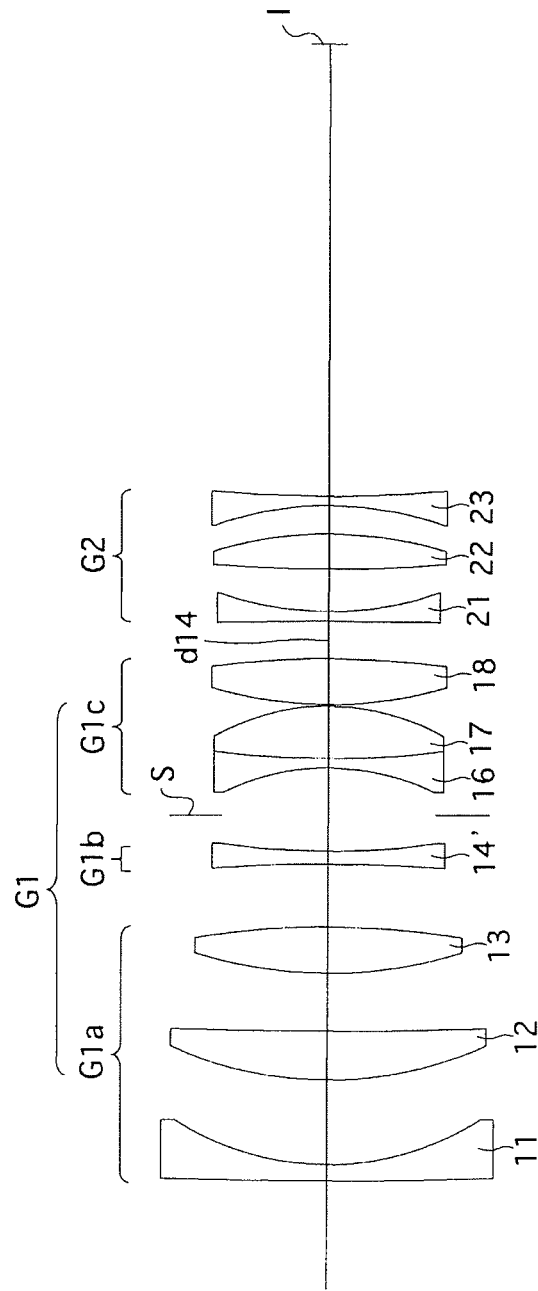
FIG. 65 shows a lens arrangement of a 9th numerical embodiment of a close-distance correcting lens system, according to the present invention, in a state where an image-stabilizing lens group is not decentered when focused on an object at infinity.
Figure 68:
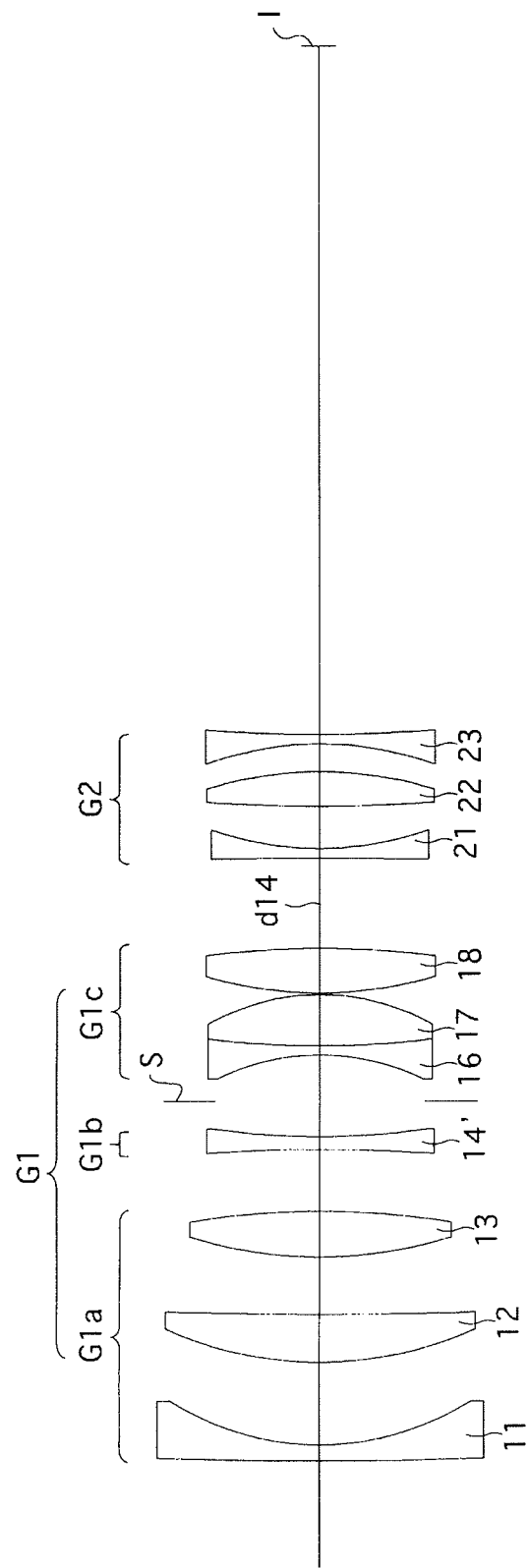
FIG. 68 shows a lens arrangement of the 9th numerical embodiment of a close-distance correcting lens system, according to the present invention, in a state where an image-stabilizing lens group is not decentered when focused on an object at a close distance.
Figure 71A:
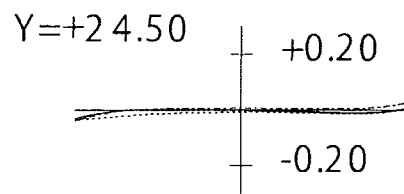
FIGS. 71A, 71B and 71C show lateral aberrations of the 9th numerical embodiment of a close-distance correcting lens system, according to the present invention, in a state where an image-stabilizing lens group is decentered when focused on an object at infinity.
Figure 71B:
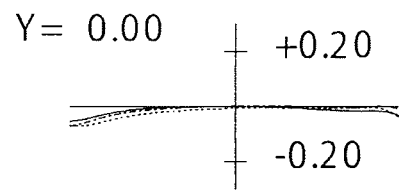
Figure 71C:
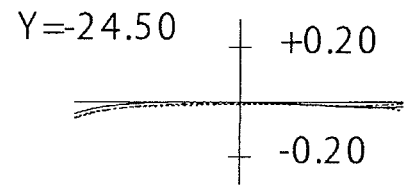
Figure 72A:
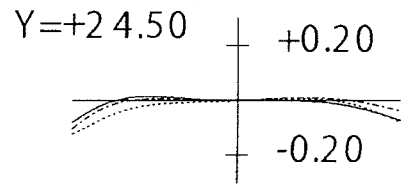
FIGS. 72A, 72B and 72C show lateral aberrations of the 9th numerical embodiment of a close-distance correcting lens system, according to the present invention, in a state where an image-stabilizing lens group is decentered when focused on an object at a close distance.
Figure 72B:
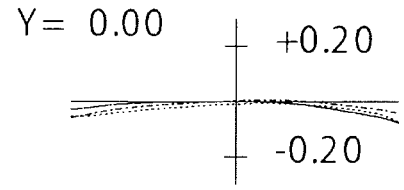
Figure 72C:
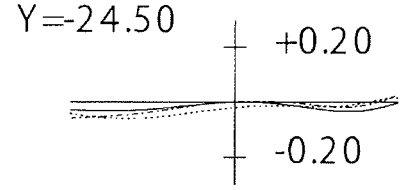

FIGS. 65 through 72C and Tables 33 through 36 show a ninth numerical embodiment of a close-distance correcting lens system according to the present invention. FIG. 65 shows a lens arrangement of the ninth numerical embodiment of the close-distance correcting lens system when focused on an image at infinity. FIGS. 66A, 66B, 66C and 66D show various aberrations that occurred in the lens arrangement shown in FIG. 65. FIGS. 67A, 67B and 67C show lateral aberrations that occurred in the lens arrangement shown in FIG. 65. FIG. 68 shows a lens arrangement of the ninth numerical embodiment of the close-distance correcting lens system when focused on an image at close-distance. FIGS. 69A, 69B, 69C and 69D show various aberrations that occurred in the lens arrangement shown in FIG. 68. FIGS. 70A, 70B and 70C show lateral aberrations that occurred in the lens arrangement shown in FIG. 68. FIGS. 71A, 71B and 71C show lateral aberrations that occurred when image-stabilizing operation is carried out when focused on an object at infinity. FIGS. 72A, 72B and 72C show lateral aberrations that occurred when image-stabilizing operation is carried out when focused on an object at a close distance. Table 33 shows the lens surface data, Table 34 shows various data, Table 35 shows aspherical data, and Table 36 shows image-stabilizing operation data.

The lens arrangement of the ninth numerical embodiment is the same as that of the eighth numerical embodiment except the following point (1).

(1) The negative lens element 21 of the second lens group G2 is configured of a negative biconcave lens element.

TABLE 33

SURFACE DATA

| SURFACE NO. | r | d | N(d) | ν d |
|---|---|---|---|---|
| 1 | 752.090 | 2.500 | 1.74400 | 44.9 |
| 2 | 43.606 | 12.880 | | |
| 3 | 58.619 | 7.490 | 1.80610 | 33.3 |
| 4 | 859.851 | 8.850 | | |
| 5 | 68.831 | 7.080 | 1.49700 | 81.6 |
| 6 | −126.284 | 9.620 | | |
| 7 | −254.859 | 2.000 | 1.63854 | 55.5 |
| 8 | 115.686 | 5.510 | | |
| 9 diaphragm | ∞ | 7.230 | | |
| 10 | −36.167 | 1.400 | 1.76182 | 26.6 |
| 11 | 143.880 | 8.000 | 1.49700 | 81.6 |
| 12 | −35.608 | 0.250 | | |
| 13 | 63.687 | 7.000 | 1.80610 | 40.7 |
| 14* | −124.847 | d14 | | |
| 15 | −887.272 | 1.500 | 1.59551 | 39.2 |
| 16 | 50.795 | 6.570 | | |
| 17 | 245.346 | 5.340 | 1.80610 | 33.3 |
| 18 | −60.009 | 4.330 | | |
| 19 | −52.174 | 1.450 | 1.51742 | 52.2 |
| 20 | 207.658 | — | | |

The asterisk (*) designates an aspherical surface which is rotationally symmetrical with respect to the optical axis.

TABLE 34

[VARIOUS DATA]

| | Infinite Photographic Position | Close-Distance(−0.70:1) Photographic Position |
|---|---|---|
| FNO. | 2.85 | 4.46 |
| f | 90.20 | |
| W | 21.1 | |
| Y | 34.85 | 34.85 |
| fB | 68.70 | 106.80 |
| L | 173.38 | 219.85 |
| d14 | 5.680 | 14.044 |

TABLE 35

[ASPHERICAL DATA]

| SURFACE NO. | K | A4 |
|---|---|---|
| 14 | 0.000 | 0.1516E-05 |

TABLE 36

[IMAGE-STABILIZING OPERATION DATA]

|  | Infinite Photographic Position | Close-Distance(-0.70:1) Photographic Position |
|---|---|---|
| f | 90.20 |  |
| LV | 1.00 | 1.00 |
| LI | -0.75 | -1.07 |

[Numerical Embodiment 10]

Figure 73:
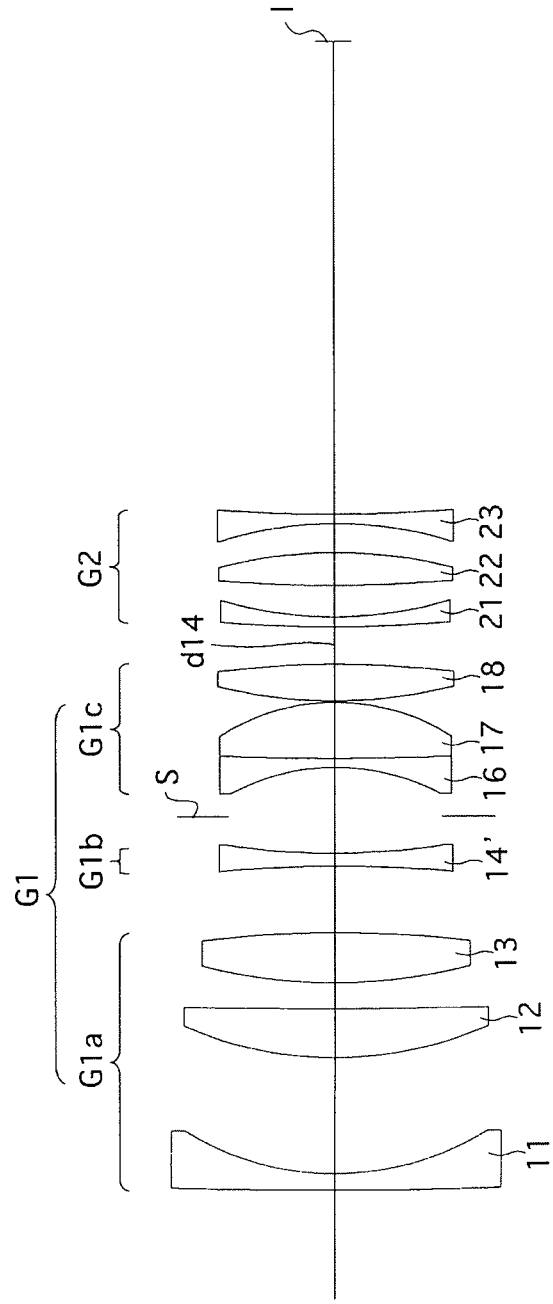
FIG. 73 shows a lens arrangement of a 10th numerical embodiment of a close-distance correcting lens system, according to the present invention, in a state where an image-stabilizing lens group is not decentered when focused on an object at infinity.
Figure 76:
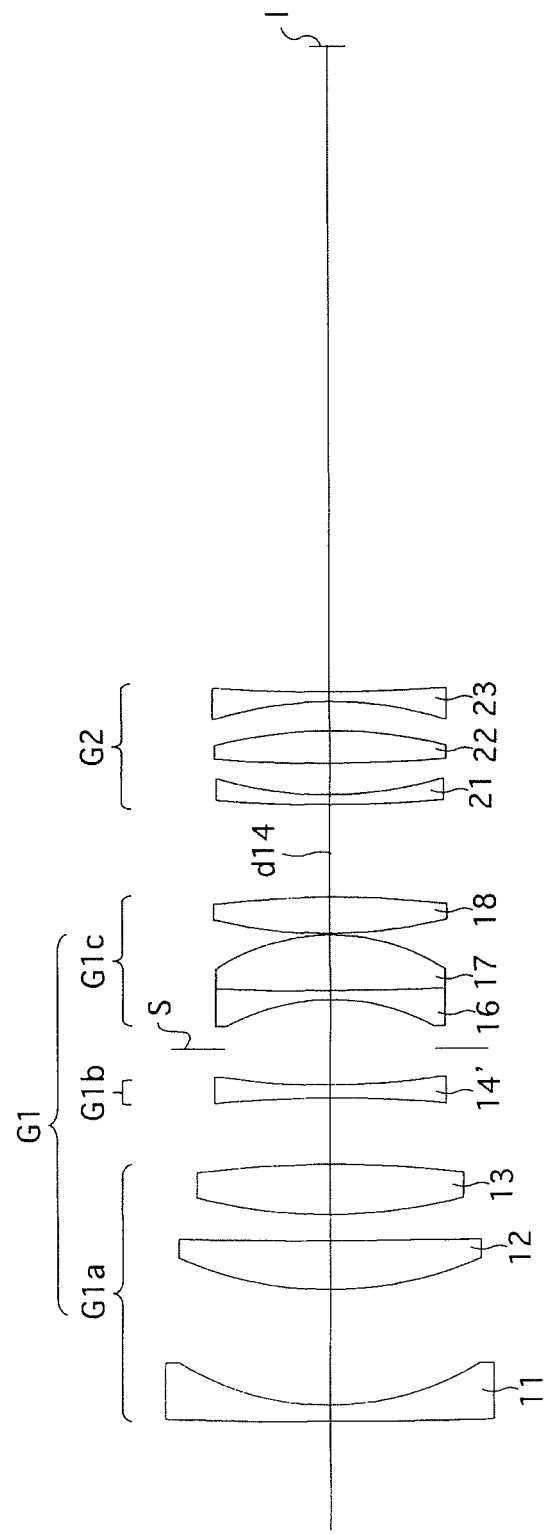
FIG. 76 shows a lens arrangement of the 10th numerical embodiment of a close-distance correcting lens system, according to the present invention, in a state where an image-stabilizing lens group is not decentered when focused on an object at a close distance.
Figure 79A:
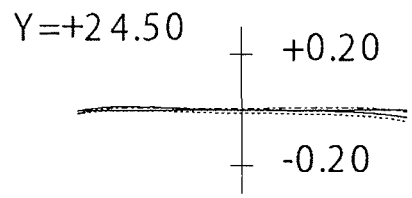
FIGS. 79A, 79B and 79C show lateral aberrations of the 10th numerical embodiment of a close-distance correcting lens system, according to the present invention, in a state where an image-stabilizing lens group is decentered when focused on an object at infinity.
Figure 79B:
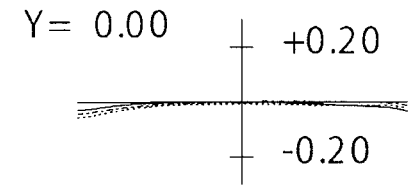
Figure 79C:
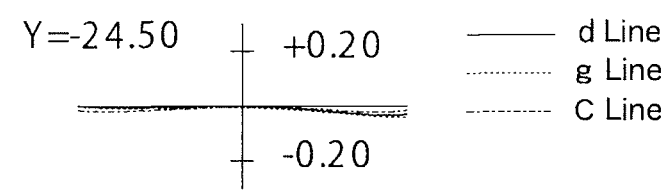
Figure 80A:
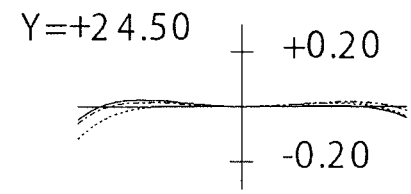
FIGS. 80A, 80B and 80C show lateral aberrations of the 10th numerical embodiment of a close-distance correcting lens system, according to the present invention, in a state where an image-stabilizing lens group is decentered when focused on an object at a close distance.
Figure 80B:
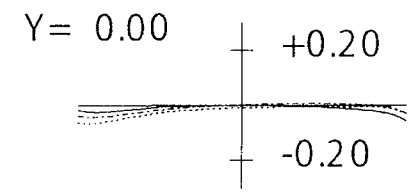
Figure 80C:
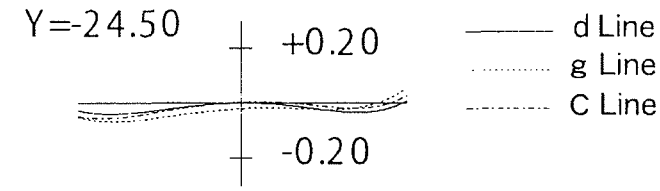

FIGS. 73 through 80C and Tables 37 through 40 show a tenth numerical embodiment of a close-distance correcting lens system according to the present invention. FIG. 73 shows a lens arrangement of the tenth numerical embodiment of the close-distance correcting lens system when focused on an image at infinity. FIGS. 74A, 74B, 74C and 74D show various aberrations that occurred in the lens arrangement shown in FIG. 73. FIGS. 75A, 75B and 75C show lateral aberrations that occurred in the lens arrangement shown in FIG. 73. FIG. 76 shows a lens arrangement of the tenth numerical embodiment of the close-distance correcting lens system when focused on an image at close-distance. FIGS. 77A, 77B, 77C and 77D show various aberrations that occurred in the lens arrangement shown in FIG. 76. FIGS. 78A, 78B and 78C show lateral aberrations that occurred in the lens arrangement shown in FIG. 76. FIGS. 79A, 79B and 79C show lateral aberrations that occurred when image-stabilizing operation is carried out when focused on an object at infinity. FIGS. 80A, 80B and 80C show lateral aberrations that occurred when image-stabilizing operation is carried out when focused on an object at a close distance. Table 37 shows the lens surface data, Table 38 shows various data, Table 39 shows aspherical data, and Table 40 shows image-stabilizing operation data.

The lens arrangement of the tenth numerical embodiment is the same as that of the eighth numerical embodiment except the following point (1).

(1) The single negative biconcave lens element 14' of the second sub lens group G1b is provided with an aspherical surface on the object side thereof.

TABLE 37

SURFACE DATA

| SURFACE NO. | r | d | N(d) | ν d |
|---|---|---|---|---|
| 1 | 801.150 | 2.500 | 1.66755 | 41.9 |
| 2 | 43.839 | 17.638 |  |  |
| 3 | 57.889 | 7.490 | 1.80610 | 33.3 |
| 4 | 1118.478 | 3.944 |  |  |
| 5 | 82.838 | 7.640 | 1.49700 | 81.6 |
| 6 | -171.499 | 10.144 |  |  |
| 7* | -197.079 | 2.000 | 1.56883 | 56.0 |
| 8 | 110.909 | 5.560 |  |  |
| 9 diaphragm | ∞ | 7.484 |  |  |
| 10 | -33.934 | 1.400 | 1.80518 | 25.5 |
| 11 | 447.167 | 8.500 | 1.49700 | 81.6 |
| 12 | -32.827 | 0.250 |  |  |
| 13 | 74.739 | 5.572 | 1.80101 | 40.9 |
| 14* | -133.789 | d14 |  |  |
| 15 | 210.515 | 1.500 | 1.76182 | 26.6 |

TABLE 37-continued

SURFACE DATA

| SURFACE NO. | r | d | N(d) | ν d |
|---|---|---|---|---|
| 16 | 61.029 | 4.786 |  |  |
| 17 | 210.371 | 4.990 | 1.80518 | 25.5 |
| 18 | -71.924 | 4.434 |  |  |
| 19 | -59.278 | 1.450 | 1.56732 | 42.8 |
| 20 | 235.864 | — |  |  |

The asterisk (*) designates an aspherical surface which is rotationally symmetrical with respect to the optical axis.

TABLE 38

[VARIOUS DATA]

|  | Infinite Photographic Position | Close-Distance(-0.50:1) Photographic Position |
|---|---|---|
| FNO. | 2.87 | 4.03 |
| f | 89.78 |  |
| W | 21.3 |  |
| Y | 34.85 | 34.85 |
| fB | 71.81 | 98.43 |
| L | 174.77 | 209.79 |
| d14 | 5.680 | 14.085 |

TABLE 39

[ASPHERICAL DATA]

| SURFACE NO. | K | A4 |
|---|---|---|
| 7 | 0.000 | 0.2067E-06 |
| 14 | 0.000 | 0.1399E-05 |

TABLE 40

[IMAGE-STABILIZING OPERATION DATA]

|  | Infinite Photographic Position | Close-Distance(-0.50:1) Photographic Position |
|---|---|---|
| f | 89.78 |  |
| LV | 1.00 | 1.00 |
| LI | -0.75 | -0.98 |

[Numerical Embodiment 11]

Figure 81:
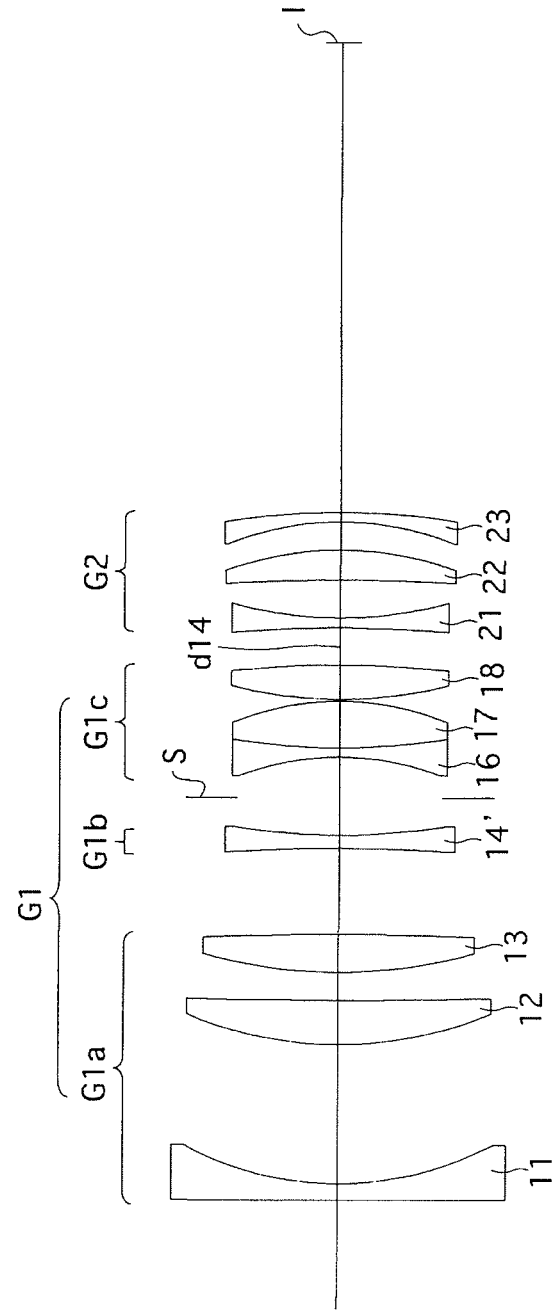
FIG. 81 shows a lens arrangement of a 11th numerical embodiment of a close-distance correcting lens system, according to the present invention, in a state where an image-stabilizing lens group is not decentered when focused on an object at infinity.
Figure 84:
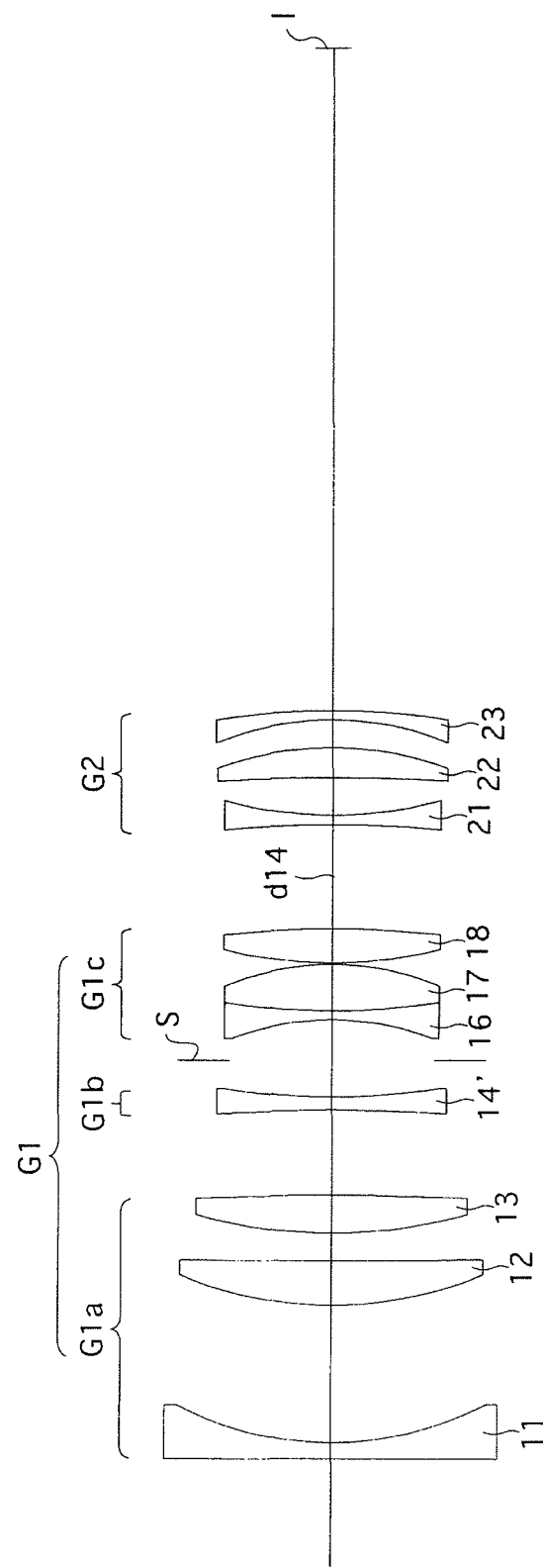
FIG. 84 shows a lens arrangement of the 11th numerical embodiment of a close-distance correcting lens system, according to the present invention, in a state where an image-stabilizing lens group is not decentered when focused on an object at a close distance.
Figure 87A:
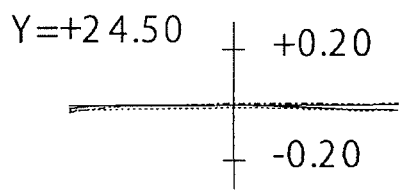
FIGS. 87A, 87B and 87C show lateral aberrations of the 11th numerical embodiment of a close-distance correcting lens system, according to the present invention, in a state where an image-stabilizing lens group is decentered when focused on an object at infinity.
Figure 87B:
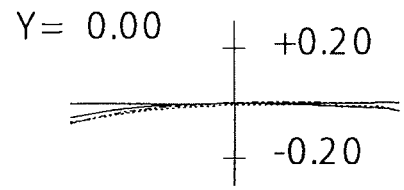
Figure 87C:
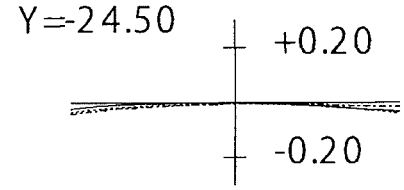
Figure 88A:
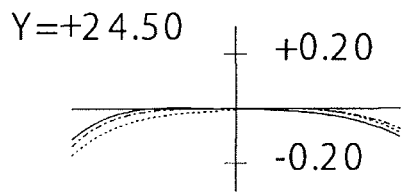
FIGS. 88A, 88B and 88C show lateral aberrations of the 11th numerical embodiment of a close-distance correcting lens system, according to the present invention, in a state where an image-stabilizing lens group is decentered when focused on an object at a close distance.
Figure 88B:
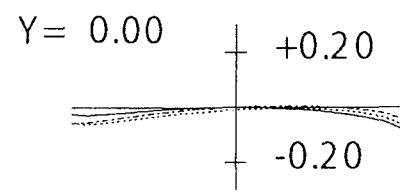
Figure 88C:
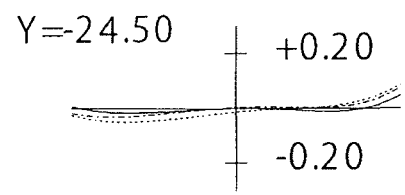

FIGS. 81 through 88C and Tables 41 through 44 show a 11th numerical embodiment of a close-distance correcting lens system according to the present invention. FIG. 81 shows a lens arrangement of the 11th numerical embodiment of the close-distance correcting lens system when focused on an image at infinity. FIGS. 82A, 82B, 82C and 82D show various aberrations that occurred in the lens arrangement shown in FIG. 81. FIGS. 83A, 83B and 83C show lateral aberrations that occurred in the lens arrangement shown in FIG. 81. FIG. 84 shows a lens arrangement of the 11th numerical embodiment of the close-distance correcting lens system when focused on an image at close-distance. FIGS. 85A, 85B, 85C and 85D show various aberrations that occurred in the lens arrangement shown in FIG. 84. FIGS. 86A, 86B and 86C show lateral aberrations that occurred in the lens arrangement shown in FIG. 84. FIGS. 87A, 87B and 87C show lateral aberrations that occurred when image-stabilizing operation is carried out when focused on an object at infinity. FIGS. 88A, 88B and 88C show lateral aberrations that occurred when image-stabilizing operation is carried out when focused on an object at a close distance. Table 41 shows the lens surface data, Table 42 shows various data, Table 43 shows aspherical data, and Table 44 shows image-stabilizing operation data.

The lens arrangement of the 11th numerical embodiment is the same as that of the ninth numerical embodiment except the following points (1) and (2).

(1) The positive lens element 22 of the second lens group G2 is configured of a positive meniscus lens element having a convex surface on the image side.

(2) The negative lens element 23 of the second lens group G2 is configured of a negative meniscus lens element having a convex surface on the image side.

TABLE 41

SURFACE DATA

| SURFACE NO. | r | d | N(d) | ν d |
|---|---|---|---|---|
| 1 | 6222.464 | 2.500 | 1.69680 | 55.5 |
| 2 | 51.279 | 21.250 | | |
| 3 | 61.446 | 6.790 | 1.80420 | 46.5 |
| 4 | 1046.985 | 4.300 | | |
| 5 | 78.658 | 5.790 | 1.59282 | 68.6 |
| 6 | −476.802 | 13.170 | | |
| 7 | −270.658 | 2.000 | 1.58913 | 61.2 |
| 8 | 99.474 | 5.710 | | |
| 9 diaphragm | ∞ | 6.250 | | |
| 10 | −43.405 | 1.400 | 1.76182 | 26.6 |
| 11 | 101.960 | 7.140 | 1.49700 | 81.6 |
| 12 | −43.751 | 0.250 | | |
| 13 | 67.056 | 5.290 | 1.80610 | 40.7 |
| 14* | −135.096 | d14 | | |
| 15 | −192.704 | 1.500 | 1.56732 | 42.8 |
| 16 | 63.121 | 5.760 | | |
| 17 | −310.957 | 4.620 | 1.80610 | 33.3 |
| 18 | −51.980 | 4.290 | | |
| 19 | −47.283 | 1.450 | 1.51742 | 52.2 |
| 20 | −116.387 | — | | |

The asterisk (*) designates an aspherical surface which is rotationally symmetrical with respect to the optical axis.

TABLE 42

[VARIOUS DATA]

| | Infinite Photographic Position | Close-Distance(−0.60:1) Photographic Position |
|---|---|---|
| FNO. | 2.88 | 4.27 |
| f | 89.49 | |
| W | 21.3 | |
| Y | 34.85 | 34.85 |
| fB | 71.60 | 101.79 |
| L | 176.74 | 217.27 |
| d14 | 5.680 | 16.017 |

TABLE 43

[ASPHERICAL DATA]

| SURFACE NO. | K | A4 |
|---|---|---|
| 14 | 0.000 | 0.1612E−05 |

TABLE 44

[IMAGE-STABILIZING OPERATION DATA]

| | Infinite Photographic Position | Close-Distance(−0.60:1) Photographic Position |
|---|---|---|
| f | 89.49 | |
| LV | 1.00 | 1.00 |
| LI | −0.75 | −1.03 |

[Numerical Embodiment 12]

Figure 89:
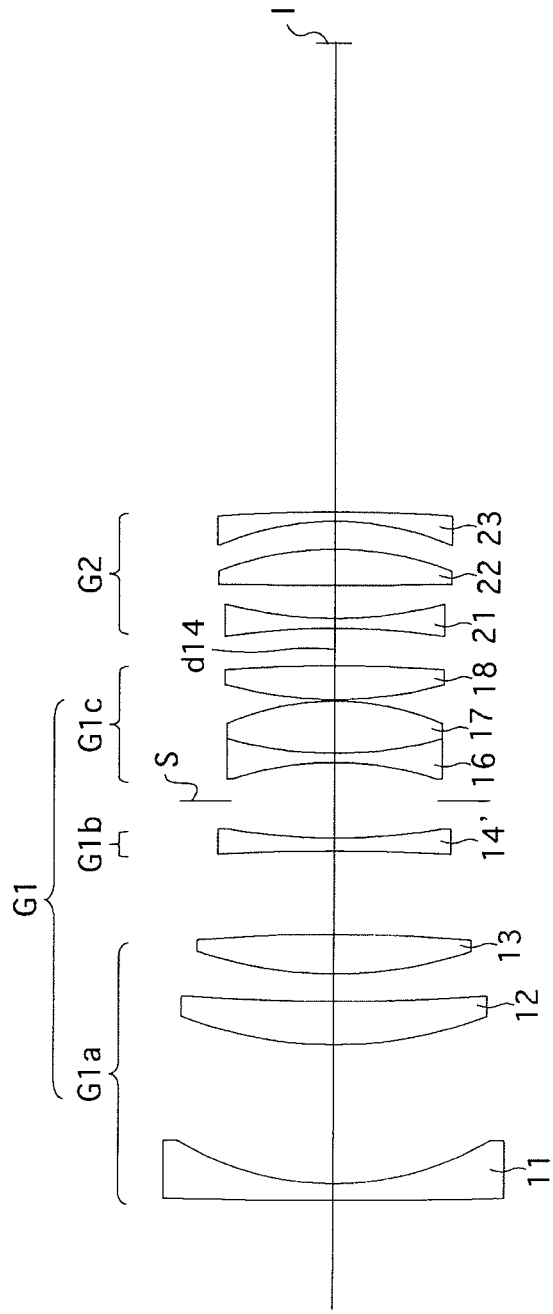
FIG. 89 shows a lens arrangement of a 12$^{th}$ numerical embodiment of a close-distance correcting lens system, according to the present invention, in a state where an image-stabilizing lens group is not decentered when focused on an object at infinity.
Figure 95A:
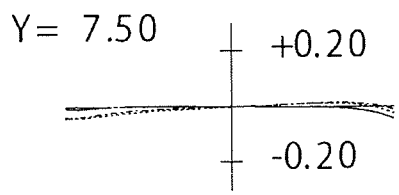
FIGS. 95A, 95B and 95C show lateral aberrations of the 12$^{th}$ numerical embodiment of a close-distance correcting lens system, according to the present invention, in a state where an image-stabilizing lens group is decentered when focused on an object at infinity.
Figure 95B:
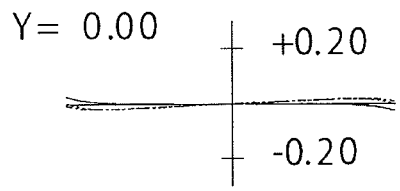
Figure 95C:
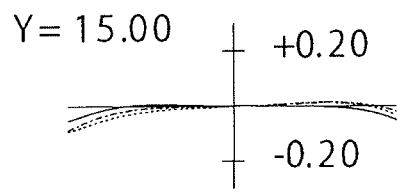
Figure 96A:
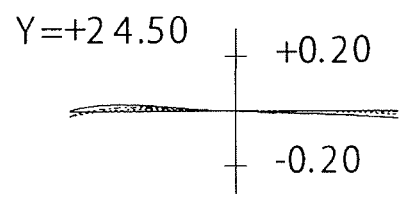
FIGS. 96A, 96B and 96C show lateral aberrations of the 12$^{th}$ numerical embodiment of a close-distance correcting lens system, according to the present invention, in a state where an image-stabilizing lens group is decentered when focused on an object at a close distance.
Figure 96B:
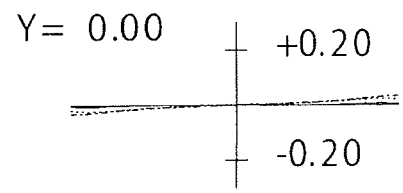
Figure 96C:
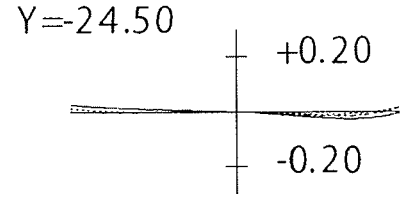

FIGS. 89 through 96C and Tables 45 through 48 show a 12th numerical embodiment of a close-distance correcting lens system according to the present invention. FIG. 89 shows a lens arrangement of the 12th numerical embodiment of the close-distance correcting lens system when focused on an image at infinity. FIGS. 90A, 90B, 90C and 90D show various aberrations that occurred in the lens arrangement shown in FIG. 89. FIGS. 91A, 91B and 91C show lateral aberrations that occurred in the lens arrangement shown in FIG. 89. FIG. 92 shows a lens arrangement of the 12th numerical embodiment of the close-distance correcting lens system when focused on an image at close-distance. FIGS. 93A, 93B, 93C and 93D show various aberrations that occurred in the lens arrangement shown in FIG. 92. FIGS. 94A, 94B and 94C show lateral aberrations that occurred in the lens arrangement shown in FIG. 92. FIGS. 95A, 95B and 95C show lateral aberrations that occurred when image-stabilizing operation is carried out when focused on an object at infinity. FIGS. 96A, 96B and 96C show lateral aberrations that occurred when image-stabilizing operation is carried out when focused on an object at a close distance. Table 45 shows the lens surface data, Table 46 shows various data, Table 47 shows aspherical data, and Table 48 shows image-stabilizing operation data.

The lens arrangement of the 12th numerical embodiment is the same as that of the ninth numerical embodiment except the following point (1).

(1) The negative lens element 23 of the second lens group G2 is configured of a negative meniscus lens element having a convex surface on the image side.

TABLE 45

SURFACE DATA

| SURFACE NO. | r | d | N(d) | ν d |
|---|---|---|---|---|
| 1 | 1351.161 | 2.500 | 1.63854 | 55.5 |
| 2 | 47.061 | 21.200 | | |
| 3 | 65.007 | 6.650 | 1.80420 | 46.5 |
| 4 | 334.047 | 4.210 | | |
| 5 | 65.288 | 6.010 | 1.59282 | 68.6 |
| 6 | −259.126 | 12.780 | | |
| 7 | −319.084 | 2.000 | 1.61800 | 63.4 |
| 8 | 99.906 | 5.690 | | |
| 9 diaphragm | ∞ | 5.850 | | |
| 10 | −49.185 | 1.400 | 1.80610 | 33.3 |
| 11 | 60.987 | 7.990 | 1.49700 | 81.6 |
| 12 | −40.930 | 0.250 | | |
| 13 | 61.777 | 5.180 | 1.80139 | 45.5 |
| 14* | −191.077 | d14 | | |
| 15 | −114.378 | 1.500 | 1.54814 | 45.8 |
| 16 | 63.756 | 5.080 | | |
| 17 | 911.791 | 5.510 | 1.80420 | 46.5 |
| 18 | −49.104 | 4.220 | | |
| 19 | −45.079 | 1.450 | 1.48749 | 70.4 |
| 20 | −267.360 | — | | |

The asterisk (*) designates an aspherical surface which is rotationally symmetrical with respect to the optical axis.

TABLE 46

[VARIOUS DATA]

|  | Infinite Photographic Position | Close-Distance(−0.50:1) Photographic Position |
|---|---|---|
| FNO. | 2.88 | 4.07 |
| f | 88.55 | |
| W | 21.6 | |
| Y | 34.85 | 34.85 |
| fB | 71.71 | 99.08 |
| L | 176.86 | 212.41 |
| d14 | 5.680 | 13.857 |

TABLE 47

[ASPHERICAL DATA]

| SURFACE NO. | K | A4 |
|---|---|---|
| 14 | 0.000 | 0.1013E−05 |

TABLE 48

[IMAGE-STABILIZING OPERATION DATA]

|  | Infinite Photographic Position | Close-Distance(−0.50:1) Photographic Position |
|---|---|---|
| f | 88.55 | |
| LV | 1.00 | 1.00 |
| LI | −0.75 | −1.03 |

[Numerical Embodiment 13]

Figure 98:
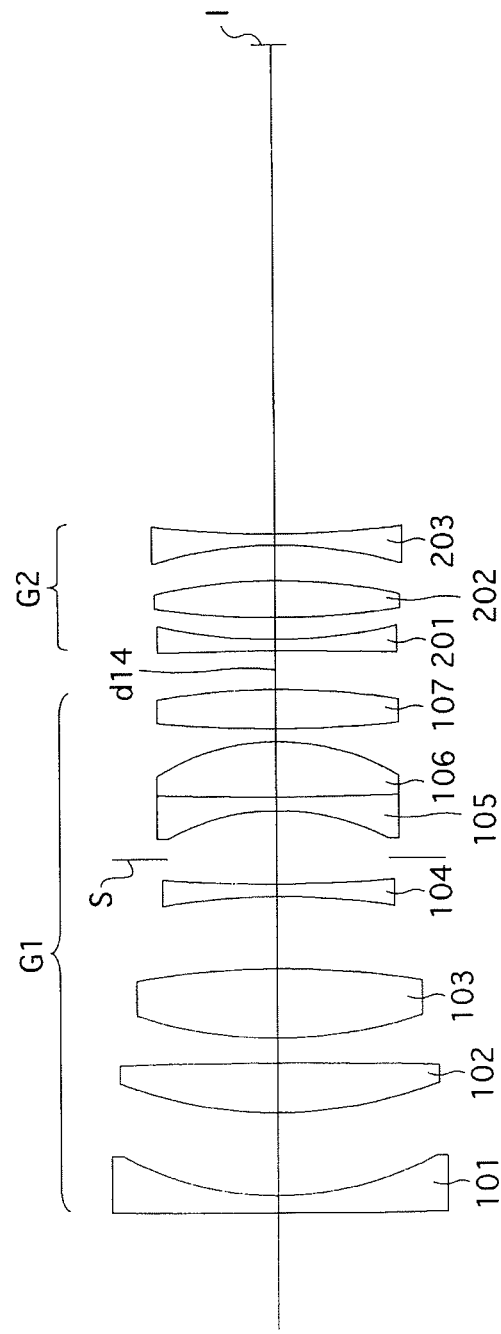
FIG. 98 shows a 13$^{th}$ numerical embodiment of a close-distance correcting lens system, according to the present invention, when focused on an object at infinity.
Figure 101:
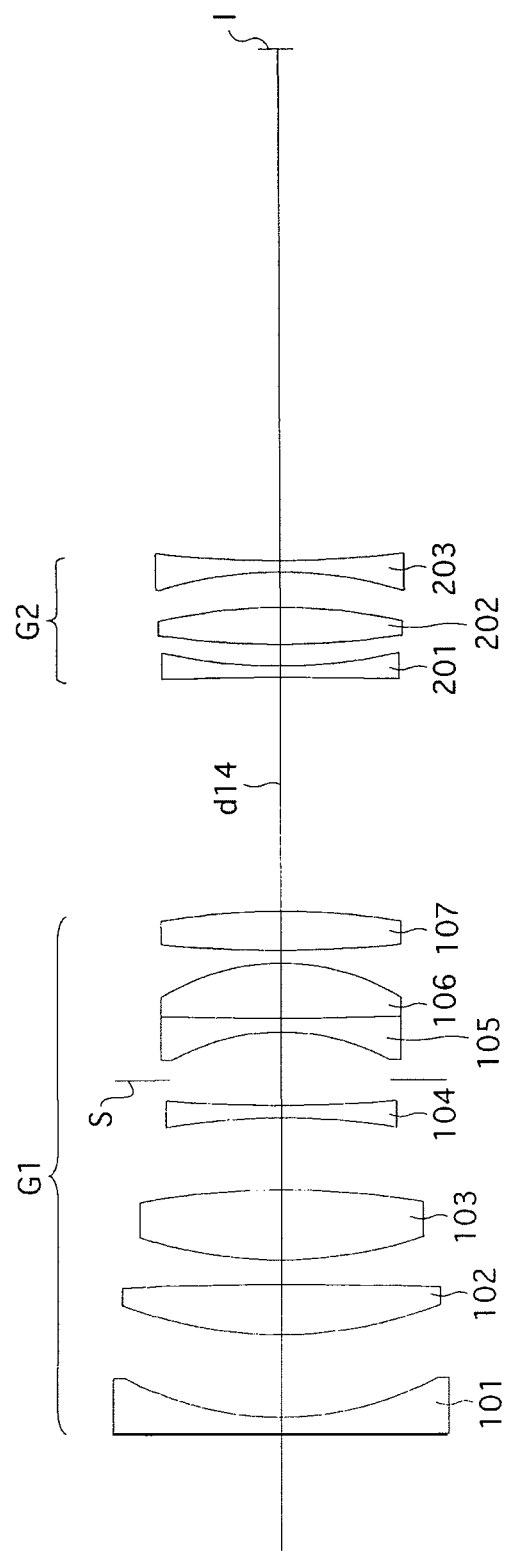
FIG. 101 shows a lens arrangement of the 13$^{th}$ numerical embodiment of a close-distance correcting lens system, according to the present invention, when focused on an object at a close distance.

FIGS. 98 through 103C and Tables 49 through 51 show a 13th numerical embodiment of a close-distance correcting lens system according to the present invention. FIG. 98 shows a lens arrangement of the 13th numerical embodiment of the close-distance correcting lens system when focused on an image at infinity. FIGS. 99A, 99B, 99C and 99D show various aberrations that occurred in the lens arrangement shown in FIG. 98. FIGS. 100A, 100B and 100C show lateral aberrations that occurred in the lens arrangement shown in FIG. 98. FIG. 101 shows a lens arrangement of the 13th numerical embodiment of the close-distance correcting lens system when focused on an image at close-distance. FIGS. 102A, 102B, 102C and 102D show various aberrations that occurred in the lens arrangement shown in FIG. 101. FIGS. 103A, 103B and 103C show lateral aberrations that occurred in the lens arrangement shown in FIG. 101. Table 49 shows the lens surface data, Table 50 shows various data and Table 51 shows aspherical data.

The close-distance correcting lens system of the 13$^{th}$ embodiment is configured of a positive first lens group G1 and a negative second lens group G2, in that order from the object side.

The first lens group G1 is configured of a negative meniscus lens element having a convex surface on the object side (a negative lens having a concave surface on the image side) 101, a biconvex lens element 102, a biconvex lens element 103, a biconcave lens element 104, a diaphragm S, a cemented lens having a biconcave lens element 105 and a biconvex lens element 106, and a biconvex lens element 107, in that order from the object side. The biconvex lens element 107 is provided with an aspherical surface on the image side thereof.

The second lens group G2 is configured of a negative biconcave lens element 201 (a negative lens element having a concave surface on the image side), a biconvex lens element 202 and a negative biconcave lens element (a negative lens element having a concave surface on the object side) 203, in that order from the object side.

The first lens group G1 and the second lens group G2 move toward the object side by different moving amounts, respectively, when focusing on an object at infinity to a close-distance. The moving amount of the first lens group G1 to the object side is larger than that of the second lens group G2.

TABLE 49

SURFACE DATA

| SURFACE NO. | r | d | N(d) | ν d |
|---|---|---|---|---|
| 1 | 1977.748 | 2.500 | 1.80610 | 40.7 |
| 2 | 47.374 | 11.870 | | |
| 3 | 64.269 | 7.090 | 1.80610 | 33.3 |
| 4 | −893.056 | 3.580 | | |
| 5 | 66.415 | 10.000 | 1.49700 | 81.6 |
| 6 | −121.009 | 10.330 | | |
| 7 | −101.977 | 1.800 | 1.62004 | 36.3 |
| 8 | 206.839 | 3.670 | | |
| 9 diaphragm | ∞ | 6.870 | | |
| 10 | −32.907 | 2.000 | 1.67270 | 32.2 |
| 11 | 716.307 | 7.880 | 1.49700 | 81.6 |
| 12 | −33.126 | 1.840 | | |
| 13 | 176.357 | 5.650 | 1.80139 | 45.5 |
| 14* | −98.056 | d14 | | |
| 15 | −602.490 | 1.650 | 1.51742 | 52.2 |
| 16 | 78.473 | 3.120 | | |
| 17 | 119.015 | 5.320 | 1.80450 | 39.6 |
| 18 | −78.728 | 5.050 | | |
| 19 | −61.010 | 1.650 | 1.59551 | 39.2 |
| 20 | 149.789 | — | | |

The asterisk (*) designates an aspherical surface which is rotationally symmetrical with respect to the optical axis.

TABLE 50

[VARIOUS DATA]

|  | Infinite Photographic Position | Close-Distance(−0.50:1) Photographic Position |
|---|---|---|
| FNO. | 2.88 | 3.95 |
| f | 90.04 | |
| W | 21.2 | |
| Y | 34.85 | 34.85 |
| fB | 69.86 | 73.14 |
| L | 167.23 | 198.46 |
| d14 | 5.500 | 33.457 |

TABLE 51

[ASPHERICAL DATA]

| SURFACE NO. | K | A4 | A6 |
|---|---|---|---|
| 14 | 0.000 | 0.9099E−06 | 0.2694E−09 |

[Numerical Embodiment 14]

Figure 107:
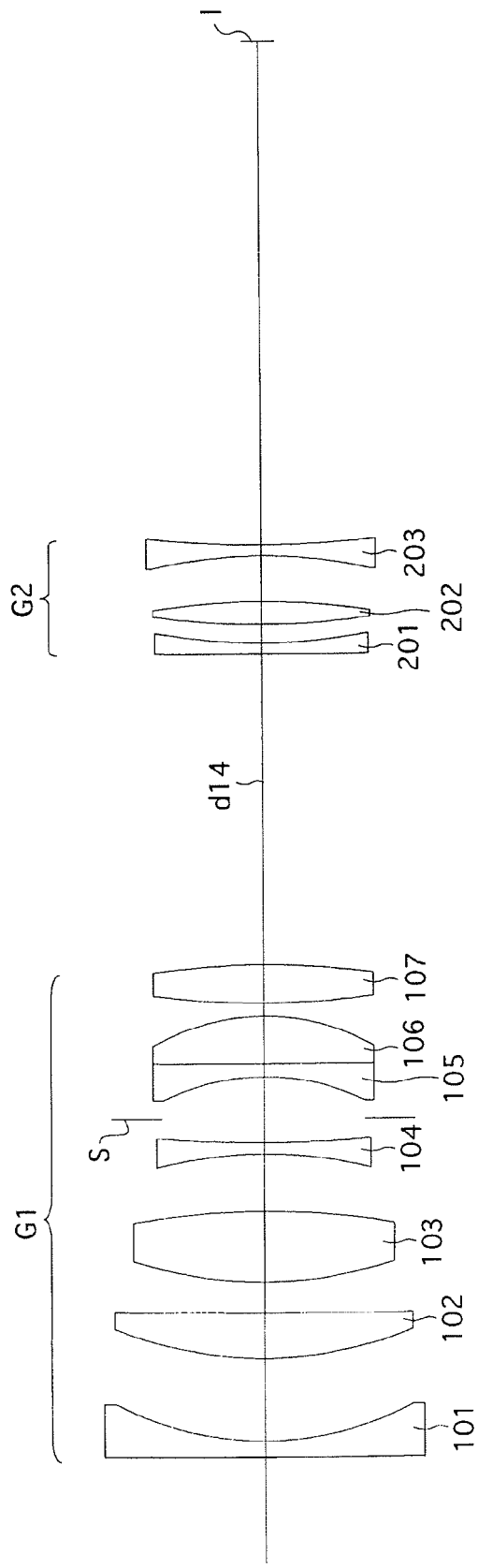
FIG. 107 shows a lens arrangement of the 14$^{th}$ numerical embodiment of a close-distance correcting lens system, according to the present invention, when focused on an object at a close distance.

FIGS. 104 through 109C and Tables 52 through 54 show a 14th numerical embodiment of a close-distance correcting lens system according to the present invention. FIG. 104 shows a lens arrangement of the 14th numerical embodiment of the close-distance correcting lens system when focused on an image at infinity. FIGS. 105A, 105B, 105C and 105D show various aberrations that occurred in the lens arrangement shown in FIG. 104. FIGS. 106A, 106B and 106C show lateral aberrations that occurred in the lens arrangement shown in FIG. 104. FIG. 107 shows a lens arrangement of the 14th numerical embodiment of the close-distance correcting lens system when focused on an image at close-distance. FIGS. 108A, 108B, 108C and 108D show various aberrations that occurred in the lens arrangement shown in FIG. 107. FIGS. 109A, 109B and 109C show lateral aberrations that occurred in the lens arrangement shown in FIG. 107. Table 52 shows the lens surface data, Table 53 shows various data and Table 54 shows aspherical data.

The lens arrangement of the 14th numerical embodiment is the same as that of the 13th numerical embodiment except the following points (1) and (2).

(1) The positive lens element 102 of the first lens group G1 is configured of a positive meniscus lens element having a convex surface on the object side.

Figure 110:
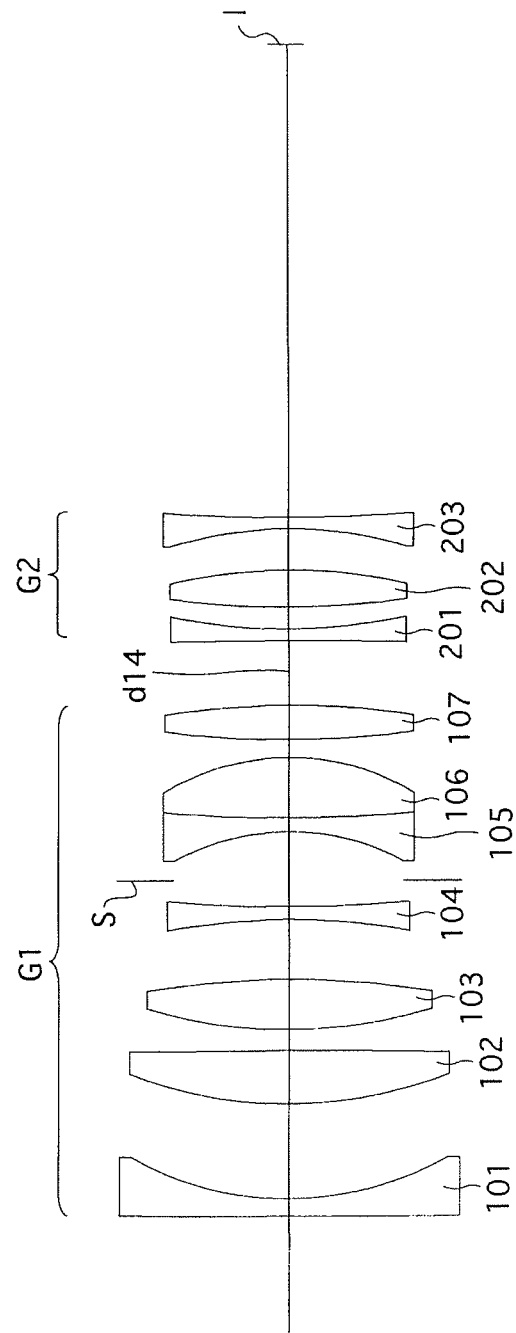
FIG. 110 shows a 15$^{th}$ numerical embodiment of a close-distance correcting lens system, according to the present invention, when focused on an object at infinity.
Figures 111A, 111B, 111C, 111D:
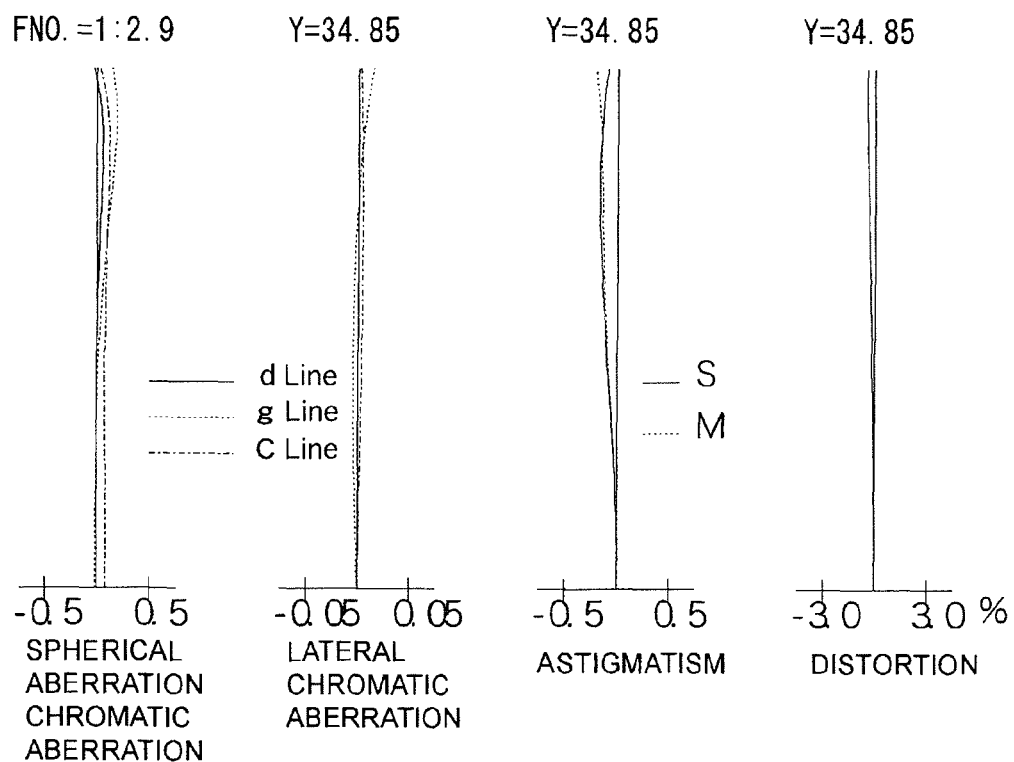
FIGS. 111A, 111B, 111C and 111D show various aberrations that occurred in the lens arrangement shown in FIG. 110.
Figure 112A:
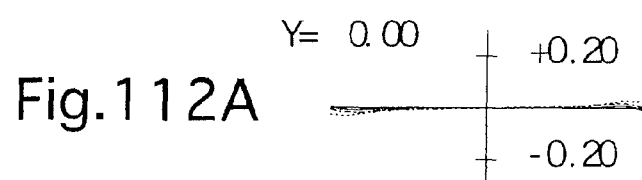
FIGS. 112A, 112B and 112C show lateral aberrations that occurred in the lens arrangement shown in FIG. 110.
Figure 112B:
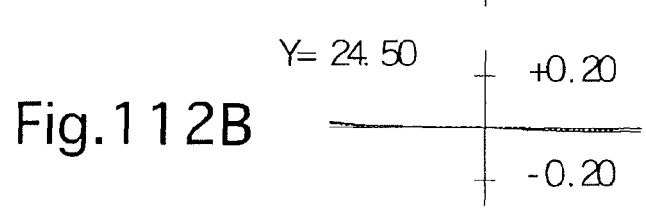
Figure 112C:
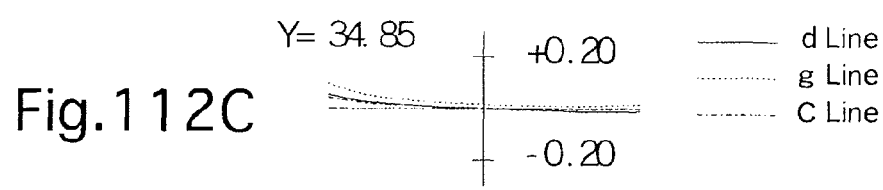

(2) The negative lens element (a negative lens element having a concave surface on the image side) 201 of the second lens group G2 is configured of a negative meniscus lens element having a convex surface on the object side.

lens system according to the present invention. FIG. 110 shows a lens arrangement of the 15th numerical embodiment of the close-distance correcting lens system when focused on an image at infinity. FIGS. 111A, 111B, 111C and 111D show various aberrations that occurred in the lens arrangement shown in FIG. 110. FIGS. 112A, 112B and 112C show lateral aberrations that occurred in the lens arrangement shown in FIG. 110. FIG. 113 shows a lens arrangement of the 15th numerical embodiment of the close-distance correcting lens system when focused on an image at a close-distance. FIGS. 114A, 114B, 114C and 114D show various aberrations that occurred in the lens arrangement shown in FIG. 113. FIGS. 115A, 115B and 115C show lateral aberrations that occurred in the lens arrangement shown in FIG. 113. Table 55 shows the lens surface data, Table 56 shows various data and Table 57 shows aspherical data.

The lens arrangement of the 15th numerical embodiment is the same as that of the 13th numerical embodiment.

TABLE 52

SURFACE DATA

| SURFACE NO. | r | d | N(d) | νd |
|---|---|---|---|---|
| 1 | 1977.151 | 2.500 | 1.74400 | 44.9 |
| 2 | 49.169 | 13.030 | | |
| 3 | 60.871 | 7.120 | 1.80450 | 39.6 |
| 4 | 1681.316 | 4.890 | | |
| 5 | 66.120 | 10.980 | 1.48749 | 70.4 |
| 6 | −118.685 | 8.950 | | |
| 7 | −67.315 | 1.800 | 1.56732 | 42.8 |
| 8 | 197.923 | 3.790 | | |
| 9 diaphragm | ∞ | 6.540 | | |
| 10 | −35.792 | 2.000 | 1.64769 | 33.8 |
| 11 | 1710.229 | 7.520 | 1.49700 | 81.6 |
| 12 | −34.240 | 2.050 | | |
| 13 | 126.928 | 6.000 | 1.69350 | 53.2 |
| 14* | −112.336 | d14 | | |
| 15 | 4344.585 | 1.650 | 1.54814 | 45.8 |
| 16 | 85.211 | 2.940 | | |
| 17 | 116.847 | 3.620 | 1.83400 | 37.3 |
| 18 | −103.779 | 7.170 | | |
| 19 | −73.685 | 1.650 | 1.62004 | 36.3 |
| 20 | 153.595 | — | | |

The asterisk (*) designates an aspherical surface which is rotationally symmetrical with respect to the optical axis.

TABLE 53

[VARIOUS DATA]

| | Infinite Photographic Position | Close-Distance(−0.75:1) Photographic Position |
|---|---|---|
| FNO. | 2.88 | 4.67 |
| f | 90.52 | |
| W | 21.2 | |
| Y | 34.85 | 34.85 |
| fB | 67.40 | 78.52 |
| L | 167.10 | 221.36 |
| d14 | 5.500 | 48.640 |

TABLE 54

[ASPHERICAL DATA]

| SURFACE NO. | K | A4 | A6 |
|---|---|---|---|
| 14 | 0.000 | 0.1091E−05 | 0.3256E−09 |

TABLE 55

SURFACE DATA

| SURFACE NO. | r | d | N(d) | νd |
|---|---|---|---|---|
| 1 | 2000.000 | 2.500 | 1.74330 | 49.2 |
| 2 | 46.299 | 13.572 | | |
| 3 | 62.822 | 7.666 | 1.83400 | 37.3 |
| 4 | −1465.488 | 3.020 | | |
| 5 | 71.409 | 7.181 | 1.49700 | 81.6 |
| 6 | −125.149 | 8.610 | | |
| 7 | −96.328 | 1.800 | 1.64769 | 33.8 |
| 8 | 188.921 | 3.791 | | |
| 9 diaphragm | ∞ | 6.967 | | |
| 10 | −34.872 | 2.000 | 1.62004 | 36.3 |
| 11 | 204.907 | 8.635 | 1.49700 | 81.6 |
| 12 | −34.890 | 2.581 | | |
| 13 | 141.154 | 4.958 | 1.69350 | 53.2 |
| 14* | −104.307 | d14 | | |
| 15 | −560.621 | 1.650 | 1.58144 | 40.9 |
| 16 | 82.691 | 3.097 | | |
| 17 | 124.997 | 5.295 | 1.80610 | 33.3 |
| 18 | −75.920 | 5.914 | | |
| 19 | −59.080 | 1.650 | 1.63980 | 34.6 |
| 20 | 251.608 | — | | |

The asterisk (*) designates an aspherical surface which is rotationally symmetrical with respect to the optical axis.

TABLE 56

[VARIOUS DATA]

| | Infinite Photographic Position | Close-Distance(−0.75:1) Photographic Position |
|---|---|---|
| FNO. | 2.88 | 4.54 |
| f | 90.38 | |
| W | 21.2 | |
| Y | 34.85 | 34.85 |
| fB | 67.44 | 82.26 |
| L | 167.59 | 216.81 |
| d14 | 9.260 | 43.664 |

TABLE 57

[ASPHERICAL DATA]

| SURFACE NO. | K | A4 | A6 |
|---|---|---|---|
| 14 | 0.000 | 0.1048E−05 | 0.3393E−09 |

[Numerical Embodiment 15]

FIGS. 110 through 115C and Tables 55 through 57 show a 15th numerical embodiment of a close-distance correcting

[Numerical Embodiment 16]

Figure 116:
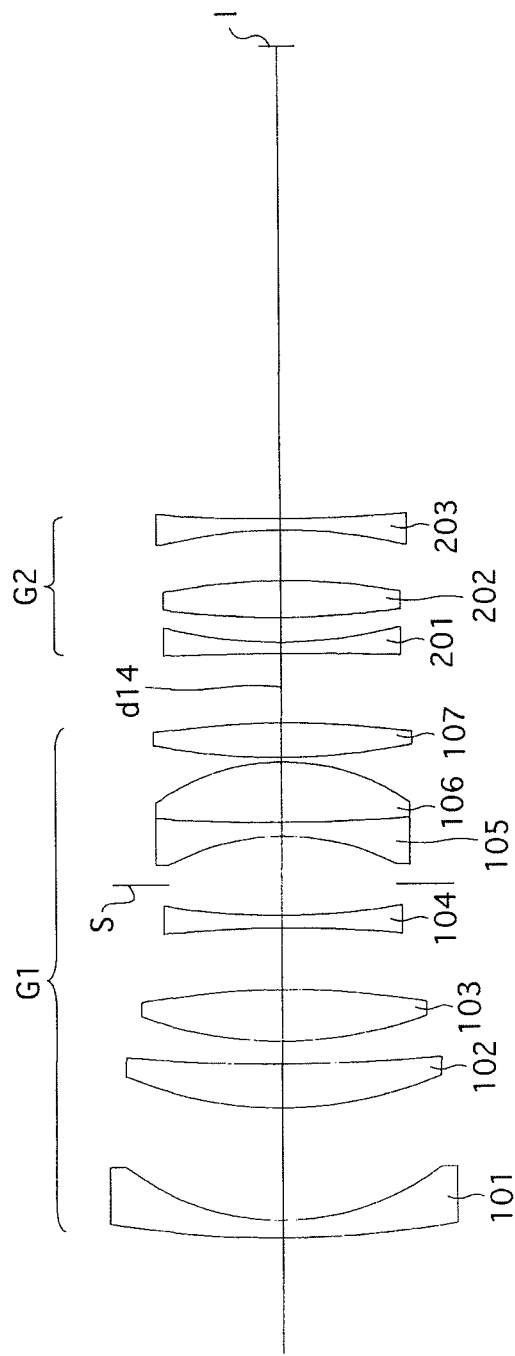
FIG. 116 shows a 16$^{th}$ numerical embodiment of a close-distance correcting lens system, according to the present invention, when focused on an object at infinity.
Figure 119:
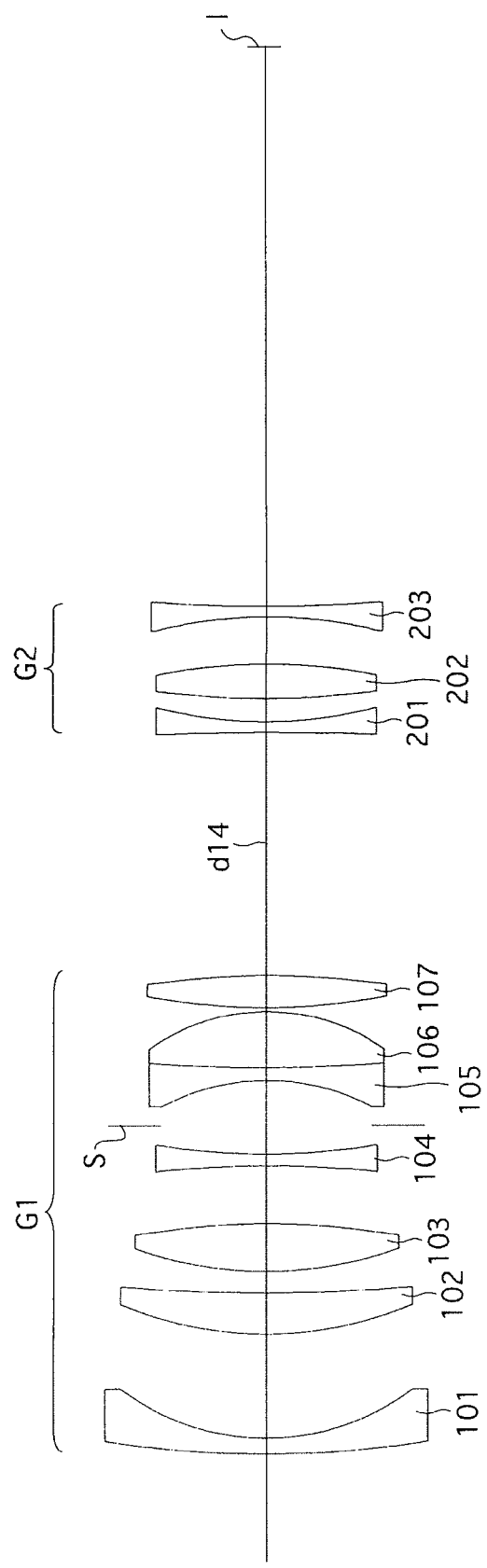
Figures 120A, 120B, 120C, 120D:
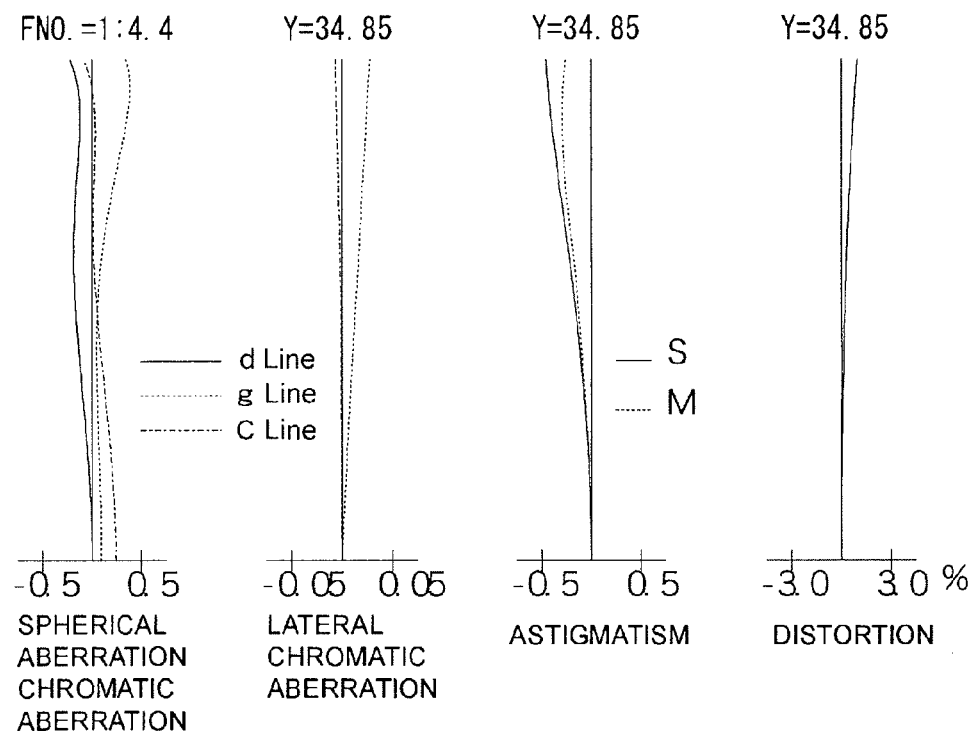
Figure 121A:
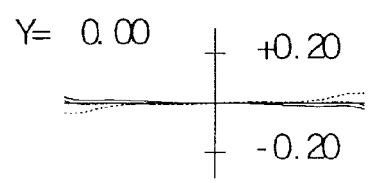
Figure 121B:
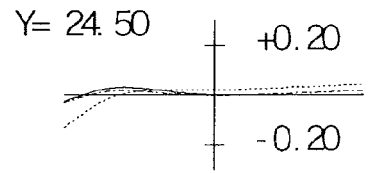
Figure 121C:
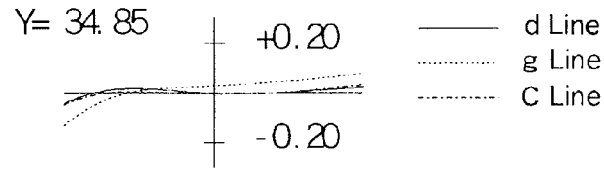

FIGS. 116 through 121C and Tables 58 through 60 show a 16th numerical embodiment of a close-distance correcting lens system according to the present invention. FIG. 116 shows a lens arrangement of the 16th numerical embodiment of the close-distance correcting lens system when focused on an image at infinity. FIGS. 117A, 117B, 117C and 117D show various aberrations that occurred in the lens arrangement shown in FIG. 116. FIGS. 118A, 118B and 118C show lateral aberrations that occurred in the lens arrangement shown in FIG. 116. FIG. 119 shows a lens arrangement of the 16th numerical embodiment of the close-distance correcting lens system when focused on an image at a close-distance. FIGS. 120A, 120B, 120C and 120D show various aberrations that occurred in the lens arrangement shown in FIG. 119. FIGS. 121A, 121B and 121C show lateral aberrations that occurred in the lens arrangement shown in FIG. 119. Table 58 shows the lens surface data, Table 59 shows various data and Table 60 shows aspherical data.

The lens arrangement of the 16th numerical embodiment is the same as that of the 13$^{th}$ numerical embodiment except the following point (1).

(1) The positive lens element 102 of the first lens group G1 is configured of a positive meniscus lens element having a convex surface on the object side.

TABLE 58

SURFACE DATA

| SURFACE NO. | r | d | N(d) | νd |
|---|---|---|---|---|
| 1 | 155.398 | 2.500 | 1.70154 | 41.2 |
| 2 | 37.772 | 16.030 | | |
| 3 | 57.814 | 6.310 | 1.80518 | 25.5 |
| 4 | 282.286 | 3.270 | | |
| 5 | 60.821 | 7.410 | 1.49700 | 81.6 |
| 6 | −115.678 | 8.870 | | |
| 7 | −169.067 | 1.800 | 1.80518 | 25.5 |
| 8 | 106.362 | 4.370 | | |
| 9 diaphragm | ∞ | 6.960 | | |
| 10 | −34.513 | 2.000 | 1.74950 | 35.0 |
| 11 | 274.491 | 8.640 | 1.49700 | 81.6 |
| 12 | −31.492 | 0.630 | | |
| 13 | 97.553 | 4.960 | 1.80139 | 45.5 |
| 14* | −115.663 | d14 | | |
| 15 | −615.431 | 1.650 | 1.51742 | 52.2 |
| 16 | 66.861 | 3.560 | | |
| 17 | 126.336 | 5.300 | 1.80610 | 33.3 |
| 18 | −87.112 | 7.240 | | |
| 19 | −70.372 | 1.650 | 1.67270 | 32.2 |
| 20 | 244.535 | — | | |

The asterisk (*) designates an aspherical surface which is rotationally symmetrical with respect to the optical axis.

TABLE 59

[VARIOUS DATA]

| | Infinite Photographic Position | Close-Distance(−0.75:1) Photographic Position |
|---|---|---|
| FNO. | 2.88 | 4.43 |
| f | 89.37 | |
| W | 21.3 | |
| Y | 34.85 | 34.85 |
| fB | 67.45 | 85.93 |
| L | 170.49 | 216.46 |
| d14 | 9.890 | 37.382 |

TABLE 60

[ASPHERICAL DATA]

| SURFACE N | K | A4 | A6 |
|---|---|---|---|
| 14 | 0.000 | 0.9759E−06 | 0.2538E−09 |

[Numerical Embodiment 17]

Figure 122:
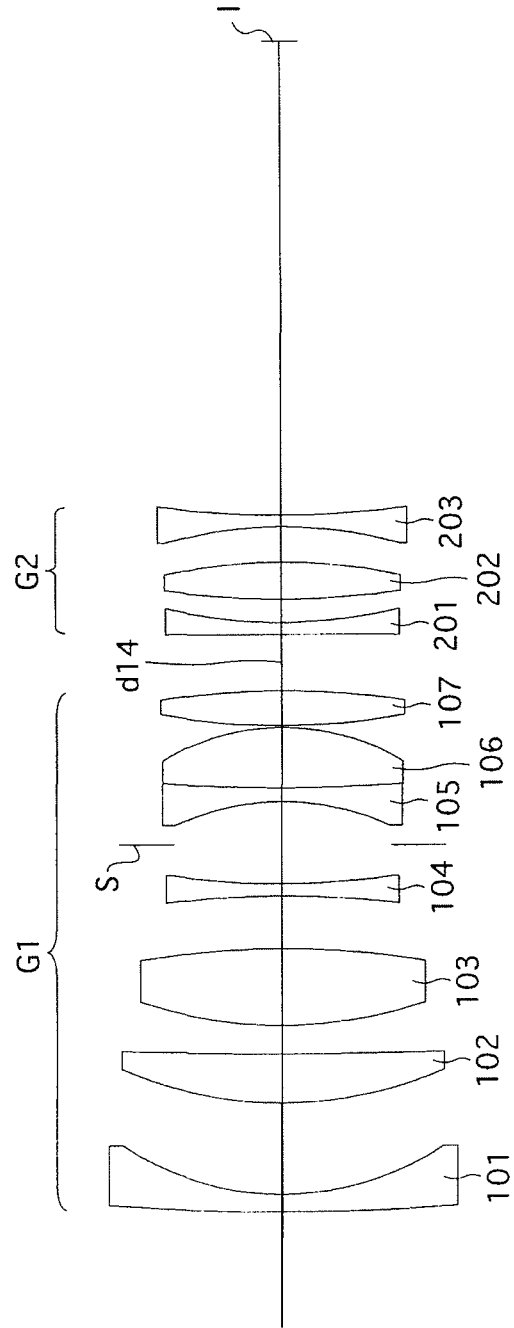

FIGS. 122 through 127C and Tables 61 through 63 show a 17th numerical embodiment of a close-distance correcting lens system according to the present invention. FIG. 122 shows a lens arrangement of the 17th numerical embodiment of the close-distance correcting lens system when focused on an image at infinity. FIGS. 123A, 123B, 123C and 123D show various aberrations that occurred in the lens arrangement shown in FIG. 122. FIGS. 124A, 124B and 124C show lateral aberrations that occurred in the lens arrangement shown in FIG. 122. FIG. 125 shows a lens arrangement of the 17th numerical embodiment of the close-distance correcting lens system when focused on an image at a close-distance. FIGS. 126A, 126B, 126C and 126D show various aberrations that occurred in the lens arrangement shown in FIG. 125. FIGS. 127A, 127B and 127C show lateral aberrations that occurred in the lens arrangement shown in FIG. 125. Table 61 shows the lens surface data, Table 62 shows various data and Table 63 shows aspherical data.

The lens arrangement of the 17th numerical embodiment is the same as that of the 16th numerical embodiment.

TABLE 61

SURFACE DATA

| SURFACE NO. | r | d | N(d) | νd |
|---|---|---|---|---|
| 1 | 350.638 | 2.500 | 1.71300 | 53.9 |
| 2 | 41.817 | 13.010 | | |
| 3 | 58.203 | 7.060 | 1.83400 | 37.3 |
| 4 | 782.988 | 4.080 | | |
| 5 | 64.861 | 11.000 | 1.49700 | 81.6 |
| 6 | −121.379 | 7.520 | | |
| 7 | −139.008 | 1.800 | 1.69895 | 30.0 |
| 8 | 113.364 | 5.490 | | |
| 9 diaphragm | ∞ | 6.260 | | |
| 10 | −36.570 | 2.000 | 1.80610 | 33.3 |
| 11 | 269.178 | 8.640 | 1.49700 | 81.6 |
| 12 | −33.267 | 0.250 | | |
| 13 | 99.829 | 4.960 | 1.80101 | 40.9 |
| 14* | −110.071 | d14 | | |
| 15 | −1728.669 | 1.650 | 1.54814 | 45.8 |
| 16 | 70.447 | 3.340 | | |
| 17 | 118.910 | 5.300 | 1.83400 | 37.3 |
| 18 | −78.477 | 5.090 | | |
| 19 | −60.343 | 1.650 | 1.59551 | 39.2 |
| 20 | 138.948 | — | | |

The asterisk (*) designates an aspherical surface which is rotationally symmetrical with respect to the optical axis.

TABLE 62

[VARIOUS DATA]

| | Infinite Photographic Position | Close-Distance(−0.75:1) Photographic Position |
|---|---|---|
| FNO. | 2.88 | 4.58 |
| f | 89.99 | |
| W | 21.2 | |
| Y | 34.85 | 34.85 |
| fB | 67.78 | 87.57 |
| L | 167.48 | 216.70 |
| d14 | 8.100 | 37.532 |

TABLE 63

[ASPHERICAL DATA]

| SURFACE NO. | K | A4 | A6 |
|---|---|---|---|
| 14 | 0.000 | 0.9125E−06 | 0.2098E−09 |

[Numerical Embodiment 18]

Figure 128:
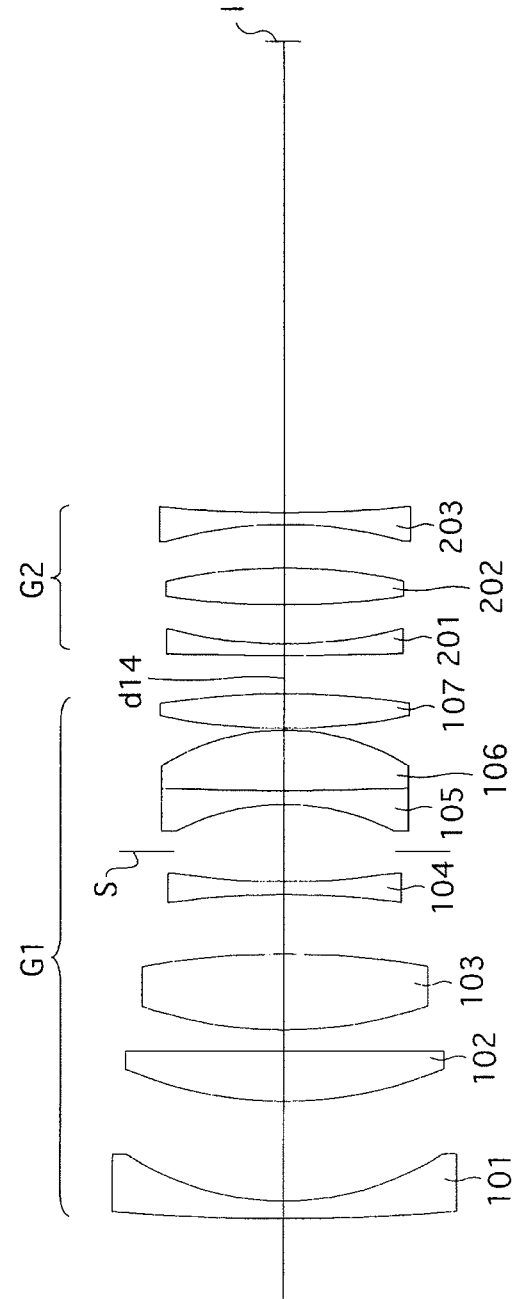

FIGS. 128 through 133C and Tables 64 through 66 show an 18th numerical embodiment of a close-distance correcting lens system according to the present invention. FIG. 128 shows a lens arrangement of the 18th numerical embodiment of the close-distance correcting lens system when focused on an image at infinity. FIGS. 129A, 129B, 129C and 129D show various aberrations that occurred in the lens arrangement shown in FIG. 128. FIGS. 130A, 130B and 130C show lateral aberrations that occurred in the lens arrangement shown in FIG. 128. FIG. 131 shows a lens arrangement of the 18th numerical embodiment of the close-distance correcting lens system when focused on an image at a close-distance. FIGS. 132A, 132B, 132C and 132D show various aberrations that occurred in the lens arrangement shown in FIG. 131. FIGS. 133A, 133B and 133C show lateral aberrations that occurred in the lens arrangement shown in FIG. 131. Table 64 shows the lens surface data, Table 65 shows various data and Table 66 shows aspherical data.

The lens arrangement of the 18th numerical embodiment is the same as that of the 13th numerical embodiment except the following points (1) and (2).

(1) The positive lens element 102 of the first lens group G1 is configured of a positive planoconvex lens element having a convex surface on the object side.

(2) The negative lens element (a negative lens having a concave surface on the image side) 201 of the second lens group G2 is configured of a negative meniscus lens element having a convex surface on the object side.

TABLE 64

SURFACE DATA

| SURFACE NO. | r | d | N(d) | ν d |
|---|---|---|---|---|
| 1 | 305.177 | 2.500 | 1.72916 | 54.7 |
| 2 | 41.868 | 14.230 | | |
| 3 | 58.765 | 7.200 | 1.74950 | 35.3 |
| 4 | ∞ | 3.020 | | |
| 5 | 63.462 | 10.890 | 1.49700 | 81.6 |
| 6 | −119.178 | 8.580 | | |
| 7 | −117.585 | 1.800 | 1.64769 | 33.8 |
| 8 | 101.926 | 4.350 | | |
| 9 diaphragm | ∞ | 6.720 | | |
| 10 | −34.067 | 2.000 | 1.72825 | 28.3 |
| 11 | 449.442 | 8.640 | 1.49700 | 81.6 |
| 12 | −33.304 | 0.250 | | |
| 13 | 88.965 | 4.960 | 1.80610 | 40.7 |
| 14* | −109.811 | d14 | | |
| 15 | 594.325 | 1.650 | 1.72825 | 28.3 |
| 16 | 66.581 | 5.540 | | |
| 17 | 120.345 | 5.300 | 1.80518 | 25.5 |
| 18 | −77.738 | 6.240 | | |
| 19 | −60.917 | 1.650 | 1.64769 | 33.8 |
| 20 | 185.828 | — | | |

The asterisk (*) designates an aspherical surface which is rotationally symmetrical with respect to the optical axis.

TABLE 65

[VARIOUS DATA]

| | Infinite Photographic Position | Close-Distance(−0.75:1) Photographic Position |
|---|---|---|
| FNO. | 2.88 | 4.52 |
| f | 89.77 | |
| W | 21.2 | |
| Y | 34.85 | 34.85 |
| fB | 67.37 | 94.82 |
| L | 168.39 | 213.83 |
| d14 | 5.500 | 23.496 |

TABLE 66

[ASPHERICAL DATA]

| SURFACE NO. | K | A4 | A6 |
|---|---|---|---|
| 14 | 0.000 | 0.1192E−05 | 0.1752E−09 |

[Numerical Embodiment 19]

FIGS. 134 through 139C and Tables 67 through 69 show a 19th numerical embodiment of a close-distance correcting lens system according to the present invention. FIG. 134 shows a lens arrangement of the 19th numerical embodiment of the close-distance correcting lens system when focused on an image at infinity. FIGS. 135A, 135B, 135C and 135D show various aberrations that occurred in the lens arrangement shown in FIG. 134. FIGS. 136A, 136B and 136C show lateral aberrations that occurred in the lens arrangement shown in FIG. 134. FIG. 137 shows a lens arrangement of the 19th numerical embodiment of the close-distance correcting lens system when focused on an image at a close-distance. FIGS. 138A, 138B, 138C and 138D show various aberrations that occurred in the lens arrangement shown in FIG. 137. FIGS. 139A, 139B and 139C show lateral aberrations that occurred in the lens arrangement shown in FIG. 137. Table 67 shows the lens surface data, Table 68 shows various data and Table 69 shows aspherical data.

The lens arrangement of the 19th numerical embodiment is the same as that of the 13th numerical embodiment except the following point (1).

(1) The negative lens element (a negative lens having a concave surface on the image side) 201 of the second lens group G2 is configured of a negative meniscus lens element having a convex surface on the object side.

TABLE 67

SURFACE DATA

| SURFACE NO. | r | d | N(d) | ν d |
|---|---|---|---|---|
| 1 | 2000.000 | 2.500 | 1.77250 | 49.6 |
| 2 | 45.692 | 11.540 | | |
| 3 | 59.646 | 7.490 | 1.72342 | 38.0 |
| 4 | −677.375 | 3.020 | | |
| 5 | 61.512 | 11.000 | 1.49700 | 81.6 |
| 6 | −123.115 | 9.620 | | |
| 7 | −102.040 | 1.800 | 1.56732 | 42.8 |
| 8 | 114.686 | 4.260 | | |
| 9 diaphragm | ∞ | 7.430 | | |
| 10 | −32.034 | 2.000 | 1.71736 | 29.5 |
| 11 | 362.902 | 8.640 | 1.49700 | 81.6 |
| 12 | −32.023 | 0.250 | | |
| 13 | 78.013 | 5.850 | 1.80139 | 45.5 |
| 14* | −125.242 | d14 | | |
| 15 | 300.258 | 1.650 | 1.72825 | 28.3 |
| 16 | 59.337 | 3.910 | | |

TABLE 67-continued

SURFACE DATA

| SURFACE NO. | r | d | N(d) | νd |
|---|---|---|---|---|
| 17 | 117.738 | 5.300 | 1.84666 | 23.8 |
| 18 | −79.123 | 5.280 | | |
| 19 | −64.463 | 1.650 | 1.69895 | 30.0 |
| 20 | 163.152 | — | | |

The asterisk (*) designates an aspherical surface which is rotationally symmetrical with respect to the optical axis.

TABLE 68

[VARIOUS DATA]

| | Infinite Photographic Position | Close-Distance(−0.50:1) Photographic Position |
|---|---|---|
| FNO. | 2.88 | 4.03 |
| f | 90.14 | |
| W | 21.1 | |
| Y | 34.85 | 34.85 |
| fB | 68.83 | 91.95 |
| L | 167.52 | 200.37 |
| d14 | 5.500 | 15.222 |

TABLE 69

[ASPHERICAL DATA]

| SURFACE NO. | K | A4 | A6 |
|---|---|---|---|
| 14 | 0.000 | 0.1246E−05 | 0.7829E−10 |

[Numerical Embodiment 20]

FIGS. 140 through 145C and Tables 70 through 72 show a 20th numerical embodiment of a close-distance correcting lens system according to the present invention. FIG. 140 shows a lens arrangement of the 20th numerical embodiment of the close-distance correcting lens system when focused on an image at infinity. FIGS. 141A, 141B, 141C and 141D show various aberrations that occurred in the lens arrangement shown in FIG. 140. FIGS. 142A, 142B and 142C show lateral aberrations that occurred in the lens arrangement shown in FIG. 140. FIG. 143 shows a lens arrangement of the 20th numerical embodiment of the close-distance correcting lens system when focused on an image at a close-distance. FIGS. 144A, 144B, 144C and 144D show various aberrations that occurred in the lens arrangement shown in FIG. 143. FIGS. 145A, 145B and 145C show lateral aberrations that occurred in the lens arrangement shown in FIG. 143. Table 70 shows the lens surface data, Table 71 shows various data and Table 72 shows aspherical data.

The lens arrangement of the 20th numerical embodiment is the same as that of the 19th numerical embodiment.

TABLE 70

SURFACE DATA

| SURFACE NO. | r | d | N(d) | νd |
|---|---|---|---|---|
| 1 | 703.402 | 2.500 | 1.83481 | 42.7 |
| 2 | 47.731 | 11.460 | | |
| 3 | 59.240 | 7.470 | 1.80610 | 33.3 |
| 4 | −1086.874 | 3.020 | | |
| 5 | 66.760 | 11.000 | 1.49700 | 81.6 |
| 6 | −127.022 | 6.290 | | |
| 7 | −111.960 | 1.800 | 1.56732 | 42.8 |

TABLE 70-continued

SURFACE DATA

| SURFACE NO. | r | d | N(d) | νd |
|---|---|---|---|---|
| 8 | 108.311 | 5.400 | | |
| 9 diaphragm | ∞ | 10.550 | | |
| 10 | −31.687 | 2.000 | 1.69895 | 30.0 |
| 11 | 159.164 | 8.640 | 1.49700 | 81.6 |
| 12 | −31.846 | 0.250 | | |
| 13 | 66.774 | 4.960 | 1.80139 | 45.5 |
| 14* | −154.236 | d14 | | |
| 15 | 292.195 | 1.650 | 1.69895 | 30.0 |
| 16 | 52.984 | 4.050 | | |
| 17 | 117.847 | 5.300 | 1.80518 | 25.5 |
| 18 | −70.243 | 4.890 | | |
| 19 | −59.221 | 1.650 | 1.63980 | 34.6 |
| 20 | 142.919 | — | | |

The asterisk (*) designates an aspherical surface which is rotationally symmetrical with respect to the optical axis.

TABLE 71

[VARIOUS DATA]

| | Infinite Photographic Position | Close-Distance(−0.50:1) Photographic Position |
|---|---|---|
| FNO. | 2.88 | 4.09 |
| f | 90.23 | |
| W | 21.1 | |
| Y | 34.85 | 34.85 |
| fB | 68.91 | 97.16 |
| L | 167.29 | 202.16 |
| d14 | 5.500 | 12.125 |

TABLE 72

[ASPHERICAL DATA]

| SURFACE NO. | K | A4 | A6 |
|---|---|---|---|
| 14 | 0.000 | 0.1254E−05 | −0.2444E−10 |

[Numerical Embodiment 21]

FIGS. 146 through 151C and Tables 73 through 75 show a 21st numerical embodiment of a close-distance correcting lens system according to the present invention. FIG. 146 shows a lens arrangement of the 21st numerical embodiment of the close-distance correcting lens system when focused on an image at infinity. FIGS. 147A, 147B, 147C and 147D show various aberrations that occurred in the lens arrangement shown in FIG. 146. FIGS. 148A, 148B and 148C show lateral aberrations that occurred in the lens arrangement shown in FIG. 146. FIG. 149 shows a lens arrangement of the 21st numerical embodiment of the close-distance correcting lens system when focused on an image at a close-distance. FIGS. 150A, 150B, 150C and 150D show various aberrations that occurred in the lens arrangement shown in FIG. 149. FIGS. 151A, 151B and 151C show lateral aberrations that occurred in the lens arrangement shown in FIG. 149. Table 73 shows the lens surface data, Table 74 shows various data and Table 75 shows aspherical data.

The lens arrangement of the 21th numerical embodiment is the same as that of the 14th numerical embodiment.

TABLE 73

SURFACE DATA

| SURFACE NO. | r | d | N(d) | νd |
|---|---|---|---|---|
| 1 | 1989.085 | 2.500 | 1.72916 | 54.7 |
| 2 | 44.288 | 11.690 | | |
| 3 | 56.012 | 7.230 | 1.80450 | 39.6 |
| 4 | 1118.068 | 3.500 | | |
| 5 | 69.627 | 6.740 | 1.48749 | 70.4 |
| 6 | −121.000 | 6.190 | | |
| 7 | −146.248 | 1.800 | 1.56732 | 42.8 |
| 8 | 118.599 | 5.860 | | |
| 9 diaphragm | ∞ | 11.870 | | |
| 10 | −33.941 | 2.000 | 1.68893 | 31.2 |
| 11 | 99.993 | 9.620 | 1.49700 | 81.6 |
| 12 | −33.716 | 0.250 | | |
| 13 | 51.385 | 6.280 | 1.75501 | 51.2 |
| 14* | −227.297 | d14 | | |
| 15 | 277.107 | 1.650 | 1.72342 | 38.0 |
| 16 | 45.410 | 4.940 | | |
| 17 | 123.939 | 5.300 | 1.80518 | 25.5 |
| 18 | −71.332 | 5.270 | | |
| 19 | −72.121 | 1.650 | 1.67270 | 32.2 |
| 20 | 141.151 | — | | |

The asterisk (*) designates an aspherical surface which is rotationally symmetrical with respect to the optical axis.

TABLE 74

[VARIOUS DATA]

| | Infinite Photographic Position | Close-Distance(−0.50:1) Photographic Position |
|---|---|---|
| NO. | 2.88 | 4.14 |
| f | 90.25 | |
| W | 21.1 | |
| Y | 34.85 | 34.85 |
| fB | 68.02 | 100.64 |
| L | 167.86 | 204.31 |
| d14 | 5.500 | 9.327 |

TABLE 75

[ASPHERICAL DATA]

| SURFACE NO. | K | A4 | A6 |
|---|---|---|---|
| 14 | 0.000 | 0.1793E−05 | −0.1276E−09 |

[Numerical Embodiment 22]

FIGS. 152 through 157C and Tables 76 through 78 show a 22nd numerical embodiment of a close-distance correcting lens system according to the present invention. FIG. 152 shows a lens arrangement of the 22nd numerical embodiment of the close-distance correcting lens system when focused on an image at infinity. FIGS. 153A, 153B, 153C and 153D show various aberrations that occurred in the lens arrangement shown in FIG. 152. FIGS. 154A, 154B and 154C show lateral aberrations that occurred in the lens arrangement shown in FIG. 152. FIG. 155 shows a lens arrangement of the 22nd numerical embodiment of the close-distance correcting lens system when focused on an image at a close-distance. FIGS. 156A, 156B, 156C and 156D show various aberrations that occurred in the lens arrangement shown in FIG. 155. FIGS. 157A, 157B and 157C show lateral aberrations that occurred in the lens arrangement shown in FIG. 155. Table 76 shows the lens surface data, Table 77 shows various data and Table 78 shows aspherical data.

The lens arrangement of the 22nd numerical embodiment is the same as that of the 19th numerical embodiment except the following point (1).

(1) The first lens group G1 moves toward the object side, while the second lens group being stationary with respect to the imaging plane I (not moving in the optical axis direction), when focusing on an object at infinity to close-distance.

TABLE 76

SURFACE DATA

| SURFACE NO. | r | d | N(d) | νd |
|---|---|---|---|---|
| 1 | 1237.863 | 2.100 | 1.80610 | 40.7 |
| 2 | 42.391 | 10.630 | | |
| 3 | 60.652 | 6.620 | 1.80610 | 33.3 |
| 4 | −217.593 | 3.030 | | |
| 5 | 59.015 | 9.000 | 1.48749 | 70.4 |
| 6 | −111.786 | 6.010 | | |
| 7 | −106.004 | 2.320 | 1.74950 | 35.3 |
| 8 | 116.344 | 4.650 | | |
| 9 diaphragm | ∞ | 7.230 | | |
| 10 | −34.530 | 2.000 | 1.68893 | 31.2 |
| 11 | 205.036 | 8.530 | 1.49700 | 81.6 |
| 12 | −34.186 | 1.660 | | |
| 13 | 164.190 | 5.340 | 1.80139 | 45.5 |
| 14* | −82.539 | d14 | | |
| 15 | 799.831 | 2.080 | 1.76200 | 40.1 |
| 16 | 54.121 | 3.190 | | |
| 17 | 61.840 | 6.240 | 1.80610 | 33.3 |
| 18 | −85.825 | 5.780 | | |
| 19 | −67.931 | 1.690 | 1.67270 | 32.2 |
| 20 | 131.352 | — | | |

The asterisk (*) designates an aspherical surface which is rotationally symmetrical with respect to the optical axis.

TABLE 77

[VARIOUS DATA]

| | Infinite Photographic Position | Close-Distance(−0.50:1) Photographic Position |
|---|---|---|
| FNO. | 2.88 | 3.80 |
| f | 90.05 | |
| W | 21.2 | |
| Y | 34.85 | 34.85 |
| fB | 70.75 | 70.75 |
| L | 164.35 | 191.05 |
| d14 | 5.500 | 32.202 |

TABLE 78

[ASPHERICAL DATA]

| SURFACE NO. | K | A4 | A6 |
|---|---|---|---|
| 14 | 0.000 | 0.8540E−06 | 0.3276E−09 |

[Numerical Embodiment 23]

FIGS. 158 through 163C and Tables 79 through 81 show a 23rd numerical embodiment of a close-distance correcting lens system according to the present invention. FIG. 158 shows a lens arrangement of the 23rd numerical embodiment of the close-distance correcting lens system when focused on an image at infinity. FIGS. 159A, 159B, 159C and 159D show various aberrations that occurred in the lens arrangement shown in FIG. 158. FIGS. 160A, 160B and 160C show lateral aberrations that occurred in the lens arrangement shown in FIG. 158. FIG. 161 shows a lens arrangement of the 23rd numerical embodiment of the close-distance correcting lens system when focused on an image at close-distance. FIGS. 162A, 162B, 162C and 162D show various aberrations that occurred in the lens arrangement shown in FIG. 161. FIGS. 163A, 163B and 163C show lateral aberrations that occurred in the lens arrangement shown in FIG. 161. Table 79 shows the lens surface data, Table 80 shows various data and Table 81 shows aspherical data.

The lens arrangement of the 23rd numerical embodiment is the same as that of the 22nd numerical embodiment.

TABLE 79

SURFACE DATA

| SURFACE NO. | r | d | N(d) | v d |
|---|---|---|---|---|
| 1 | 2000.000 | 2.100 | 1.80420 | 46.5 |
| 2 | 41.936 | 11.950 | | |
| 3 | 62.301 | 6.620 | 1.83400 | 37.3 |
| 4 | −244.596 | 3.030 | | |
| 5 | 58.976 | 9.000 | 1.49700 | 81.6 |
| 6 | −112.192 | 6.000 | | |
| 7 | −109.325 | 2.320 | 1.70154 | 41.2 |
| 8 | 102.768 | 4.190 | | |
| 9 diaphragm | ∞ | 8.340 | | |
| 10 | −34.405 | 2.000 | 1.71736 | 29.5 |
| 11 | 1257.628 | 8.530 | 1.49700 | 81.6 |
| 12 | −33.940 | 0.330 | | |
| 13 | 167.258 | 5.340 | 1.80139 | 45.5 |
| 14* | −84.808 | d14 | | |
| 15 | 240.443 | 2.000 | 1.72342 | 38.0 |
| 16 | 53.119 | 4.710 | | |
| 17 | 58.351 | 6.240 | 1.64769 | 33.8 |
| 18 | −82.972 | 6.820 | | |
| 19 | −65.134 | 1.690 | 1.62004 | 36.3 |
| 20 | 130.440 | — | | |

The asterisk (*) designates an aspherical surface which is rotationally symmetrical with respect to the optical axis.

TABLE 80

[VARIOUS DATA]

| | Infinite Photographic Position | Close-Distance(−0.70:1) Photographic Position |
|---|---|---|
| FNO. | 2.88 | 4.15 |
| f | 89.42 | |
| W | 21.4 | |
| Y | 34.85 | 34.85 |
| fB | 67.69 | 67.69 |
| L | 164.40 | 201.19 |
| d14 | 5.500 | 42.287 |

TABLE 81

[ASPHERICAL DATA]

| SURFACE NO. | K | A4 | A6 |
|---|---|---|---|
| 14 | 0.000 | 0.9994E−06 | 0.4657E−09 |

[Numerical Embodiment 24]

FIGS. 164 through 169C and Tables 82 through 84 show a 24th numerical embodiment of a close-distance correcting lens system according to the present invention. FIG. 164 shows a lens arrangement of the 24th numerical embodiment of the close-distance correcting lens system when focused on an image at infinity. FIGS. 165A, 165B, 165C and 165D show various aberrations that occurred in the lens arrangement shown in FIG. 164. FIGS. 166A, 166B and 166C show lateral aberrations that occurred in the lens arrangement shown in FIG. 164. FIG. 167 shows a lens arrangement of the 24th numerical embodiment of the close-distance correcting lens system when focused on an image at a close-distance. FIGS. 168A, 168B, 168C and 168D show various aberrations that occurred in the lens arrangement shown in FIG. 167. FIGS. 169A, 169B and 169C show lateral aberrations that occurred in the lens arrangement shown in FIG. 167. Table 82 shows the lens surface data, Table 83 shows various data and Table 84 shows aspherical data.

The lens arrangement of the 24th numerical embodiment is the same as that of the 22nd numerical embodiment except the following points (1), (2) and (3).

(1) The negative lens element 105 of the first lens group G1 is configured of a negative planoconcave lens element having a concave surface on the object side.

(2) The positive lens element 106 of the first lens group G1 is configured of a positive planoconvex lens element having a convex surface on the image side.

(3) The negative lens element (a negative lens element having a concave surface on the image side) 201 of the second lens group G2 is configured of a biconcave lens element.

TABLE 82

SURFACE DATA

| SURFACE NO. | r | d | N(d) | v d |
|---|---|---|---|---|
| 1 | 1990.687 | 2.100 | 1.72916 | 54.7 |
| 2 | 40.648 | 12.410 | | |
| 3 | 58.457 | 6.860 | 1.80450 | 39.6 |
| 4 | −340.254 | 3.030 | | |
| 5 | 72.046 | 10.000 | 1.49700 | 81.6 |
| 6 | −97.152 | 6.010 | | |
| 7 | −79.731 | 2.000 | 1.63980 | 34.6 |
| 8 | 190.437 | 5.090 | | |
| 9 diaphragm | ∞ | 6.190 | | |
| 10 | −41.845 | 2.000 | 1.75520 | 27.5 |
| 11 | ∞ | 7.120 | 1.49700 | 81.6 |
| 12 | −39.128 | 0.740 | | |
| 13 | 267.350 | 5.340 | 1.80101 | 40.9 |
| 14* | −74.918 | d14 | | |
| 15 | −247.967 | 2.000 | 1.74400 | 44.9 |
| 16 | 53.884 | 3.850 | | |
| 17 | 67.090 | 6.610 | 1.80450 | 39.6 |
| 18 | −74.942 | 7.780 | | |
| 19 | −66.282 | 1.500 | 1.60342 | 38.0 |
| 20 | 256.520 | — | | |

The asterisk (*) designates an aspherical surface which is rotationally symmetrical with respect to the optical axis.

TABLE 83

[VARIOUS DATA]

| | Infinite Photographic Position | Close-Distance(−0.70:1) Photographic Position |
|---|---|---|
| FNO. | 2.88 | 4.21 |
| f | 89.46 | |
| W | 21.4 | |
| Y | 34.85 | 34.85 |
| fB | 68.27 | 68.27 |
| L | 164.40 | 200.93 |
| d14 | 5.500 | 42.029 |

TABLE 84

[ASPHERICAL DATA]

| SURFACE NO. | K | A4 | A6 |
|---|---|---|---|
| 14 | 0.000 | 0.1130E−05 | 0.6034E−09 |

[Numerical Embodiment 25]

FIGS. 170 through 175C and Tables 85 through 87 show a 25th numerical embodiment of a close-distance correcting lens system according to the present invention. FIG. 170 shows a lens arrangement of the 25th numerical embodiment of the close-distance correcting lens system when focused on an image at infinity. FIGS. 171A, 171B, 171C and 171D show various aberrations that occurred in the lens arrangement shown in FIG. 170. FIGS. 172A, 172B and 172C show lateral aberrations that occurred in the lens arrangement shown in FIG. 170. FIG. 173 shows a lens arrangement of the 25th numerical embodiment of the close-distance correcting lens system when focused on an image at a close-distance. FIGS. 174A, 174B, 174C and 174D show various aberrations that occurred in the lens arrangement shown in FIG. 173. FIGS. 175A, 175B and 175C show lateral aberrations that occurred in the lens arrangement shown in FIG. 173. Table 85 shows the lens surface data, Table 86 shows various data and Table 87 shows aspherical data.

The lens arrangement of the 25th numerical embodiment is the same as that of the 24th numerical embodiment except the following points (1) and (2).

(1) The negative lens element 105 of the first lens group G1 is configured of a negative meniscus lens element having a convex surface on the image side.

(2) The positive lens element 106 of the first lens group G1 is configured of a positive meniscus lens element having a convex surface on the image side.

TABLE 85

SURFACE DATA

| SURFACE NO. | r | d | N(d) | vd |
|---|---|---|---|---|
| 1 | 1983.218 | 2.100 | 1.77250 | 49.6 |
| 2 | 41.543 | 12.480 | | |
| 3 | 63.357 | 6.970 | 1.83400 | 37.3 |
| 4 | −276.955 | 3.030 | | |
| 5 | 63.077 | 10.000 | 1.49700 | 81.6 |
| 6 | −101.306 | 6.010 | | |
| 7 | −95.007 | 1.500 | 1.67270 | 32.2 |
| 8 | 119.475 | 6.090 | | |
| 9 diaphragm | ∞ | 6.980 | | |
| 10 | −35.048 | 1.500 | 1.68893 | 31.2 |
| 11 | −1097.973 | 7.490 | 1.49700 | 81.6 |
| 12 | −34.507 | 0.250 | | |
| 13 | 200.394 | 5.330 | 1.80139 | 45.5 |
| 14* | −80.342 | d14 | | |
| 15 | −524.733 | 1.500 | 1.74330 | 49.2 |
| 16 | 52.116 | 3.270 | | |
| 17 | 60.636 | 6.920 | 1.70154 | 41.2 |
| 18 | −75.048 | 8.930 | | |
| 19 | −64.231 | 1.500 | 1.59551 | 39.2 |
| 20 | 283.354 | — | | |

The asterisk (*) designates an aspherical surface which is rotationally symmetrical with respect to the optical axis.

TABLE 86

[VARIOUS DATA]

| | Infinite Photographic Position | Close-Distance(−0.50:1) Photographic Position |
|---|---|---|
| FNO. | 2.88 | 3.78 |
| f | 89.69 | |
| W | 21.3 | |
| Y | 34.85 | 34.85 |
| fB | 67.04 | 67.04 |
| L | 164.39 | 189.03 |
| d14 | 5.500 | 30.139 |

TABLE 87

[ASPHERICAL DATA]

| SURFACE NO. | K | A4 | A6 |
|---|---|---|---|
| 14 | 0.000 | 0.1109E−05 | 0.4896E−09 |

[Numerical Embodiment 26]

FIGS. 176 through 181C and Tables 88 through 90 show a 26th numerical embodiment of a close-distance correcting lens system according to the present invention. FIG. 176 shows a lens arrangement of the 26th numerical embodiment of the close-distance correcting lens system when focused on an image at infinity. FIGS. 177A, 177B, 177C and 177D show various aberrations that occurred in the lens arrangement shown in FIG. 176. FIGS. 178A, 178B and 178C show lateral aberrations that occurred in the lens arrangement shown in FIG. 176. FIG. 179 shows a lens arrangement of the 26th numerical embodiment of the close-distance correcting lens system when focused on an image at a close-distance. FIGS. 180A, 180B, 180C and 180D show various aberrations that occurred in the lens arrangement shown in FIG. 179. FIGS. 181A, 181B and 181C show lateral aberrations that occurred in the lens arrangement shown in FIG. 179. Table 88 shows the lens surface data, Table 89 shows various data and Table 90 shows aspherical data.

The lens arrangement of the 26th numerical embodiment is different from the 13th to 25th numerical embodiments, mainly at the configuration of the first lens group G1.

The first lens group G1 is configured of a positive first sub lens group G1a, a negative second sub lens group G1b, a diaphragm S and a positive third sub lens group G1c, in that order from the object side.

The positive first sub lens group G1a is configured of a negative meniscus lens element 101' having a convex surface on the object side, a positive meniscus lens element 102' having a convex surface on the object side and a positive biconvex lens element 103', in that order from the object side.

The negative second sub lens group G1b is configured of a cemented lens configured of a biconcave lens element (a negative lens element having a concave surface on the image side) 104' and a positive meniscus lens element having a convex surface on the object side' (a positive lens having a concave surface on the image side) 105'.

The positive third sub lens group G1c is configured of a cemented lens configured of a biconcave lens element 106' and a biconvex lens 107' element, and a biconvex lens element 108', in that order from the object side. The biconvex lens element 108' is provided with an aspherical surface on image side thereof.

The second lens group G2 is configured of a negative biconcave lens element (a negative lens element having a concave surface on the image side) 201, a biconvex lens element 202 and a biconcave lens element (a negative lens element having a concave surface on the object side) 203, in that order from the object side.

TABLE 88

SURFACE DATA

| SURFACE NO. | r | d | N(d) | vd |
|---|---|---|---|---|
| 1 | 473.951 | 2.000 | 1.69680 | 55.5 |
| 2 | 42.407 | 15.520 | | |
| 3 | 56.655 | 7.090 | 1.83400 | 37.3 |
| 4 | 617.022 | 4.080 | | |

TABLE 88-continued

SURFACE DATA

| SURFACE NO. | r | d | N(d) | νd |
|---|---|---|---|---|
| 5 | 81.434 | 8.290 | 1.49700 | 81.6 |
| 6 | −137.766 | 6.930 | | |
| 7 | −338.338 | 1.450 | 1.69895 | 30.0 |
| 8 | 31.510 | 5.320 | 1.80518 | 25.5 |
| 9 | 85.195 | 5.880 | | |
| 10 diaphragm | ∞ | 7.050 | | |
| 11 | −39.794 | 2.000 | 1.75520 | 27.5 |
| 12 | 67.154 | 9.200 | 1.49700 | 81.6 |
| 13 | −37.583 | 1.400 | | |
| 14 | 50.849 | 6.040 | 1.80101 | 40.9 |
| 15* | −174.666 | d15 | | |
| 16 | −4275.941 | 1.500 | 1.67270 | 32.2 |
| 17 | 44.710 | 5.160 | | |
| 18 | 137.335 | 5.350 | 1.80518 | 25.5 |
| 19 | −73.119 | 5.110 | | |
| 20 | −104.080 | 1.450 | 1.70154 | 41.2 |
| 21 | 145.257 | — | | |

The asterisk (*) designates an aspherical surface which is rotationally symmetrical with respect to the optical axis.

TABLE 89

[VARIOUS DATA]

| | Infinite Photographic Position | Close-Distance(−0.60:1) Photographic Position |
|---|---|---|
| FNO. | 2.87 | 4.32 |
| f | 90.45 | |
| W | 21.0 | |
| Y | 34.85 | 34.85 |
| fB | 66.76 | 101.86 |
| L | 173.26 | 213.84 |
| d15 | 5.680 | 11.159 |

TABLE 90

[ASPHERICAL DATA]

| SURFACE NO. | K | A4 | A6 |
|---|---|---|---|
| 15 | 0.000 | 0.1916E−05 | −0.9666E−10 |

[Numerical Embodiment 27]

FIGS. 182 through 187C and Tables 91 through 93 show a 27th numerical embodiment of a close-distance correcting lens system according to the present invention. FIG. 182 shows a lens arrangement of the 27th numerical embodiment of the close-distance correcting lens system when focused on an image at infinity. FIGS. 183A, 183B, 183C and 183D show various aberrations that occurred in the lens arrangement shown in FIG. 182. FIGS. 184A, 184B and 184C show lateral aberrations that occurred in the lens arrangement shown in FIG. 182. FIG. 185 shows a lens arrangement of the 27th numerical embodiment of the close-distance correcting lens system when focused on an image at a close-distance. FIGS. 186A, 186B, 186C and 186D show various aberrations that occurred in the lens arrangement shown in FIG. 185. FIGS. 187A, 187B and 187C show lateral aberrations that occurred in the lens arrangement shown in FIG. 185. Table 91 shows the lens surface data, Table 92 shows various data and Table 93 shows aspherical data.

The lens arrangement of the 27th numerical embodiment is the same as that of the 26th numerical embodiment except the following point (1).

(1) The negative lens element 201 of the second lens group G2 is configured of a negative meniscus lens having a convex surface on the object side.

TABLE 91

SURFACE DATA

| SURFACE NO. | r | d | N(d) | νd |
|---|---|---|---|---|
| 1 | 313.004 | 2.000 | 1.83481 | 42.7 |
| 2 | 42.890 | 11.700 | | |
| 3 | 56.534 | 7.540 | 1.80610 | 33.3 |
| 4 | 1344.027 | 5.180 | | |
| 5 | 70.142 | 7.260 | 1.49700 | 81.6 |
| 6 | −126.482 | 7.850 | | |
| 7 | −253.610 | 1.450 | 1.63980 | 34.6 |
| 8 | 33.519 | 4.750 | 1.80518 | 25.5 |
| 9 | 74.839 | 6.130 | | |
| 10 diaphragm | ∞ | 6.640 | | |
| 11 | −38.315 | 1.400 | 1.72825 | 28.3 |
| 12 | 58.634 | 9.660 | 1.49700 | 81.6 |
| 13 | −35.914 | 0.750 | | |
| 14 | 58.416 | 7.250 | 1.80610 | 40.7 |
| 15* | −183.734 | d15 | | |
| 16 | 2478.431 | 1.550 | 1.63980 | 34.6 |
| 17 | 49.802 | 4.900 | | |
| 18 | 126.215 | 5.570 | 1.80610 | 33.3 |
| 19 | −69.406 | 4.080 | | |
| 20 | −65.521 | 1.450 | 1.56883 | 56.0 |
| 21 | 146.337 | — | | |

The asterisk (*) designates an aspherical surface which is rotationally symmetrical with respect to the optical axis.

TABLE 92

[VARIOUS DATA]

| | Infinite Photographic Position | Close-Distance(−0.50:1) Photographic Position |
|---|---|---|
| FNO. | 2.85 | 4.06 |
| f | 90.12 | |
| W | 21.1 | |
| Y | 34.85 | 34.85 |
| fB | 69.09 | 98.18 |
| L | 171.88 | 207.25 |
| d15 | 5.680 | 11.958 |

TABLE 93

[ASPHERICAL DATA]

| SURFACE NO. | K | A4 |
|---|---|---|
| 15 | 0.000 | 0.1173E−05 |

[Numerical Embodiment 28]

FIGS. 188 through 193C and Tables 94 through 96 show a 28th numerical embodiment of a close-distance correcting lens system according to the present invention. FIG. 188 shows a lens arrangement of the 28th numerical embodiment of the close-distance correcting lens system when focused on an image at infinity. FIGS. 189A, 189B, 189C and 189D show various aberrations that occurred in the lens arrangement shown in FIG. 188. FIGS. 190A, 190B and 190C show lateral aberrations that occurred in the lens arrangement shown in FIG. 188. FIG. 191 shows a lens arrangement of the 28th numerical embodiment of the close-distance correcting lens system when focused on an image at a close-distance. FIGS. 192A, 192B, 192C and 192D show various aberrations that occurred in the lens arrangement shown in FIG. 191. FIGS. 193A, 193B and 193C show lateral aberrations that occurred in the lens arrangement shown in FIG. 191. Table 94 shows the lens surface data, Table 95 shows various data and Table 96 shows aspherical data.

The lens arrangement of the 28th numerical embodiment is the same as that of the 26th numerical embodiment except the following points (1) and (2).

(1) The positive lens element 102' of the first lens group G1$a$ is configured of a positive biconvex lens, which is provided with an aspherical surface on the object side thereof.

(2) The negative lens element 201 of the second lens group G2 is configured of a negative planoconcave lens element having a concave surface on the image side.

TABLE 94

SURFACE DATA

| SURFACE NO. | r | d | N(d) | ν d |
|---|---|---|---|---|
| 1 | 2254.961 | 2.000 | 1.65160 | 58.4 |
| 2 | 42.516 | 15.530 | | |
| 3* | 52.658 | 8.500 | 1.72916 | 54.7 |
| 4 | −473.334 | 2.630 | | |
| 5 | 106.175 | 5.470 | 1.49700 | 81.6 |
| 6 | −198.050 | 8.690 | | |
| 7 | −238.065 | 1.450 | 1.59551 | 39.2 |
| 8 | 34.324 | 4.410 | 1.80518 | 25.5 |
| 9 | 67.445 | 6.900 | | |
| 10 diaphragm | ∞ | 6.250 | | |
| 11 | −43.265 | 1.400 | 1.71736 | 29.5 |
| 12 | 45.438 | 8.080 | 1.48749 | 70.4 |
| 13 | −54.875 | 0.250 | | |
| 14 | 69.236 | 6.250 | 1.80139 | 45.5 |
| 15* | −80.649 | d15 | | |
| 16 | ∞ | 1.500 | 1.53172 | 48.8 |
| 17 | 50.628 | 4.960 | | |
| 18 | 156.419 | 4.380 | 1.80610 | 33.3 |
| 19 | −115.982 | 3.000 | | |
| 20 | −427.329 | 1.450 | 1.72342 | 38.0 |
| 21 | 152.155 | — | | |

The asterisk (*) designates an aspherical surface which is rotationally symmetrical with respect to the optical axis.

TABLE 95

[VARIOUS DATA]

| | Infinite Photographic Position | Close-Distance(−0.50:1) Photographic Position |
|---|---|---|
| FNO. | 2.87 | 4.06 |
| f | 89.86 | |
| W | 21.3 | |
| Y | 34.85 | 34.85 |
| fB | 74.69 | 104.66 |
| L | 173.47 | 210.47 |
| d15 | 5.680 | 12.710 |

TABLE 96

[ASPHERICAL DATA]

| SURFACE NO. | K | A4 |
|---|---|---|
| 3 | 0.000 | −0.9260E−07 |
| 15 | 0.000 | 0.1535E−05 |

The numerical values of conditions for the 1$^{st}$ through 12$^{th}$ numerical embodiments are shown in Table 97.

TABLE 97

| | Embod. 1 | Embod. 2 | Embod. 3 |
|---|---|---|---|
| Cond. (1) | 32.17 | 30.05 | 34.57 |
| Cond. (2) | 8.39 | 4.45 | 10.79 |
| Cond. (3) | 1.673 | 1.699 | 1.640 |
| Cond. (4) | 1.847 | 1.805 | 1.847 |
| Cond. (5) | — | — | — |
| Cond. (6) | 2.51 | 2.70 | 2.90 |
| Cond. (7) | 0.49 | 0.44 | 0.39 |
| Cond. (8) | 1.93 | 2.03 | 2.40 |
| Cond. (9) | 0.875 | 0.865 | 0.850 |
| | Embod. 4 | Embod. 5 | Embod. 6 |
| Cond. (1) | 34.57 | 39.22 | 33.84 |
| Cond. (2) | 9.27 | 13.62 | 10.06 |
| Cond. (3) | 1.640 | 1.596 | 1.648 |
| Cond. (4) | 1.805 | 1.805 | 1.847 |
| Cond. (5) | — | — | — |
| Cond. (6) | 2.98 | 3.00 | 3.17 |
| Cond. (7) | 0.38 | 0.38 | 0.35 |
| Cond. (8) | 2.57 | 3.45 | 3.89 |
| Cond. (9) | 0.822 | 0.810 | 0.802 |
| | Embod. 7 | Embod. 8 | Embod. 9 |
| Cond. (1) | — | — | — |
| Cond. (2) | — | — | — |
| Cond. (3) | — | — | — |
| Cond. (4) | — | — | — |
| Cond. (5) | 46.50 | 49.62 | 55.45 |
| Cond. (6) | 3.11 | 3.00 | 2.90 |
| Cond. (7) | 0.36 | 0.38 | 0.40 |
| Cond. (8) | 1.95 | 2.10 | 2.39 |
| Cond. (9) | 0.791 | 0.830 | 0.820 |
| | Embod. 10 | Embod. 11 | Embod. 12 |
| Cond. (1) | — | — | — |
| Cond. (2) | — | — | — |
| Cond. (3) | — | — | — |
| Cond. (4) | — | — | — |
| Cond. (5) | 56.04 | 61.25 | 63.39 |
| Cond. (6) | 2.81 | 2.66 | 2.51 |
| Cond. (7) | 0.42 | 0.45 | 0.49 |
| Cond. (8) | 2.95 | 3.47 | 3.86 |
| Cond. (9) | 0.760 | 0.745 | 0.770 |

As can be understood from Table 97, the first through sixth embodiments satisfy conditions (1) through (4), and conditions (6) and (9), and the seventh through twelfth embodiments satisfy conditions (5) through (9). Furthermore, as can be understood from the aberration diagrams, the various aberrations are favorably corrected.

The numerical values of conditions for the 13th through 28th numerical embodiments are shown in Table 98. The numerical values for conditions (17) and (18) are calculated for the positive lens element located closeted to object side within the first lens group G1. It is impossible to calculate the numerical values of conditions (20) through (23) for the 13th through 25th embodiments since the configuration of the first lens group G1 is different from that of the 26th through 28th embodiments. Whereas, it is possible to calculate the numerical values of conditions (10) through (19) for the 26th through 28th embodiments since the configuration of the second lens group G2 of the 26th through 28th embodiments is the same as that of 13th through 25th embodiments.

TABLE 98

| | Embod. 13 | Embod. 14 | Embod. 15 | Embod. 16 | Embod. 17 |
|---|---|---|---|---|---|
| Cond. (10) | −0.77 | −1.04 | −0.74 | −0.80 | −0.92 |
| Cond. (11) | 0.211 | 0.199 | 0.210 | 0.317 | 0.229 |
| Cond. (12) | 0.46 | 0.43 | 0.44 | 0.52 | 0.47 |
| Cond. (13) | 0.25 | 0.22 | 0.26 | 0.37 | 0.27 |
| Cond. (14) | 39.22 | 36.30 | 34.57 | 32.17 | 39.22 |
| Cond. (15) | 1.806 | 1.744 | 1.743 | 1.702 | 1.713 |
| Cond. (16) | 40.73 | 44.90 | 49.22 | 41.15 | 53.94 |
| Cond. (17) | 1.806 | 1.805 | 1.834 | 1.805 | 1.834 |
| Cond. (18) | 33.27 | 39.64 | 37.34 | 25.46 | 37.34 |
| Cond. (19) | 0.105 | 0.205 | 0.301 | 0.402 | 0.502 |
| Cond. (20) | — | — | — | — | — |
| Cond. (21) | — | — | — | — | — |
| Cond. (22) | — | — | — | — | — |
| Cond. (23) | — | — | — | — | — |

| | Embod. 18 | Embod. 19 | Embod. 20 | Embod. 21 | Embod. 22 |
|---|---|---|---|---|---|
| Cond. (10) | −1.25 | −1.49 | −1.44 | −1.39 | −1.15 |
| Cond. (11) | 0.361 | 0.406 | 0.418 | 0.649 | 0.306 |
| Cond. (12) | 0.61 | 0.64 | 0.65 | 0.68 | 0.34 |
| Cond. (13) | 0.42 | 0.41 | 0.46 | 0.64 | 0.30 |
| Cond. (14) | 33.84 | 30.05 | 34.57 | 32.17 | 32.17 |
| Cond. (15) | 1.729 | 1.773 | 1.835 | 1.729 | 1.806 |
| Cond. (16) | 54.67 | 49.62 | 42.72 | 54.67 | 40.73 |
| Cond. (17) | 1.750 | 1.723 | 1.806 | 1.805 | 1.806 |
| Cond. (18) | 35.27 | 37.99 | 33.27 | 39.64 | 33.27 |
| Cond. (19) | 0.604 | 0.704 | 0.810 | 0.895 | (0) |
| Cond. (20) | — | — | — | — | — |
| Cond. (21) | — | — | — | — | — |
| Cond. (22) | — | — | — | — | — |
| Cond. (23) | — | — | — | — | — |

| | Embod. 23 | Embod. 24 | Embod. 25 |
|---|---|---|---|
| Cond. (10) | −1.57 | −0.64 | −0.82 |
| Cond. (11) | 0.312 | 0.275 | 0.323 |
| Cond. (12) | 0.45 | 0.25 | 0.32 |
| Cond. (13) | 0.33 | 0.36 | 0.44 |
| Cond. (14) | 36.30 | 38.01 | 39.22 |
| Cond. (15) | 1.804 | 1.729 | 1.773 |
| Cond. (16) | 46.50 | 54.67 | 49.62 |
| Cond. (17) | 1.834 | 1.805 | 1.834 |
| Cond. (18) | 37.34 | 39.64 | 37.34 |
| Cond. (19) | (0) | (0) | (0) |
| Cond. (20) | — | — | — |
| Cond. (21) | — | — | — |
| Cond. (22) | — | — | — |
| Cond. (23) | — | — | — |

| | Embod. 26 | Embod. 27 | Embod. 28 |
|---|---|---|---|
| Cond. (10) | −0.98 | −1.04 | −1.00 |
| Cond. (11) | 0.970 | 0.426 | 1.922 |
| Cond. (12) | 0.61 | 0.52 | 0.43 |
| Cond. (13) | 0.80 | 0.52 | 0.70 |
| Cond. (14) | 41.15 | 56.04 | 37.99 |
| Cond. (15) | 1.697 | 1.835 | 1.652 |
| Cond. (16) | 55.46 | 42.72 | 58.40 |
| Cond. (17) | 1.834 | 1.806 | 1.729 |
| Cond. (18) | 37.34 | 33.27 | 54.67 |
| Cond. (19) | 0.865 | 0.822 | 0.810 |
| Cond. (20) | 30.05 | 34.57 | 39.22 |
| Cond. (21) | 4.45 | 9.27 | 13.62 |
| Cond. (22) | 1.699 | 1.640 | 1.596 |
| Cond. (23) | 1.805 | 1.805 | 1.805 |

As can be understood from Table 98, the 13th through 25th embodiments satisfy conditions (10) through (18), the 13th through 21th embodiments satisfy condition (19), and the 26th through 28th embodiments satisfy conditions (10) through (23). Furthermore, as can be understood from the aberration diagrams, the various aberrations are favorably corrected.

What is claimed is:

1. A close-distance correcting lens system comprising a positive first lens group and a negative second lens group,
   wherein traveling distances of said first lens group and said second lens group toward the object side differ from each other when performing a focusing operation on an object at infinity to an object at a close distance, each lens group being defined such that a distance between adjacent lens elements of the first and second lens groups changes as a focusing operation is performed;
   wherein said first lens group includes a positive first sub lens group, a negative second sub lens group, a diaphragm, and a positive third sub lens group, in that order from the object side;
   wherein said second sub lens group includes an image-stabilizing lens group which is configured to move in a direction orthogonal to the optical axis to change an imaging position of the object image to thereby correct image shake of said object image, and
   wherein the following conditions are satisfied:

$$2.5 < \beta_{1b} < 3.2$$

and $$0.35 < \beta_R < 0.50$$

wherein $\beta_{1b}$ designates the lateral magnification of said second sub lens group when focused on an object at infinity, and $\beta_R$ designates the lateral magnification of the lens groups which are located closer to the image side than said second sub lens group, when focused on an object at infinity.

2. The close-distance correcting lens system according to claim 1, wherein said second sub lens group comprises a cemented lens including a negative lens element having a concave surface on the image side and a positive lens element having a concave surface on the image side, in that order from the object side.

3. The close-distance correcting lens system according to claim 2, wherein the following condition is satisfied:

$$vd_{1bn} > 30 \ldots \text{wherein}$$

$vd_{1bn}$ designates the Abbe number, with respect to the d-line, of said negative lens element provided in said second sub lens group.

4. The close-distance correcting lens system according to claim 2, wherein the following condition is satisfied:

$$0 < vd_{1bn} - vd_{1bp} < 20 \ldots$$

wherein $vd_{1bn}$ designates the Abbe number, with respect to the d-line, of said negative lens element provided in said second sub lens group, and $vd_{1bp}$ designates the Abbe number, with respect to the d-line, of said positive lens element provided in said second sub lens group.

5. The close-distance correcting lens system according to claim 2, wherein the following conditions and are satisfied:

$$nd_{1bn} < 1.7 \ldots \text{and}$$

$$nd_{1bp} > 1.8 \ldots \text{wherein}$$

$nd_{1bn}$ designates the refractive index at the d-line of said negative lens element provided in said second sub lens group, and
   $nd_{1bp}$ designates the refractive index at the d-line of said positive lens element provided in said second sub lens group.

6. The close-distance correcting lens system according to claim 1, wherein said second sub lens group comprises a single negative lens element having a concave surface on the image side.

7. The close-distance correcting lens system according to claim 6, where the following condition is satisfied:

$\nu d_{1b} > 45 \ldots$ wherein $\nu d_{1b}$ designates the Abbe number, with respect to the d-line, of said single negative lens element provided in said second sub lens group.

8. The close-distance correcting lens system according to claim 1, wherein the following condition is satisfied:

$1.9 < |f2/f1| < 3.9 (f2 < 0) \ldots$ wherein f1 designates the focal length of said first lens group, and f2 designates the focal length of said second lens group.

9. The close-distance correcting lens system according to claim 1, wherein the following condition is satisfied:

$0.74 < \Delta d2/\Delta d1 < 0.88 \ldots$ wherein $\Delta d1$ designates the traveling distance of said first lens group between a focusing operation performed on an object at infinity to and a focusing operation performed on an object at a close distance, and $\Delta d2$ designates the traveling distance of said second lens group between a focusing operation performed on an object at infinity and a focusing operation performed on an object at a close distance.

10. A close-distance correcting lens system comprising a positive first lens group and a negative second lens group,
wherein traveling distances of said first lens group and said second lens group toward the object side differ from each other when performing a focusing operation on an object at infinity to an object at a close distance, each lens group being defined such that a distance between adjacent lens elements of the first and second lens groups changes as a focusing operation is performed;
wherein said first lens group includes a positive first sub lens group, a negative second sub lens group, a diaphragm, and a positive third sub lens group, in that order from the object side; and
wherein said second sub lens group includes a cemented lens including a negative lens element having a concave surface on the image side and a positive lens element having a concave surface on the image side, in that order from the object side, and
wherein the following conditions are satisfied:

$0 < \nu d_{1bn} - \nu d_{1bp} < 20$ $1.9 < |f2/f1| < 3.9 (f2 < 0)$ wherein $\nu d_{1bn}$ designates the Abbe number, with respect to the d-line, of said negative lens element provided in said second sub lens group, and
$\nu d_{1bp}$ designates the Abbe number, with respect to the d-line, of said positive lens element provided in said second sub lens group, and f1 designates the focal length of said first lens group, and f2 designates the focal length of said second lens group.

11. The close-distance correcting lens system according to claim 10, wherein the following condition is satisfied:

$\nu d_{1bn} > 30 \ldots$ wherein $\nu d_{1bn}$ designates the Abbe number, with respect to the d-line, of said negative lens element provided in said second sub lens group.

12. The close-distance correcting lens system according to claim 10, wherein the following conditions are satisfied:

$nd_{1bn} < 1.7 \ldots$ and $nd_{1bp} > 1.8$ wherein $nd_{1bn}$ designates the refractive index at the d-line of said negative lens element provided in said second sub lens group, and
$nd_{1bp}$ designates the refractive index at the d-line of said positive lens element provided in said second sub lens group.

13. A close-distance correcting lens system comprising a positive first lens group and a negative second lens group,
wherein traveling distances of said first lens group and the second lens group toward the object side differ from each other when performing a focusing operation on an object at infinity to an object at a close distance, each lens group being defined such that a distance between adjacent lens elements of the first and second lens groups changes as a focusing operation is performed;
wherein said first lens group includes a positive first sub lens group, a negative second sub lens group, a diaphragm and a positive third sub lens group, in that order from the object side;
wherein said second sub lens group includes a single negative lens element having a concave surface facing toward the image, and
wherein the following is conditions are satisfied:

$\nu d_{1b} > 45 \ldots$ and $1.9 < |f2/f1| < 3.9 (f2 < 0)$ wherein f1 designates the focal length of said first lens group, and f2 designates the focal length of said second lens group, and
$\nu d_{1b}$ designates the Abbe number, with respect to the d-line, of said single negative lens element provided in said second sub lens group.

14. A close-distance correcting lens system comprising a positive first lens group and a negative second lens group,
wherein at least said first lens group moves toward the object side when performing a focusing operation on an object at infinity to an object at a close distance, each lens group being defined such that a distance between adjacent lens elements of the first and second lens groups changes as a focusing operation is performed;
wherein said second lens group includes a negative lens element having a concave surface on the image side, a positive lens element, and a negative lens element having a concave surface on the object side, in that order from the object side; and
wherein the following condition is satisfied:

$-1.6 < (R_{21i} + R_{21o})/(R_{21i} - R_{21o}) < -0.6$ wherein $R_{21i}$ designates the radius of curvature of the surface on the image side of said negative lens element having the concave surface on the image side, and
$R_{21o}$ designates the radius of curvature of the surface on the object side of said negative lens element having the concave surface on the image side.

15. The close-distance correcting lens system according to claim 14, wherein the following condition is satisfied:

$0.1 < R_{23o}/f_2 < 2.0 \ldots$, wherein $R_{23o}$ designates the radius of curvature of the surface on the object side of said negative lens element having the concave surface on the object side, and $f_2$ designates the focal length of said second lens group.

16. The close-distance correcting lens system according to claim 14, wherein the following condition is satisfied:

$$0.2 < f_{21}/f_2 < 0.7 \ldots,$$

wherein $f_{21}$ designates the focal length of said negative lens element having a concave surface on the image side, and $f_2$ designates the focal length of said second lens group.

17. The close-distance correcting lens system according to claim 14, wherein the following condition is satisfied:

$$0.2 < f_{23}/f_2 < 0.9 \ldots,$$

wherein $f_{23}$ designates the focal length of said negative lens element having a concave surface on the object side, and $f_2$ designates the focal length of said second lens group.

18. The close-distance correcting lens system according to claim 15, wherein the following condition is satisfied:

$$vd_{23} < 60 \ldots \text{wherein}$$

$vd_{23}$ designates the Abbe number, with respect to the d-line, of said negative lens element having a concave surface on the object side.

19. The close-distance correcting lens system according to claim 14, wherein said first lens group comprises a negative lens element which has a concave surface on the image side and is provided closest to the object side.

20. The close-distance correcting lens system according to claim 19, wherein the following conditions are satisfied:

$$nd_{11} > 1.65 \ldots, \text{ and}$$

$$vd_{11} > 40 \ldots, \text{wherein}$$

$nd_{11}$ designates the refractive index at the d-line of said negative lens element, of said first lens group, having a concave surface on the image side and provided closest to the object side, and $vd_{11}$ designates the Abbe number, with respect to the d-line, of said negative lens element, of said first lens group, having a concave surface on the image side and provided closest to the object side.

21. The close-distance correcting lens system according to claim 15, wherein said first lens group comprises at least one positive lens element, and wherein the following conditions are satisfied:

$$nd_{P1} > 1.7 \ldots \text{ and}$$

$$vd_{P1} < 60 \ldots$$

wherein $nd_{P1}$ designates the refractive index at the d-line of said at least one positive lens element provided within said first lens group, and $vd_{P1}$ designates the Abbe number, with respect to the d-line, of said at least one positive lens element provided within said first lens group.

22. The close-distance correcting lens system according to claim 14, wherein, when performing a focusing operation on an object at infinity and performing a focusing operation on an object at a close distance, said second lens group moves toward the object side at a moving rate different from a moving rate of said first lens group, and wherein the following condition is satisfied:

$$0.1 < \Delta d2/\Delta d1 < 0.9 \ldots \text{wherein}$$

$\Delta d1$ designates the traveling distance of said first lens group between performing a focusing operation on an object at infinity to and performing a focusing operation on an object at a close distance, and $\Delta d2$ designates the traveling distance of said second lens group between performing a focusing operation on an object at infinity to and performing a focusing operation on an object at a close distance.

23. The close-distance correcting lens system according to claim 14, wherein, between performing a focusing operation on an object at infinity and performing a focusing operation an object at a close distance, said second lens group does not move in the optical axis direction relative to the imaging plane.

24. The close-distance correcting lens system according to claim 14, wherein said first lens group comprises a positive first sub lens group, a negative second sub lens group, a diaphragm, and a positive third sub lens group, in that order from the object side, wherein said second sub lens group comprises a cemented lens including a negative lens element having a concave surface on the image side, and a positive lens element having a concave surface on the image side, in that order from the object side.

25. The close-distance correcting lens system according to claim 24, wherein the following condition is satisfied:

$$vd_{1bn} > 30 \ldots \text{wherein}$$

$vd_{1bn}$ designates the Abbe number, with respect to the d-line, of said negative lens element provided in said second sub lens group.

26. The close-distance correcting lens system according to claim 24, wherein the following condition is satisfied:

$$0 < vd_{1bn} - vd_{1bp} < 20 \ldots$$

wherein $vd_{1bn}$ designates the Abbe number, with respect to the d-line, of said negative lens element provided in said second sub lens group, and $vd_{1bp}$ designates the Abbe number, with respect to the d-line, of said positive lens element provided in said second sub lens group.

27. The close-distance correcting lens system according to claim 24, wherein the following conditions are satisfied:

$$nd_{1bn} < 1.7 \ldots$$

$$nd_{1bp} > 1.8 \ldots \text{wherein}$$

$nd_{1bn}$ designates the refractive index at the d-line of said negative lens element provided in said second sub lens group, and $nd_{1bp}$ designates the refractive index at the d-line of said positive lens element provided in said second sub lens group.

* * * * *